April 26, 1960 R. B. TROUSDALE 2,934,606

SELECTOR CIRCUIT

Original Filed Sept. 21, 1950 49 Sheets-Sheet 1

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 2

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 4

INVENTOR.
ROBERT B. TROUSDALE
BY
T. L. Bowes
Atty

INVENTOR.
ROBERT B. TROUSDALE
BY
T. L. Bowes
Att'y

INVENTOR.
ROBERT B. TROUSDALE
BY
T. L. Bowes
Atty

INVENTOR.
ROBERT B. TROUSDALE
BY J. L. Bowes
Att'y

INVENTOR.
ROBERT B. TROUSDALE
BY T. L. Bowes
Atty

April 26, 1960 R. B. TROUSDALE 2,934,606

SELECTOR CIRCUIT

Original Filed Sept. 21, 1950 49 Sheets-Sheet 9

INVENTOR.
ROBERT B. TROUSDALE
BY
T. L. Bowes
Att'y

INVENTOR.
ROBERT B. TROUSDALE
BY
J. L. Bowes
Atty

April 26, 1960 R. B. TROUSDALE 2,934,606

SELECTOR CIRCUIT

Original Filed Sept. 21, 1950 49 Sheets-Sheet 11

CONNECTOR 12 b

INVENTOR.
ROBERT B. TROUSDALE
BY
J. L. Bowes
Att'y

April 26, 1960 R. B. TROUSDALE 2,934,606

SELECTOR CIRCUIT

Original Filed Sept. 21, 1950 49 Sheets-Sheet 12

CONNECTOR 12b

INVENTOR.

ROBERT B. TROUSDALE

BY

J. L. Bowes

Atty

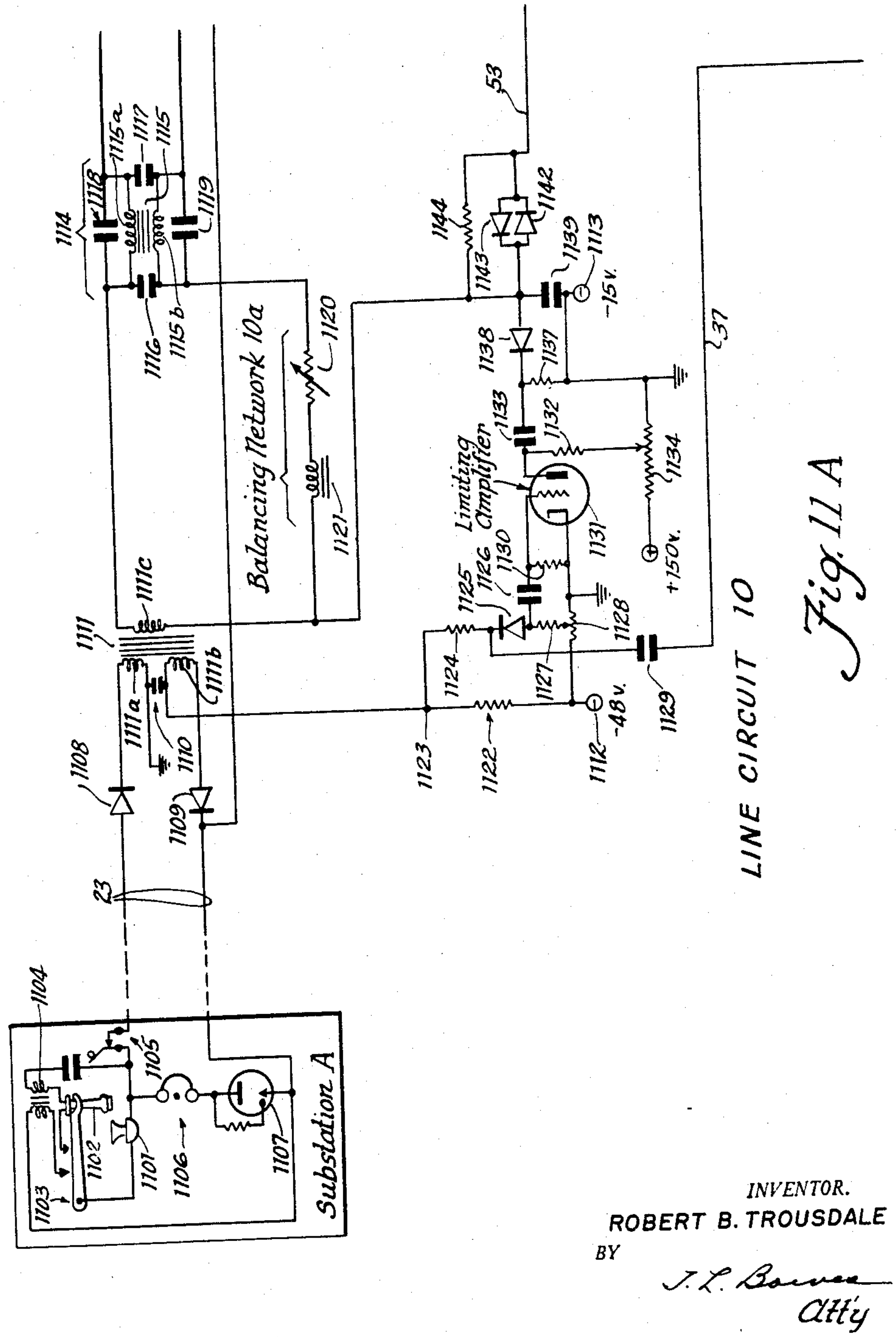
LINE CIRCUIT 10 Fig. 11A
INVENTOR.
ROBERT B. TROUSDALE
BY
J. L. Bowes
Att'y April 26, 1960

R. B. TROUSDALE

SELECTOR CIRCUIT 2,934,606

Original Filed Sept. 21, 1950

49 Sheets-Sheet 14

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 16

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 17

FINDER 12a

INVENTOR.
ROBERT B. TROUSDALE
BY
T. L. Bowes
Atty

April 26, 1960 R. B. TROUSDALE 2,934,606

SELECTOR CIRCUIT

Original Filed Sept. 21, 1950 49 Sheets-Sheet 18

INVENTOR.
ROBERT B. TROUSDALE
BY T. L. Bowes
Att'y

INVENTOR.
ROBERT B. TROUSDALE
BY
F. L. Bowes
Atty

April 26, 1960 R. B. TROUSDALE 2,934,606

SELECTOR CIRCUIT

Original Filed Sept. 21, 1950 49 Sheets-Sheet 20

CONNECTOR 12b

INVENTOR.
ROBERT B. TROUSDALE
BY
T. L. Bowes
Att'y

CONNECTOR 12b

INVENTOR.
ROBERT B. TROUSDALE
BY
T. L. Bowes
Att'y

CONNECTOR 12 b

INVENTOR.
ROBERT B. TROUSDALE
BY
J. L. Bowes
Att'y

DISTRIBUTOR 15

INVENTOR.
ROBERT B. TROUSDALE
BY
T. L. Bowes
Att'y

DISTRIBUTOR 15

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 26

LINE CIRCUIT 16

INVENTOR.
ROBERT B. TROUSDALE
BY
J. L. Bowes
Att'y

April 26, 1960 R. B. TROUSDALE 2,934,606

SELECTOR CIRCUIT

Original Filed Sept. 21, 1950 49 Sheets-Sheet 27

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 29

INVENTOR.
ROBERT B. TROUSDALE
BY
J. L. Bowes
Atty

April 26, 1960 R. B. TROUSDALE 2,934,606

SELECTOR CIRCUIT

Original Filed Sept. 21, 1950

49 Sheets-Sheet 30

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 32

INVENTOR.
ROBERT B. TROUSDALE
BY
T. L. Bowes
Att'y

INVENTOR.
ROBERT B. TROUSDALE
BY
T. L. Bowes
Att'y

INVENTOR.
ROBERT B. TROUSDALE
BY
J. L. Bowes
Att'y

INVENTOR.
ROBERT B. TROUSDALE
BY
T. L. Bowes
Att'y

INVENTOR.
ROBERT B. TROUSDALE
BY
T. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 38

INVENTOR.
ROBERT B. TROUSDALE
BY
T. L. Bowes
Att'y

INVENTOR.
ROBERT B. TROUSDALE
BY
T. L. Bowes
Att'y

INVENTOR.
ROBERT B. TROUSDALE
BY
J. L. Bowes
Att'y

April 26, 1960 R. B. TROUSDALE 2,934,606

SELECTOR CIRCUIT

Original Filed Sept. 21, 1950 49 Sheets-Sheet 41

INVENTOR.
ROBERT B. TROUSDALE
BY
J. L. Bowes
Att'y

April 26, 1960 R. B. TROUSDALE 2,934,606

SELECTOR CIRCUIT

Original Filed Sept. 21, 1950 49 Sheets-Sheet 42

INVENTOR.
ROBERT B. TROUSDALE
BY
J. L. Bowes
Att'y

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 44

INVENTOR.
ROBERT B. TROUSDALE
BY
T. L. Bowes
Att'y

INVENTOR.
ROBERT B. TROUSDALE
BY J. L. Bower
Att'y

April 26, 1960 R. B. TROUSDALE 2,934,606

SELECTOR CIRCUIT

Original Filed Sept. 21, 1950 49 Sheets-Sheet 46

INVENTOR.
ROBERT B. TROUSDALE
BY
T. L. Bowes
Att'y

April 26, 1960 R. B. TROUSDALE 2,934,606

SELECTOR CIRCUIT

Original Filed Sept. 21, 1950 49 Sheets-Sheet 47

INVENTOR
ROBERT B. TROUSDALE
BY
T. L. Bowes
Atty.

April 26, 1960 R. B. TROUSDALE 2,934,606

SELECTOR CIRCUIT

Original Filed Sept. 21, 1950 49 Sheets-Sheet 48

INVENTOR.
ROBERT B. TROUSDALE
BY
T. L. Bowes
Att'y

INVENTOR.
ROBERT B. TROUSDALE
BY
T. L. Bowes
Att'y

United States Patent Office 2,934,606

Patented Apr. 26, 1960

2,934,606

SELECTOR CIRCUIT

Robert B. Trousdale, Long Beach, Calif., assignor to Stromberg-Carlson Company, a corporation of New York Original application September 21, 1950, Serial No. 186,046, now Patent No. 2,774,071, dated December 11, 1956. Divided and this application October 8, 1956, Serial No. 614,634

53 Claims. (Cl. 179—18)

The present invention relates to improved methods and apparatus for selectively setting up signal transmission connections between the lines of a signaling system and more particularly to improved methods and apparatus for setting up private two-way communication connections between the lines of an automatic telephone system. This application is a division of copending application Serial No. 186,046, filed September 21, 1950, now Patent No. 2,774,071, granted Dec. 11, 1956.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signaling system on a selective basis. However, most if not all of these proposals are limited to arrangements for providing one-way signal transmission between two lines and include no provisions whatever for performing the ancillary control and supervisory functions, such, for example, as line busying, called line selection, called line busy testing and called station ringing, which are required in interconnecting the lines of an automatic telephone system.

It is an object of the present invention, therefore, to provide new and improved methods and apparatus for selectively setting up two-way connections between any pair of lines of a signaling system.

It is another object of the present invention to provide an improved automatic telephone system capable of providing all of the services of electromechanical switch type systems, but which consists exclusively of electron discharge tubes and interconnecting circuit components.

It is a further object of the invention to provide an improved electronic line selector which is fully automatic in operation and embodies improved methods and apparatus for controlling the transmission of signals in both directions and on a private basis between different pairs of connected lines of the system.

It is still another object of the invention to provide an improved electronic telephone system of the fully automatic type which includes numerical switching stages each comprising electronic facilities directively controllable over any calling line of the system to select a desired called line of the system.

It is a still further object of the invention to provide an improved impulse responsive line selector for use in an automatic telephone system of the character described.

More specifically, it is an object of the present invention to provide an improved impulse responsive line selector which is fully automatic in operation and which embodies electronic facilities for transmitting the usual start impulsing or dial tone signal over each calling line of the system when the line selector is operatively associated with the line, testing each called line to determine the idle or busy condition thereof incident to the selection thereof, returning a busy signal to the calling line if the called line tests busy, transmitting a ringing signal over the called line and a ring-back signal over the calling line if the called line tests idle, and terminating the ringing and ring-back signals in response to answering of the call on the called line.

It is another object of the present invention to provide a new and improved impulse responsive line selector which embodies electronic facilities directively controllable over any calling line of the system to select a desired called line of the system on a pulse multiplex basis.

The invention, both as to its organization and method of operation, together with further objects and advantages thereof, will best be understood by reference to the following specification taken in connection with the accompanying drawings, in which:

Figs. 1, 2, 3 and 4, when arranged in the manner shown in Fig. 5, diagrammatically illustrate an automatic telephone system characterized by the features of the present invention;

Figs. 2A and 2B when laid end to end in the order named diagrammatically illustrate the components of one of the finder-connector links embodied in the system shown in Figs. 1 to 4, inclusive;

Figs. 7 to 36, inclusive, when arranged in the manner shown in Fig. 6 illustrate the details of the system shown in Figs. 1 to 4, inclusive;

Figs. 37, 38, 39 and 40 when laid side by side in the order named graphically illustrate the time relationships between certain of the pulses developed by and utilized in the various components of the system; and Figs. 41 to 53, inclusive, are graphs illustrating the operating characteristics of certain components of the system.

In general, the fundamentally new electronic telephone system herein disclosed is capable of serving one hundred lines. More specifically, the system is capable of providing selective and private two-way communication between any two lines of a one hundred line group and includes entirely novel facilities for performing the functions of:

(1) Individual finder-connector link assignment to each calling line, coupled with automatic link busying as each link is taken into use to handle a call.

(2) Dial tone transmission to the calling substation when a finder-connector link is assigned to the calling line.

(3) Dial controlled impulsing (two digits) to effect selection, on a decimal basis, of any called line in the one hundred line group.

(4) Automatic dial tone cut-off in response to initiation of the dialing operation.

(5) Busy testing the called line incident to the selection thereof and the transmission of a busy tone signal to the calling substation in the event the called line tests busy.

(6) Intermittent ringing of the called substation in the event the called line tests idle and the transmission of a ringback tone signal to the calling substation as the ringing operation proceeds.

(7) Automatic ring cut-off and ringback tone signal cut-off when the called subscriber answers.

(8) Guarding each calling line against intrusion as a result of an incoming call thereto in response to assignment of a finder-connector link to the calling line and guarding of a called line against intrusion as a result of a subsequently initiated call thereto after it has been selected as a called line.

(9) Automatic release of the link occupied with a call incident to release of the connection at the calling substation.

All of the above functions are accomplished on a fully automatic basis without the use of any relays, stepping switches or other equivalent mechanical devices having moving parts. With the exception of the line circuits all equipment provided in the system to perform the described functions is common to all lines of the system, thus minimizing duplication of system components.

Basically the present improved system utilizes a system of multiplexing, namely pulsed sampling effectively at an ultrasonic rate of the control and intelligence signals produced at each substation of the system, to provide signal channel separation. Specifically, each line or substation of the system is assigned a particular pulse time position in each of repetitive pulse frames each comprising one hundred pulse time positions. Intelligence and control signals developed at any one substation of the system are sampled only in the particular pulse time position assigned to the particular substation and the samples are carried through the signal transmitting components of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

GENERAL DESCRIPTION OF THE SYSTEM

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system, and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points. Actually, only twenty-seven multiple connections and one individual connection are required in order to add one finder-connector link to the system. This is in contrast with conventional step-by-step and all-relay type systems wherein more than six hundred multiple connections are normally required to put a single added link into service.

As shown, the line circuits 10 and 16 respectively terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors **12*b*, 13*b* or 14*b* by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44*a* and 44*b* forming the illustrated cable 44 to one of the gate circuits provided in the distributor 16. The line circuit 10 is also connected to certain components of the common equipment 17 in the manner described below. Similarly, the line circuit 16 is connected by way of the conductors 54*a* and 54*b* to one of the gate circuits in the distrbutor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the distributor 15 performs the function of repeating intelligence and control signals derived from the connectors 12*b*, 13*b* and 14*b* in pulse time positions corresponding to particular calling and called lines to the line circuits respectively terminating the lines. To this end, the input terminals of the distributor are connected by way of the common conductor 51 to the output terminals of each of the connectors 12*b*, 13*b* and 14*b*. In performing the described functions, the multiplexer 11 and the distributor 15 are controlled by certain components of the common equipment 17** in the manner hereinafter explained.

The finders of the various links, such, for example, as the finder **12*a*, do not perform any intelligence transmission functions. On the contrary, they function strictly as control units. Specifically, the finder 12*a*** is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potentials upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated to a common busy conductor 52 which is multipled to each of the finders and connectors of the system. To perform the above functions in the manner fully explained below, the finder 12*a* comprises (see Figs. 2A, 15 and 16) a pulse input circuit 200, a +B switching circuit 201, a pulse combining circuit 202, tens and units coincidence tube circuits 203 and 204, and a finder pulse forming circuit 205. It will be noted that the finder 12*a* and connector 12*b* are connected on an individual link basis by only two conductors, namely the +B switch conductor 12*c* and the finder gate pulse conductor 12*d*. The finder 13*a* and connector 13*b* of the link 13 are similarly connected on an individual link basis by means of the finder gate and +B switch conductors 13*d* and 13*c* which respectively correspond to the conductors 12*d* and 12*c* of the link 12. Similarly, the finder gate and +B switch conductors 14*d* and 14*c* are provided to connect the finder 14*a* and connector 14*b* of the link 14.

Each of the connectors 12*b*, 13*b* and 14*b* performs a plurality of different functions. Thus the connector 12*b*, for example, is controlled by finder gate pulses delivered thereto over the conductor 12*d* to accept and respond to signal bearing multiplexer pulses occurring in the pulse time position coresponding to the calling line with which the link is associated. It also responds to the application of operating anode potential to the conductor 12*c* and to the finder gate pulses appearing on the conductor 12*d* to feed a dial tone signal to the distributor 15 on connector signal pulses occurring in the pulse time position assigned to the calling line with which it is operatively associated, thereby to return the usual dial tone signal to the calling subscriber. This connector 12*b* also responds to dial pulses (two digits) originating at the calling line with which the link 12 is operatively associated to select the particular pulse time position assigned to the called line. Incident to the selection of this time position, the connector 12*b* conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12*b* performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy; transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12*b* is also arranged to release in response to the release of a connection involving the link 12 at the calling substation.

To perform the above-mentioned functions in the manner fully explained below, the connector 12*b*, as diagrammatically illustrated in Fig. 2B and as shown in detail in Figs. 9, 10, 11, 18, 19 and 20, is provided with a calling line in gate circuit 207 which responds to finder gate pulses transmitted to the connector over the conductor 12*d* to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12*b* further comprises a called line out gate circuit 224 for gating to the distributor 15 connector signal pulses carrying the intelligence reconstructed by the circuit 208 in the time position assigned to a particular called line. In addition, the connector 12*b* includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate the distributor 15 signal bearing connector pulses which occur in the pulse time position assigned to the calling line. More generally, the three circuit 207, 208 and 224 function to repeat intelligence from the calling line to the called line, whereas the three corresponding circuits 223, 222 and 226 function to repeat to the calling line intelligence derived from the called line.

The connector 12*b* additionally comprises a plurality of components for responding to two digits of dial pulses repeated to the connector on multiplexer pulses occurring in the pulse time position assigned to the calling line. In general, the dial pulse responsive equipment of the connector 12*b* comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i.e., initiate certain operations at the ends of the first and second digits dialed into the connector. The connector further comprises a connector pulse forming circuit 217 which is controlled in accordance with the settings imparted to the tens and units digit registers 211 and 215 at the end of a dialing operation to produce the connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 function continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors 30*a*, 30*b*–30*j* over which negative units pulses are sequentially transmitted in the order named to the units coincidence tube circuits 204 of the finders 12*a*, 13*a* and 14*a* and the units digits registers 215 of the connectors 12*b*, 13*b* and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15 and also to the pulse gate circuits of a channel pulse commutator 22. The positive units pulses developed upon the two conductors 31*a* and 31*f* are also employed to control a bias and ringing carrier supply circuit 26. The positive and negative units pulses are sequentially developed on the units leads 31 and 30, respectively at a frequency rate of 100 kilocycles and each tenth positive units pulse, i.e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the tens pulse gate circuits of the multiplexer 11 and the tens pulse gate circuits of the distributor 15 in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 12*b* and 12*c* and the tens digit registers 211 embodied in the connectors 12*b*, 13*b* and 14*b*, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the units pulse gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

The common equipment 17 further comprises a link allotter 24 having the function of developing link allotting pulses of relatively long duration (preferably each pulse persists for at least one millisecond) successively on the link allotting conductors 36*a*, 36*b* and 36*c*. These conductors individually extend to the pulse combining circuits 202 of the finders 12*a*, 13*a* and 14*a* and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits 225 of each of the connectors 12*b*, 13*b* and 14*b*. The common equipment further comprises a ring-back tone generator 29*c*, the output signal of which is keyed by the ringing keying circuit 27 and supplied to the supervisory tone gate circuits 225 of each of the connectors 12*b*, 13*b* and 14*b* over a common multiple conductor 48. Finally, the common equipment includes a ringing supply circuit 60 which embodies a 20 cycle ringing current source and which is connected by way of two common multiple conductors 61*a* and 61*b* within the cable 61 to each of the line circuits of the system.

In order to render the mode of operation of the system more readily understandable, a pulse chart has been illustrated in Figs. 37 to 40, inclusive, to show the relative widths of the pulses developed by the common equipment components 19, 25, 20, 21 and 22 during two successive pulse frames, as well as the time or phase relationship between the pulses. As there shown, the units pulse ring drive pulses 95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i.e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*b*, 31*c*–31*j* and the negative units pulses coincidentally appearing on the units pulse conductors 31*a*, 31*b*–31*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b*–*j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62*a*, 62*b*, 62*c*, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33*a*, 33*b*–33*j* and the positive tens pulses coincidentally produced on the tens pulse conductors 32*a*, 32*b*–32*j* are illustrated as appearing along the ten zero potential reference lines 72 to 81, inclusive. Here, also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulse 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the positive and negative units pulses 62*a*, 62*b*, 62*c*, etc., appearing along the zero potential reference line 62 and impressed upon the units pulse conductors 30*a* and 31*a*, respectively, by the units pulse ring circuit 20. Further, each tens pulse period terminates at the exact instant of termination of the positive and negative units pulses 71*a*, 71*b*, 71*c*, etc., appearing along the zero potential reference line 72 and produced by the units pulse ring circuit 20 on the conductors 30*j* and 31*j*, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31*j* to step or trigger the tens pulse ring 21 on a periodic basis.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the positive and negative units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 37 to 40, inclusive, in mind, it will readily be understood that each pulse frame is divided into one hundred readily identifiable pulse time positions. Thus the first ten pulse time positions of each pulse frame, which are respectively assigned to the lines of the system having the directory number designations 11, 12—10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23—20, are defined by the second tens pulse period 73*a* during which the ten units pulse periods 62*b*, 63*b*, 64*b*–71*b* occur. Again, the third ten pulse time positions, which are respectively assigned to the lines of the system having the directory number designations 31, 32, 33—30, are marked out by the third tens pulse time period 74*a* during which the ten units pulse periods 62*c*, 63*c*, 64*c*–71*c* occur. Thus it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding signal pulse 84*b* occurs well within the limits of this pulse time position. Similarly, the pulse time position 32 assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

OPERATION OF THE SYSTEM AS A WHOLE

Briefly to consider the general mode of operation of the system, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53 to the units gating circuit of the multiplexer 11 which individually corresponds to the line 23. The multiplexer 11 responds to this change in magnitude of the controlling bias potential supplied thereto from the line circuit 10 by opening the units gate corresponding to the line 23 to permit the ten pulses 84*a*, 84*b*, 84*c*, etc., to pass through this gate. The tens gate circuit controlled by the tens pulse 73*a* corresponding to the ten line subgroup including the line 23, is, however, only opened in coincidence with the signal pulse 84*b* during each pulse frame. Accordingly, only the signal pulses 84*b* occurring during the pulse time positions 64*b* of successive pulse frames, are permitted to pass over the common conductor 50 to the pulse input circuits 200 of the finders 12*a*, 13*a* and 14*a* and the in gate circuits 207 and 223 of the connectors 12*b*, 13*b* and 14*b* in parallel. At this point the pulses transmitted from the multiplexer 11 over the common conductor in the pulse time position 64*b* may be regarded as multiplexer pulses 84*b*. Since only the link 12 is conditioned by the allotter 24 and the combining circuit 202 of the finder 12*a* to handle the call, and the connector 12*b* of this link is as yet inoperative, only the finder 12*a* initially responds to the multiplexer pulses 84*b* delivered thereto from the multiplexer 11 over the conductor 50 in the described pulse time position 64*b*.

In the finder 12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 211, 212, 213, 214, 215, 216, 218, 219, 223, 224 and 225 of the connector 12*b* over the +B switch conductor 12*c*, with the result that the connector 12*b* is conditioned for operation, i.e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the negative tens pulses developed by the tens pulse ring circuit 21 and the negative units pulses developed by the units pulse ring circuit 20. In responding to the tens and units pulses impressed thereon coincidentally with the multiplexer pulses 84*b*, the tens and units coincidence tube circuits 203 and 204 of the finder 12*a* cooperate with the finder pulse forming circuit 205 and the combining circuit 202 of this finder to produce finder gating pulses which are transmitted over the conductor 12*d* to the circuits 207, 208 and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy lead 52 to each of the other finders and connectors of the system to prevent these finders from responding to multiplexer pulses occurring in this time position. Thus the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b*. Finally, the busy pulses developed in the time position 64*b* render the finder 12*a* non-responsive to link allotter pulses impressed upon the allotter conductor 36*a*, individual to the link 12, by the allotter 24. After the finder 12*a* has operated to perform the described functions, continued holding of the finder 12*a* is dependent upon continued acceptance and transmission of multiplexer pulses 84*b* by the pulse input circuit 200, which of course means that the finder will remain associated with the calling line 23 only so long as a calling condition persists on this line.

As indicated above, when the +B switching circuit 201 of the finder 12*a* operates to apply operating anode potential to the conductor 12*c*, the circuits 209, 211, 212, 213, 214, 215, 216, 218, 219, 223, 224 and 225 of the connector 12*b* are conditioned for operation. Immediately anode potential is applied to the dial tone gating tube of the network 225, this network functions to transmit a dial tone signal, derived from the dial tone generator 29*b* over the conductor 47, to the calling line out gate circuit 226 over the conductor 244. This circuit in responding to the dial tone signal and also to the finder gate pulses delivered thereto over the conductor 12*d* and the commutator drive pulses 96*a* delivered thereto over the conductor 35, functions to repeat over the channel conductor 51 to the distributor 15 connector signal pulses modulated in accordance with the dial tone signal in the pulse time position 64*b* assigned to the calling line. The distributor 15 responds to the connector signal pulses thus transmitted thereto by repeating the same through the tens and units gate circuits thereof over the conductor 44*a* to the line circuit 10. In the line circuit 10, the dial tone signal is detected and transmitted over the line 23 to signal the calling subscriber that the dialing operation may be initiated.

Two digits of dial impulses must be dialed into the connector 12*b* in order to effect selection in the connector of the pulse time position 63*c* assigned to the called line 32. More specifically, the directory number digits 3 and 2 must be dialed successively into the connector 12*b* to effect selection of the pulse time position 63*c*. During the open circuit period of each dial impulse, the control bias supplied by the line circuit 10 to that units gate circuit of the multiplexer 11 which corresponds to the calling line 23 is returned to its on hook value to interrupt the transmission of multiplexer pulses 84*b* over the conductor 50 to the pulse input circuit 200 of the finder 12*a* and to the in gate circuit 223 and 207 of the connector 12*b*. At this point, it is noted that the +B switching circuit has a fundamentally new time delay feature incorporated therein which prevents this circuit from removing operating anode potential from the conductor 12*c* during the open circuit periods of dial impulses, hook switch flashing and the like. Thus premature release of the link 12 during dialing is positively prevented through the action of the +B switching circuit 201 to maintain operating anode potential upon the conductor 12*c* during the open circuit period of each dial impulse. With the +B switching circuit 201 operating to supply anode potentials to the tubes of the coincidence tube circuits 203 and 204 of the finder 12*a*, finder gating pulses continue to be transmitted over the conductor 12*d* to the circuits 207, 208 and 226 of the connector 12*b*. Thus these circuits are held in condition to respond to intelligence and control signals delivered thereto from the multiplexer 11 on multiplexer pulses 84*b* impressed upon the conductor 50 in the pulse time position 64*b*.

During the make period of each impulse dialed at the calling substation multiplexer signal pulse transmission from the multiplexer 11 to the finder 12*a* and the connector 12*b* in the pulse time position 64*b* is resumed. As controlled by the finder gating pulses delivered to the circuits 207 and 208 from the circuit 202 over the conductor 12*d*, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held nonresponsive to the three impulses transmitted thereto by the dial impulse integrator circuit 209 during dialing of the first digit 3 at the calling substation. However, the tens changeover gate circuit functions to repeat the three impulses over the conductors 230 and 231 respectively to the tens digit register circuit 211 and the tens sequence timing circuit 212. In responding to the three impulses thus transmitted thereto, the tens digit register 211 is driven to a setting wherein tens pulses appearing on the negative tens pulse conductor 33*c* in the third tens pulse time position 74*a* of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the second digit at the calling substation. Immediately the first dial impulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circuit 213 repeats the two impulses to the units changeover gate circuit 214 over the conductor 238 and the latter circuit repeats the impulses over the conductors 236 and 237, respectively, to the units digit register 215 and the units sequence timing circuit 216. As a consequence, the units digit register is operated or driven to open the second units gate circuit therein, thereby to establish a path for the transmission of units pulses appearing in the time positions 63*a*, 63*b*, 63*c*, etc., to the connector pulse forming circuit 217. The two pulses repeated to the units sequence timing circuit 216 over the conductor 237 serve to condition this circuit for operation at the end of the second digit.

At the end of the second digit dialed into the connector 12*b* the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the pulse time position 63*c* assigned to this line.

The potential applied to the conductor 242 also has the effect of rendering the connector pulse former circuit 217 operative to mix the tens and units pulses respectively transmitted thereto from the registers 211 and 215 over the conductors 232 and 245 to produce a resultant connector pulse which appears on the conductor 239. More specifically, the tens pulses 74*a* appearing on the negative tens pulse conductor 33*c* and gated by the tens digit register 211 are transmitted to the connector pulse former circuit 217 over the conductor 232 where they are mixed with the negative units pulses appearing in the time position 63*c* which are gated by the units register 215 and transmitted to the circuit 217 over the conductor 245. Mixing of these pulses in the circuit 217 results in the production of a resultant connector pulse which occurs during each pulse frame in the pulse time position 63*c* assigned to the called line. These pulses are transmitted over the conductor 239 to the connector components 218, 220, 222, 223 and 224.

Effectively, the busy test circuit 218 and the busy lock circuit 219 cooperate to perform the busy test operation in the connector 12*b*. More specifically, if the called line 32 is busy, i.e., occupied with a call, busy pulses are present on the common busy conductor 52 in the pulse time position 63*c* assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239. Coincidence between the connector pulses and the busy pulses has the effect of preventing the busy test circuit from operating. Thus the busy condition of the called line is indicated.

In the event the called line is busy, the busy lock circuit 219 as controlled over the conductors 242 and 246 and through the resistor 247 from the units sequence timing circuit 216 measures a predetermined time interval, i.e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus the calling subscriber is advised of the busy condition of the called line.

Assuming that the called line 32 is idle at the time the pulse time position 63*c* assigned thereto is selected in the connector in the manner explained above, such busy pulses as may be present on the common busy lead 52 do not occur coincidentally with the connector pulses generated by the connector pulse forming circuit 217 in the pulse time position 63*c* assigned to the called line. When coincidence between the connector pulses and the busy pulses is lacking, the busy test circuit operates immediately the first connector pulse is impressed thereon from the connector pulse forming circuit 217 over the conductor 239. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position **63*c* to the distributor 15, and is applied to the busy gate circuit 220 so that connector pulses are released to the busy conductor 52 and is also applied to the network 225 to act as an operating anode potential for the ring back tone gate tube of this network. The positive potential developed on the cut-through conductor 251 is also applied to the called line in-gate circuit 223 and the called line reconstructor circuit 222, thereby to condition these circuits to accept signals derived from the called line. This feature of making operation of the circuits 223 and 222** dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring back tone gate circuit of the network 225. When this occurs, the ring back tone gate circuit of the network 225 is rendered operative to transmit the intermittent ring back tone signal derived from the keying circuit 27 over the conductor 48 to the calling line out gate circuit 226 over the conductor 244. The ring back tone signal is modulated on the signal pulses developed by the out gate circuit 226 and thus transmitted by way of the conductor 51 and the distributor 15 to the line circuit 10. In the line circuit 10, the ring back tone signal is detected and transmitted over the calling line 23 to the calling substation. Thus the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position **63*c* assigned to the called line, whereby very narrow connector signal pulses are released over the conductor 51 to the distributor 15 which are well within the limits of the pulse time position 63*c* assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the pulse time position 63*c* which are approximately fifty percent larger in amplitude than those used to convey intelligence signals to the distributor 15 after the call is answered at the called substation B. These large amplitude signal pulses are diverted by the distributor 15 to the line circuit 16** and serve to signal this line circuit that the ringing operation should start.

More specifically, the large amplitude connector signal pulses are released by the distributor 15 to the line circuit 16 over the conductor **54*a*. In this line circuit, these pulses have the effect of activating the ringing control facilities of the line circuit 16 with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45 to the multiplexer 11 with the result that the gate assigned to the called line 32 in the multiplexer 11 is opened to permit multiplexer pulses 83*c* occurring in the pulse time position 63*c* of each pulse frame to be transmitted through the corresponding tens and units gate circuits of the multiplexer 11 and over the conductor 50** to the multiplexer input terminals of each of the finders and connectors of the system.

The multiplexer pulses **83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse former circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty percent the amplitude of the connector signal pulses transmitted over the conductor 51 and through the distributor 15 to the line circuit 16. The ringing control facilities of the line circuit 16 respond to this decrease in the amplitude of the connector signal pulses delivered thereto by terminating the transmission of ringing current to the called substation. Thus the ringing operation is arrested. The decrease in the positive potential present on the ring trip conductor 253 which occurs when the ring trip circuit 221 operates also has the effect of closing the ring back tone signal transmission gate of the network 225**, with the result that transmission of the ring back tone signal to the calling substation is arrested.

Following the described operations in the connector **12*b*, a two-way talking or communication circuit is fully established between the calling substation A and the called substation B. Thus, voice or other signals developed at the substation A and transmitted over the line 23 to the line circuit 10 serve to vary the bias voltage impressed upon the gate circuit of the multiplexer 11 over the conductor 53 directly in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy conductor 52 from the circuit 205. In the finder 12*a*, the multiplexer pulses 84*b* maintain the +B switching circuit 201 operated to hold the link 12 associated with the line 23. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 and released by the distributor 15 to the line circuit 16. In the line circuit 16, the signal components of the connector signal pulses are detected and transmitted over the line 32** to the called substation B where they are audibly reproduced by the receiver of the telephone instrument provided at the called substation.

Voice signals developed at the called substation B and transmitted over the line 32 to the line circuit 16 cause the bias potential delivered over the conductor 45 to the gate circuit of the multiplexer 11 which corresponds to the called line 32 to vary in exact accordance therewith. As a consequence, the voice signals are modulated upon the multiplexer pulses **83*c* occurring within the pulse time position 63*c* and released through the units and tens gates of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy conductor 52 in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuits 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are released by the distributor 15 in the pulse time position 64*b* and are diverted to the line circuit 10 through the gating circuit of the distributor which corresponds to the calling line. In the line circuit 10, the signal components of the pulses released by the calling line out gate circuit 226 are detected and transmitted over the line 23** to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. This non-interfering feature of the system primarily results from the assignment of two discrete and non-interfering pulse time positions in each pulse frame for the transmission of voice or intelligence modulated signals simultaneously through the switching equipment of the system in both directions. Secondarily, it results from physical separation of the intelligence gating circuits in the connector **12*b* into six discrete components. Thus the calling line in gate circuit 207, the calling line reconstructor circuit 208 and the called line out gate circuit 224 are used only to repeat intelligence or voice signals from the calling line to the called line, whereas the called line in gate circuit 223, the called line reconstructor circuit 222 and the calling line out gate circuit 226** are used only to repeat intelligence or voice signals from the called line to the calling line.

In describing the manner in which the system components 10, 11, **12*a*, 12*b*, 15 and 16 are partially or wholly released upon termination of the call, it may be assumed first that the called party at the substation B is the first to hang up. In such case, the bias potential delivered from the line circuit 16 over the conductor 45 to the gating circuit of the multiplexer 11 individually assigned to the called line 32 is restored to its normal value when the called line loop circuit is opened, with the result that multiplexer pulses 83*c* appearing in the pulse time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63*c* assigned to the called line continue to be fed to the busy conductor 52 from the busy gate circuit 220 of the connector 12*b*, thereby to prevent the called line 32** from originating a call or accepting an incoming call. This of course means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53 to that gate circuit of the multiplexer 11 which individually corresponds to the calling line 23 is restored to its normal value. As a consequence, this gate circuit is biased to terminate the transmission of multiplexer pulses **84*b* occurring in the pulse time position 64*b* over the conductor 50 to the various finders and connectors of the system. When the transmission of multiplexer pulses 84*b* to the pulse input circuit 200 of the finder 12*a* is thus terminated, this circuit is rendered inactive to repeat pulses to the finder circuits 201, 203 and 204. After a predetermined time interval, measured by the overall time constant of the +B switching circuit 201, this circuit responds to cessation of multiplexer pulse transmission thereto by removing the operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy conductor 52 in the pulse time position 64*b* assigned to the calling line 23 is arrested. Termination of pulse transmission to the combining circuit 202 in the time position 64*b* has the effect of rendering this circuit operative under the control of the link allotter 24 to reassociate the link 12 with another calling line to handle another call. Cessation of busy pulse transmission to the conductor 52 in the pulse time position 64*b* has the effect of marking the calling line 23** as idle to permit initiation of a second call on this line or seizure of the line on a call incoming thereto.

Removal of operating anode potential from the conductor **12*c* also has the effect of restoring the component circuits 209, 211, 212, 213, 214, 215, 216, 218, 219, 223, 224 and 225 of the connector 12*b* to normal, thereby to condition the connector 12*b* to handle another call. Incident to normalizing of the connector pulse forming circuit 217, connector pulse production on the conductor 239 in the pulse time position 63*c* assigned to the called line 32 is terminated to arrest the application of busy pulses to the common busy conductor 52 by the busy gate circuit 220 in this pulse time position. Thus the called line is unguarded to free the same for use in initiating another call or accepting a call incoming thereto. It will be noted that normalizing of the identified circuits of the connector 12*b* has the effect of restoring all components of this connector to the condition which prevailed at the time the link 12** was taken into use to handle the call just described.

As will be evident from the immediately preceding explanation, the key component involved in effecting release of the link 12 is the +B switching circuit 201 embodied in the finder **12*a*. So long as multiplexer pulses are repeated to this circuit by the pulse input circuit 200 in the time position assigned to the calling line, the circuit positively prevents release of the link 12 and holds both the calling and called lines out of service, i.e., prevents use of the same in initiating outgoing calls or accepting incoming calls. However, when multiplexer pulse transmission by way of the pulse input circuit 200 to the +B switching circuit 201 is arrested for a period of time greater than approximately one fourth of a second, this switching circuit immediately effects release of the link regardless of the extent of progress of the call and regardless of whether or not the connection has been released at the called substation. Thus, normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i.e., hang up, the link 12 is immediately released under the control of the +B switching circuit 201 embodied in the finder 12*a*. In such case, the line circuit 16 associated with the called line 32 immediately assumes a setting indicating that the line 32 is calling, with the result that a link is assigned to the called line under the control of the allotter 24** and the usual dial tone signal is returned to the called subscriber. This signal has the effect of indicating to the called subscriber that the connection has been released at the calling substation and that he should hang up.

DETAILED DESCRIPTION OF THE SYSTEM

Figure 1:
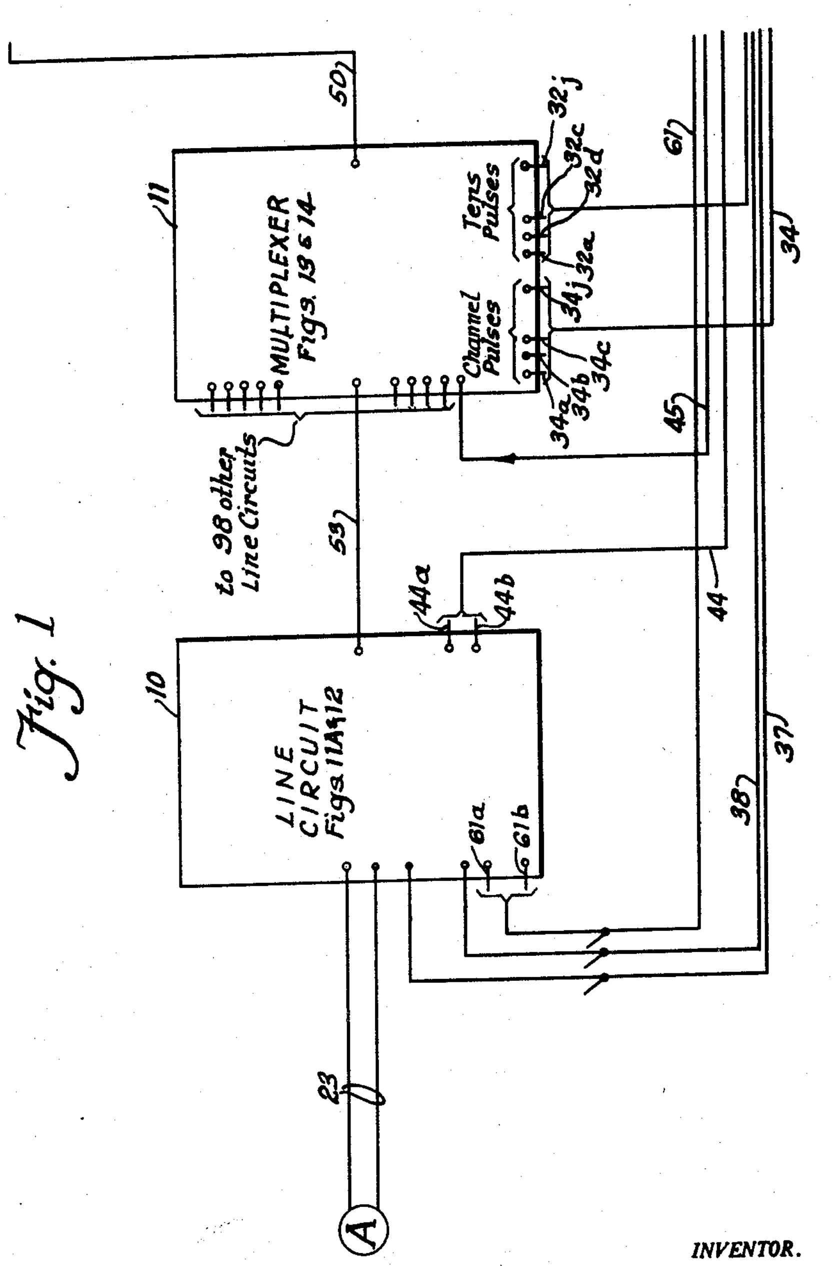

In considering the detailed circuitry of the system components briefly described above, operation of these components will be analyzed in so far as possible in terms of functions which they perform in establishing the above-described connection between the lines 23 and 32 in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. Thus, each of the tens coincidence tubes 1610, 1620, 1630—1600 of the tens coincidence tube circuit 203 in the finder **12*a*** are of the gas filled type and dots disposed opposite the respective cathodes of these tubes have been illustrated to indicate this fact. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification, the terms electronic and electronic means refer to an are intended to define means comprising electron conductive devices such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches and the like.

*Master oscillator 18*

Figure 36:
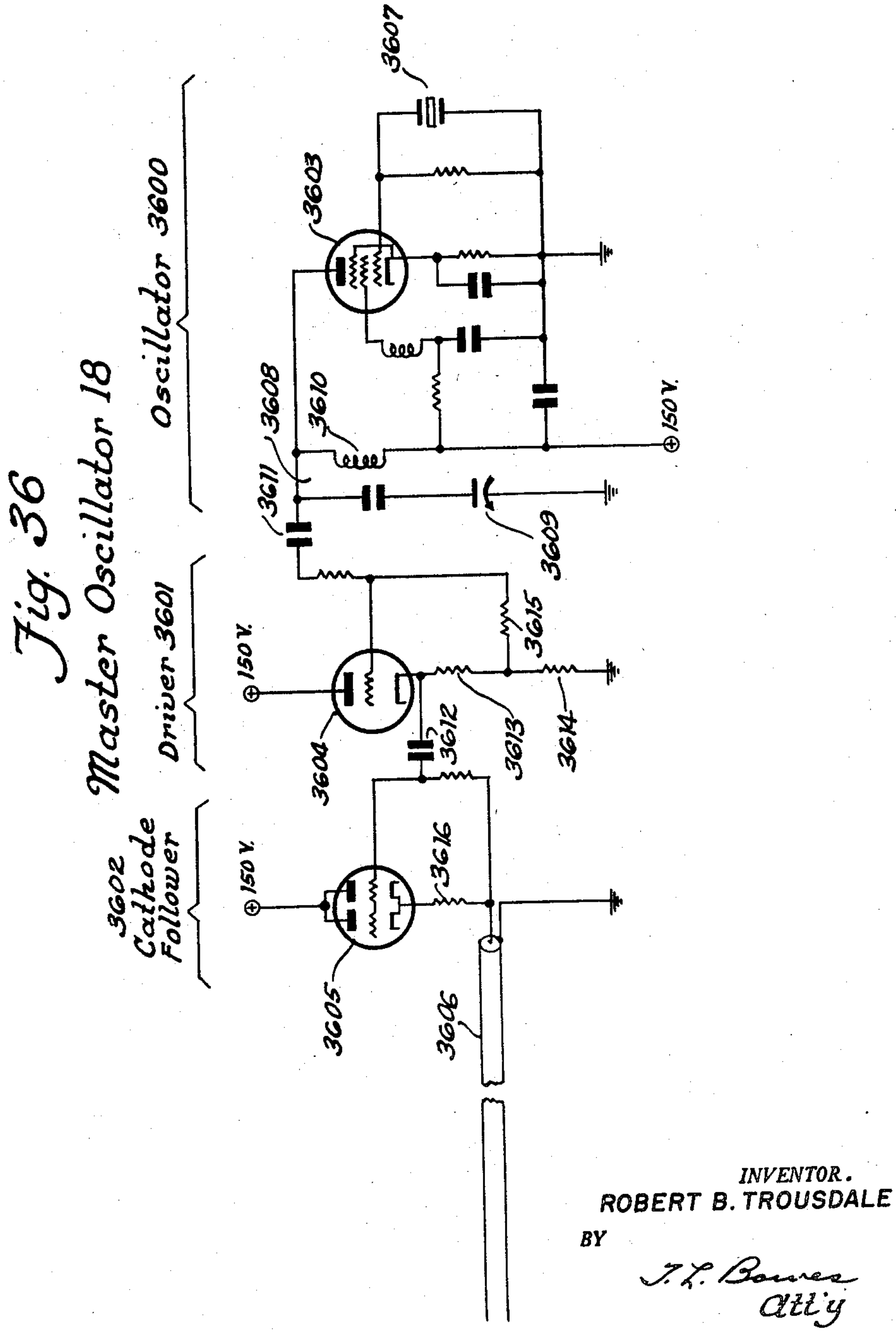
Figure 37:
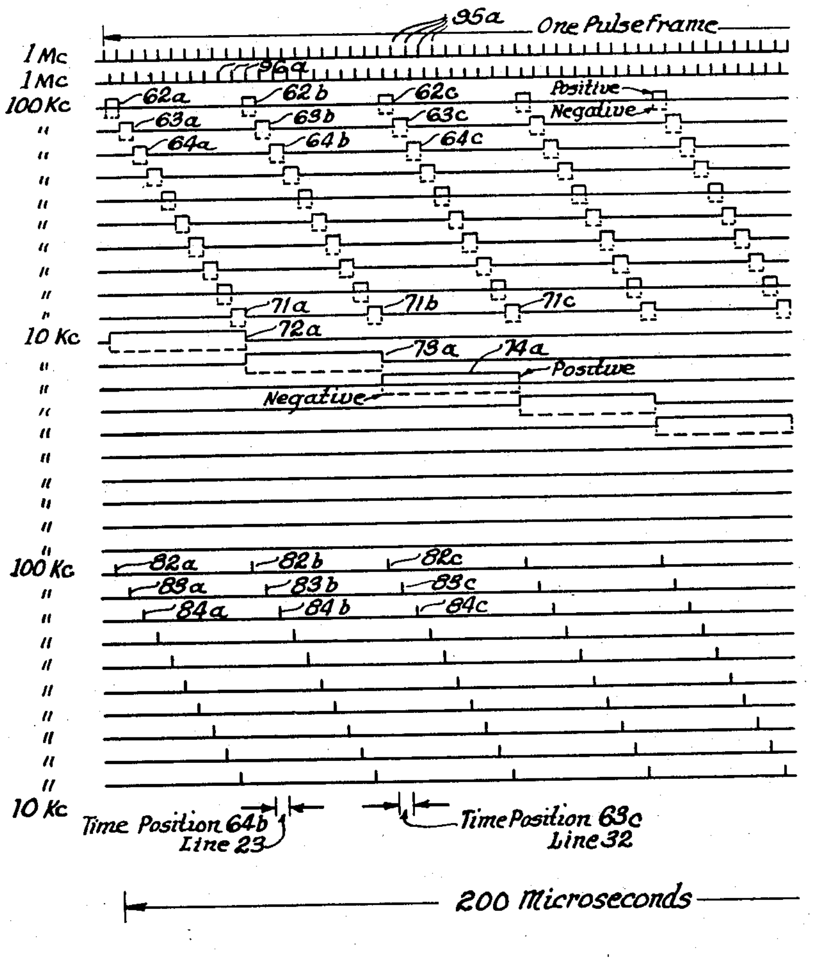
Figure 38:
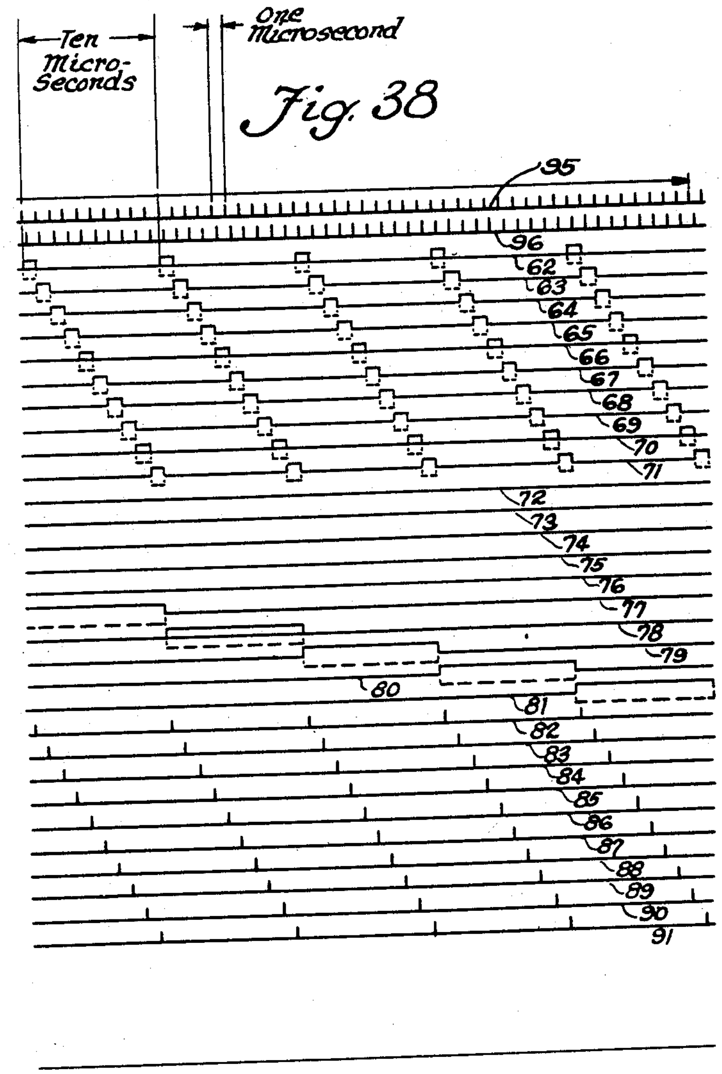
Figure 39:
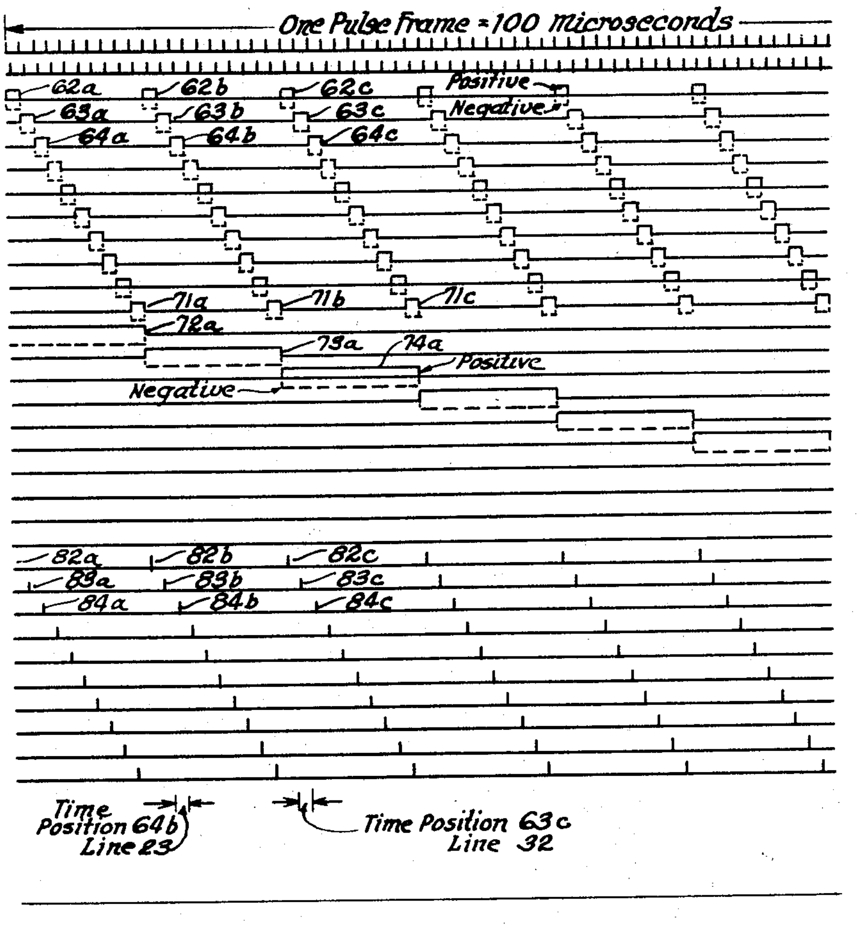
Figure 40:
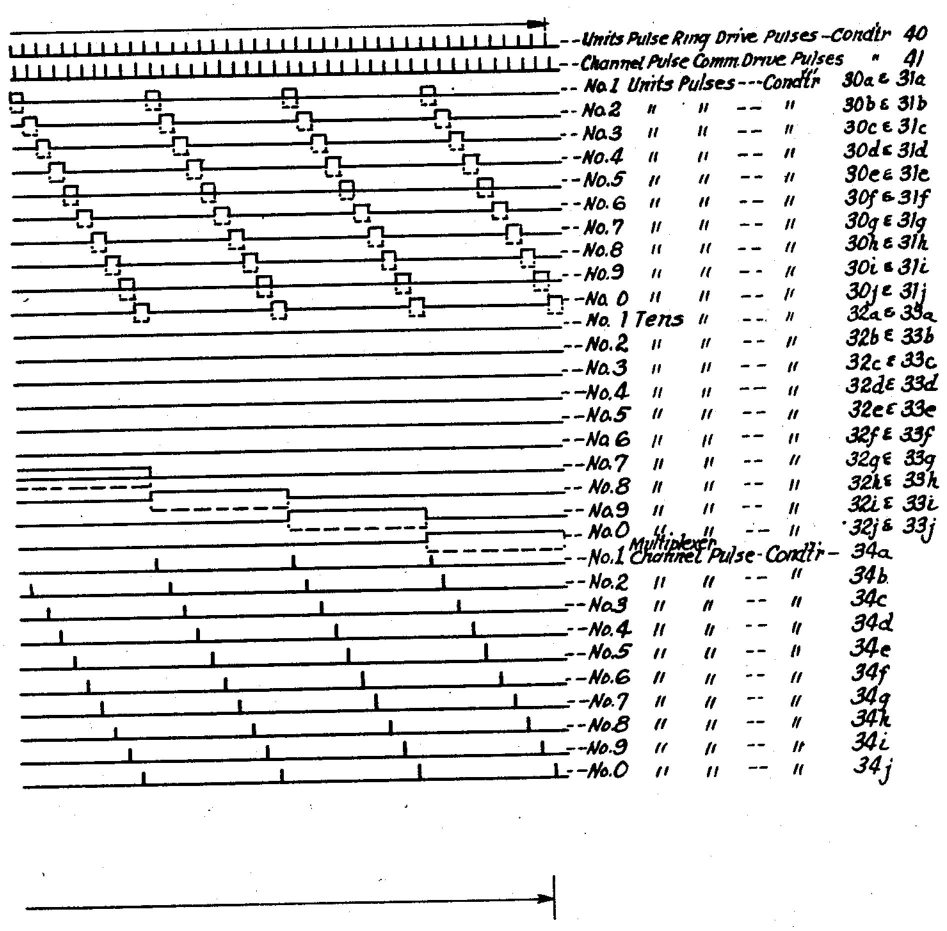

This circuit, as shown in Fig. 36 of the drawings, is substantially conventional and is designed to provide a stable output signal voltage of three volts at a frequency of one megacycle across the output terminals thereof. In general, the circuit comprises an oscillator section 3600 which includes an oscillator tube 3603 of the well known 6AK5 type, a driver section 3601 which includes a triode of the 6C4 type, and a cathode follower section 3602 which includes a twin triode tube of the well known 6J6 type. More specifically, the oscillator section 3600 of the circuit 18 is of the electron coupled type in which the screen electrode of the tube 3603 serves as the plate or anode of a triode oscillator and power is taken from a tuned output circuit coupled between the anode and cathode of the tube 3603. It is provided with a frequency determining crystal 3607 having a resonant frequency of one megacycle which is connected between the input electrodes of the tube 3603 to determine the output frequency of the oscillator, and a tuned output circuit, consisting of an inductance 3610 paralleled by a tuning condenser 3609, designed to have a resonant frequency of one megacycle. The output voltage developed by the oscillator network 3600 is impressed upon the input electrodes of the driver tube 3604 through a coupling condenser 3611. The driver tube 3604 is connected to operate as a cathode follower, resistors 3613 and 3614 being provided in the cathode circuit of this tube across which the one megacycle signal voltage is developed. The direct current component of the voltage appearing across the resistor 3613 is applied through a resistor 3615 negatively to the control grid of the tube 3604 to establish the normal operating bias level for this tube. The signal voltage appearing across the serially related cathode resistors 3613 and 3614 of the driver tube 3604 is impressed upon the parallel connected control grids of the cathode follower tube 3605 through a coupling condenser 3612. As shown, the parallel connected cathodes of the tube 3605 are connected to ground through a load circuit which comprises a cathode resistor 3616, a coaxial cable 3606 extending to the phase shift and pulse forming circuit 19 and a terminating resistor 3518 provided at the distant end of the cable 3606. More specifically, the terminating resistor 3518 is connected between the central conductor of the coaxial cable 3606 and the grounded sheath of this cable.

As will be evident from the foregoing explanation, the output voltage developed across the output circuit 3608 during operation of the oscillator network 3600 is impressed upon the control grid of the driver tube 3604 through the coupling condenser 3611. This signal voltage is repeated by the tube 3604 and appears across the cathode resistors 3613 and 3614 to be conducted to the control grids of the twin triode tube 3605 through the coupling condenser 3612. In the cathode follower 3602, the signal voltage is repeated by the tube 3605 and appears across the cathode load circuit of this tube, namely the resistors 3616 and 3518 and the coaxial cable 3606. That portion of this voltage which is developed across the resistor 3518 is utilized as the driving voltage for the phase shift and pulse forming circuit 19. This voltage has substantially a pure sine wave form and an amplitude of three volts. In the described operations, the driver section 3601 of the oscillator 18 functions to match the relatively high impedance of the oscillator output circuit 3608 with the relatively low input circuit impedance of the cathode follower 3602, in addition to supplying a portion of the required attenuation of the oscillator output voltage.

*Phase shift and pulse forming circuit 19*

Figure 34:
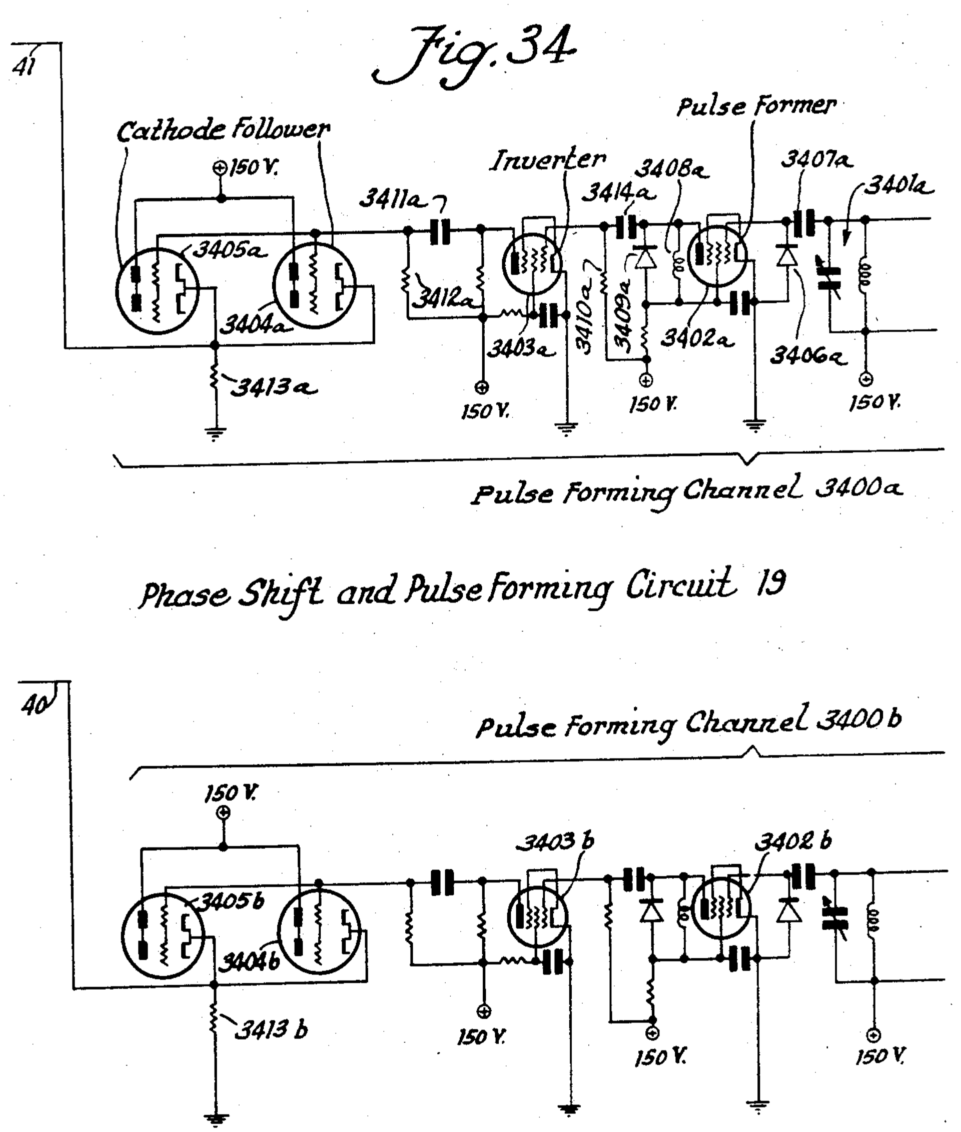
Figure 35:
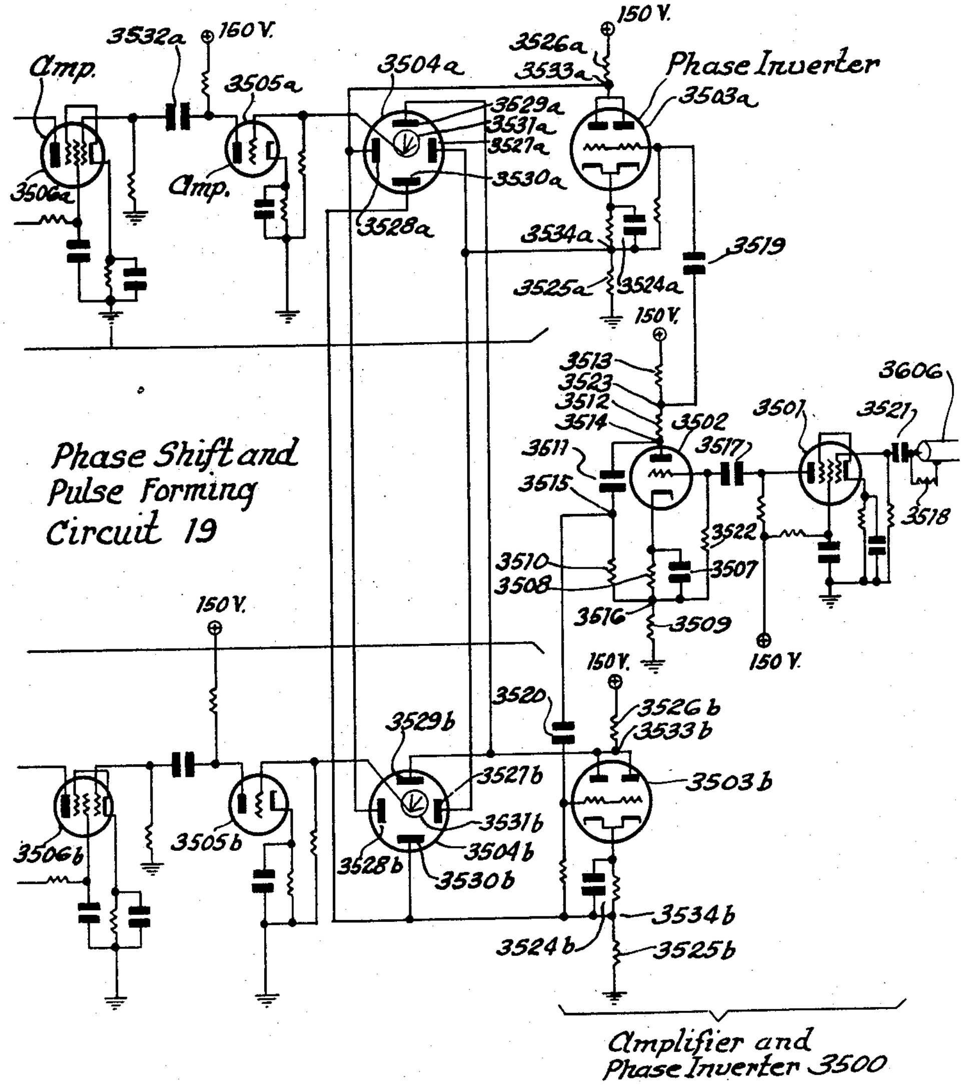

This circuit, as shown in Figs. 34 and 35 of the drawings, is provided to generate the extremely narrow pulses 95*a* and 96*a* which are used in sampling the intelligence and control signals in the manner generally explained above, and also for driving the units pulse ring circuit 20 and the commutator drive circuit 25. It is arranged to operate from a sine wave signal source, namely the master oscillator 18, which as previously explained, may be remote from the other equipment of the exchange, thus enabling the pulses developed by the phase shift and pulse forming circuits of several exchanges to be synchronized through the use of a single master oscillator 18 feeding these circuits from a convenient common point. The circuit 19 responds to the sine wave signal delivered thereto from the master oscillator 18 by developing two sets of output pulses on the output conductors 40 and 41 which may be phase shifted with respect to each other over a full 360 degree phase shift range. This permits exact centering of the signal sampling pulses within the limits of corresponding units pulses of longer duration in the manner generally explained above.

Briefly considered, the circuit 19 comprises an amplifier and phase inverter section 3500 which is common to two identical pulse forming channels 3400*a* and 3400*b*. These two pulse forming channels comprise identical circuit components interconnected in the same way. Accordingly, reference numerals, distinguished by the subscripts *a* and *b*, have been employed to identify corresponding components of the two channels. In detail, the amplifier and phase splitting section 3500 comprises a high gain pentode amplifier tube 3501 of the 6AK5 type having its input electrodes coupled to the output resistor 3518 of the master oscillator 18 through a coupling condenser 3521 and having its output electrodes coupled through a coupling condenser 3517 to the input electrodes of a phase splitting tube 3502 of the 6C4 type. The tube 3502 is provided with a cathode load resistor 3509 connected in series with a cathode bias resistor 3508 which is shunted by a by-pass condenser 3507. The direct current component of the voltage developed across the resistor 3508 is negatively applied as a bias voltage to the control grid of the tube 3502 through a resistor 3522. This tube is also provided with an anode load circuit which comprises two series connected resistors 3512 and 3513 having a combined resistance somewhat higher than the resistance of the cathode load resistor 3509. A phase splitting circuit comprising a condenser 3511 and resistor 3510 connected in series between the anode of the tube 3502 and the top of the load resistor 3509 is provided to perform the phase splitting operation described more fully below. The phase splitting tube 3502 is coupled through coupling condensers 3519 and 3520, respectively, to excite the input electrodes of two phase inverter tubes 3503*a* and 3503*b*. Each of the tubes 3503*a* and 3503*b* is of the twin triode 6J6 type having its anodes, control grids and cathodes connected in parallel. As shown, the tube 3503*a* is provided with a self-biasing network 3524*a*, a cathode load resistor 3525*a* and an anode load resistor 3526*a*. Similarly, the phase inverter tube 3503*b* is provided with a self-biasing circuit 3524*b*, a cathode load resistor 3525*b*, and an anode load resistor 3526*b*. Each of the two phase inverter tubes delivers two phase displaced input signals to each of the two pulse forming channels 3400*a* and 3400*b*.

Considering the pulse forming channel 3400*a* by way of example, this channel comprises a four phase condenser 3504*a* having four stator plates 3527*a*, 3528*a*, 3529*a* and 3530*a* which are physically displaced by 90 degrees and within which is rotatably mounted a specially shaped rotor 3531*a* capable of rotation through an angle of 360 degrees or more. The stator plates 3527*a* and 3528*a* are respectively connected to the top terminal 3534*a* of the cathode load resistor 3525*a* and the anode terminal 3533*a* of the tube 3503*a*, whereas the two remaining stator plates 3529*a* and 3530*a* are respectively connected to the anode terminal 3533*b* of the phase inverter tube 3503*b* and the top terminal 3534*b* of the cathode load resistor 3525*b*. The signal voltage developed between the rotor 3531*a* of the four-phase condenser 3504*a* and ground is impressed upon the input electrodes of a triode amplifier tube 3505*a* of the well known 6C4 type. This amplifier tube feeds its amplified signal output voltage through a coupling condenser 3532*a* to the input electrodes of a second high gain pentode amplifier tube 3506*a* of the well known 6AK5 type. The output circuit 3401*a* of the last-mentioned amplifier tube consists of inductance and capacitance elements which are shunt connected to form a tuned circuit resonant at the signal frequency of one megacycle. The voltage developed across this resonant circuit is impressed upon the input electrodes of a pulse forming tube 3402*a* through a coupling condenser 3407*a*. This tube is also of the commercial 6AK5 type and has its input electrodes shunted by a crystal rectifier 3406*a*. The output circuit of the pulse forming tube 3402*a* includes an inductance element 3408*a* which is self-resonant at a frequency approximately 2½ times the output frequency of the master oscillator 18, i.e., at a frequency of approximately 2½ megacycles. This self-resonating inductance element is shunted by a crystal rectifier 3409*a*. The voltage developed across the shunt connected elements 3408*a* and 3409*a* is impressed upon the input electrodes of an inverter tube 3403*a* through a coupling condenser 3414*a*. This inverter tube is preferably in the form of a 6AK5 pentode and includes as one of its input electrodes a control grid which is connected to the +B terminal of the anode current supply source through a grid resistor 3410*a*. The signal voltage developed at the anode of the tube 3403*a* is fed through a coupling condenser 3411*a* to the control grids of two parallel connected cathode follower tubes 3404*a* and 3405*a* having a common cathode load resistor 3413*a*. These two cathode follower tubes are of the twin triode 6J6 type having their anodes, control grids and cathodes respectively connected in parallel. The cathode load resistor 3413a of the two cathode follower tubes 3404a and 3405a functions as the output load impedance of the pulse forming channel 3400a. Accordingly, the commutator drive conductor 41 is connected to the cathode end of this load resistor.

In considering the operation of the phase shift and pulse forming circuit 19, it will be understood that the one megacycle sine wave signal voltage developed across the output load resistor 3518 of the master oscillator 18 is impressed between the cathode and control grid of the amplifier tube 3501 through the coupling condenser 3521. This voltage is amplified through the tube 3501 and impressed between the control grid and cathode of the phase splitting tube 3502 through the coupling condenser 3517. The tube 3502 is characterized by a low mμ factor and performs the function of developing two sine wave voltages at the circuit terminals 3515 and 3523 which are displaced in phase by 90 degrees. More specifically, the signal voltage developed at the terminal 3514 of the anode circuit is displaced in phase by one hundred and eighty degrees relative to the signal voltage developed at the cathode resistor load terminal 3516. These two voltages are of substantially equal amplitude and are fed to the phase splitting circuit consisting of the condenser 3511 and the resistor 3510. As a result of the phase splitting action of these two series connected circuit elements, a resultant voltage is developed at the terminal 3515 and impressed upon the control grids of the inverter tube 3503b through the condenser 3520 which is phase displaced by 90 degrees relative to the signal voltage appearing at either of the two anode circuit terminals 3514 or 3523. The phase inverter tube 3503b responds to the excitation voltage thus impressed upon its control grid by developing signal voltages of equal amplitude at its anode circuit terminal 3533b and cathode load resistor terminal 3534b which are phase displaced by 180 degrees. These voltages are respectively impressed upon the stator plates 3529a and 3530a of the four-phase condenser 3504a. Similarly, the signal voltages developed at the terminal points 3533b and 3534b of the phase inverter stage 3503b are respectively impressed upon the stator plates 3529b and 3530b of the four-phase condenser 3504b.

As indicated above, the signal voltage developed at the anode circuit terminal point 3523 of the phase splitting stage 3502 is phase displaced 90 degrees relative to the signal voltage developed at the circuit terminal 3515. The voltage appearing at the terminal point 3523 is impressed upon the input electrodes of the second phase inverter tube 3503a through the coupling condenser 3519 to produce signal voltages at the anode terminal point 3533a and the cathode load resistor terminal 3534a which are of equal amplitude but are phase displaced by one hundred and eighty degrees. These signal voltages are respectively impressed upon the stator plates 3528a and 3527a of the four-phase condenser 3504a and upon the corresponding stator plates 3528b and 3527b of the second four-phase condenser 3504b.

From the preceding explanation, it will be understood that the three tubes 3502, 3503a and 3503b in cooperation with the circuit elements interconnected therewith respond to the amplified one megacycle signal voltage delivered to the tube 3502 by producing four sine wave signal voltages of the same frequency and equal amplitude which are respectively displaced in phase by 90 degrees and which are respectively impressed upon the four stator plates of each of the four-phase condensers 3504a and 3504b. It is of importance to maintain amplitude equality between these signal voltages, and it is to this end that the combined plate or anode load resistance afforded by the resistors 3512 and 3513 in the anode circuit of the phase splitting tube 3502 is made substantially greater than the resistance of the cathode load resistor 3509. In this connection, it is noted that since the input electrode biasing resistor 3508 of the tube 3502 is by-passed at the signal frequency by the condenser 3507, is does not substantially affect the cathode load resistance of the tube 3502 at this frequency. The necessity for making the anode load resistance of the tube 3502 appreciably higher than the cathode load resistance of the tube is dictated by the fact that the cathode impedance of the tube is very low and is virtually unaffected by stray capacitance, whereas the plate impedance of the tube is relatively high and hence the magnitude of the signal voltages appearing at the circuit terminals 3514 and 3523 is very substantially affected by the shunting effect of stray capacitance. However, by employing a load resistance for the tube 3502 having a value appreciably higher than the resistance value of the cathode load resistor 3509, this effect is overcome with the result that the voltages produced at the circuit terminals 3514 and 3516 are equalized. It has been found that entirely satisfactory results may be obtained by employing resistors 3512 and 3513 having resistance values of 2700 and 2400 ohms, respectively, and using a cathode load resistor 3509 having a resistance value of 3900 ohms. Resistance values higher than those just given cannot be employed satisfactorily since the use of higher value resistors has the effect of altering to an appreciable extent the desired one hundred and eighty degree phase relationship between the signal voltages developed at the circuit terminals 3514 and 3516. Further to the end of obtaining amplitude equality between the signal voltages supplied to the four stator plates of each of the condensers 3504a and 3504b, the anode and cathode load resistors 3526a and 3525a of the tube 3503a are selected to have relatively low and unequal resistance values, such that the voltages appearing at the circuit terminals 3533a and 3534a are of equal amplitude. Similarly, the anode and cathode load resistors 3526b and 3525b of the inverter tube 3503b are selected to have unequal resistance values which insure amplitude equality of the signal voltages developed at the circuit terminals 3533b and 3534b. Specifically, the desired signal voltage equality at the output terminals of the two phase inverter tubes 3503a and 3503b may be obtained by using anode load resistors 3526a and 3526b each having a resistance value of 560 ohms and by using cathode load resistors 3525a and 3525b each having a resistance value of 470 ohms.

As indicated above, by virtue of the 90 degree phase relationship between the signal voltages delivered to the control grids of the two inverter tubes 3503a and 3503b and because of the one hundred and eighty degree phase relationship obtained between the two signal output voltages of each of these inverter tubes, the four stator plates of each of the four-phase condensers 3504a and 3504b are excited by one megacycle signal voltages of equal amplitude which are displaced in phase by 90 degrees. From this point on only the operations which occur in the pulse forming channel 3400a will be described, since those occurring in the second pulse forming channel 3400b are identical. The rotor element 3531a of the four-phase condenser 3504a is so shaped and positioned relative to the four stator plates as to have a signal voltage developed thereon which varies in phase relative to the condenser stator voltages as a function of the vector sum of the electrostatic fields embraced thereby. Hence by rotating this element to a particular position relative to the four stator plates, a signal voltage is developed on this element having the desired phase relationship relative to the signal voltage developed on the rotor 3531b of the condenser 3504b. In other words, through rotation of the rotor elements 3531a and 3531b signal voltages are developed on these elements which may be varied in phase relative to each other through any desired phase angle up to and including 360 electrical degrees. Moreover, this adjustment of the phase relationship between the signal voltages produced on the rotor elements 3531*a* and 3531*b* of the two condensers is obtained without varying the amplitude of the voltage on either rotor element.

The voltage developed between the rotor element 3531*a* and ground is impressed between the cathode and control grid of the amplifier tube 3505*a* in an obvious manner and after amplification through this tube is impressed upon the input electrodes of the second amplifier tube 3506*a* through the coupling condenser 3532*a*. As a result of the signal amplification produced by the two tubes 3505*a* and 3506*a* and the additive action of the tuned circuit 3401*a* further to increase the amplitude of the signal voltage, this voltage as impressed between the cathode and control grid of the pulse former tube 3402*a* through the condenser 3407*a* is of sufficient amplitude completely to overload the pulse former tube. More specifically, during each positive half cycle of the signal voltage appearing across the tuned circuit 3401*a*, the control grid of the tube 3402*a* in conjunction with the crystal rectifier 3406*a* conducts, thus charging the coupling condenser 3407*a* to a value equal to the amplitude of the signal voltage. During each negative half cycle of the signal voltage, the control grid potential of the tube 3402*a* is driven well beyond cutoff. In this manner, the signal voltage is clamped to the cathode potential of the tube 3402*a*, resulting in an intermittent flow of plate current through the tube similar to that which occurs in a class C amplifier.

During each positive half cycle of the signal voltage applied to the control grid of the tube 3402*a*, a sharp increase is produced in the current flow through the self-resonant inductance element 3408*a*. As a result, this element is shock excited to develop a transient wave train which oscillates at the natural resonant frequency of the element 3408*a*, i.e., at a frequency of 2½ megacycles. The character of this wave train is such that during the first half cycle thereof the upper terminal of the element 3408*a* is negative relative to the lower terminal of the element. Moreover, the shunting crystal rectifier 3409*a* is so poled as to be nonconducting during the first half cycle of the oscillatory transient developed across the element 3408*a*. However, when the polarity of the voltage across the element 3408*a* reverses during the second half cycle of the oscillatory wave train, the crystal rectifier 3409*a* becomes conductive to absorb all of the transient energy stores in the element 3408*a*. Thus, only the first half cycle of the oscillatory transient as it appears at the top terminal of the element 3408*a* is permitted to endure. This voltage half cycle or pulse is of negative polarity. Since the element 3408*a* is self-resonant at a frequency of 2½ megacycles, it will be understod that the first negative half cycle of each transient wave train produced across this element persists for an interval of only one fifth of a microsecond. Thus as the signal voltage is continuously impressed upon the control grid of the tube 3402*a*, pulses of negative polarity are developed across the output circuit of this tube which have a repetition rate of one megacycle, but in which the pulse persistance interval is limited to one fifth of a microsecond. These successive pulses are obviously spaced by an interval of ⅘ of a microsecond.

The narrow negative pulses thus produced across the output circuit of the tube 3402*a* are impressed upon the control grid of the inverter tube 3403*a* through the coupling condenser 3414*a*. This tube functions to amplify the pulses and invert the same so that they appear as positive pulses at the anode of this tube. In this regard, it is noted that the control grid of the tube 3403*a* is normally positively biased from the anode current supply source through the resistor 3410*a* to a value such that plate current flow through the inverter tube 3403*a* is at the saturation value. By thus normally biasing the tube 3403*a* to the plate current saturation point, the reference potential relative to which the pulses are repeated by the tube 3403*a* is positively clamped at a fixed value, with the result that variations in the pulse amplitude as a consequence of relatively slow changes in the reference voltage level are minimized.

The pulses of positive polarity developed at the output side of the inverter tube 3403*a* are repeated to the control grids of the cathode follower tubes 3404*a* and 3405*a* in parallel. At this stage, the input pulses are clamped positively by virtue of grid conduction of the two tubes. In order to provide a tighter clamp with larger plate currents and output pulses as a result, the control grids are returned through the resistor 3412*a* to the anode current supply source. The pulses applied to the control grids of the two cathode follower tubes 3404*a* and 3405*a* are obviously repeated across the cathode load resistor 3413*a* common to those two tubes. This resistor functions as the output load impedance of the pulse forming channel 3400*a*. More particularly, the commutator drive conductor 41 is connected to the cathode terminal of the resistor 3413*a*, such that the narrow pulses formed in the channel 3400*a* are repeated positively to the input terminal of the commutator drive circuit 25.

The second pulse forming channel 3400*b* operates in exactly the same manner as the pulse forming channel 3400*a* to produce positive pulses 95*a* on the ring drive pulse conductor 40 each having a pulse persistence interval of one fifth microsecond and having a repetition rate of one megacycle. As will be evident from the above explanation, however, the phase relationship between the pulses respectively developed on the conductors 40 and 41 may be varied as desired by suitable adjustment of one or both of the four-phase condensers 3504*a* and 3504*b*. In actual practice, it is preferred to so phase the pulses produced on these conductors that each pulse developed on the conductor 41 is disposed approximately midway between two successive pulses 95*a* produced on the conductor 40; this for the purpose of centering the signal sampling pulses 96*a* within the units gate pulses in the manner generally explained above.

*Commutator drive circuit 25*

Figure 33:
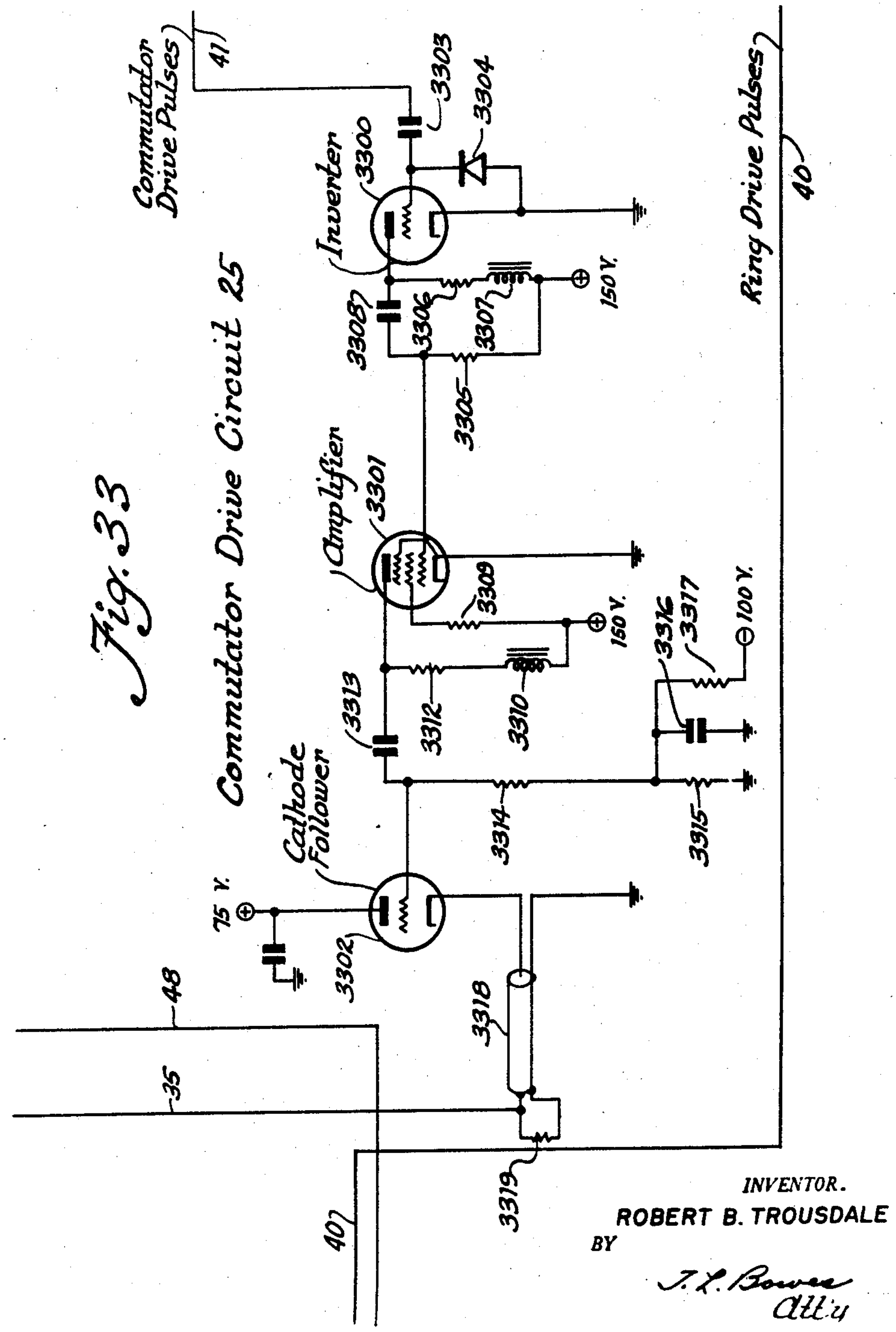

This circuit, as shown in Fig. 33 of the drawings, is provided for the purpose of amplifying the positive pulses appearing on the commutator drive pulse conductor 41 and to act as an impedance matching network. As previously pointed out, the pulses 96*a* produced at the output terminals of the circuit are delivered over the conductor 35 to the channel pulse commutator 22 and to each of the connectors 12*b*, 13*b* and 14*b* of the system. The pulse power requirements of these parallel connected components are fairly severe, which in part necessitates provision of the circuit 25 to amplify the pulses on the conductor 41 sufficiently to satisfy the pulse load requirements of the system.

In brief, this circuit 25 comprises a pulse inverter tube 3300 in the form of a commercial type 6C4 triode, a pulse amplifier tube 3301 in the form of the commercial type 6AK6 pentode and a cathode follower tube 3302 connected in tandem in the order named. In actual practice the cathode follower tube 3302 may comprise one section of a commercial type 6AS7 twin triode. More specifically, the input electrodes of the inverter tube 3300 are coupled to the output load resistor 3413*a* of the pulse forming channel 3400*a* over a path which includes the commutator drive conductor 41 and a coupling condenser 3303. A resistance-capacitance coupling network comprising the two resistors 3305 and 3306 and a coupling condenser 3308 is employed to impress the pulses developed at the anode of the inverter tube 3300 upon the input electrodes of the amplifier tube 3301. Similarly, a resistance-capacitance coupling network comprising the resistors 3312 and 3314 and a condenser 3313 is employed to impress the pulses developed at the anode of the amplifier tube 3301 upon the input electrodes of the cathode follower tube 3302. Self-resonant inductance elements 3307 and 3310 are respectively provided in the output circuits of the inverter and amplifier tubes 3300 and 3301 to act as high frequency compensators and thus prevent widening of the very narrow pulses which are transmitted through the drive circuit 25. These inductance elements each have a natural resonant frequency falling somewhere in the four to five megacycle range. Bias potential for the control grid of the cathode follower tube 3302 is supplied through the resistor 3314 from a voltage dividing network comprising two resistors 3315 and 3317 which are connected in series across a one hundred volt bias potential source. Specifically, the voltage drop across the resistor 3315 is negatively applied to the control grid of the cathode follower tube 3302 through the resistor 3314 to establish the normal operating bias level of this grid. The biasing resistor 3315 is by-passed at the channel pulse frequency by means of a by-pass condenser 3316 connected in shunt therewith. As shown, the output circuit of the cathode follower tube 3302 comprises a coaxial cable 3318, the distant or remote terminals of which are bridged by a load resistor 3319. More specifically, the upper terminal of the resistor 3319 is connected through the central conductor of the cable 3318 to the cathode of the tube 3302 and the lower terminal of this resistor is connected to the grounded sheath of the cable.

In considering the operation of the commutator drive circuit 25, it will be remembered that the pulses applied to the commutator drive conductor 41 at the output side of the pulse forming channel 3400*a* are of positive polarity. Each of these pulses as impressed upon the control grid of the inverter tube 3300 through the coupling condenser 3303 has the effect of increasing space current flow through the tube 3300 to produce a corresponding amplified negative pulse at the anode of this tube which is repeated through the coupling condenser 3308 to the control grid of the amplifier tube 3301. The crystal rectifier 3304 shunting the input electrodes of the inverter tube 3300 is so poled as to be conductive during each on-pulse period. Hence, during each such interval, grid and crystal current flows to charge the condenser 3303. During each off-pulse period, the condenser 3303 retains its charge so as to bring tube 3300 below cutoff. Thus the crystal rectifier 3304 has the effect of clamping the pulse amplitude to ground as a reference potential, i.e., functions to prevent any appreciable variation in the amplitude of the pulses developed at the output side of the inverter tube 3300.

In the amplifier tube 3301, the pulses are amplified to further increase the amplitude thereof and are inverted in polarity, so that they are repeated as positive pulses through the coupling condenser 3313 to the control grid of the cathode follower tube 3302. In this regard it is noted that plate current flow through the tube 3301 is normally at the saturation value by virtue of the positive potential impressed upon the control grid of this tube through the grid current limiting resistor 3305. Thus the anode potential level of this tube is clamped to a fixed value to prevent variations in the pulse base line voltage level and consequent amplitude distortion of the pulses. During each off-pulse period, the condenser 3308 is completely discharged through the inductance element 3307 and the resistors 3305 and 3306.

The cathode follower tube 3302 is normally biased beyond cutoff by the voltage negatively applied to its control grid through the resistor 3314. However, each pulse positively impressed upon the control grid of this tube drives the grid positive to the plate current saturation value thereof. Thus each pulse as reproduced in amplified form across the cathode load circuit of the tube has both its peak amplitude and base clamped to a fixed value such that successive pulses are of the same constant amplitude. More particularly, the pulses appear in amplified form across the cathode load resistor 3319 and are distributed as positive drive pulses 96*a* over the pulse distributing conductor 35 to the channel pulse commutator 22 and the connectors 12*b*, 13*b* and 14*b*. In this connection, it is pointed out that the cathode load impedance of the cathode follower tube 3302 is approximately 72 ohms which means that variations in the load imposed upon the commutator drive circuit 25 do not appreciably change the amplitude of the pulses appearing on the channel pulse conductor 35. This low output impedance is in contrast with the output impedance of the pulse forming channel 3400*a* which is of the order of 270 ohms. It should also be understood that tremendous amplification of the pulses is provided by the three tubes 3300, 3301 and 3302 as the pulses are transmitted through the commutator drive circuit 25.

*Ring circuits 20 and 21*

Figure 26:
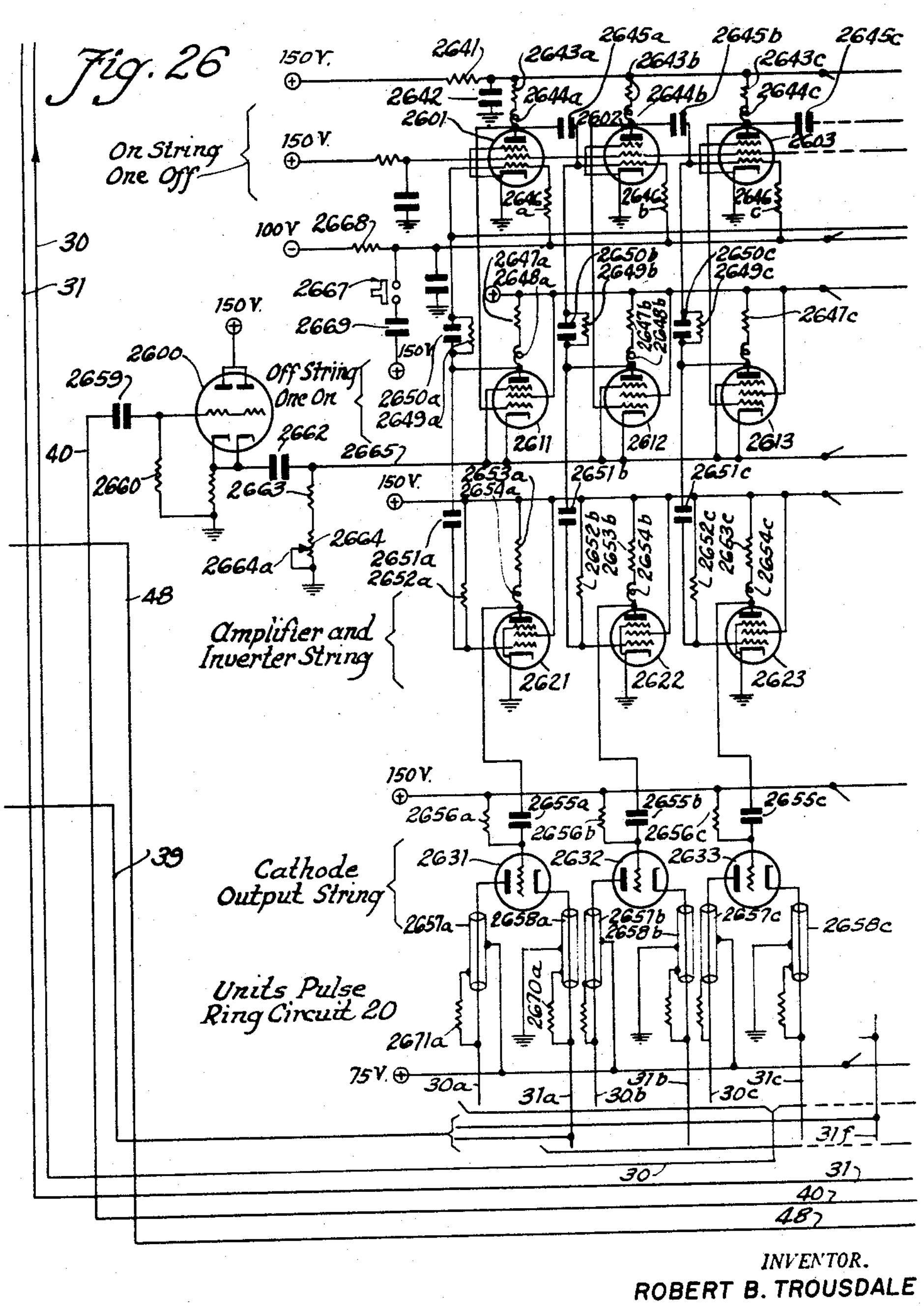
Figure 27:
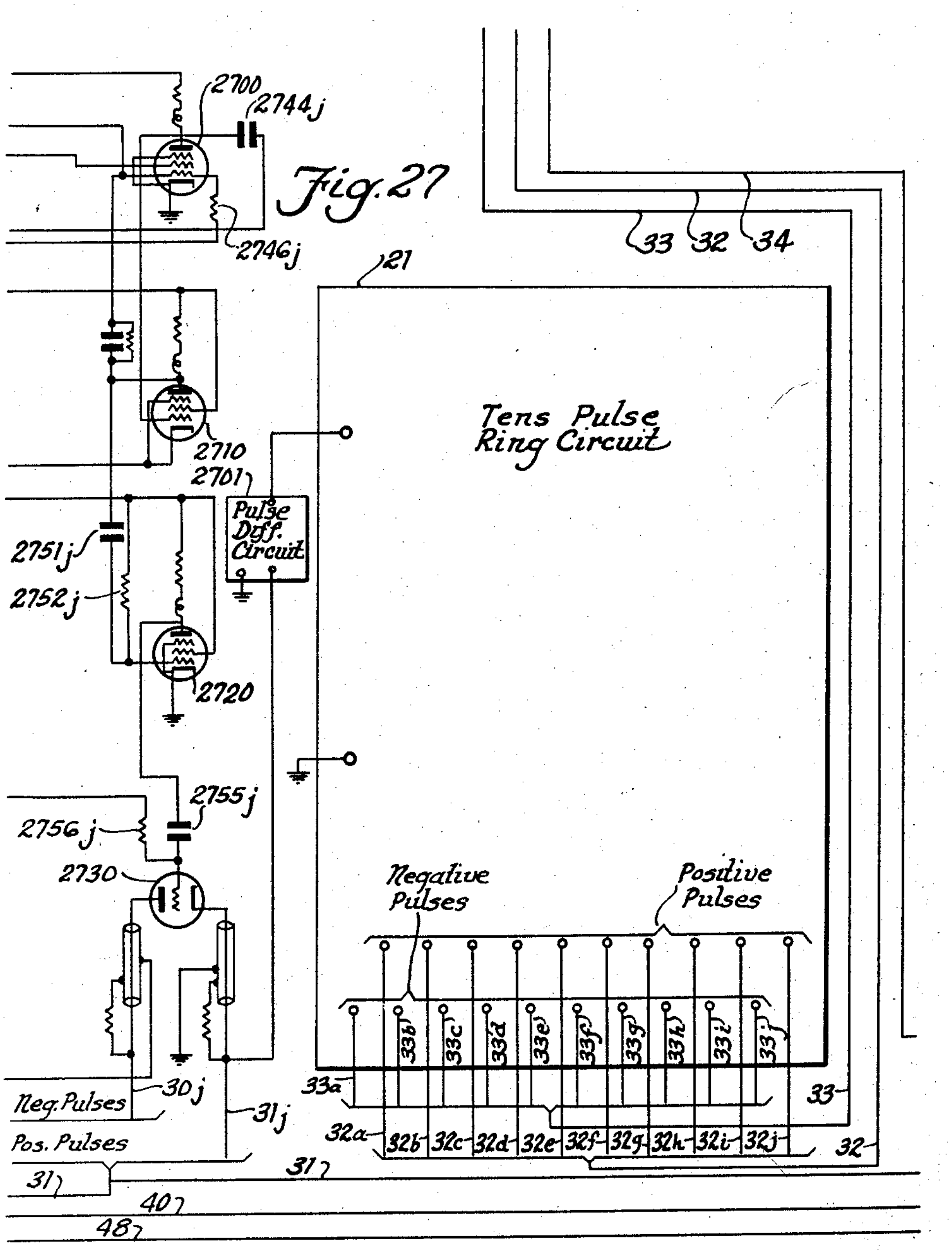

As previously pointed out in the general description of the system, the units pulse ring circuit 20 and the tens pulse ring circuit 21 are identical in circuit arrangement. Accordingly, only the details of the units pulse ring circuit 20 have been illustrated in Figs. 26 and 27 of the drawings. The purpose of the units pulse ring circuit 20, it will be recalled, is that of converting the ring drive pulses 95*a* developed on the ring drive pulse conductor 40 by the pulse forming channel 3400*b* of the circuit 19 into positive and negative units pulses of a finite and greater width than the channel pulses 96*a* and of diverting or commutating the negative units pulses thus developed successively to the negative units pulse conductors 30*a*, 30*b*–30*j*, and the positive units pulses successively to the positive units pulse conductors 31*a*, 31*b*–31*j*. In general, the units pulse ring circuit 20 comprises an impulse repeating and amplifying tube 2600 of the 6J6 type connected to operate as a cathode follower in repeating the drive pulses to the ring drive conductor 2665, and ten units pulse forming and gating stages of which the first three and tenth stages are illustrated. Each units pulse gating and forming stage of the circuit 20 comprises four tubes which for convenience of explanation have been arranged in vertical alignment in Figs. 26 and 27 of the drawings. Thus the first pulse forming and gating stage comprises the vertically aligned tubes 2601, 2611, 2621 and 2631, the second stage comprises the four vertically aligned tubes 2602, 2612, 2622 and 2632, the third stage comprises the four vertically aligned tubes 2603, 2613, 2623 and 2633 and the last or tenth stage comprises the four vertically aligned tubes 2700, 2710, 2720 and 2730. Considered on the basis of horizontal alignment, the tubes 2601, 2602, 2603, 2700, 2611, 2612, 2613 and 2710 in the two upper rows are ring circuit tubes, the tubes 2621, 2622, 2623 and 2720 in the third row function as amplifier and inverter tubes and the tubes 2631, 2632, 2633 and 2730 function as output tubes. All tubes in the circuit 20 with the exception of the input pulse amplifying and repeating tube 2600 and the output tubes 2631, 2632, 2633—2730 are commercial type 6AK6 pentodes. The output tubes 2631, 2632, 2633 and 2730 are commercial type 6AS7 triodes.

More specifically considered, the two top tubes of each units pulse forming and gating stage are connected in the manner more fully explained below to function as an Eccles-Jordan flip-flop circuit, such that the ten pairs of tubes in the two upper horizontal tube rows effectively comprise a pulse commutating ring circuit. The successive responses of the ten Eccles-Jordan circuits to successive drive pulses developed on the ring drive conductor 2665 result in the production of pulses at successive stages of the ring circuit which are respectively repeated through the coupling condensers 2651*a*, 2651*b*, 2651*c*–2751*j*, to the control grids of the amplifier and inverter tubes 2621, 2622, 2623—2720. These tubes in amplifying and inverting the pulses successively received on the control grids thereof repeat the same in amplified form through the condensers 2655*a*, 2655*b*, 2655*c*–2755*j*, successively to the control grids of the output tubes 2631, 2632, 2633—2730. In responding to the pulses successively impressed upon the control grids thereof, the identified output tubes develop negative units pulses successively on the units pulse conductors 30*a*, 30*b*, 30*c*–30*j* and simultaneously develop positive units pulses successively on the positive units pulse conductors 31*a*, 31*b*, 31*c*–31*j* in the manner generally explained above.

In considering the operation of the units pulse ring circuit 20, it is pointed out that the positive drive pulses developed on the ring drive conductor 40 by the pulse forming channel 3400*b* of the phase shift and pulse forming circuit 19 are positively repeated by the tube 2600 through the coupling condenser 2662 to the ring drive conductor 2665. Specifically, each pulse appearing on the conductor 40 produces a voltage drop across the resistor 2660 which drives the parallel connected grids of the tube 2600 positive to produce a corresponding increase in the voltage across the cathode load resistor 2661 of this tube. Each time a positive pulse is thus produced across the resistor 2661 current flows through the condenser 2662 and the series connected resistors 2663 and 2664 to increase the positive potential on the ring drive conductor 2665. Thus the positive input or drive pulses to the units pulse ring circuit 20 are amplified through the tube 2600 and repeated to the ring drive conductor 2665. The two condensers 2659 and 2662 are of such size as to fully discharge during each period separating successive pulses on the conductor 40. Thus the condenser 2659 is provided with a discharge path which includes the resistors 2660 and 3413*b*. Similarly, the condenser 2662 is provided with a discharge path which includes the resistors 2661, 2663 and 2664.

In order to start the circuit, the switch 2667 is closed to bridge the voltage dropping resistor 2668 and the condenser 2669 in series across the terminals of the negative one hundred volt bias potential source and the positive one hundred and fifty volt anode current source in series. This operation has the effect of producing a heavy current flow through the series connected elements to produce voltage drops thereacross. Initially the major portion of the available two hundred and fifty volts supplied by the two sources appears across the resistor 2668. However, as the condenser 2669 charges up, the voltage drop across the resistor 2668 is decreased to its normal value. The transient voltage when is thus developed across the resistor 2668 has the effect of shock exciting one stage of the ring circuit into operation. After operation of the ring circuit is initiated, the switch 2667 may be opened and the circuit will continue to operate in the manner explained below. It has been found that the described method of starting the ring circuit positively precludes the possibility of two or more stages of the circuit starting to operate simultaneously. Hence the described starting arrangement constitutes an important novel feature of the ring circuit 20.

With the ring circuit in operation, only one of the tubes 2601, 2602, 2603—2700 in the upper horizontal string is off, i.e., non-conducting and only a corresponding one of the tubes 2611, 2612, 2613—2710 in the second horizontal string is on, i.e., conducting at any given instant. Assume now that in the upper horizontal tube string, the tube 2601 is not conducting with all other tubes of this string conducting and that in the second horizontal string the tube 2611 is conducting with all other tubes of this string not conducting. With the circuit in this condition, anode current is delivered to the nine on string tubes 2602, 2603—2700 through the resistors 2643*b*, 2643*c*, etc., and the inductance elements 2644*b*, 2644*c*, etc., and the common voltage dropping resistor 2641 from the anode current source which has a terminal voltage of one hundred and fifty volts. These impedance elements are so proportioned that the voltage drop across the resistor 2641 is approximately 75 volts, which means that the anode potential on the non-conducting tube 2601 is 75 volts and the anode potentials of the other tubes of the on-string are appreciably less than 75 volts. The control grid of the off-string tube 2611 is connected directly to the anode of the on-string tube 2601, such that when the tube 2601 is not conducting the control grid of the tube 2611 has a positive potential of 75 volts reverse impressed thereon relative to ground. However, with the off-string tube 2611 conducting, the current traversing this tube and the resistors 2663 and 2664 causes a voltage drop to be produced across the two identified series connected resistors which has a magnitude of approximately 75 volts. Thus the cathode of the tube 2611 is operating at a positive potential which is substantially the same as the control grid potential of this tube. The bias voltage on the control grid of the tube 2601 is obviously a function of the voltage drop across the resistor 2646*a*, which in turn is a function of the magnitude of current flow through the tube 2611 and the series connected resistors 2647 and 2649. More specifically, with the tube 2611 conducting, the voltage drop across the resistor 2646*a* is relatively low, i.e., of the order of 80 volts, such that the control grid of the tube 2601 is negatively biased to a potential of approximately 20 volts with respect to the tube cathode and the tube is thus biased beyond cutoff.

With the circuit in the condition just described, the next positive drive pulse produced on the drive pulse conductor 2665 in the manner explained above has the effect of increasing the cathode potential of the tube 2611 positively by an amount sufficient to cut off space current flow through this tube. In response to this operation, current flow through the resistor 2646*a* is increased to decrease the bias on the control grid of the tube 2601 sufficient to render the latter tube conductive. As the tube 2601 starts to conduct, its anode becomes less positive due to the voltage drop across the inductance element 2644*a* and the resistor 2643*a*, with the result that a negative pulse is transmitted through the condenser 2645*a* to the control grid of the next on-string tube 2602. This pulse is of sufficient amplitude to drive the control grid of the tube 2602 beyond cutoff. As a consequence, the tube 2602 stops conducting and the anode potential thereof rises to increase the positive potential on the control grid of the companion off-string tube 2612. So long as the positive drive pulse perists on the conductor 2665 to hold the cathode potential of the tube 2612 at a high positive level, the tube cannot conduct even though the control grid potential is positively increased in the manner just described. However, when the drive pulse on the conductor 2665 ends, the cathode potential of the tube 2612 drops sufficiently to render this tube conductive under the influence of the increased positive potential impressed on the control grid of the tube from the anode of the tube 2602. As soon as the tube 2612 starts to conduct, the voltage drop across the resistor 2646*b* is decreased to a value such that the tube 2602 remains biased beyond cutoff from the negative one hundred volts bias potential source. Thus, the tube 2602 is held non-conductive after the pulse transmitted to the control grid thereof through the condenser 2645*a* ends. In this connection, it is pointed out that the condenser 2645*a* is chosen to have a capacitance value such that the negative pulse impressed upon the control grid of the tube 2602 cannot die out to render this tube conductive before the driving pulse on the conductor 2665 ends. This condenser is also made small enough so that it is fully discharged before it is again called upon to deliver a negative pulse to the control grid of the tube 2602.

When the tube 2601 is rendered conductive to reduce the anode potential thereof in the manner just explained, the potential on the control grid of the tube 2611 is reduced to a value such that when the drive pulse on the conductor 2665 ends the tube 2611 is still biased beyond cutoff. Thus current conduction through the tube 2601 has the effect of preventing current flow through the tube 2611 after the pulse on the drive conductor 2665 is terminated.

In a manner entirely similar to that just described, the next succeeding pulse developed on the drive conductor 2665 has the effect of arresting current conduction through the tube 2612, starting current conduction through the tube 2602, arresting current conduction through the tube 2603 and starting current conduction through the tube 2613. The manner in which additional pulses appearing on the drive conductor 2665 successively activate the fourth to tenth stages of the ring circuit will be entirely apparent from the preceding explanation. In this regard, it is noted that when the tenth pulse is delivered to the ring circuit from the drive conductor 2665 to cut off space current conduction through the tube 2710 and render the tube 2700 conductive, a negative pulse is transmitted through the condenser **2744*j* to cut off space current flow through the tube 2601, with the result that this tube is rendered non-conductive and the tube 2611 is rendered conductive when the tenth drive pulse on the drive conductor 2665** ends.

From the above explanation it will be apparent that as successive drive pulses appear on the drive conductor 2665, the ten stages of the ring circuit comprising the two upper horizontal tube strings are sequentially activated. In order to prevent more than one stage of the ring circuit from responding to any given drive pulse, the resistors 2663 and 2664 are so proportioned that if two of the off-string tubes 2611, 2612—2710 start to conduct simultaneously a voltage drop is produced across these resistors which has the effect of biasing both of the conducting tubes beyond cutoff. As a practical matter, this is accomplished by adjusting the short circuiting wiper **2664*a* along the resistor 2664 to a point where current flow through any one of the tubes 2611, 2612—2710 and the resistors 2663 and 2664 has the effect of biasing these tubes fairly close to the cutoff point. It will be understood that with the circuit adjusted in this manner, positive drive pulses of relatively low amplitude appearing on the drive conductor 2665 will have the effect of switching the ring circuit in the manner explained above. Another important feature of the ring circuit is the use of coupling condensers 2645*a*, 2645*b*, 2645*c*—2744*j* connected between the anodes and control grids of successive tubes 2601, 2602, 2603—2700 of the on-string rather than between successive tubes 2611, 2612, 2613—2710 of the off-string. This arrangement is of importance for the reason that since the tubes of the off-string are normally biased considerably beyond cutoff, a relatively large change in the potentials on the control grids thereof would be required to effect the described stage switching operations in response to delivery of successive drive pulses to the ring circuit. On the other hand, the control grids of the on-string tubes 2601, 2602, 2603—2700 are normally biased to saturation through the resistors 2646*a*, 2646*b*, 2646*c*—2746*j*. As a consequence, delivery of a small negative pulse to the control grid of any on-string tube, as to the control grid of the tube 2602 through the condenser 2645*a***, for example, has the effect of cutting off space current flow through the tube.

In considering the manner in which the step-by-step operation of the ring circuit results in the production of positive and negative units pulses successively on the negative units pulse conductors 30 and the positive units pulse conductors 31, it is first pointed out that normally the amplifier and inverter tubes 2621, 2622, 2623—2720 are conducting heavily. Thus, the control grids of these tubes are respectively connected through the grid current limiting resistors **2652*a*, 2652*b*, 2652*c*—2752*j* directly to the positive terminal of the anode current source, so that heavy grid and anode current flow in these tubes. On the other hand, the tubes 2631, 2632, 2633—2730, constituting the output string, are normally biased beyond cutoff by the charges accumulated on the respective associated condensers 2655*a*, 2655*b*, 2655*c*—2755*j***.

With the ring circuit operating in the manner described above, negative pulses are developed on the negative units pulse conductors **30*a*, 30*b*, 30*c*–30*j* and positive pulses are developed on the positive units pulse conductors 31*a*, 31*b*, 31*c*–31*j* only when the respective corresponding tubes 2611, 2612, 2613—2710 are conducting. Thus a negative pulse is developed on the negative units pulse lead 30*a* and a positive pulse is developed on the positive units pulse lead 31*a* when the tube 2611 is rendered conductive under the influence of a driving pulse on the conductor 2665. More specifically, when the tube 2611 is rendered conductive to produce space current flow therethrough, the positive potential of its anode is decreased to transmit a negative pulse through the coupling condenser 2651*a* to the control grid of the tube 2621. This pulse, during its persistence interval, has the effect of decreasing space current flow through the tube 2621 to produce a corresponding increase in the positive anode potential of the tube. As a result, the pulse is inverted to a positive pulse and repeated in amplified form through the condenser 2655*a* to the control grid of the output tube 2631. This repeated positive pulse is of very large amplitude and has the effect of driving the control grid of the tube 2631 sufficiently positive to saturate space current flow through the tube. Thus, the tube 2631, which as explained above is normally cut off, is abruptly rendered conductive at its saturation level. During the conducting interval of the tube 2631, the condenser 2655*a* is heavily charged by grid current flow through this tube, such current flow occurring over a path which extends from positive terminal of the anode current source by way of the resistor 2653*a*, the inductance element 2654*a*, the condenser 2655*a*, the grid-cathode path in the tube 2631, and the resistor 2670*a* to the grounded negative terminal of the anode current source. As a result of the heavy anode current flow thus produced through the tube 2631, the voltage drop across the cathode resistor 2670*a* is sharply increased to produce the desired positive pulse on the units pulse conductor 31*a*. Concurrently therewith, the voltage drop across the anode load resistor 2671*a* is sharply increased to correspondingly decrease the potential on the negative units pulse conductor 30*a* and thus develop the desired negative pulse on this conductor. As shown in Figs. 37 to 40, inclusive, these pulses are produced in time position 62*a*, 62*b*, 62*c***, etc., of each pulse frame.

The duration of the pulses thus developed on the units pulse conductors **30*a* and 31*a* is measured by the spacing interval between two successive drive pulses appearing on the ring drive conductor 2665. Thus when the next succeeding drive pulse is developed on this conductor to render the tube 2611 non-conductive in the manner explained above, the positive anode potential of this tube is sharply increased to produce a corresponding sharp increase in current flow through the tube 2621. As a result, the positive anode potential of the tube 2621 is sharply decreased. More specifically, the voltage at the anode of the tube 2621 is less than the voltage across the condenser 2655*a*, which is now negatively applied to the control grid of the tube 2631, by an amount sufficient to cut off space current flow through the latter tube. As a consequence, the voltage drops across the resistors 2670*a* and 2671*a* are sharply decreased to their reference value levels to terminate the pulses on the conductors 30*a* and 31*a***.

In a manner entirely similar to that just described, negative and positive units pulses are respectively produced on the conductors **30*b* and 31*b* in time positions 63*a*, 63*b*, 63*c*, etc., during successive intervals of conduction of the tube 2612. Similarly, positive and negative pulses are respectively produced on the conductors 31*c* and 30*c* in the time positions 64 during those intervals when the tube 2613 is conducting. Thus it will be understood that negative units pulses are successively produced on the conductors 30*a*, 30*b*, 30*c*–30*j* and positive units pulses are concurrently produced on the conductors 31*a***, 31*b*, 31*c*–31*j* in the manner illustrated in the pulse chart shown in Figs. 37 to 40, inclusive, during sustained operation of the ring circuit.

As will be apparent from the preceding explanation, the units pulses produced by each of the tubes 2631, 2632, 2633—2730 are developed by switching each tube from a completely non-conductive state to a condition where anode current flow through the tube is at the saturation level. This insures the production of units pulses of uniform amplitude having clean tops. As will also be apparent from the preceding explanation, each of the coupling condensers **2651*a*, 2651*b*, 2651*c*—2751*j* is only required to hold the control grid potential of the associated one of the tubes 2621, 2622, 2623—2720 at the pulse producing level for an interval equal to the period separating two successive pulses on the drive conductor 2665. Accordingly, these condensers may be relatively small. During the interval separating pulse transmission by each of these condensers and equal to the sum of nine units pulse periods, each condenser is fully discharged through one of the respective associated resistors 2652*a*, 2652*b*, 2652*c*—2752*j*. On the other hand, each of the condensers 2655*a*, 2655*b*, 2655*c*–2655*j* is required to hold its charge during each spacing interval separating two pulse transmission periods thereof, i.e., during intervals each equal to the sum of nine units pulse periods. Accordingly these condensers are relatively large. During such spacing intervals these condensers discharge through their respective associated resistors 2656*a*, 2656*b*, 2656*c*—2756*j*. However, these resistors have very high resistance values such that the condenser discharge rate is low. The inductance elements, such as the elements 2644*a*, 2648*a* and 2654*a***, respectively provided in the anode circuits of the tubes forming the upper three rows serve the function of preventing width distortion of the pulses. Each of these elements is self resonant at a frequency of four to five megacycles.

As indicated above, the circuit arrangement of the tens pulse ring circuit 21 and the mode of operation of this circuit to produce the positive tens pulses successively on the conductors **33*a*, 33*b*–33*j*, and the positive tens pulses successively on the conductors 32*a*, 32*b*–32*j* are identical with the circuit arrangement and mode of operation of the units pulse ring circuit 20 just described. However, the driving pulses for the tens pulse ring circuit 21 are derived from the tenth units pulse forming and gating stage of the units pulse ring circuit 20. More specifically, the positive units pulses appearing on the units pulse conductor 31*j* are employed to drive the ring circuit 21 through the pulse differentiating circuit 2701 which functions to differentiate the leading edge of each pulse. It will be understood, therefore, that the stage switching operations effected in the tens pulse ring circuit 21 occur at one tenth the stage switching rate employed in the units pulse ring circuit 20. In other words, one positive and concurrent negative tens pulse is produced for each ten units pulses developed by the units pulse ring circuit 20. Due to the longer time intervals involved in the stage switching operations of the tens pulse ring circuit 20, the circuit constants of certain of the circuit components embodied in this circuit are different from those of the corresponding components of the units pulse ring circuit. This is particularly true of those condensers of the tens pulse ring circuit 21 which respectively correspond to the condensers 2650*a*, 2651*a* and 2655*a*, and those resistors of the tens pulse ring circuit which respectively correspond to the resistors 2668 and 2663 of the units pulse ring circuit 20. Aside from the differences noted, the two ring circuits 20 and 21 are identical and it is believed that the mode of operation of the tens pulse ring circuit will be readily apparent from the explanation given above with reference to the units pulse ring circuit 20**.

*Channel pulse commutator 22*

Figure 28:
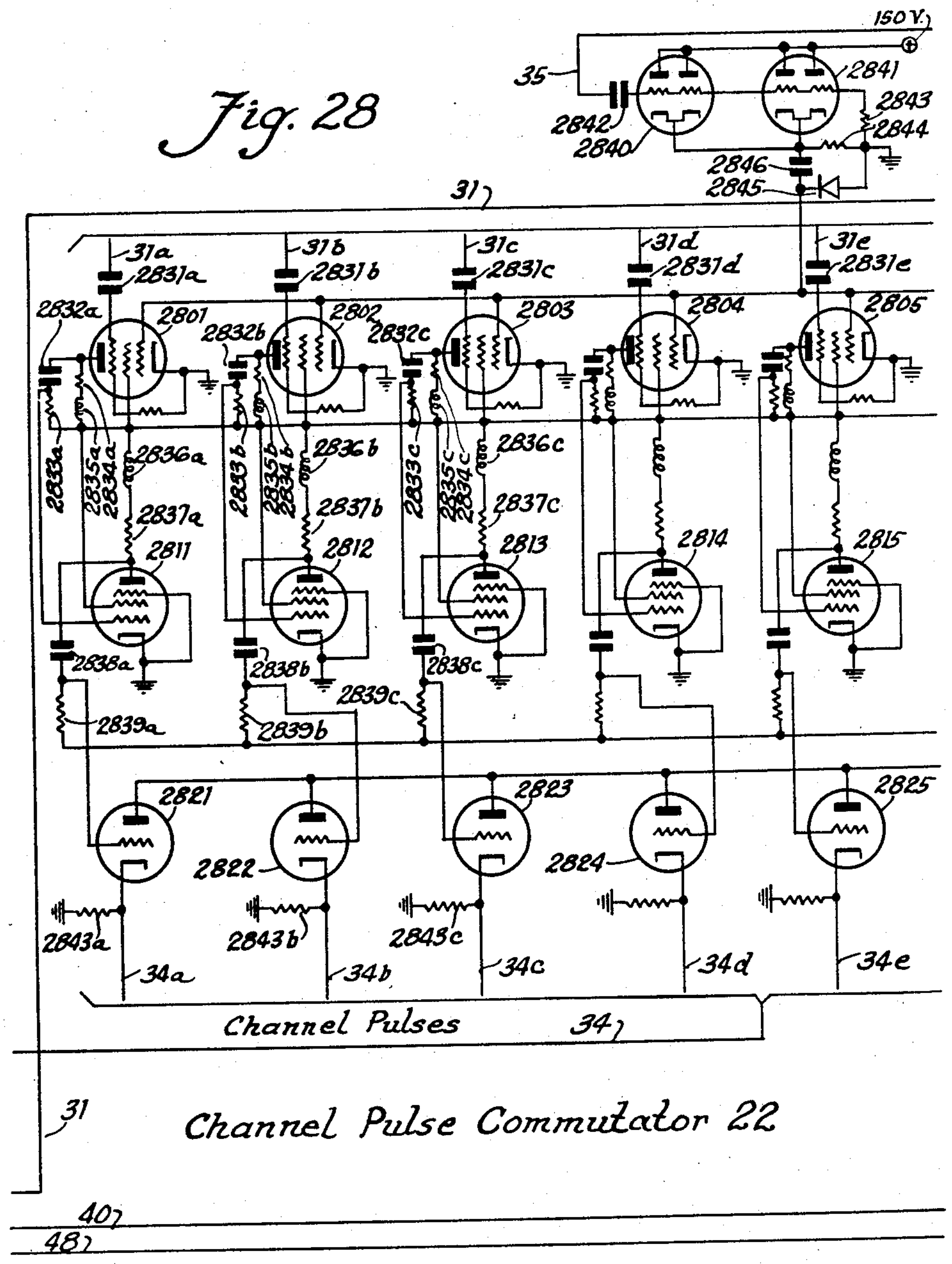
Figure 29:
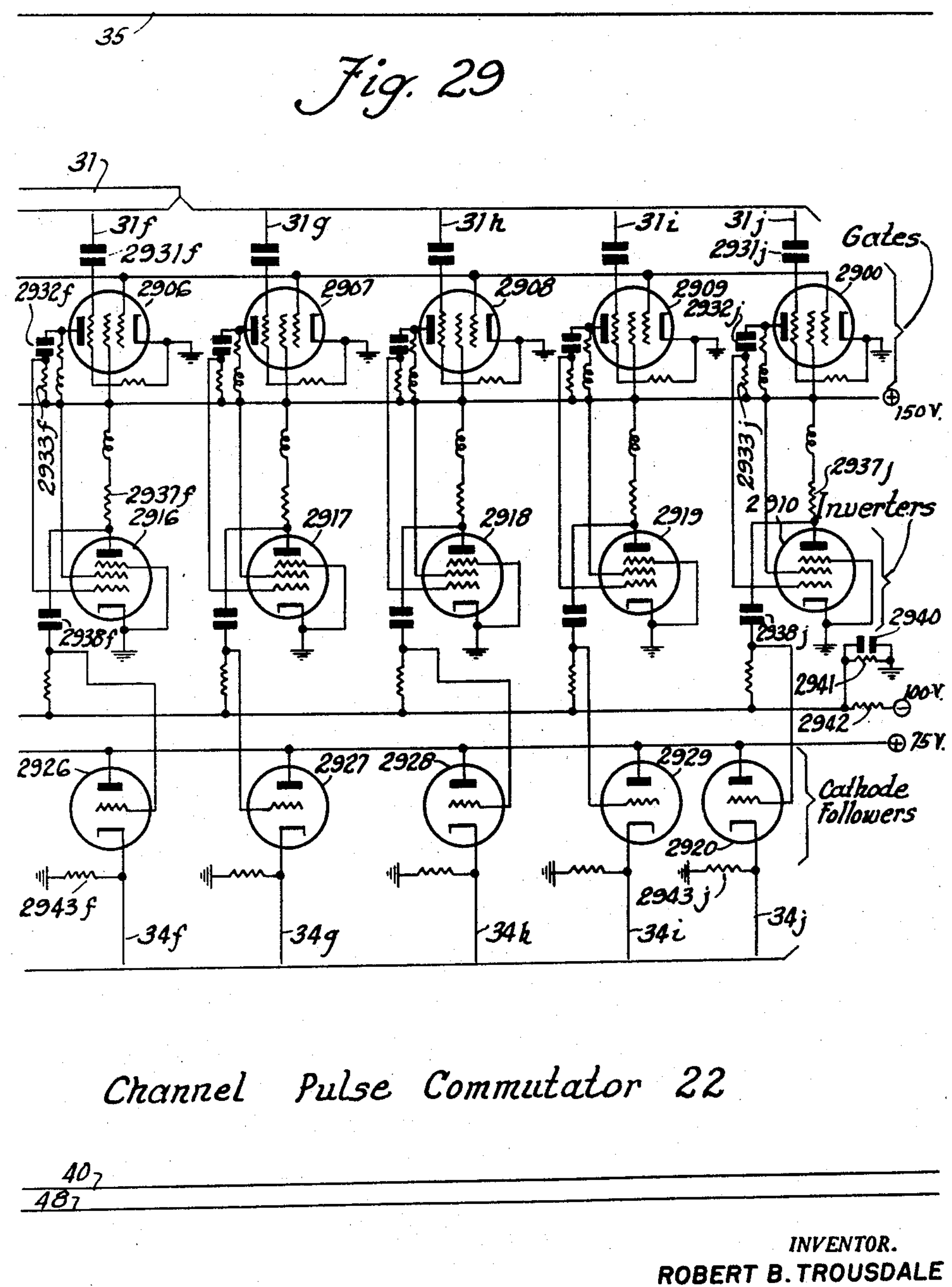

As generally indicated above, this circuit is provided sequentially to gate the pulses developed in the pulse forming channel **3400*a* over the conductors 34*a*, 34*b*–34*j* to the multiplexer 11. In brief, this circuit, the details of which are illustrated in Figs. 28 and 29, comprises two parallel connected cathode follower tubes 2840 and 2841, to which drive pulses are delivered from the commutator drive circuit 25 over the conductor 35; ten pulse gating tubes 2801, 2802, 2803, 2804, 2805, 2906, 2907, 2908, 2909 and 2900, which are jointly controlled by the drive pulses repeated thereto by the tubes 2840 and 2841 and also by positive units pulses delivered thereto over the units pulse conductors 31*a*, 31*b*–31*j* sequentially to gate the drive pulses to ten inverter and amplifier tubes 2811, 2812, 2813, 2814, 2815, 2916, 2917, 2918, 2919 and 2910; and ten cathode follower tubes 2821, 2822, 2823, 2824, 2825, 2926, 2927, 2928, 2929 and 2920, to which the amplified pulses are sequentially repeated by the inverter tubes 2811, 2812—2910. Effectively, therefore, the channel pulse commutator 22 is comprised of ten pulse gating stages, the first of which comprises the three vertically aligned tubes 2801, 2811 and 2821, the second of which comprises the three vertically aligned tubes 2802, 2812 and 2822, and so on to the last stage, which comprises the tubes 2900, 2910 and 2920. The cathode follower tubes 2840 and 2841 are twin triodes of the 6J6 type, the ten gating tubes 2801, 2802—2900 are pentodes of the 6AS6 type, the inverter and amplifier tubes 2811, 2812—2910 are pentodes of the 6AK6 type, and the cathode follower tubes are triodes of any suitable commercial type. If desired, five triodes of the 6AS7 type may be employed to replace the triodes 2821, 2822—2920 in pairs; that is, five twin triodes of the 6AS7 type may be used in lieu of the ten triodes shown. The circuit components employed to couple the identified tubes of the channel pulse commutator 22 with the units pulse ring circuit 20, the commutator drive circuit 25** and with each other are identified below in terms of the functions which they respectively perform in the network.

Normally, i.e., in the absence of pulses on the drive conductor 35, the control grids of the cathode follower tubes 2840 and 2841 are negatively biased with respect to the cathodes of these tubes through the resistor 2843 by an amount equal to the voltage drop across the cathode load resistor 2844. The control grids of the gating tubes 2801, 2802—2900 are connected in parallel and coupled to the load terminal of the cathode load resistor 2844 through a coupling condenser 2846. The manner is which these control grids are normally biased to the same predetermined operating potential is explained more fully below. Positive units pulses are sequentially impressed upon the suppressor grids of the gating tubes 2801, 2802–2810 over the positive units pulse conductors **31*a*, 31*b*–31*j* and through the coupling condensers 2831*a*, 2831*b*–2931*j*. From an inspection of the circuit it will be noted that the control grids of the amplifier and inverter tubes 2811, 2812—2910 are connected directly to the positive terminal of the anode current source through the resistors 2833*a*, 2833*b*—2933*j*. Thus, these tubes are normally heavily conductive, the control grids thereof being biased positively relative to the tube cathodes to produce grid current flow through the tubes which is limited only by the resistors 2833*a*, 2833*b*—2933*j*. The normal bias for the control grids of the ten cathode follower tubes 2821, 2822—2920 is in part determined by the voltages respectively developed across the coupling condensers 2838*a*, 2838*b*—2938*j* during operation of the circuit and also by a fixed bias voltage derived from a biasing network which comprises the series connected resistors 2941 and 2942 and a by-pass condenser 2940**.

In considering the operation of the commutator 22, it will be understood that the drive pulses transmitted from the commutator drive circuit 25 over the conductor 35 and impressed upon the control grids of the tubes 2840 and 2841 through the coupling condenser 2842 are repeated as positive pulses across the cathode load resistor 2844.

These pulses are impressed upon the parallel connected control grids of the gating tubes 2801, 2802—2900 through the coupling condenser 2846. They occur at a frequency rate of one megacycle and, as will be apparent from the preceding explanation, are synchronized with the positive units pulses successively impressed upon the suppressor grids of the gating tubes over the conductors 31*a*, 31*b*–31*j*. Thus each of the gating tubes 2801, 2802—2900 has a positive units pulse impressed upon the suppressor grid thereof in synchronism with each tenth drive pulse impressed upon its control grid through the coupling condenser 2846. Moreover, and as explained above, each drive pulse is time positioned to occur at the approximate center of the coincident units pulse. Normally the gating tubes 2801, 2802—2900 are biased well beyond cutoff by the voltage developed across the condenser 2846 and negatively applied to the control grids of the gating tubes during each off-pulse period. More specifically, each time a positive pulse appears across the cathode load resistor 2844, the condenser 2846 is rapidly charged through the clamping crystal rectifier 2845. When the pulse terminates, the condenser 2846 cannot discharge through the rectifier 2845 and has a voltage thereacross which is substantially greater than the normal off-pulse voltage across the resistor 2844. This condenser voltage is applied negatively to the control grids of the ten gating tubes 2801, 2802—2900 and is so much greater than the voltage across the resistor 2844 that the gating tubes are biased beyond cutoff. Thus the rectifier 2845 functions to clamp the drive pulse reference line voltage at a fixed negative value equal to the amplitude of the drive pulses. The amplitudes of the positive units pulses successively applied to the suppressor grids of the ten gating tubes must be larger than the cut-off potential of the suppressor grids of the gating tubes. In other words, the magnitude of the positive units pulses is sufficient to cause plate current cutoff between pulses in spite of any control grid action. However, and considering the first stage of the commutator 28 by way of example, when a drive pulse is applied to the control grid of the tube 2801 coincident with the application of a positive units pulse to the suppressor grid of this tube, the tube is rendered conductive for the very short interval during which the drive pulse persists. This same action occurs successively at the other nine stages of the commutator 22 as drive and units pulses are coincidentally applied to the control and suppressor grids of the gating tubes 2802, 2803—2900. When the tube 2801 is thus rendered conductive, the anode potential thereof drops abruptly to repeat the drive pulse negatively through the coupling condenser 2832*a* to the control grid of the amplifier and inverter tube 2811. As a result, space current flow through the tube 2811 is abruptly decreased at the start of the pulse and abruptly increased at the end of the pulse. Tremendous pulse amplification is obtained in the tube 2811. Since space current flow through this tube is sharply decreased during the pulse period to effect a sharp increase in the anode potential of the tube, it will be understood that the pulse is repeated positively through the coupling condenser 2838*a* to the control grid of the cathode follower tube 2821. The magnitude of this repeated pulse is sufficient to drive the control grid of the tube 2821 positive relative to the cathode of the tube, thereby to produce grid current flow in the tube. This current charges the coupling condenser 2838*a*. During the pulse interval, the tube 2821 conducts heavily to repeat the pulse across its cathode load resistor 2843*a*. Thus a drive pulse having the persistence interval of the drive pulse impressed upon the control grid of the gating tube 2801 is developed positively on the channel pulse conductor 34*a*. After the drive pulse ends, such that the gating tube 2801 is again biased below cutoff and normal heavy space current flow through the amplifier and inverter tube 2811 is resumed, the condenser 2838*a* is left charged to a voltage which biases the cathode follower tube 2821 considerably beyond cutoff. Thus the latter tube is rendered non-conductive immediately the pulse ends. The condenser 2838*a* holds its charge until the tubes 2801 and 2811 are again activated to transmit a pulse through its condenser to the control grid of the cathode follower tube 2821. The fixed bias impressed upon the cathode follower tubes from the bleeder resistors 2941 and 2942 prevents these tubes from losing bias and drawing excessive current when either gate or driving pulses are missing.

The manner in which the nine other stages of the commutator 22 function successively to produce pulses on the other nine channel pulse conductors 34*b*, 34*c*–34*j* is exactly the same as the described mode of operation of the first commutator stage and will readily be understood from the preceding explanation. It will thus be understood that during operation of the system the commutator 22 functions continuously to commutate channel pulses 82*a*, 83*a*, 84*a*, etc., to the ten channel pulse conductors 34*a*, 34*b*–34*j* in sequence. These pulses are of positive polarity and each thereof has a persistence interval of one fifth of a microsecond. In order to prevent width distortion of the pulses as the described pulse commutating action is effected in the commutator 22, inductance elements 2835*a*, 2836*a*, 2835*b*, 2836*b*, etc., each self-resonant at a frequency of from four to five megacycles, are respectively provided in the anode circuits of the gating and inverter tubes in the manner illustrated. It will be understood from the above explanation and consideration of the pulse chart shown in Figs. 37 to 40, inclusive, that while the pulses are produced at the fundamental frequency rate of one megacycle, they recur on each of the channel pulse conductors 34*a*, 34*b*–34*j* at a frequency rate of one hundred kilocycles.

*Dial tone generator 29b*

As previously indicated, this generator is provided to produce the signal voltage which is employed to signal calling subscribers that dialing operations may be initiated. The circuitry of the generator is uniquely arranged to produce a wobbly dial tone signal, i.e., a 180 cycle signal modulated at fifteen cycles, which accurately simulates dial tone signals of similar character commonly in use at the present time. In this connection, it will be understood that conventional dial tone signal generators are in the form of mechanically driven choppers which produce square wave signal voltages rich in the odd numbered harmonics. The dial tone generator 29*b* is uniquely arranged to produce a signal voltage of the same character.

Figure 30:
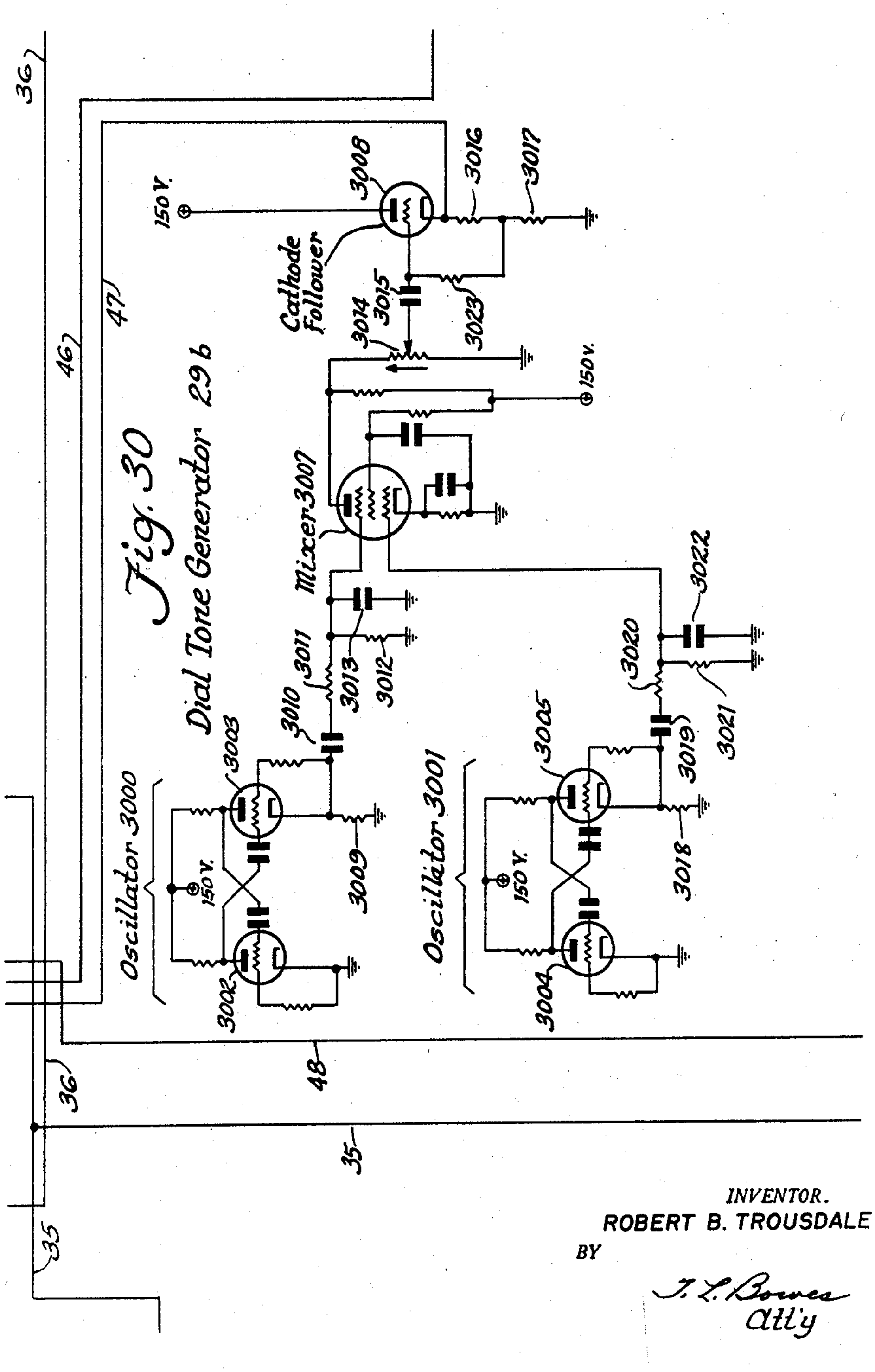

In brief, the generator the details of which are shown in Fig. 30, comprises two square wave oscillators 3000 and 3001 of the well known multi-vibrator type designed to operate at fifteen cycles and 180 cycles respectively, a signal mixer tube 3007 and a cathode follower tube 3008. The oscillator 3000 comprises two multi-vibrator tubes 3002 and 3003 interconnected in an entirely conventional manner. Similarly, the oscillator 3001 comprises two multi-vibrator tubes 3004 and 3005 also conventionally interconnected. All four of these tubes are triodes of the 6C4 type. The square wave signal voltage developed by the oscillator 3000 appears across a load resistor 3009 included in the cathode circuit of the tube 3003 and is impressed upon the suppressor grid of the mixer tube 3007 through a resistance-capacitance coupling network which comprises a coupling condenser 3010 and resistor 3012. Also included in this circuit is a low pass filter made up of a series resistor 3011 and a filter condenser 3013. This filter is designed to pass the fifteen cycle signal voltage developed by the oscillator 3000 but will not pass the higher harmonics of this fundamental signal voltage.

The 180 cycle signal voltage developed by the second oscillator 3001 appears across a load resistor included in the cathode circuit of the tube 3005 and is impressed upon the control grid of the mixer tube 3007 through a resistance-capacitance coupling circuit which comprises a coupling condenser 3019 and a resistor 3021. This coupling circuit also includes a low pass filter consisting of a series resistor 3020 and a filter condenser 3022, which is designed to pass the fundamental signal voltage of 180 cycles as well as the third, fifth and seventh harmonics thereof, but is not capable of passing the higher order harmonics of this signal voltage.

The mixer tube 3007 is a 6AS6 type pentode and is provided with output electrodes which are coupled to the input electrodes of the cathode follower tube 3008 through a signal level control potentiometer 3014 and a coupling condenser 3015. The cathode follower tube 3008 is a commercial type 6C4 triode and is provided with a cathode load circuit comprising two series connected resistors 3016 and 3017. The normal operating bias of this tube is derived from the resistor 3016 and is impressed upon the control grid of the tube through a biasing resistor 3023.

In considering the operation of the dial tone generator **29*b*, it will be understood that the 15 cycle and 180 cycle signal voltages respectively developed by the oscillators 3000 and 3001 are impressed upon the suppressor and control grids respectively of the mixer tube 3007. In the tube 3007, the two signals are electronically mixed to produce a signal at the output side of the tube 3007 having a fundamental frequency of 180 cycles which is modulated at a frequency of 15 cycles. This signal voltage is rich in the first, third, fifth and seventh harmonics of the fundamental signal frequency of 180 cycles, due to the square wave character of the signal voltage produced by the oscillator 3001 and the signal pass characteristic of the filter consisting of the circuit elements 3020 and 3022. The output voltage of the mixer tube 3007 appears across the potentiometer 3014 and the desired portion thereof is impressed between the input electrodes of the cathode follower tube 3008 through the coupling condenser 3015. In this connection, it is noted that the condenser 3015 in combination with the resistor 3023 acts as a high pass filter to filter out the 15 cycle component of the signal voltage appearing on the anode of the mixer tube 3007. Thus only the 180 cycle signal voltage modulated at the 15 cycle rate and containing the desired first, third, fifth and seventh harmonics of the fundamental signal frequency is impressed upon the control grid of the cathode follower tube. This signal voltage is repeated by the tube 3008 and appears across the cathode load resistors 3016 and 3017 thereof. The signal voltage thus developed across the two identified load resistors is transmitted to the supervisory tone gate circuits 225 of the connectors 12*b*, 13*b* and 14*b* over the dial tone conductor 47**.

*Busy tone generator 29a*

Figure 31:
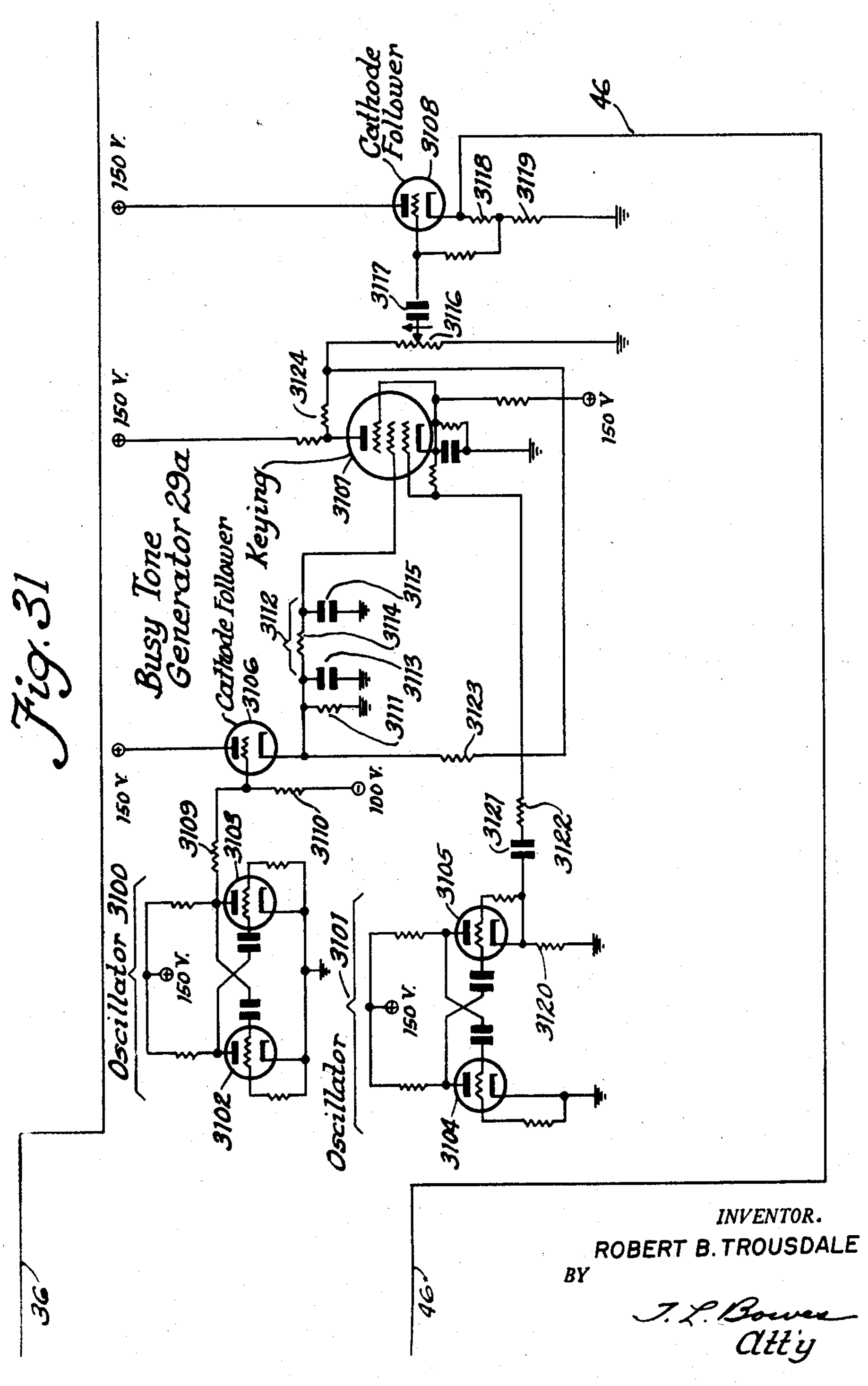

As pointed out in the general description of the system, this generator is provided for the purpose of supplying the signal voltage utilized in signaling calling subscribers when the lines to which calls are routed are tested and found busy. Specifically, the generator **29*a* functions to produce a 180 cycle signal voltage which is keyed at a rate of one-half second on and one-half second off. In brief, this generator, the details of which are shown in Fig. 31, comprises two oscillators 3100 and 3101 of the well known multivibrator type designed to operate at 1 and 180 cycles per second, respectively. These oscillators respectively comprise the tubes 3102 and 3103 and the tubes 3104 and 3105, and each functions to produce a square wave output signal. The generator 29*a* further comprises a cathode follower tube 3106, a signal keying tube 3107, and a cathode follower tube 3108. All of the tubes included in the generator 29*a* are commercial type 6C4 triodes with the exception of the tube 3107** which is a commercial type 6AK5 pentode.

More specifically, the signal voltage developed by the oscillator 3101 appears across a load resistor 3120 included in the cathode circuit of the tube 3105 and is impressed upon the control grid of the keying tube 3107 through a coupling condenser 3121 and a resistor 3122. The keying voltage developed by the oscillator 3100 and appearing at the anode of the multivibrator tube 3103 is impressed directly upon the control grid of the cathode follower tube 3106 through a resistor 3109. The output signal developed by the cathode follower tube 3106 across the cathode load resistor 3111 and by-pass condenser 3113 of this tube if fed through a pulse correcting network 3112 comprising a series resistor 3114 and shunt condenser 3115 to the screen grid of the keying tube 3107. The keyed 180 cycle signal voltage developed at the anode of the keying tube 3107 is impressed across a signal level control potentiometer 3116 and a desired portion of this voltage is impressed upon the control grid of the cathode follower tube 3108 through a coupling condenser 3117. The cathode follower tube 3108 is provided with two series connected cathode load resistors 3118 and 3119, the cathode terminal of which is connected to the generator output conductor 46. This conductor is connected in multiple to the supervisory tone gate circuits 225 of the connectors **12*b*, 13*b* and 14*b* in the manner previously explained. In order to cancel out the low frequency keying component of the signal voltage appearing at the anode of the keying tube 3107, the voltage developed across the load resistor 3111 of the amplifier tube 3106 is applied to the terminals of the potentiometer 3116 in opposition to the keying component of the signal voltage impressed upon this resistor from the anode of the tube 3107 through the isolating resistor 3124**.

From the preceding explanation, it will be apparent that the square wave keying signal of one cycle per second derived from the oscillator 3100 and impressed upon the screen grid of the tube 3107 through the cathode follower 3106 and the pulse correcting network 3112 functions to key the 180 cycle signal voltage delivered to the control grid of the tube 3107 from the oscillator 3101 at a rate of one cycle per second. Thus, during each positive half cycle of the keying voltage produced by the oscillator 3100, the voltage drop across the cathode resistor 3111 of the cathode follower tube 3106 is increased to a value substantially equaling the normal operating screen potential level of the keying tube 3107, with the result that this tube is rendered conductive to repeat the 180 cycle busy tone signal to the output circuit thereof. On the other hand, during each negative half cycle of the keying voltage delivered by the oscillator 3100 to the control grid of the amplifier tube 3106, the voltage across the load resistor 3111 is decreased to such a low level that the keying tube 3107 becomes inoperative to pass the 180 cycle busy tone signal voltage.

As will be evident from the preceding explanation, during each positive half cycle of the keying voltage, when the tube 3107 is rendered conductive, the positive potential level of the tube anode is decreased, such that the voltage repeated to the potentiometer 3116 through the isolating resistor 3124 effectively comprises negative pulses of half second duration occurring at a repetition rate of one pulse per second and modulated with the 180 cycle square wave signal voltage derived from the oscillator 3101. The leading and trailing edge of each such pulse effectively comprises a steep voltage transient as seen by the cathode follower tube 3108. These transients, if impressed upon the control grid of the cathode follower tube 3108, would produce large transient spikes or pulses across the load resistors 3118 and 3119 of opposite polarity at the beginning and end of each pulse. Such transient voltage spikes, if repeated to a calling line through the distributor 15 and the connector occupied with the call, would be reproduced as disturbing clicks by the receiver in use at the calling substation.

In accordance with a novel and important feature of the circuit, the production of transient spikes of the character just described across the load resistors 3118 and 3119 at the beginning and end of each on-signal period is obviated by providing means comprising the resistor 3123 for cancelling the low frequency keying voltage component of the signal voltage developed at the anode of the tube 3107 and impressed upon the potentiometer 3116 through the resistor 3124. This is accomplished by impressing each positive pulse developed across the resistor 3111 directly upon the potentiometer 3116 through the coupling resistor 3123, so that during each pulse period when the tube 3107 is acting to repeat a signal modulated pulse negatively to the potentiometer, the positive pulse derived from the resistor 3111 holds the average voltage across the resistor 3116 at the same amplitude level. Thus the keying component of the signal voltage developed at the anode of the tube 3107 is cancelled out as seen by the potentiometer 3116, so that only the 180 cycle square wave signal voltage is impressed upon the control grid of the cathode follower tube 3108. In this connection, it is noted that the pulse correcting network 3112 functions to produce time coincidence between the keying component of the signal voltage developed at the anode of the tube 3107 and the positive pulse concurrently developed across the cathode load resistor 3111. If desired or necessary, the two circuit components 3114 and 3115 of the pulse correcting network 3112 may be made adjustable in order to obtain the described low frequency pulse cancelling effect. It is also noted that the isolating resistor 3124 is characterized by a relatively high resistance in order to insure that the keying operation of the tube 3107 will not interfere with cancellation of the keying pulses across the potentiometer 3116.

*Ringback tone generator 29c*

Figure 25A:
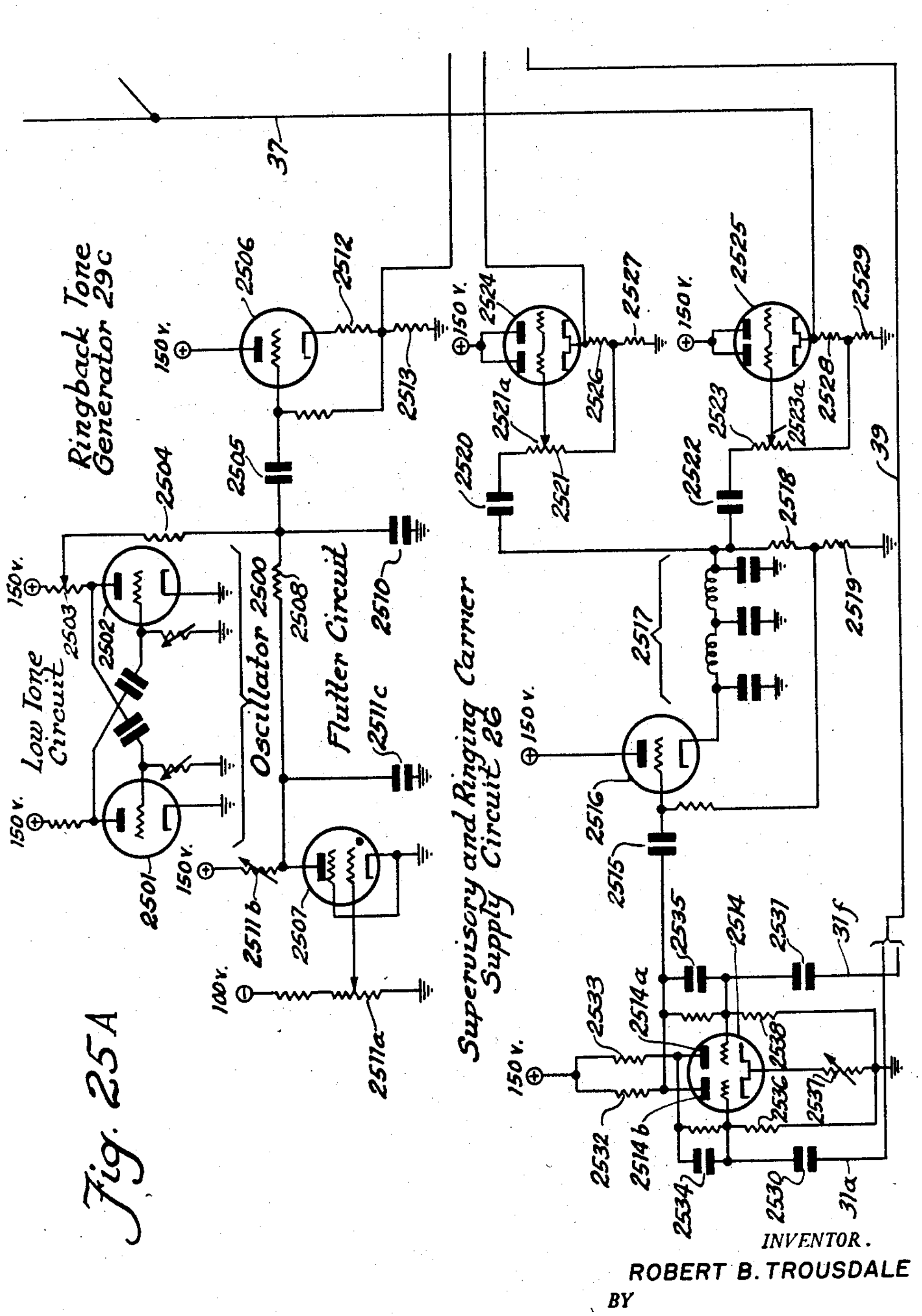

This circuit is illustrated in Fig. 25A and is provided to generate the low frequency signal voltage which is used to signal a calling substation that a called substation is being rung. More particularly, the circuit is designed to produce a signal voltage having a frequency of approximately 200 cycles per second, to which is added a lower frequency of approximately 20 cycles per second. In general, the circuit comprises an oscillator 2500 consisting of two triodes 2501 and 2502 of the 6C4 type connected to operate as a conventional multivibrator. This oscillator is designed to develop a square wave signal voltage at a frequency of 200 cycles per second and the output terminals thereof are coupled through an isolating resistor 2504 and a coupling condenser 2505 to the input electrodes of a cathode follower tube 2506. The higher order harmonics of the square wave signal voltage developed by the oscillator 2500 are shunted through a condenser 2510 and thus prevented from reaching the grid of the cathode follower tube 2506. The tube 2506 is also a commercial type 6C4 triode and is provided with a cathode load circuit which includes two serially related resistors 2512 and 2513. In order to add to the signal voltage impressed upon the input electrodes of the cathode follower tube 2506 a predetermined low frequency of 20 cycles per second, a conventional sawtoothed signal generator is provided which comprises a four electrode thyratron 2507 of the 5696 type manufactured by the Radio Corporation of America, a grid biasing circuit including the resistor 2511*a*, an adjustable frequency determining anode resistor 2511*b* and the usual condenser 2511*c*. The sawtooth voltage developed across the condenser 2511*c* is impressed upon the control grid of the tube 2506 through an isolating resistor 2508 and the coupling condenser 2505.

In considering the operation of the generator 29*c*, it will be understood that the sawtooth generator comprising the tube 2507 and the condenser 2511*c* functions to provide a flutter component to the control grid of the tube 2506 at the predetermined slow rate of 20 cycles per second. It will also be understood that the oscillator 2500 functions to impress a rectangular wave signal voltage upon the control grid of the tube 2506, which provides the principal component signal frequency of 200 cycles per second. Thus a composite signal voltage having a fundamental signal frequency of 200 cycles per second with an added component at the lower frequency of 20 cycles per second is impressed upon the control grid of the cathode follower tube 2506 through the coupling condenser 2505. Higher order harmonics of the two signal voltages are by-passed to ground through the condenser 2510 and hence are prevented from reaching the grid of the tube 2506. However, the composite signal voltage applied to the grid of this tube is rich with the lower order harmonics of the two signal voltages. The composite signal voltage impressed upon the grid of the tube 2506 is repeated by this tube and appears across the cathode load resistors 2512 and 2513, and that portion thereof which is developed across the load resistor 2513 is impressed upon the ringing keying circuit 27 in the manner explained below.

*Supervisory and ringing carrier supply circuit 26*

This circuit is provided synchronously to produce sine wave signal voltages at different voltage levels and having the same frequency of 100 kilocycles, which are utilized in the line circuits of the system for call forwarding and ringing control operations in the manner described more fully below. Generally considered, the circuit comprises a flip-flop circuit including a tube 2514 of the twin triode 6J6 type which is controlled by the units pulse ring circuit 20 to produce a square wave signal voltage at a 100 kilocycle rate, a signal amplifier and inverter tube 2516 of the 6C4 type, a filter network 2517, and two cathode follower tubes 2524 and 2525 of the 6J6 type having their input electrodes coupled in parallel to the output terminals of the filter 2517 through the coupling condensers 2520 and 2522 respectively. The cathode follower tube 2524 is provided with a cathode load circuit which consists of two series connected load resistors 2526 and 2527. Similarly, the cathode follower tube 2525 is provided with a cathode load circuit which comprises the two serially related resistors 2528 and 2529.

In considering the operation of the circuit 26, it is first pointed out that operation of the flip-flop circuit comprising the tube 2514 is governed by positive units pulses transmitted to the left and right control grids of this tube, respectively, through the coupling condensers 2530 and 2531 from the positive units pulse conductors 31*a* and 31*f*. In this connection it will be observed from the pulse chart shown in Figs. 37 to 40, inclusive, that the positive units pulses developed on the two conductors 31*a* and 31*f* are spaced five time positions apart. Normally one section of the tube 2514 is conducting, whereas the other section of the tube is biased beyond cutoff. Thus, assume that during a given drive pulse spacing interval the right section of the tube 2514 is conducting. With this section of the tube conducting, the voltage drop across the resistor 2533 is relatively high such that the positive potential of the anode 2514*a* is relatively low. Under these circumstances, the voltage drop across the resistor 2536 is relatively low such that the voltage existing across the cathode biasing resistor 2537 is high enough to bias the left section of the tube 2514 beyond cutoff. With the circuit in this condition, the next positive units pulse to appear on the condutcor 31*a* is impressed upon the left control grid of the tube 2514 through the coupling condenser 2530 and has the effect of decreasing the bias on the section of the tube to render the same conductive. Immediately the left section of the tube 2514 starts to conduct, the voltage drop across the resistor 2532 is increased to decrease the voltage drop across the resistor 2538 to a point such that the voltage across the cathode resistor 2537 of the tube biases the right section of the tube beyond cutoff. When this section of the tube stops conducting, the voltage drop across the anode load resistor 2533 drops to a value such that when the positive units pulse on the conductor **31*a* ends, the voltage drop across the resistor 2536 exceeds that across the cathode resistor 2537 by an amount sufficient to maintain conduction through the left section of the tube 2514**.

As will be understood from the above explanation, the next units pulse transmitted to the carrier supply circuit 26 appears on the units pulse conductor **31*f* and is of positive polarity. Application of this pulse to the control grid of the right section of the tube 2514 causes the reverse of the action just described to occur, i.e., the right section of this tube is rendered conductive and the left section of the tube is rendered non-conductive. Thus, as positive units pulses are successively transmitted to the circuit 26 alternately over the two conductors 31*a* and 31*f*, the two sections of the tube 2514 are alternately rendered conductive. It will be understood, moreover, that since the units pulses are derived from the units pulse ring circuit 20 over the first and sixth units pulse conductors 31*a* and 31*f*, the switching periodicity of the flip-flop circuit comprising the tube 2514 is entirely uniform, i.e., each period of conduction of each section of this tube is equal to each period of conduction of the other section of the tube. It will thus be apparent that the positive voltage of the tube anode 2514*b*** is periodically increased and decreased to produce a square wave signal voltage at this anode.

This square wave signal voltage is applied to the control grid of the cathode follower tube 2516 through the coupling condenser 2515, with the result that the signal voltage is amplified through this tube to appear across the series connected resistors 2518 and 2519 and the filter network 2517. The network 2517 performs the function of extracting harmonics from the reproduced signal voltage to the extent required to produce a substantially sine wave voltage across the two load resistors 2518 and 2519. The manner in which the filtering action occurs is entirely conventional and will be readily apparent to those skilled in the art.

The voltage developed across the load resistors 2518 and 2519 is impressed across the signal level adjusting potentiometer 2521 and the cathode load resistor 2527 of the tube 2524 through the coupling condenser 2520. This same voltage is also impressed on the signal level determining potentiometer 2523 and the cathode load resistor 2529 of the tube 2525 through the coupling condenser 2522. An adjustable portion of the voltage thus developed across the potentiometer 2521 is impressed directly upon the control grids of the cathode follower tube 2524, with the result that the sine wave signal voltage is reproduced across the two cathode load resistors 2526 and 2527 of this tube and delivered to the ringing keying circuit 27. Obviously, by adjusting the tap **2521*a* along the potentiometer 2521, the magnitude of the signal voltage developed across the serially related resistors 2526 and 2527 may be changed to establish the desired signal voltage level. Similarly, an adjustable portion of the signal voltage produced across the potentiometer 2523 is impressed upon the control grids of the cathode follower tube 2525, with the result that this voltage is repeated across the series connected cathode load resistors 2528 and 2529 of this tube. Here again, the magnitude of the signal voltage produced across the load resistors 2528 and 2529 of the tube 2525 may be changed as desired by adjustment of the tap 2523*a* along the potentiometer 2523. The voltage developed across the two resistors 2528 and 2529 is supplied to the various line circuits of the system over the common multiple conductor 37. The purpose of providing the two cathode follower tubes 2524 and 2525 is that of isolating the ringing signal carrier voltage supplied to the keying circuit 27 from the control carrier voltage supplied to the various line circuits of the system. Further, the use of two tubes to perform the desired isolating function permits two synchronously related signal voltages of the same frequency to be produced at the different voltage levels required in the keying circuit 27** and the individual line circuits of the system.

*Ringing keying circuit 27*

Figure 25B:
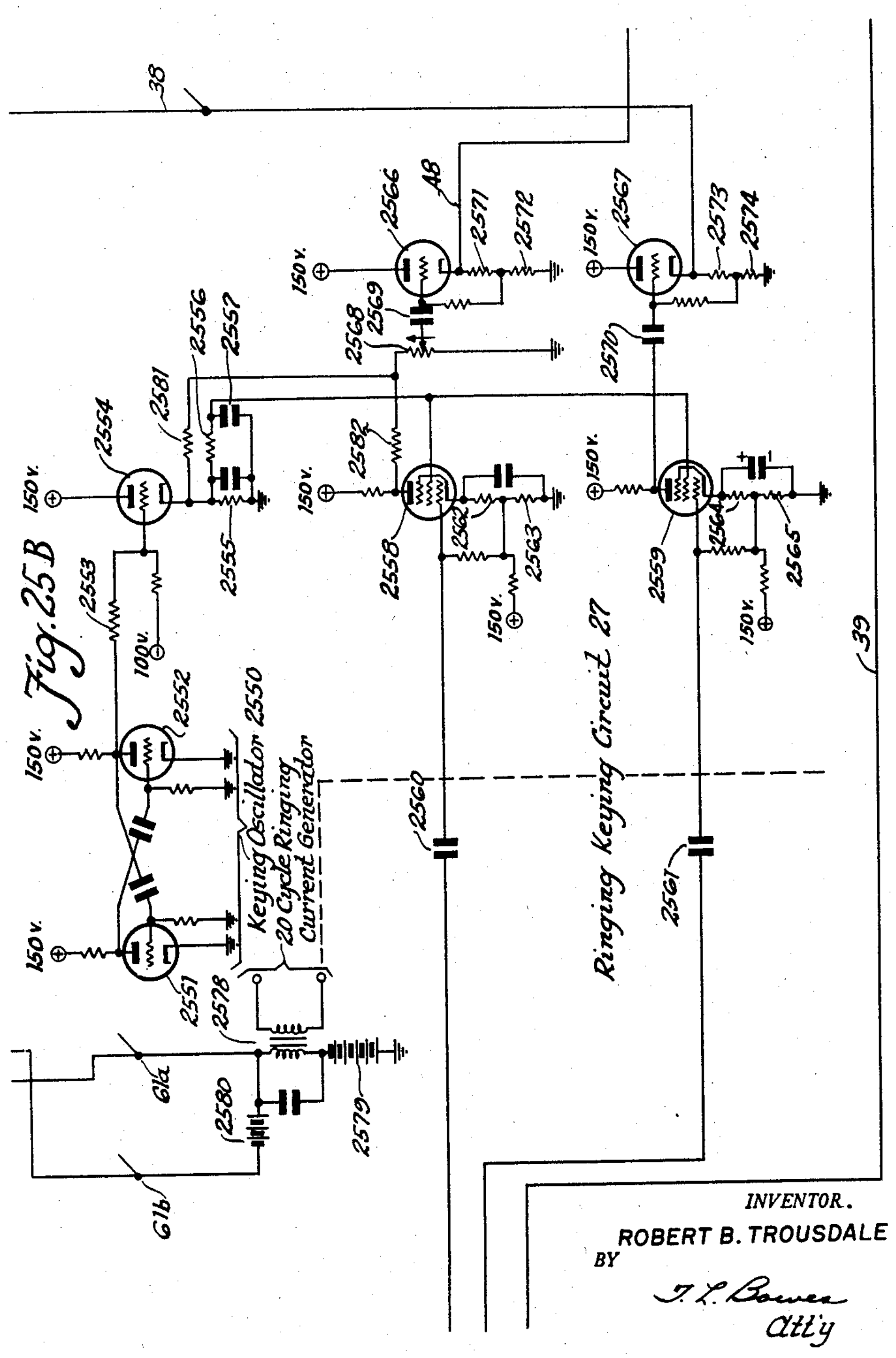

This circuit is illustrated in Fig. 25B and is provided for the purpose of synchronously keying the ringback tone signal voltage delivered to the various connectors of the system and the ringing carrier control voltage transmitted to the various line circuits of the system. More specifically, the circuit is arranged synchronously to key these two signal voltages at a rate of approximately one second on and four seconds off. Generally considered, the circuit comprises a rectangular wave keying oscillator 2550 of the well known multivibrator type which includes a pair of triodes 2551 and 2552 of the 6C4 type. The rectangular wave output voltage developed by this oscillator is impressed upon the control grid of a cathode follower tube 2554, also of the 6C4 type, through a coupling resistor 2553. This cathode follower tube is provided with a load resistor 2555 which is coupled through a filter circuit comprising a series resistor 2556 and a shunt condenser 2557 to the parallel connected screen grids of two keying tubes 2558 and 2559. The first identified keying tube is provided to key the ringback tone signal supplied to the connectors **12*b*, 13*b* and 14*b* of the system. To this end, this tube has its control grid coupled to the output load resistor 2513 of the ringback tone generator 29*c* through the coupling condenser 2560 and has its anode coupled to the control grid of a tandem related cathode follower tube 2566 through a coupling network which comprises a signal level adjusting potentiometer 2568 and a coupling condenser 2569. For the purpose of preventing the low frequency keying component of the voltage developed at the anode of the keying tube 2558 from being impressed upon the control grid of the cathode follower tube 2566, an isolating resistor 2582 is connected between this anode and the upper terminal of the potentiometer 2568, and the load circuit of the tube 2554 is arranged to deliver cancelling pulses to the potentiometer 2568 through the resistor 2581. The circuit further comprises a keying tube 2559 which is arranged periodically to repeat the 100 kilocycle ringing carrier signal developed by the circuit 26 and impressed upon its control grid through the coupling condenser 2561 to the control grid of a cathode follower tube 2567 through a coupling condenser 2570**.

In considering the operation of the keying circuit 27, it will be understood that the low frequency ringback tone signal voltage developed across the load resistor 2513 in the generator **29*c* continuously excites the control grid of the keying tube 2558 through the coupling condenser 2560. Similarly, the 100 kilocycle signal voltage developed across the series connected load resistors 2526 and 2527 in the carrier supply circuit 26 continuously excites the control grid of the keying tube 2559 through the coupling condenser 2561. Referring now to the keying oscillator 2550, this oscillator functions in an entirely conventional manner to develop a rectangular wave keying voltage at the anode of the tube 2552 having a frequency of one-fifth cycle per second. This signal voltage is impressed upon the control grid of the tube 2554, is repeated by this tube and appears across the load resistor 2555. More specifically, the rectangular wave voltage variations across the load resistor 2555 are of such magnitude that during each period when space current flow through the tube 2554 is decreased, the screen grid potentials of the two tubes 2558 and 2559 are reduced to such low values that the tubes will not repeat the signal voltages impressed upon the control grids thereof. On the other hand, each time space current flow through the tube 2554 is increased to increase the voltage drop across the resistor 2555, the screen grids of the keying tubes 2558 and 2559 are driven sufficiently positive to render these two tubes operative to repeat the signal voltages continuously impressed upon the control grids thereof. It will thus be understood that the keying tubes 2558 and 2559 are only operative as signal voltage repeaters during the short "on" period of the rectangular wave keying voltage developed by the oscillator 2550. During each period when the tube 2559 is rendered operative, the 100 kilocycle signal voltage impressed upon the control grid thereof is repeated from the anode of this tube through the coupling condenser 2570 to the control grid of the cathode follower tube 2567. Thus the 100 kilocycle signal voltage is reproduced across the series connected load resistors 2573 and 2574 of the cathode follower tube 2567. From the cathode terminal of this load circuit, the 100 kilocycle carrier or signal voltage is transmitted to each of the line circuits of the system over the conductor 38**.

During each period when the keying tube 2558 is rendered operative under the control of the oscillator 2550 and the cathode follower tube 2554, it functions to repeat the ringback tone signal voltage derived from the generator 29c through the isolating resistor 2582 to the potentiometer 2568. An adjustable portion of the signal voltage thus developed across the resistor 2568 is impressed upon the control grid of the cathode follower tube 2566 through the coupling condenser 2569. Here also, the signal voltage is repeated through the tube 2566 and reproduced across the cathode load resistors 2571 and 2572. The signal voltage developed across these two series connected resistors is transmitted to the supervisory tone gate circuits 225 of each of the connectors 12b, 13b and 14b over the common conductor 48.

It will be understood that the signal voltage delivered to the connectors of the system over the conductor 48 from the cathode load circuit of the tube 2566 is a supervisory signal voltage which is audibly reproduced to signal calling subscribers the desired called substations are being rung. In order to prevent the low frequency keying component of the signal voltage developed at the anode of the tube 2558 from being audibly reproduced as an objectionable click at the beginning and end of each ringback tone signal voltage pulse in the manner previously explained with reference to the busy tone generator 29a, the low frequency keying component of this signal voltage is cancelled out and thus prevented from reaching the grid of the tube 2566. More specifically, each positive keying pulse developed across the resistor 2555 is delivered directly to the potentiometer 2568 through the coupling resistor 2581 to cancel out the decrease in voltage across the resistor 2568 which would otherwise occur due to increased conductivity of the tube 2558 during the pulse period. Coincidence between the leading and trailing edges of the pulses impressed upon the potentiometer 2568 from the resistor 2555 and the tube 2558, respectively, is insured through the action of the pulse correcting network comprising the resistor 2556 and condenser 2557. It will be recognized that the pulse cancelling arrangement just described and employed in the ringing keying circuit 27 is identical with that used in the busy tone generator 29a.

While not directly a part of the ringing keying circuit 27, the ringing facilities of the system include a ringing current generator, not shown, having any desired output frequency, but indicated as having a frequency of 20 cycles, the terminals of which are connected to the primary winding of a transformer 2578. The secondary winding of this transformer is connected between the negative terminal of an anode current source 2579 and the ringing current conductor 61a, which extends to each of the line circuits of the system. These common facilities further comprise a bias potential source 2580 having its terminals connected between the ringing current conductor 61a and lead 61b which is also multipled to the various line circuits of the system in the manner indicated. The manner in which the two identified current sources are employed in ringing a called substation is explained more fully below.

*Link allotter 24*

Figure 32:
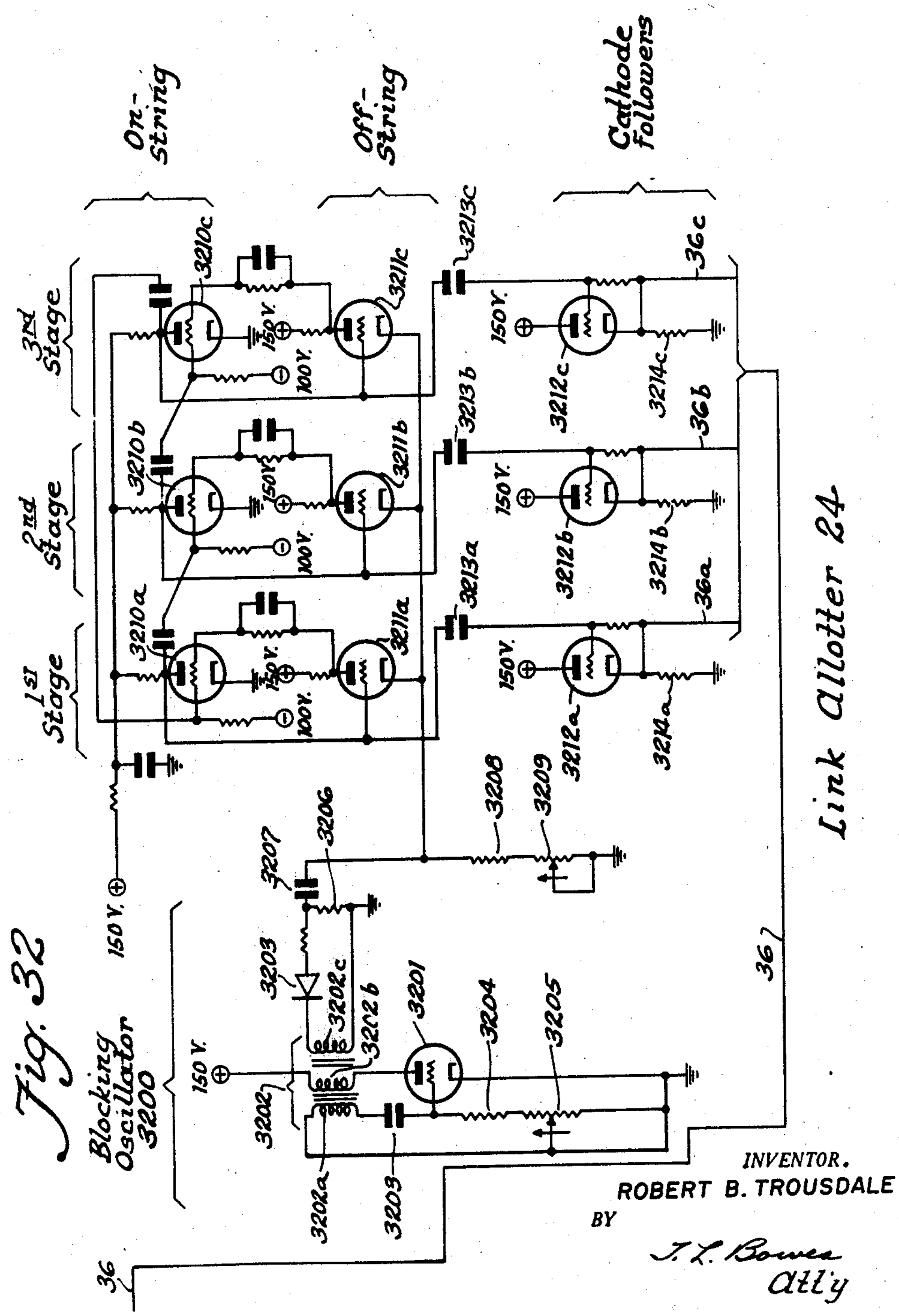

This circuit, as shown in Fig. 32, is provided to produce the allotter pulses which are utilized in successively assigning the finder-connector links 12, 13 and 14 to the use of calling lines. In this regard it will be recalled from the preceding explanation that each allotter pulse is at least equal to and preferably several times longer than each frame of units pulses. By way of example, the allotter 24 may be designed to produce allotter pulses successively on the three allotter conductors 36a, 36b and 36c at a frequency of one kilocycle, which, of course, means that each allotter pulse persists for an interval ten times greater than the time interval of each units pulse frame.

Briefly considered, the link allotter 24 comprises a blocking oscillator 3200 of entirely conventional type and three link allotting stages. Each link allotting stage comprises two tubes of a pulse forming ring circuit and a cathode follower tube. Thus, the first link allotting stage of the allotter comprises an on-string tube 3210a, an off-string tube 3211a and a cathode follower tube 3212a. In this regard it is pointed out that the three on-string tubes 3210a, 3210b and 3210c and the three off-string tubes 3211a, 3211b and 3211c comprise a pulse counting and forming circuit which is substantially identical with the previously described pulse counting and forming circuit of the units pulse ring circuit 20 and operates in the same manner. More specifically, the tubes 3210 of the link allotter respectively correspond to the tubes 2601, 2602, etc., of the units pulse ring circuit 20, and the off-string tubes 3211a, 3211b and 3211c respectively correspond to the off-string tubes 2611, 2612, etc., of the ring circuit 20. The three cathode follower tubes 3212a, 3212b and 3212c are directly coupled to the respective stages of the pulse counting and forming circuits through coupling condensers 3213a, 3213b and 3213c respectively.

As shown, the blocking oscillator 3200 comprises an oscillator tube 3201, a three winding coupling transformer 3202 and a resistance-capacitance timing circuit consisting of a condenser 3203, a resistor 3204 and an adjustable potentiometer 3205. The output winding 3202c of the transformer 3202 is coupled through a crystal rectifier 3203 to a load resistor 3206 across which rectified pulses developed by the blocking oscillator 3200 are reproduced. These pulses are fed through a coupling condenser 3207 to two series connected resistors 3208 and 3209 which respectively correspond to the resistors 2663 and 2664 of the units pulse ring circuit 20. All tubes of the link allotter 24 are triodes of the 6C4 type.

In considering the operation of the link allotter 24, it is first pointed out that the mode of operation of the blocking oscillator 3200 is substantially conventional. Briefly, however, if it is assumed that the grid condenser 3203 has been charged during one operating cycle of the oscillator, the voltage thereacross serves to bias the tube 3201 well below cutoff. As the charge on the condenser 3203 leaks off through the resistor 3204 and the potentiometer 3205, the bias voltage on the control grid of the tube 3201 is decreased to a point where this tube starts to conduct. As anode current starts to flow through the tube a magnetic field is set up around the anode winding 3202b of the transformer 3202. This field induces a voltage in the grid winding 3202a of the transformer which is positively applied through the coupling condenser 3203 to the grid of the tube 3201. As this voltage builds up across the winding 3202a, the grid of the tube 3201 is driven positive relative to the cathode of this tube until a condition of anode current saturation is reached in the tube. Immediately the grid of the tube 3201 is driven positive relative to the tube cathode, grid current flows through the tube to charge the condenser 3203. When anode current flows through the tube is stabilized at the saturation level the induced voltage in the winding 3202a drops to zero. As a consequence, the voltage across the condenser 3203 immediately drives the grid of the tube 3201 sufficiently negative to cut off space current flow through the tube. As space current flow through the tube decreases an induced voltage is developed in the winding 3202*a* which is of the correct polarity to assist in biasing the tube 3201 beyond cutoff. After the voltage across the winding 3202*a* drops to zero, the condenser 3203 starts to discharge and thus initiates a new operating cycle of the oscillator.

From the above explanation it will be understood that pulses of current are caused to traverse the anode winding 3202*b* at a predetermined periodic rate. More specifically, the width or persistence interval of each pulse is determined by the resistance and inductance parameters of the transformer 3202, whereas the spacing interval between pulses is determined by the time constant of the resistance-capacitance circuit consisting of the condenser 3203 and the resistors 3204 and 3205. The current pulses traversing the anode winding 3202*b* cause an alternating voltage to be induced in the transformer output winding 3202*c*. Alternate half cycles of this voltage are passed by the rectifier 3203 to appear across the load resistor 3206. More specifically, the rectifier 3203 is so poled that only those half cycles of the voltage developed across the winding 3202*c* which drive the upper terminal of the resistor 3206 positive with respect to ground are passed by the rectifier 3203. Thus, positive pulses are produced across the load resistor 3206 during continued operation of the oscillator 3200. These pulses are impressed upon the series connected resistors 3208 and 3209 through the coupling condenser 3207. The positive pulses thus developed across the two resistors 3208 and 3209 are applied to the cathodes of the off-string tubes 3211*a*, 3211*b* and 3211*c* in parallel to drive the ring circuit of the allotter 24 in a manner which will be fully apparent from the preceding explanation with reference to operation of the units pulse ring circuit 20. From this explanation, it will be understood that the on-string tubes 3211*a*, 3211*b* and 3211*c* are rendered non-conductive during succeeding non-overlapping periods, each of which equals the period separating the starting instants of two succeeding pulses developed by the blocking oscillator 3200. During the successive periods when the identified on-string tubes are respectively non-conducting, positive pulses are transmitted thereby successively through the coupling condensers 3213*a*, 3213*b* and 3213*c* to the respective control grids of the cathode follower tubes 3212*a*, 3212*b* and 3212*c*. Each time a positive pulse is thus impressed upon the control grid of the tube 3212*a*, for example, space current flow through this tube is increased to increase the voltage drop across the load resistor 3214*a* and thus repeat the positive pulse to the link allotter conductor 36*a*. Bias for the tube 3212*a* is derived from the condenser 3213*a* by the normal positive pulse clamping principle previously described herein. Positive allotter pulses are similarly developed successively on the other two allotter conductors 36*b* and 36*c* as the ring circuit of the link allotter 24 is driven under the control of the blocking oscillator 3200.

*Substations A and B*

The substations respectively terminating the various lines of the system are identical in arrangement. Accordingly, the details of the substation A terminating the line 23 have been illustrated in Fig. 11A of the drawings, but the substation B terminating the line 32 has been only diagrammatically illustrated. Any desired substation arrangement adapted for use in conventional automatic telephone systems may be employed in the present system with but slight modification. The illustrated circuit of the substation A comprises the usual transmitter 1101, receiver 1102, hook or cradle switch 1103, coupling transformer 1104, calling or impulsing device 1105 and ringer 1106 interconnected to form a conventional substation circuit. In addition, the circuit is equipped with a neon or other gas filled tube 1107 which is employed to bridge the ringer 1106 across the conductors of the line 23 in series with the impulsing contacts of the calling device 1105. This tube has a voltage breakdown rating of approximately 100 volts. Operation of the substation equipment as provided at the substation A is entirely conventional and will be readily apparent to those skilled in the art. Accordingly, a detailed description thereof is not included herein. However, in so far as required to explain the mode of operation of the line circuit 10 terminating the line 23 at the exchange end of the line, the operation of the substation A is explained below in the following detailed description of the line circuit 10.

*Line circuits 10 and 16*

Figure 23:
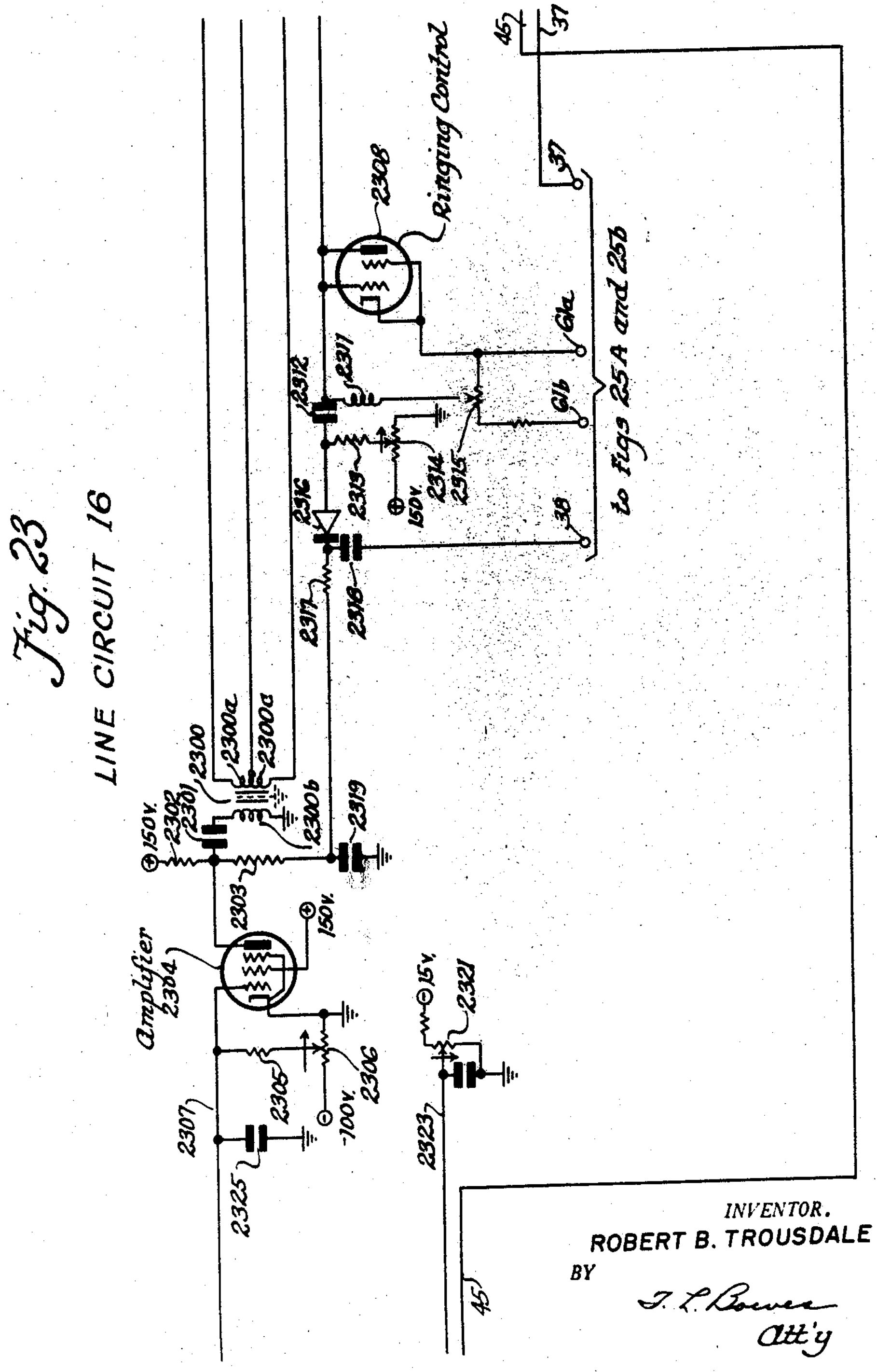
Figure 24:
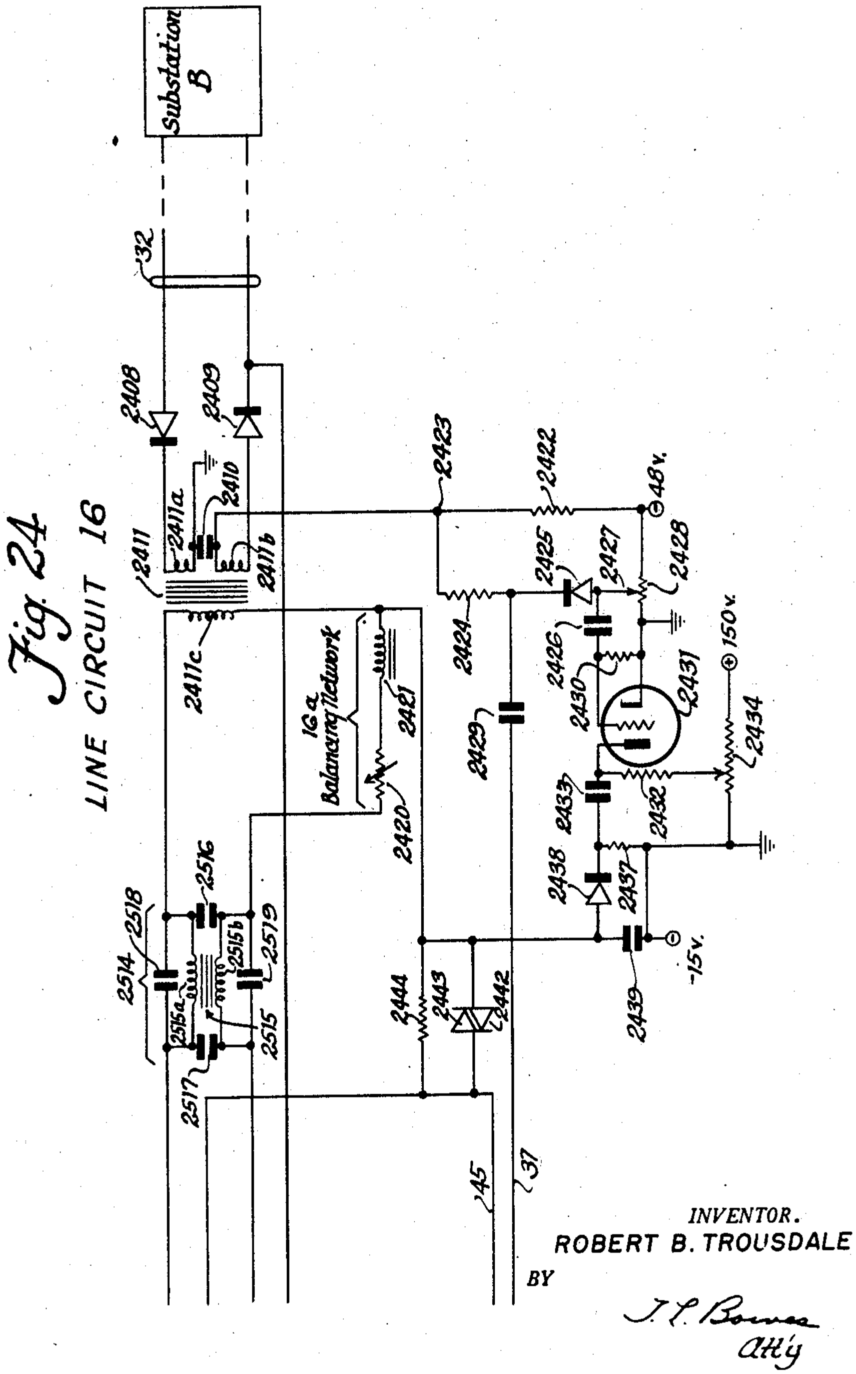

As previously indicated, the two identified line circuits are respectively utilized to terminate the lines 23 and 32 at the exchange end of the system. These two line circuits as well as the line circuits terminating the other lines of the system are identical in circuitry and mode of operation. Accordingly, corresponding components of the two line circuits have been identified by reference numbers having the same tens and units digits, but differing in the hundreds and thousands digits to identify the figures of the drawings in which the individual components thereof are to be found. Since the two line circuits 10 and 16 are identical in every respect, the following description will be confined to the line circuit 10 illustrated in Figs. 11A and 12 of the drawings. It will be understood, however, that this description accurately applies to the line circuit 16 as shown in Figs. 23 and 24 of the drawings as well.

Briefly considered, the line circuit 10 comprises a coupling transformer 1111 which is connected directly to the conductors of the line 23 through two selenium crystals rectifiers 1108 and 1109, a hybrid transformer 1200, a low pass filter 1114 having an upper cut-off frequency of approximately three and one-half kilocycles, and a balancing network 10*a*. The identified components of the line circuit 10 are utilized in transmitting intelligence signals from the distributor 15 to the line 23 and over this line to the substation A in such manner that the signals are not revertively transmitted back to the multiplexer 11. In addition, the line circuit 10 comprises a detector and amplifier circuit, including a tube 1204 of the 6AK6 type, which functions to reconstruct of detect the signal or intelligence components of signal bearing pulses distributed thereto from the distributor 15 over the conductor 44*a*, to amplify the detected signals, and to impress the detected signals upon the primary winding of the hybrid coil 1200 for transmission to the line 23.

Control signals developed at the substation A and transmitted to the line circuit 10 over the line 23 are impressed upon a limiting amplifier network which comprises a three electrode tube 1131 of the well known 6AQ6 type. This tube, in cooperation with the other illustrated circuit components of the limiting amplifier network, functions to convert the 100 kilocycle control carrier developed by the carrier supply circuit 26 into a bias voltage of constant amplitude which is utilized to open those units gate circuits of the multiplexer 11 which individually correspond to the units designation 3 assigned to the line 23. For the purpose of selectively energizing the ringer 1106 provided at the substation A on calls incoming to this substation, ringing control facilities are provided in the line circuit 10 which comprise a four electrode ringing control tube 1208 of the gas filled type. This tube is preferably of the commercial type 2D21 and in cooperation with its associated circuit elements responds to ringing control signals transmitted thereto from the amplifier tube 1204 to effect the transmission of the ringing current derived from the transformer 2578 over the line 23 to activate the ringer 1106 provided at the substation A. The individual circuit elements of the line circuit 10 not specifically referred to above will be described below in explaining the functions which they perform in handling calls involving the line 23.

Briefly to consider the quiescent state of the line circuit 10, i.e., the condition thereof which prevails when the line 23 is not occupied with a call, it is pointed out that so long as negative signal bearing pulses are not transmitted to the control grid of the tube 1204 from the distributor 15 over the conductor 44*a*, this tube is fairly heavily conductive, such that a relatively large voltage drop is developed across the resistor 1202 to correspondingly limit the voltage across the condenser 1219. These voltages remain fixed, under the conditions stated, at a constant level and the voltage across the condenser 1219 is held at a value insufficient to overcome the blocking bias voltage impressed upon the crystal rectifier 1216 from the potentiometer 1214 through the resistor 1213. As a consequence, the crystal rectifier 1216 is biased to prevent current conduction therethrough and hence the keyed 100 kilocycle ringing control signal developed by the circuits 26 and 27 is prevented from reaching the grid of the ringing control tube 1208 to fire this tube. Thus the ringing control facilities of the line circuit 10 are normally held in an inactive condition.

As far as the limiting amplifier network comprising the tube 1131 is concerned, it will be noted that when the substation A is not in use, the contacts of the hook or cradle switch 1103 are open, so that a loop circuit including the conductors of the line 23 is not completed between the substation A and the line circuit 10. As a consequence, no current is permitted to flow from the negative terminal 1112 of the 48 volt current source through the resistor 1122. However, current does flow from this terminal through the potentiometer 1128 to the grounded terminal of this source. The resulting voltage drop across the left portion of the potentiometer 1128 is impressed across the terminals of the crystal rectifier 1125 through the resistors 1122, 1124 and 1127 with the correct polarity to bias this rectifier against current conduction. Thus, the 100 kilocycle supervisory carrier voltage developed by the carrier supply circuit 26 is prevented by the rectifier 1125 from reaching the control grid of the limiting amplifier tube 1131. The resistors 1124 and 1127 function as blocking resistors to prevent the 100 kilocycle supervisory signal voltage from being impressed upon the line 23. Any portion of this signal not blocked by the identified resistors is by-passed to ground through the condenser 1110. It will be apparent, therefore, that so long as the line 23 is not occupied with a call, all components of the line circuit 10 are rendered inactive as signal transmission components.

Operation of the line circuit 10 to handle a call originating at the substation A may well be described in terms of the call from the substation A to the substation B considered above in the general description of the system. Specifically, when the receiver 1102 or hand set at the substation A is removed from its supporting hook or cradle, the contacts of the hook or cradle switch 1103 are closed to complete a calling loop circuit between this substation and the line circuit 10. This loop circuit extends from the ground terminal of the 48 volt current source, by way of the transformer winding 1111*a*, the selenium rectifier 1108, the upper side of the line 23, the impulsing contacts of the calling device 1105, the transmitter 1101, the contacts of the hook or cradle switch 1103, the left winding of the transformer 1104, the lower side of the line 23, the selenium rectifier 1109, the transformer winding 1111*b* and the resistor 1122 to the negative terminal 1112 of the 48 volt current source. Current flow over this loop circuit is in the correct direction to bias the two rectifiers 1108 and 1109 to the linear portions of the operating characteristics thereof. In other words, each of the rectifiers 1108 and 1109 is rendered effective to pass alternating signal voltages superimposed upon the unblocking bias voltages impressed thereacross so long as the signal voltages do not exceed in amplitude the magnitude of the unblocking bias voltage. When the described loop circuit is completed to cause current flow through the resistor 1122 in a direction from the terminal 1123 to the terminal 1112, a voltage is developed across the resistor 1122 which substantially exceeds the rectifier blocking voltage appearing across the left portion of the potentiometer 1128. Thus the upper terminal of the rectifier 1125 is driven positive relative to the lower terminal thereof to render this rectifier conductive. As a consequence, the 100 kilocycle supervisory carrier signal developed by the circuit 26 is permitted to traverse the rectifier 1125 over a circuit which includes the conductor 37, the condenser 1129, the resistor 1127 and the right portion of the potentiometer 1128. That portion of the 100 kilocycle control carrier of the potentiometer 1128 is impressed between the cathode and control grid of the limiting amplifier tube 1131 through the coupling condenser 1126. As a consequence, an amplified 100 kilocycle signal voltage of constant amplitude is developed at the anode of the tube 1131 in the manner more fully explained below. Alternate half cycles of this signal voltage are transmitted through the coupling condenser 1133 and the crystal rectifier 1138 to charge the condenser 1139. During intervening half cycles of the 100 kilocycle voltage, the rectifier 1138 prevents current flow through the condenser 1139 and this condenser tries to discharge through the resistor 1137 and the back resistance of the rectifier 1138. However, the back resistance of this rectifier is very high, of the order of one megohm, so that only a small portion of the charge accumulated on the condenser 1139 is dissipated during each short discharge interval. Thus, a unidirectional voltage is effectively developed and maintained across the condenser 1139 so long as the 100 kilocycle supervisory carrier signal is impressed upon the control grid of the tube 1131 in the manner explained above.

The unidirectional voltage developed across the condenser 1139 in the manner just explained opposes the voltage of the 15 volt current source having its negative terminal connected to the terminal 1113, so that the potential impressed upon the multiplexer input conductor 53 is reduced to a value which will permit current conduction through the units gate tube 1323 of the multiplexer 11 in the manner more fully explained below. More specifically, the net bias voltage, i.e., the difference between the voltage of the 15 volt current source connected to the terminal 1113 and the voltage developed across the condenser 1139, is impressed upon the multiplexer input conductor 53 through a parallel network which comprises the resistor 1144 and the oppositely poled copper oxide rectifiers 1142 and 1143. The circuit constants of the network including the identified components of the coupling network as well as the components of the limiting amplifier are such that the net voltage impressed upon the multiplexer conductor 53 in response to an off hook condition at the substation A is held precisely at the negative potential relative to ground which is necessary to obtain class A operation of the units gate tube.

As indicated above, the purpose of the limiting amplifier network comprising the tube 1131 is that of producing a constant bias voltage across the condenser 1139 in response to an off hook condition at the substation A regardless of variations in the magnitude of current flow through the resistor 1122. The limiting amplifier also serves to amplify the 100 kilocycle supervisory carrier signal, but the more important function performed thereby is that of producing and maintaining a constant bias voltage across the condenser 1139 when an off hook condition prevails at the substation A. In this connection, it is noted that each of the units gating tubes, such, for example, as the tube 1323, of the multiplexer is operated as a class A amplifier which means that the bias derived from the line circuit 10 when an off hook condition prevails at the substation A should be such that the tube 1323 is biased to the exact center of the class A operating range of the tube. When tubes of the 6AS6 type are used in the multiplexer as units gating tubes, this biasing requirement means that the suppressor grid of each tube must be biased precisely to the center of a three volt operating range when an off hook condition is produced at the substation corresponding to the particular tube. Thus, it is important that the voltage drop developed across the condenser 1139 be maintained precisely constant.

As opposed to the requirement outlined in the preceding paragraph, it will be understood that the line circuit 10 is designed for use with lines of varying lengths having varying loop resistances. Depending upon the loop resistance of a particular line with which the line circuit 10 may be associated, the current flow through the resistor 1122 may vary within wide limits to produce correspondingly wide variations in the magnitude of the voltage drop produced across this resistor when the line circuit is taken into use. It has been found that variations in the line loop resistance, as between long lines of high resistance and short lines of low resistance, may vary the voltage developed across the resistor 1122 and the resistor 1124 over a range extending from 7.2 volts to 39 volts. But for the novel arrangement of the limiting amplifier comprising the tube 1131 specifically described below, such variations in the voltage across the resistor 1122 would result in variations in the voltage drop across the condenser 1139.

The manner in which variations in the voltage drop produced across the resistor 1122 are prevented from producing corresponding variations in the voltage across the condenser 1139 when an off hook condition prevails at the substation A may best be explained by reference to Fig. 41 of the drawings, which illustrates the action which occurs in the limiting amplifier tube 1131 at the output side thereof. More specifically, this figure graphically illustrates the grid voltage-plate current characteristic of the tube and generally illustrates the response of this tube to the 100 kilocycle supervisory carrier signal impressed upon the grid thereof. Referring to this figure, the voltage appearing between the lower terminal of the rectifier 1125 and ground is illustrated by the curve A whereas the voltage impressed between the control grid and cathode of the tube 1131 is illustrated by the curve B. The anode current traversing the tube in response to the voltage applied to the control grid thereof is indicated by the curve C. From an examination of these curves, it will be noted that during the first few cycles of the 100 kilocycle supervisory carrier signal passed by the rectifier 1125, relatively heavy grid current flows through the tube 1131. This current has the effect of charging the grid condenser 1126, so that an operating bias for the tube 1131 is effectively built up across the condsenser. The bias voltage build up across the condenser 1126 continues until the plate current of the tube 1131 is swinging between the tube saturation value and zero. More specifically, the bias reference level is shifted by virtue of the voltage built up across the condenser 1126 until the 100 kilocycle supervisory signal swings the grid of the tube 1131 between the tube saturation value and beyond cutoff during alternate half cycles of the applied control signal voltage. This occurs regardless of the magnitude of the rectifier unblocking bias voltage developed across the resistor 1122. Thus irrespective of the voltage developed across the resistor 1122 when an off hook condition is produced at the substation A, a condition is established in the limiting amplifier network whereby the plate current of the tube 1131 is swung between the saturation value of the tube and zero by the 100 kilocycle signal applied to the grid of the tube.

Figure 41:
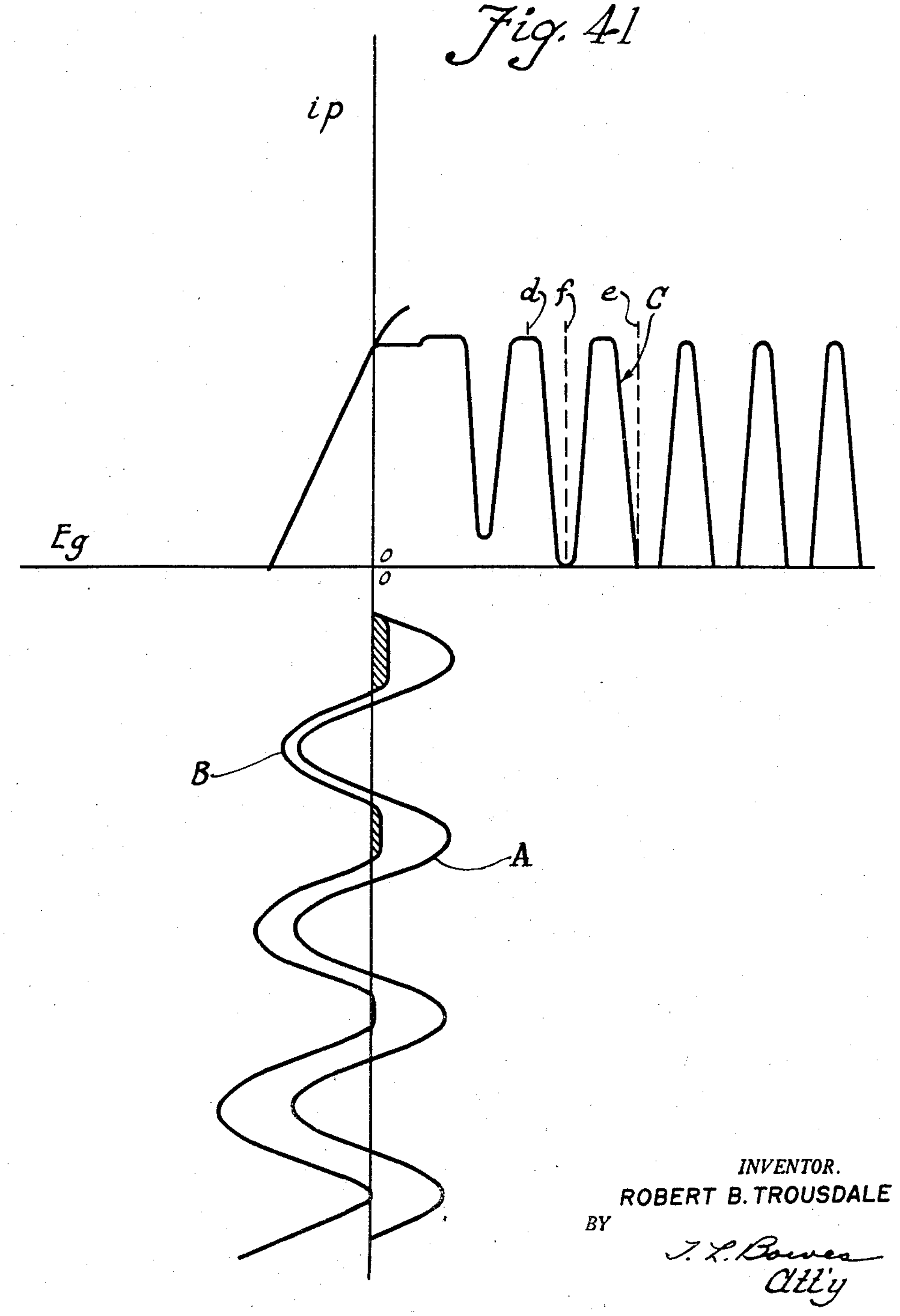

Referring more particularly to the anode current curve C as shown in Fig. 41 it will be noted that during the cycle *d–e* of the anode current swing, the plate current is a maximum at the instant *d*, such that the voltage drop across the resistor 1132 and the left portion of the potentiometer 1134 is a maximum. As a result, the left terminal of the rectifier 1138 is negative relative to the right terminal thereof. Thus the rectifier 1138 is rendered nonconductive. As the plate current through the tube 1131 drops during the period *d–f*, the voltage drop across the resistor 1132 and the left portion of the potentiometer is decreased, with the result that the anode of the tube becomes more positive to reverse the polarity of the voltage across the rectifier 1138 and thus render this rectifier conductive. Current now flows from the positive terminal of the 150 volt anode current source through the circuit elements 1134, 1132, 1133 and 1138 to charge the condenser 1139. As anode current through the tube 1131 rises during the period *f–e*, current flow through the two resistors 1134 and 1132 increases to render the anode of the tube less positive relative to ground and thus reverse the polarity of the voltage across the rectifier 1138. This cuts off charging current flow through the condenser 1139. The condenser now attempts to discharge through the circuit elements 1137 and 1138, but as explained above the back resistance of the rectifier 1138 is very high, such that only a small percentage of the charge accumulated on the condenser 1139 leaks off during the period *f–e*. During continued operation of the circuit, the described function of charging the condenser 1139 during alternate half cycles of the plate current traversing the tube 1131 continues so long as the off hook condition persists at the calling substation A. Moreover, since the swing of the anode current flow through the tube is between constant limits and repetitive at a constant 100 kilocycle rate, the voltage developed across the condenser 1139 rises to a constant value and remains set at this value within operating limits, regardless of variations in the voltage across the resistor 1122.

When the bias voltage impressed upon the suppressor grid of the units gate tube 1323 is decreased in the manner explained in the preceding paragraphs, multiplexer pulses 84*b* occurring in the time position 64*b* assigned to the calling line 23 are impressed upon the multiplexer output conductor 50 to effect seizure of an idle one of the links 12, 13 and 14 in the manner generally explained above. Assuming that the link 12 is assigned to handle the call, the finder and connector portions of the link are conditioned for operation with the result that signal pulses modulated with the dial tone signal derived from the dial tone generator 29*b* are transmitted from the calling line out gate circuit 226 of the connector 12*b* through the gate circuits of the distributor 15 which individually correspond to the line 23. After traversing these gate circuits, the gated pulses are impressed upon the input circuit of the tube 1204 where the signal components of the pulses are detected or reconstructed and impressed upon the control grid of the tube 1204. The dial tone signal as amplified through the tube 1204 is impressed upon the primary winding 1200*b* of the hybrid coil 1200 through the coupling condenser 1201. From the secondary side of the hybrid coil 1200*a*, the dial tone signal is transmitted through the low pass filter 1114, the coupling transformer 1111 and the rectifiers 1108 and 1109 to the line 23. The signal is transmitted over the line 23 to the substation A where it is reproduced by the receiver 1102 to inform the calling subscriber that the dialing operation may be statred. The manner in which the hybrid system comprising the hybrid coil 1200 and the balancing network 10*a* prevents the dial tone signal from being revertively applied to the units gate circuit of the multiplexer 11 is fully explained below.

Upon receiving the dial tone signal, the calling subscriber may actuate the calling device 1105 in accordance with the directory number designation of the desired substation. Since it is assumed that the line 32 is being called from the substation A, the digits 3 and 2 will, of course, be successively dialed at the substation A. Operation of the calling device 1105 has the effect of pulsing the voltage across the resistor 1122 to correspondingly pulse the voltage across the condenser 1139. More specifically, during the open circuit or break period of each dial impulse, the voltage across the resistor 1122 drops substantially to zero with the result that the condenser 1139 becomes fully discharged to increase the bias on suppressor grid of the units gate tube 1323 in the multiplexer to its normal pulse blocking value. On the other hand, during the closed circuit or make period of each dial impulse, the voltage drop across the resistor 1122 is restored to the off hook value, with the result that the condenser 1139 is charged to drop the bias on the suppressor grid of the units gate tube 1323 in the multiplexer 11 to its normal pulse gating value. Thus the dial impulses are repeated by the line circuit 10 over the conductor 53 to the multiplexer 11. At this point, it is noted that the condenser 1126 in combination with the resistor 1130 acts as a high pass filter having a high signal rejection characteristic at frequencies of the order of 50 cycles and less and a low impedance at the supervisory signal frequency of 100 kilocycles. At the output side of the tube 1131, the resistor 1137 and condenser 1133 also function as a high pass filter having the same characteristics as that included in the tube input circuit. The purpose of thus discriminating on a frequency basis between low frequency signals and high frequency signals is that of preventing transient, noise and induction voltages, which may appear on the line 23 and are normally of low apparent frequency, from producing changes in the voltage across the condenser 1139. That portion of the output circuit of the tube 1131 which comprises the circuit elements 1132, 1133, 1138, 1137 and 1139 and the output impedance of the tube 1131 acts as a low pass filter to pass the dial impulses while at the same time rejecting the 100 kilocycle supervisory signal and voice signals. As a consequence, the latter signals are prevented from appearing across the condenser 1139. Thus the limiting amplifier comprising the tube 1131 is specifically arranged to prevent low frequency noise voltages, voice signals and the 100 kilocycle signal from being reproduced across the condenser 1139 and being impressed from this condenser upon the suppressor grid of the tube 1323 in the multiplexer 11. The spurious signal response of the line circuit 10 is further minimized through operation of the condenser 1110 to by-pass such signals to ground and thus prevent the same from substantially affecting the voltage drop across the resistor 1122. It will be understood that the condenser 1110 also functions as an audio signal coupling condenser in coupling together the two windings **1111*a* and 1111*b* of the transformer 1111**.

As will be evident from the preceding explanation, if the called line 32 is tested in the connector **12*b* and found busy, signal pulses modulated with the busy signal are developed in the connector 12*b* and released to the line circuit 10 by the distributor 15. On the other hand, if the called line tests idle in the connector 12*b*, such that the ringing operation is initiated, signal pulses modulated with the keyed ringback tone signal voltage developed by the circuit 29*c* are impressed upon the conductor 44*a* in the distributor 15. These signal voltages are detected at the input side of the amplifier tube 1204, transmitted through the line circuit 10 and over the line 23 to excite the receiver 1102** at the calling substation in the exact manner explained above with reference to the dial tone signal.

Assuming that the call is answered at the called substation B, a two-way communication channel is established between the calling and called substations. Thus voice signals originating at the substation A and transmitted over the line 23 to the line circuit 10 traverse the two primary windings **1111*a* and 1111*b* and the coupling condenser 1110 in series aiding relationship, causing a voltage to be developed across the secondary winding 1111*c* of this transformer. By reference to the simplified circuit shown in Fig. 43 of the drawings, it will be seen that a portion of the signal voltage developed across the secondary winding 1111*c* is impressed across the parallel network comprising the resistor 1144 and the rectifiers 1142 and 1143 through the winding 1200*a* of the hybrid coil 1200. The voltage developed across the parallel connected circuit elements 1142, 1143 and 1144 is impressed upon the suppressor grid of the multiplexer tube 1323 in series with the bias voltage derived from the condenser 1139 and the 15 volt current source connected to the terminal 1113. This signal voltage serves to modulate the multiplexer pulses gated by the multiplexer 11 in the time position 64*b* assigned to the calling line in the manner more fully explained below. In this regard, it is noted that the two parallel connected rectifiers 1142 and 1143 function as a signal amplitude limiter to prevent too great a signal voltage swing of the potential applied to the suppressor grid of the tube 1123. Specifically, these two rectifiers function to maintain the signal input to the units gate tube 1123** of the multiplexer within the class A operating range of this tube.

Figure 42:
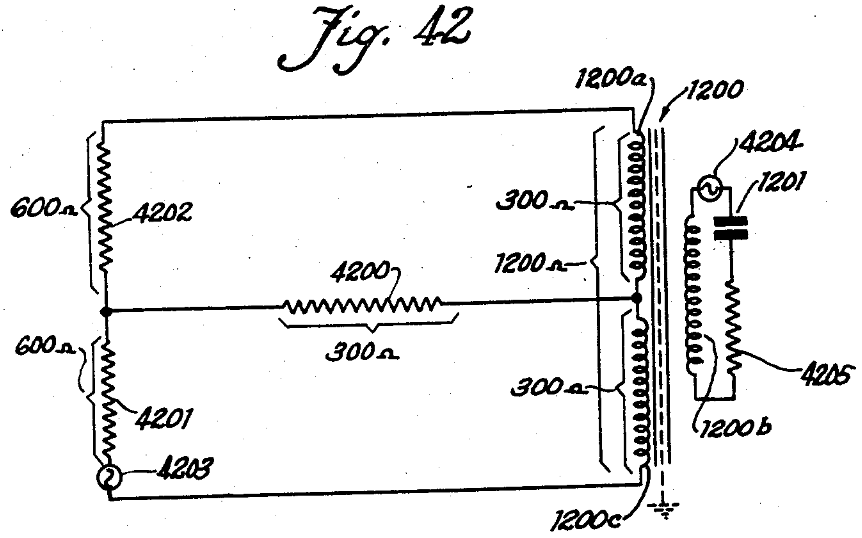

As regards voice signals originating at the called substation B, it will be understood from the preceding general explanation that such signals are repeated through the multiplexer 11 and the connector **12*b* to the distributor 15. In the distributor 15 the pulses carrying these signals are released over the conductor 44*a* to the line circuit 10, where the voice signals are reconstructed in the input circuit of the amplifier tube 1204. From the output side of the amplifier tube 1204 the voice signals are transmitted to the calling line 23 in the exact manner explained above with reference to the dial tone, busy tone and ringback tone signals. It is in the transmission of signals from the amplifier tube 1204 to the line 23 that the operation of the hybrid system embodied in the line circuit 10 becomes important. Specifically, this arrangement serves the function of preventing signals fed to the line circuit 10 from the distributor 15 from being revertively applied to the suppressor grid of the units gate tube 1323 in the multiplexer 11. The manner in which such signals are prevented from being reproduced across the parallel connected circuit elements 1142, 1143 and 1144 may best be explained by reference to the equivalent circuit shown in Fig. 42 of the drawings. In the equivalent circuit there shown, the impedance 4201 represents the equivalent impedance of the transformer 1111, the calling line 23 and the substation equipment at the substation A as seen across the terminals of the transformer secondary winding 1111*c*, and the impedance 4202 represents the series impedance of the balancing network 10*a*. In series with the equivalent impedance 4201, an alternating current generator 4203 of zero internal impedance is illustrated to indicate a signal voltage source, i.e., signal voltages impressed upon the line circuit 10 from the line 23. The diagonal impedance 4200 represents the suppressor grid-cathode impedance of the multiplexer tube 1323 as paralleled by the circuit elements 1142, 1143 and 1144. The other two arms of the bridge circuit are made up of the hybrid coil windings 1200*a* and 1200*c* which have identical impedances. It is noted that the impedance value of the hybrid coil secondary winding varies as the square of the number of winding turns. Hence the series impedance of the two windings 1200*a* and 1200*c* is four times as great as the series impedance of either of the two windings 1200*a* and 1200*c* alone. Signal voltage input from the amplifier tube 1204 to the hybrid system is through the primary winding 1200*b* of the hybrid coil 1200. This winding is shunted by the anode-cathode impedance 4205 of the amplifier tube 1204 in series with the coupling condenser 1201, and the signal voltage input to the circuit is indicated by the small series connected generator 4204** which is assumed to have zero impedance.

At frequencies within the signal frequency range handled by the line circuit 10, the balancing circuit 10a is designed to have an equivalent impedance 4202 substantially equal to the equivalent impedance 4201. More specifically, each of the equivalent impedances 4201 and 4202 has a value of approximately 600 ohms in a typical line circuit. The hybrid coil 1200 is so designed that each of its windings 1200a and 1200c has an equivalent impedance of approximately 300 ohms, such that the overall impedance of the two series connected windings is 1200 ohms. Finally, the circuit is so designed that the equivalent impedance 4200 has a value of approximately 300 ohms. Thus the impedance 4200 has a value equaling that of each of the windings 1200a and 1200c and approximately one half the value of each of the impedances 4201 and 4202.

When a signal voltage is developed across the line 23 at the calling substation A, this voltage, as represented by the generator 4203, is impressed upon the terminals of the equivalent impedance 4201. The voltage across this impedance divides equally across the equivalent impedance 4200 and the hybrid coil winding 1200c. Thus approximately one half of the available signal voltage is impressed between the suppressor grid and cathode of the units gate tube 1323 in the multiplexer 11. The voltage across the winding 1200c causes a corresponding induced voltage to be developed across the winding 1200a which is in phase opposition to the voltage across the equivalent impedance 4200 and is of the same magnitude. As a result, the net voltage produced across the terminals of the balancing network 10a, i.e., the equivalent impedance 4202, as a result of signal voltages appearing on the line 23 is substantially zero. The described cancellation of the voltages developed across the winding 1200a and the impedance 4200 as a consequence of signal voltages developed on the line 23 is of importance since it helps prevent hook switch transients and other spurious voltages of high amplitude and short duration from producing large transient voltages across the terminals of the balance network 10a as represented by the impedance 4202 in Fig. 42. In this regard, it is noted that in order to obtain the required impedance match for satisfactory balance of the hybrid system, an iron core inductance element 1121 having a magnetically polarized core may be used in the balance network 10a. Further, if this element is subjected to large amplitude voltage transients the polarization of the core may be disturbed to effect the impedance characteristics of the element. However, by arranging the hybrid system in the manner disclosed herein, such transient voltages are prevented from appearing across the balancing network 10a and hence from affecting the polarization of the core embodied in the inductance element 1121.

Signal voltages represented by the generator 4202 and impressed upon the line circuit 10 by way of the distributor 15 appear across the anode-cathode impedance 4205 of the tube 1204 and are impressed upon the hybrid coil primary winding 1200b through the coupling condenser 1201. As explained above, these signal voltages may originate locally in the connector 12b, for example, occupied with the call, or may result from voice current transmission from the called substation B to the line circuit 16 over the called line 32. In either case, the signal voltage developed across the winding 1200b of the hybrid coil 1200 causes in-phase voltages of equal magnitudes to be induced in the two windings 1200a and 1200c. The overall voltage across the outer terminals of these two windings is impressed across the impedance 4201 and 4202 in series. In this case, the series impedance of the two windings 1200a and 1200c is effectively 1200 ohms which effectively matches the series impedance of 1200 ohms of the two impedances 4201 and 4202. Thus the diagonal impedance 4200 is effectively connected between two opposed terminals of a four-arm bridge circuit having like impedances of 600 ohms in each of the four arms thereof. It will be understood, therefore, that the two terminals of the diagonal impedance 4200 are maintained at the same instantaneous potential, such that no portion of the signal voltage impressed upon the circuit from the distributor 15 appears across this impedance. However, that portion of the voltage which appears across the impedance 4201 is impressed upon the line 23 to excite the receiver 1102 provided at the calling substation. It will thus be apparent that the hybrid system as embodied in the line circuit 10 is so arranged that signal voltages impressed upon the line circuit from the distributor 15 are prevented from being revertively applied to the input circuit of the units gate tube 1323 in the multiplexer 11.

Figure 43:
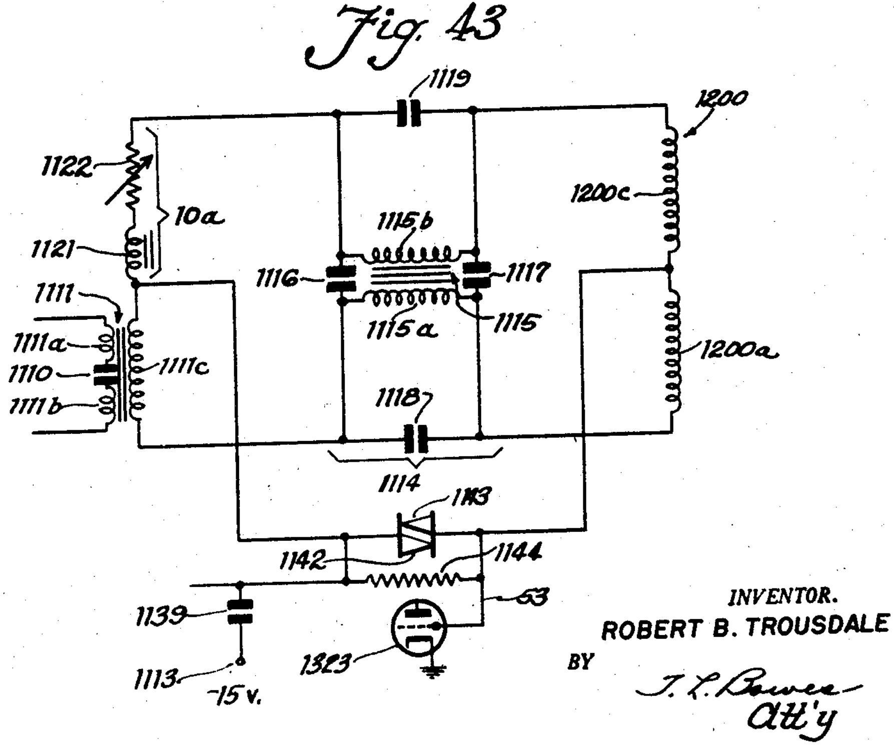

In the above explanation pertaining to the hybrid system of the line circuit 10 and its mode of operation, the effect of the low pass filter 1114 has been completely disregarded. However, and as best shown in Fig. 43 of the drawings, this filter network is included in the hybrid system in such manner as to have no appreciable effect upon the balance of the circuit. Specifically, the filter 1114 comprises two inductance elements 1115a and 1115b which are serially included in the signal current transmission path between the hybrid coil 1200 and the coupling transformer 1111 and are respectively shunted by condensers 1118 and 1119 having identical capacitance values. The shunt legs of the filter respectively comprise condensers 1116 and 1117 bridging the signal transmission channel between the hybrid coil 1200 and the coupling transformer 1111 in series with the balancing network 10a and having identical capacitance values. The inductance elements 1115a and 1115b are specifically designed to have identical impedance characteristics. To this end, these two elements are comprised of two windings having the same number of turns and wound side by side on a common toroidal core 1115. Since the capacitance values of the condensers 1116 and 1118 are respectively identical with the capacitance values of the condensers 1117 and 1119, and the two inductance elements 1115a and 1115b have identical impedance characteristics, the filter network 1114 is entirely symmetrical as viewed either from the secondary side of the coupling transformer 1111 in series with the balancing network 10a or the secondary side of the hybrid coil 1200. Due to this symmetrical arrangement of the filter network, the network has no appreciable effect upon the balance of the hybrid system shown in Fig. 42 at any frequency. The constants of the circuit components making up the filter network 1114 are so chosen that this network has an upper cutoff frequency of 3.5 kilocycles. Thus, signals, pulsed or otherwise, having frequencies in excess of 3.5 kilocycles are highly attenuated through the action of this filter network. The primary purpose of providing the filter network 1114 is that of preventing signal pulses traversing the line switching components of the system and side bands of the pulse frequencies from being transmitted through the line circuit 10 to the line 23 and thence to the substation A for audible reproduction. Since the signal sampling frequency of 10 kilocycles is the most prevalent stray frequency in the entire system, it is desirable to so design the filter network 1114 that maximum signal attenuation is obtained at this particular frequency. To this end, the capacitance values of the condensers 1118 and 1119 are so chosen that the inductance elements 1115a and 1115b are tuned precisely to resonance at the 10 kilocycle signal sampling frequency. Since the filter network 1114 has an upper cutoff frequency of 3.5 kilocycles, it also functions to suppress most of the predominant side bands of the fundamental signal sampling frequency.

In considering the operation of the ringing control facilities of the line circuit 10 on a call routed to this line circuit and the associated line 23 from another line of the system, it is pointed out above that normally the crystal rectifier 1216 is biased against current conduction so that the keyed ringing control signal impressed upon the common conductor 38 by the circuits 26 and 27 is prevented from reaching the grid of the gas filled tube 1208. Specifically, the positive potential impressed upon the left terminal of the rectifier 1216 through the resistor 1213 from the potentiometer 1214 is substantially greater than the voltage across the condenser 1219 both when the amplifier tube 1204 is inactive and when this tube is operating as a voice, dial tone, busy tone or ringback tone signal amplifier tube. With the rectifier 1216 thus biased to prevent the keyed 100 kilocycle ringing control signal from reaching the grid of the tube 1208, this grid and the cathode of the tube float together at a potential which is above ground potential by an amount equal to the 90 volts of the direct current source 2579 plus or minus the alternating ringing voltage which appears across the secondary winding of the ringing current transformer 2578. This ringing voltage has an R.M.S. value of approximately 90 volts. Normally, the grid of the tube 1208 is biased a few volts negative with respect to the cathode of the tube in a local biasing circuit which includes the bias potential source 2580, the resistor 1215*a*, the potentiometer 1215 and the inductance element 1211. More specifically, an adjustable portion of the voltage appearing across the potentiometer 1215 is negatively applied to the control grid of the tube 1208 through the inductance element 1211.

Another special feature of the ringing control facilities is the arrangement whereby the alternating voltage appearing across the secondary winding of the ringing transformer 2578 is prevented from firing the tube 1208 in the absence of a start ring bias potential on the conductor *44a*. In this connection it will be noted that the circuit elements 1212, 1213 and 1214 effectively constitute a parallel path to ground for the ringing current. Thus these components are connected in series with the inductance element 1211, the resistors 1215*a* and the potentiometer 1215 across the secondary winding of the transformer winding 2578 and the direct current source 2579, so that the alternating ringing voltage appearing across the transformer secondary winding may cause current flow through the inductance element 1211 to produce a voltage difference between the cathode and control grid of the tube 1208. However, the condenser 1212 is characterized by a low capacitance value, such that it has practically infinite impedance at the low ringing frequency of 20 cycles. Presence of this condenser in the series circuit just described limits ringing current flow over the circuit to such a low value that the voltage drop across the low impedance inductance element 1211 cannot produce inadvertent firing of the tube 1208.

When the line circuit 10 is seized on a call incoming to the line 23 from another line of the system, such, for example, as from the line 32, pulses of large amplitude and negative polarity are impressed upon the input circuit of the amplifier tube 1204 over the conductor *44a* from the distributor 15. These pulses have an amplitude approximately 50 percent greater than the maximum amplitude of pulses released by the distributor which may be modulated with any voice, dial tone, busy tone or ringback tone signal. When start ring pulses are thus impressed upon the input circuit of the tube 1204, anode current flow through the tube is sharply decreased to correspondingly decrease the voltage drop across the resistor 1202. As a consequence, the condenser 1219 is charged to a higher voltage through the series connected resistors 1202 and 1203. This increase in the voltage across the condenser 1219 results in a polarity reversal of the voltage across the crystal rectifier 1216, thereby to render this rectifier conductive. In this regard, it is noted that the resistor 1217, which interconnects the right terminal of the rectifier 1216 with the upper positive terminal of the condenser 1219, acts as an isolating resistor to prevent the 100 kilocycle ringing control carrier from being impressed upon the primary winding **1200*b* of the hybrid coil 1200**.

When the rectifier 1216 is rendered conductive in the manner just explained, the keyed 100 kilocycle ringing control carrier applied to the conductor 38 in the ringing keying circuit 27 is impressed upon the control grid of the tube 1208 over a path which includes this rectifier and the two coupling condensers 1212 and 1218. In this regard, it is noted that the impedance of the condenser 1212 at the high frequency of the ringing control signal is relatively low as compared with the impedance of the resistor 1213 and the potentiometer 1214. Also, the impedance of the inductance element 1211 is very high at the 100 kilocycle frequency of the ringing control signal. Thus the presence of the shunt connected elements 1211 and 1213 does not prevent the keyed 100 kilocycle ringing control signal from being impressed between the control grid and cathode of the tube 1208. During alternate half cycles of the ringing control signal passed by the rectifier 1216, the tube 1208 is fired. Ringing current transmission to the called substation A is initiated immediately the tube 1208 is fired. As previously pointed out, the ringing voltage actually comprises the 20 cycle alternating voltage developed across the secondary winding of the transformer 2578 as superimposed upon the voltage of the direct current source 2579. This source has a voltage of approximately 80 volts. The circuit traversed by the ringing current extends from the upper terminal of the secondary winding of the transformer 2578 by way of the conductor **61*a*, the ionized space current path through the tube 1208, the lower conductor of the line 23, the gas filled tube 1107, the windings of the ringer 1106, the impulsing contacts of the calling device 1105, the upper conductor of the line 23, the rectifier 1108 and the winding 1111*a* of the transformer 1111 to the grounded terminal of the current source 2579. In this regard, it is noted that the neon tube 1107 is instantaneously fired by the ringing voltage impressed upon the line 23 in response to firing of the ringing control tube 1208. After the two tubes 1107 and 1208 are fired, ringing current traversal of the above-traced circuit produces a voltage drop across the tube 1208 of approximately 8 volts and a voltage drop across the tube 1107 of approximately 60 volts. The balance of the available voltage, which varies from zero to 170 volts positive R.M.S., appears across the remaining components of the circuit traversed by the ringing current. It will thus be apparent that most of the available 80 volts of the direct current source 2579 is dissipated across the tubes 1107 and 1208. As a consequence, the cathode of the tube 1208 is driven positive relative to the anode of this tube during a portion of each alternate half cycle of the ringing voltage appearing across the secondary winding of the transformer 2578. Hence, but for the continued excitation of the grid of the tube 1208 by the 100 kilocycle ringing control signal in the manner explained above, this tube would be extinguished at some point during one half of each cycle of the ringing voltage. During the silent period of each ringing cycle when the 100 kilocycle ringing control signal is removed from the conductor 38, the tube 1208 is deionized during the first cycle of the ringing voltage next following interruption of the ringing control signal when the cathode of the tube 1208 is driven positive relative to the tube anode. However, ringing current transmission over the line 23 is obviously resumed at the start of each ringing interval of each ringing cycle in response to reapplication of the ringing control signal to the conductor 38**.

When the call is answered at the substation A through removal of the receiver 1102 or hand set from its supporting hook or cradle, the limiting amplifier network functions in the manner explained above to build up a voltage across the condenser 1139 which results in the transmission of multiplexer pulses occurring in the time position 64*b* assigned to the line 23 through the multiplexer 11 to the connector occupied with the call. The connector and more particularly the called line in gate circuit 223 and the called line reconstructor circuit 222 embodied therein respond to these multiplexer pulses by operating the ring trip circuit 221 of the connector to terminate the start ring signal being impressed upon the conductor 44*a* in the distributor 15. More specifically, the amplitude of the negative pulses applied to the conductor 44*a* in the distributor 15 is reduced to the normal operating level. As a consequence, the voltage drop across the resistor 1202 is sharply increased and the condenser 1219 is caused to discharge through the resistor 1203 and the space current path of the tube 1204. After the condenser 1219 has discharged down to its normal charge level, the voltage thereacross becomes less than the voltage applied to the left terminal of the rectifier 1216 through the resistor 1213. Thus the polarity of the voltage across the rectifier 1216 is reversed to bias this rectifier against transmission of the ringing control signal therethrough to the control grid of the tube 1208. When the ringing control signal is thus removed from the grid of the tube 1208, this tube is deionized to terminate the ringing operation in a manner which will be fully apparent from the preceding explanation.

The manner in which the line circuit 10 functions to transmit voice signals in both directions between the substation A and a calling substation on calls incoming to the line 23 is exactly the same as explained above with reference to the call originating at the substation A and routed to the substation B. In this connection, it is emphasized that the magnitude of the voltage changes produced at the anode of the tube 1204 in response to voice signal excitation of the control grid of this tube is insufficient to cause unblocking of the rectifier 1216. In other words, the ringing response of the line circuit 10 is on a marginal basis, a much larger bias voltage being required on the control grid of the tube 1204 to initiate the ringing operation than any signal voltage which may be impressed on the grid as a consequence of supervisory or voice signal input to the tube 1204 over the conductor 44*a* from the distributor 15. Moreover, the resistor 1203 and condenser 1219 acts as a low pass filter to prevent voice signals from being impressed upon the rectifier 1216 to any appreciable extent.

It is believed that the manner in which the line circuit 10 is released when the receiver 1102 or hand set at the substation A is replaced upon its supporting hook or cradle to terminate a call will be readily apparent from the preceding explanation. Briefly summarized, however, it is repeated that the system is arranged for calling party release of the finder-connector links embodied in the system. Accordingly, if the link 12, for example, is occupied with a call originated at the substation A, the charge across the condenser 1139 is rapidly dissipated through removal of the 100 kilocycle supervisory signal from the grid of the limiting amplifier tube 1131 when the calling subscriber at the substation A hangs up to terminate the call. When the charge across the condenser 1139 is dissipated, the units gate tube 1323 of the multiplexer 11 is biased to interrupt the transmission of multiplexer pulses to the finder 12*a* of the link occupied with the call. As a consequence, the link is released in the manner previously explained so that even though the called subscriber attempts to hang on to the connection, signal pulses cannot be impressed upon the control grid of the tube 1204 over the conductor 44*a* by the distributor 15. In a similar manner, the limiting amplifier network comprising the tube 1131 functions to dissipate the charge across the condenser 1139 on a call incoming to the line 23 when the called subscriber at the substation A hangs up to terminate the call. Here also, the units gate tube 1323 of the multiplexer 11 is biased against multiplexer pulse transmission over the conductor 50 to the link occupied with the call when the charge on the condenser 1139 is dissipated. It will thus be understood that regardless of whether a call originates at the substation A or is routed to this substation from another substation of the system, the units gate circuit of the multiplexer 11 is automatically blocked against multiplexer pulse transmission over the multiplexer output conductor 50 in the time position 64*b* assigned to the line 23 when the subscriber at the substation A hangs up to terminate the call.

*Multiplexer 11*

Figure 13:
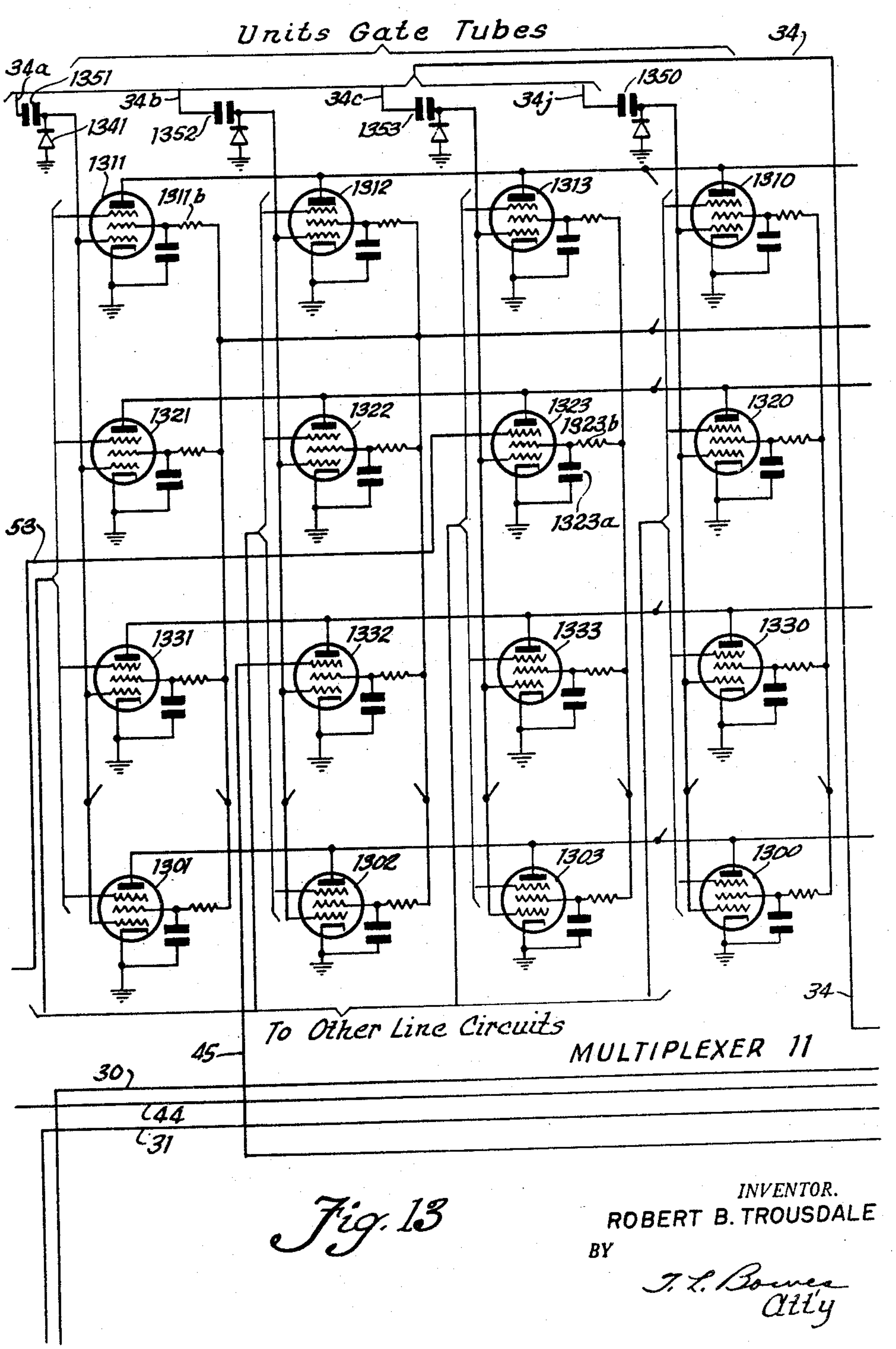
Figure 14:
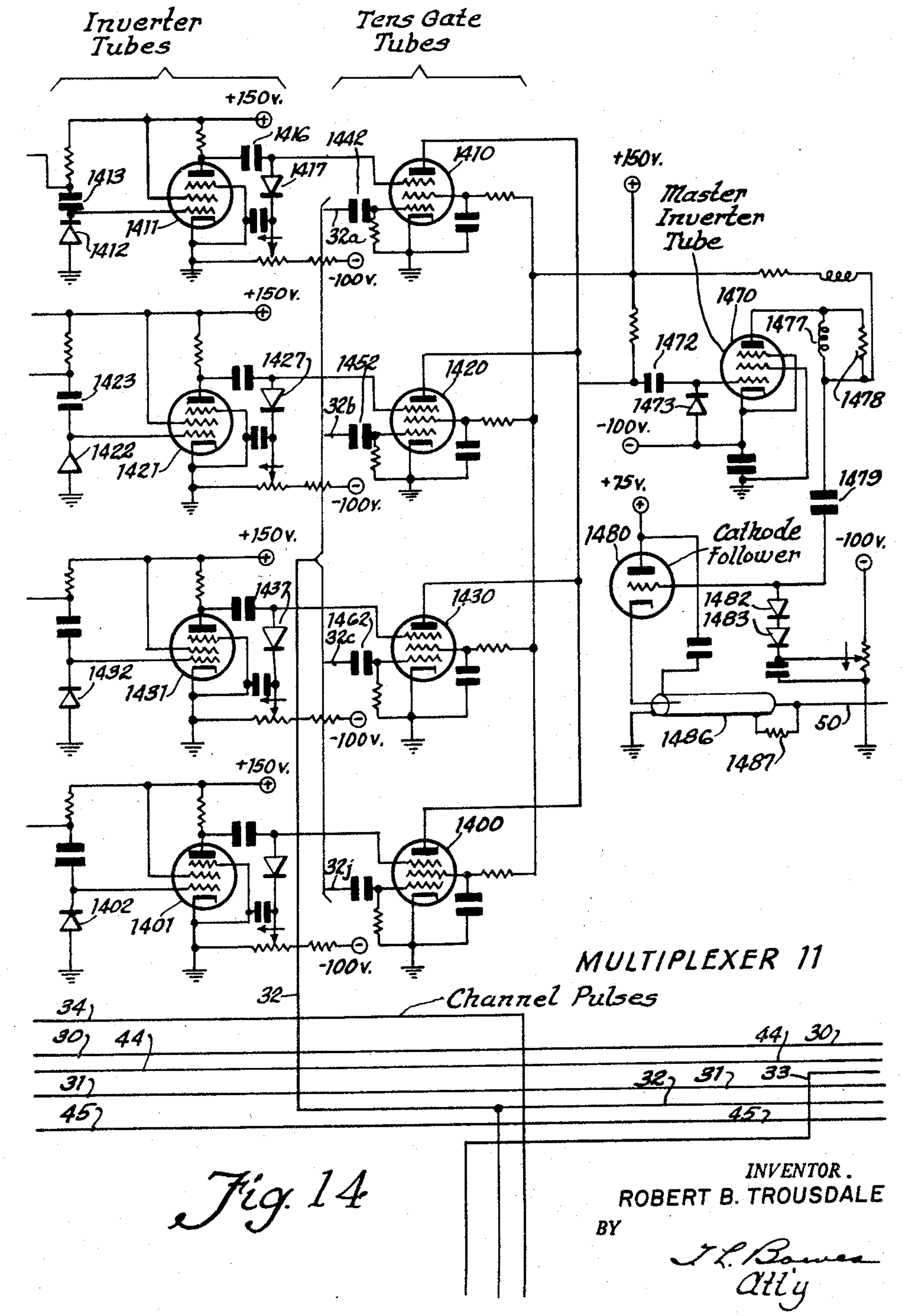

As pointed out in the general description of the system, this circuit, the details of which are illustrated in Figs. 13 and 14 of the drawings, is provided for the general purpose of sampling control and intelligence signals developed on calling and called lines of the system in the time positions of each pulse frame individually assigned to the lines from which the signals are respectively derived, and for transmitting multiplexer pulses modulated with the sampled control or intelligence signals over the multiplexer output conductor 50 to the finder connector links 12, 13 and 14. The circuit is capable of sampling signals appearing on each of the 100 lines of the system at a sampling repetition rate of 10 kilocycles. Generally considered, the multiplexer 11 comprises 100 units gate circuits which are individually associated with the lines of the system and each of which includes a units gate tube. Specifically, the units gate circuits individually associated with the lines assigned the directory number designations 11, 12, 13—10 respectively comprise the ten units gate tubes 1311, 1312, 1313—1310 of the upper horizontal tube row. Similarly, the units gate circuits respectively associated with the lines of the system having the directory number designations 21, 22, 23—20 individually include the units gate tubes 1321, 1322, 1323—1320 of the second horizontal tube row, and the units gate circuits which are individually associated with the lines having the directory number designations 31, 32, 33—30 individually comprise the units gate tube 1331, 1332, 1333—1330 forming the third horizontal tube row. Finally, the units gate circuits comprising the units gates tubes 1301, 1302, 1303—1300 forming the tenth horizontal tube row are individually associated with the lines having the directory number designations 01, 02, 03—00. Each of the ten horizontal strings of units gate tubes has a pulse inverter tube and a tens gate tube individually associated therewith. Thus four inverter tubes 1411, 1421, 1431 and 1401 having tens gate tubes 1410, 1420, 1430 and 1400 individually connected in tandem therewith are interconnected on an individual basis with the four illustrated strings of units gate tubes. In addition, the multiplexer 11 comprises a master inverter tube 1470 and a cathode follower tube 1480 connected in tandem in the order named. The cathode follower tube 1480 constitutes the output tube of the multiplexer and is provided with a cathode load circuit to which the multiplexer output conconductor 50 is connected. Each of the identified tens and units gate tubes is preferably a pentode of the 6AS6 commercial type. Pentodes of the 6AK6 type are preferably used as the inventer tubes 1411, 1421, 1431—1401. The master inventer tube 1470 is preferably a pentode of the 6AG7 type, whereas the cathode follower 1480 preferably comprises one half section of a 6AS7 twin triode. The various circuit elements employed to interconnect the identified tubes of the multiplexer 11 are specifically referred to below in describing the functions which they respectively perform in the multiplexer circuit.

Operation of the multiplexer 11 is under the joint control of the 100 line circuits of the system, the channel pulse commutator 22 and the tens pulse ring circuit 21. More specifically, channel pulses 82*a*, 82*b*, 82*c*, etc., of each pulse frame as shown in the pulse chart of Figs. 37 to 40, inclusive, are delivered to the control grids of the No. 1 units gate tubes of the ten horizontal strings in parallel over a path which includes the multiplexer channel pulse conductor 34*a* and the condenser 1351. Similarly, the multiplexer channel pulses 83*a*, 83*b*, 83*c*, etc., of each pulse frame are impressed upon the inner control grids of the No. 2 tubes of each units gate tube string over a path which includes the second multiplexer channel conductor 34*b* and the condenser 1352. In an entirely similar manner, the multiplexer channel pulses 84*a*, 84*b*, 84*c*, etc., of each pulse frame are impressed upon the inner control grids of the No. 3 tubes of the ten units gate tube strings in parallel over a path which includes the third channel pulse conductor 34*c* and the condenser 1353. The fourth to tenth units gate tubes of the ten units gate tube strings are similarly excited in parallel on a numerical basis over the seven other channel pulse conductors 34*d*, 34*e*–34*j*, the tenth conductor 34*j* being coupled to the parallel connected control grids of the No. 10 tubes of each of the ten units gate tube strings through a condenser 1350. As previously indicated, the suppressor grids of the units gate tubes are respectively connected to the line circuits terminating the lines individually associated with these tubes. Thus, the suppressor grid of the units gate tube 1323 is connected over the conductor 53 to the line circuit 10 in the manner explained above with reference to this line circuit. Similarly, the suppressor grid of the units gate tube 1332 individually associated with the line 32 is connected by way of the conductor 45 to the line circuit 16 which terminates the line 32.

From the above explanation it will be understood that channel pulses are successively impressed upon the inner control grids of the first to tenth tubes of each of the tens units gate tube strings ten times during each pulse frame, i.e., at a 100 kilocycle rate. However, each units gate tube is normally biased against channel pulse transmission therethrough by the negative bias voltage impressed upon the suppressor grid thereof from the respective associated line circuit. When the line circuit associated with one of the units gate tubes is taken into use, however, the suppressor grid bias potential of the tube is lowered precisely to the value at which class A operation of the tube is obtained. When the suppressor grid bias of the tube is thus lowered, channel pulses modulated in accordance with signal energy impressed upon the suppressor grid from the associated line circuit are developed at the anode of the tube and transmitted to the input electrodes of the associated one of the ten inverter tubes 1411, 1421, 1431—1401. Thus those signal modulated channel pulses which are developed at the anodes of the units gate tubes in the top horizontal string are impressed upon the control grid of the invertor tube 1411 through the coupling condenser 1413. The inverter tubes perform the function of amplifying the signal modulated multiplexer channel pulses impressed upon the control grids thereof and of repeating the same to the suppressor grids of the respective associated tens gate tubes. Thus amplifier signal modulated multiplexer channel pulses developed at the anode of the inverter tube 1411 are impressed upon the suppressor grid of the associated tens gate tube 1410 through the coupling condenser 1416. Positive tens pulses successively impressed upon the positive tens pulse conductors 32*a*, 32*b*–32*j* during each pulse frame are utilized successively to unbias the tens gate tubes 1410, 1420, 1430—1400 during successive tens pulse intervals of each pulse frame. Specifically, the first positive tens pulse **72*a*** of each pulse frame is impressed upon the inner control grid of the tens gate tube 1410 associated with the first group of ten lines over a path which includes the tens pulse conductor 32*a* and the coupling condenser 1442. Similarly, the second tens pulse 73*a* of the each pulse frame is impressed upon the inner control grid of the second tens gate tube 1420 individual to the second group of ten lines over a path which includes the positive tens pulse conductor 32*b* and the condenser 1452. The inner control grid of the third tens gate tube 1430, which individually corresponds to the third group of ten lines, is excited by the third tens pulse 74*a* of each pulse frame over a path which includes the positive tens pulse conductor 32*c* and the coupling condenser 1462. The inner control grids of the fourth to ninth tens gate tubes, not shown, are similarly excited over the positive tens pulse conductors 32*d*–31*i* during the respective fourth to tenth tens pulse periods of each pulse frame. Finally, the inner control grid of the tenth tens gate tube 1400, which individually corresponds ot the tenth group of ten lines, is excited by the tenth and last positive tens pulse of each pulse frame, as transmitted thereto over a path which includes the positive tens pulse conductor **32*j*. It will thus be understood that positive tens pulses are successively impressed upon the inner controls grids of the ten tens gate tubes 1410, 1420, 1430—1400 during successive tens pulse periods of each pulse frame. Each of these tubes is only operative to repeat signal modulated channel pulses therethrough during those intervals when positive tens pulses are present 1472. The pulses receive tremendous amplication through the inverter tube 1470 and are each inverted from a negative polarity to a positive polarity through the tube 1470. As positively reproduced at the anode of the tube 1470, the pulses are impressed upon the control grid of the cathode follower tube 1480 through a network which includes the parallel connected inductance and resistance elements 1477 and 1478 respectively and the coupling condenser 1479. The pulses are reproduced across the cathode load circuit of the tube 1480. This load circuit comprises a coaxial cable 1486, which actually extends to each of the finders and connectors of the system and terminates in a load resistance 1487. More specifically, the cathode of the tube 1480 is connected to the multiplexer output conductor 50, which forms the inner conductor of the cable 1486, whereas the outer sheath of this cable is connected to ground. The cable 1486** is terminated in its characteristic impedance having a value of approximately 72 ohms.

Referring now more particularly to the mode of operation of the multiplexer 11 to repeat signal samples derived from the line circuit 10 to the multiplexer output conductor 50 in the above-described call originating at the substation A and routed to the substation B, it will be understood that when the line 10 is taken into use, the limiting amplifier network of the line circuit 10 functions to reduce the bias potential impressed upon the suppressor grid of the units gate tube 1323 over the conductor 53 to a value at which class A amplifier operation of this tube is obtained. Immediately this bias potential level is established on the suppressor grid of the tube 1323, channel pulses impressed upon the channel pulse conductor 34*c* and by way of this conductor and the condenser 1353 upon the inner control grid of the tube 1323 are repeated through this tube and the condenser 1423 to the control grid of the inventer tube 1421. These pulses are, of course, modulated in amplitude in accordance with the intelligence or control signal impressed upon the suppressor grid of the tube 1323 in the manner explained above. They are repeated as negative pulses to the control grid of the inverter tube 1421, which functions to amplify and invert the same so that they are impressed upon the suppressor grid of the tens gate tube 1420 as positive pulses. These pulses recur ten times during each pulse frame. However, due to the commutating action of the tens gate tubes, the tube 1420 is only rendered effective to repeat one of the ten pulses derived from the tube 1323 during each pulse frame to the output side thereof. Thus, the tens gate tube 1420 only passes that signal bearing multiplexer channel pulse which occurs coincidentally with the application of a positive tens pulse to the inner control grid thereof during each pulse frame. Specifically, the signal modulated channel pulse 84*b* occurring in the time position 64*b* assigned to the line 23 is the only pulse passed by the tens gate tube 1420 during each pulse frame. This pulse is reproduced as a negative pulse at the anode of the tube 1420 and is impressed upon the control grid of the master inverter tube 1470 through the coupling condenser 1472. From this point, the pulse, still modulated with the signal sample derived from the line circuit 10, is repeated through the tubes 1470 and 1480 to the multiplexer output conductor 50 in the manner explained above.

As explained in the description pertaining to the line circuit 10, the audio signal input to the suppressor grid of the units gate tube 1323 is carefully limited in the line circuit by the rectifiers 1142 and 1143 to maintain the signal voltage swing within the three volts class A operating range of the tube. This prevents distortion of the sample signal in the operation of the tube 1323 to repeat the signal to the inverter tube 1421. During dialing at the calling substation A, the bias potential level on the suppressor grid of the tube 1323 rises to its normal channel pulse blocking value during the open circuit or break-period of each dial impulse, thereby to stop the transmission channel pulses over the conductor 50 in the time position 64*b*. However, during the closed circuit or make period of each dial impulse, channel pulse transmission over the conductor 50 in the time position 64*b* is resumed.

The manner in which the units gate tube 1332, the inverter tube 1431 and the tens gate tube 1430 are controlled to repeat signal samples derived from the line circuit 16 over the conductor 50 in the time position assigned to the called line 32 when the above-described call is answered at the called substation will be fully apparent from the preceding explanation. From this explanation, it will also be apparent that the multiplexer 11 is arranged to sample signals derived from the 100 line circuits of the system on a decimal basis. This is accomplished by the described method of double multiplexing, employing high speed sampling at the units gate tubes, followed by slow speed sampling at the ten gate tubes at one tenth the units gate sampling speed. This arrangement has the important advantage of eliminating the necessity for providing ring circuits in the common equipment having 100 stages, i.e., stages equal in number to the number of lines in the system. The arrangement is of even more importance when the described system of multiplexing is expanded to accommodate the requirements of exchanges having more than 100 lines. The arrangement also has the important advantage of eliminating the necessity for carrying 100 or more pulse bus conductors throughout the exchange. Thus the multiplexer 11 has only a single output conductor, namely the conductor 50.

One of the difficult problems solved in the development of the multiplexer 11 was that of preventing distortion of the signal modulated multiplexer pulses and of preventing cross talk between the pulses occurring in different time positions of each pulse frame. In this regard, it is noted that variations in the amplitude of the channel pulses 82, 83, 84, etc., delivered to the control grids of the units gate tubes has the effect of distorting the signal samples transmitted through the system. More important, if the amplitude of the channel pulses applied to the inner control grid of any units gate tube is allowed to vary at an audio frequency rate, secondary modulation of the pulses results. This is highly undesirable since any such secondary modulation components are audibly reproduced at the substation to which the signals are ultimately transmitted. In order to prevent variations in the amplitude of the channel pulses impressed upon the control grids of the units gate tubes from affecting the amplitude of the pulses gated by these tubes, amplitude clamping circuits are provided between each of the multiplexer channel pulse conductors 34, 34*b*, 34*c*–34*j* and the control grids of the respective associated units gate tubes. This clamping circuit as provided between the channel pulse conductor 34*a* and the No. 1 gate tube of each of the ten units gate tube strings comprises the condenser 1351 and a crystal rectifier 1341. Similar clamping circuits will be readily identified in association with each of the three other illustrated channel pulse conductors 34*b*, 34*c* and 34*j*. In considering the operation of the clamping circuit comprising elements 1351 and 1341, it is noted that as seen by the multiplexer, the pulses appearing on the conductor 34*a* start at a negative value and rise toward ground potential. The rectifier 1341 is so poled that so long as the pulse amplitude does not exceed ground potential this rectifier is non-conductive. However, if the pulse amplitude rises above ground potential, the rectifier 1341 becomes conductive, permitting the condenser 1351 to charge and develop a voltage thereacross which is thereafter subtracted from the channel pulse amplitude as seen by the units gate tubes 1311, 1321, 1331—1301. Thus the voltage developed across the condenser 1351 effectively reduces the amplitude of the channel pulses applied to the control grids of the No. 1 units gate tubes 1311, 1321, 1331—1301 of the ten tube strings. The condenser 1351 holds its charge indefinitely so long as the pulse amplitude remains excessive and tends to vary up and down as the channel pulse amplitudes vary in reverse manner. In other words, the voltage developed through charging of the condenser 1351 varies inversely in accordance with variations in the pulse amplitude above ground potential, thereby to maintain substantially constant the amplitude of the pulses applied to the control grids of the No. 1 gate tubes in the ten units gate tube strings.

One exceedingly important feature of the multiplexer 11 which is incorporated therein to minimize cross talk of the channel pulses gated by the multiplexer in the different time positions assigned to the different lines is that of employing the inner control grid of each of the tens and units gating tubes as the pulse gating grid and of using the suppressor grid of each tens and units gating tube as the signal excited control grid of the tube. To illustrate the importance of this feature it is pointed out that if instead of this arrangement the suppressor of the tube 1323, for example, were used as the pulse gating grid, i.e., were excited by the channel pulses, it would only cut off electron flow from the anode of the tube to the tube cathode and would not cut off electron flow from the screen electrode of the tube to the cathode during each off pulse period. In such case, the inner control grid of the tube 1323 would of necessity be used as the signal excited grid of the tube. This grid would still be free to vary the electron flow between the screen grid and the cathode, with the result that signal controlled variations in screen current flow through the tube would be produced which would manifest themselves as variations in the potentials applied to the screen electrodes of the other tens and units gating tubes of the multiplexer. Thus the signal voltage introduced into the tube 1323 could be transferred to the output circuits of the other gating tubes by means of screen control of the electron streams in the other gating tubes. However, by using the inner control grid of each gate tube as the pulse gating grid, electron flow to both the screen and anode electrodes of the tube is positively cut off during each off pulse period. Thus, cross talk between the signal bearing channel pulses as a consequence of screen electrode control of the electron streams in the gating tubes is positively prevented.

Another important feature of the multiplexer 11, also provided for the purpose of minimizing cross talk between the signal modulated channel pulses gated by the circuit in different time positions is that of operating the screen electrodes of the tens and units gating tubes at relatively low potentials which will not cause these electrodes to heat up and act as electron emitters to the tube anodes. This is accomplished by providing voltage dropping resistors between the 150 volts anode current source and the screen electrode of each of the gating tubes. Thus the voltage dropping resistor **1323*b* is provided in the screen electrode circuit of the tube 1323 to drop the voltage of the anode current source to a value of approximately 120 volts, which is the rated screen operating voltage of tubes of the 6AS6 type. Further to minimize signal frequency variations in the potentials on the screen electrodes of the gating tubes, each such electrode is by-passed to ground at signal frequencies through a suitable by-pass condenser. Thus, a by-pass condenser 1323*a* is connected between the screen electrode of the tube 1323** and ground to minimize signal frequency variations in the screen electrode potentials.

Another important feature of the multiplexer 11 is that of providing a voltage clamping crystal rectifier in shunt with the control grid and cathode of each of the inverter tubes 1411, 1421, 1431—1401 to eliminate what may be referred to as forward cross talk between the signal modulated channel pulses handled by these tubes. These clamping rectifiers are indicated at 1412, 1422, 1432 and 1402 in individual association with the four illustrated inverter tubes 1411, 1421, 1431 and 1401. To illustrate the manner in which such cross talk may occur, it is noted that if the condenser 1423, for example, is charged by a pulse delivered thereto from the tube 1323, for example, and is not discharged prior to the reception of a succeeding pulse from the tube 1320 or the tube 1321, for example, then the succeeding pulse is altered in amplitude by an amount equal to the voltage across the charged coupling condenser 1423. This obviously results in amplitude distortion of the succeeding pulse, is referred to as forward cross talk, and would occur if a coupling resistor were used in lieu of the rectifier 1422. This type of cross talk or signal pulse distortion is substantially obviated by employing the clamping rectifier 1422, for example, instead of a conventional coupling resistor. Thus during gating of a particular channel pulse from the tube 1323 to the tube 1421, the condenser 1423 is only slightly charged during the rising portion of the pulse through the high back resistance of approximately one megohm of the rectifier 1422. Moreover, the charging action occurs at a very slow rate determined by the time constant of the series connected elements 1422 and 1423. During the following part of the pulse, the charge on the condenser 1423 is immediately reversed so that after the pulse ends only a small residual charge remains on the condenser. The polarity of this charge is such that the condenser can immediately discharge through the low forward resistance of the rectifier 1422. The forward resistance of the rectifier 1422 is of the order of 90 ohms. Thus the condenser discharge path has a very short time constant, such that the charge on the condenser 1423 is effectively dissipated before the next signal pulse can arrive from another units gate tube, such as the tube 1320. The described amplitude clamping arrangement is also used ahead of each of the tens gate tubes 1410, 1020, 1430—1400, the master inverter tube 1470 and the cathode follower tube 1480. Thus, clamping crystal rectifiers 1417, 1427 and 1437 are respectively used in the coupling circuits between the anodes of the tubes 1411, 1421 and 1431 and the suppressor grids of the tubes 1410, 1420 and 1430. Similarly, a clamping crystal rectifier 1473 is provided in shunt with the control grid and cathode of the master inverter tube 1470. At the input side of the cathode follower tube 1480, two series connected clamping crystal rectifiers 1482 and 1483 are required. Provision of the described amplitude clamping facilities at the input sides of the master inverter tube 1470 and the cathode follower tube 1480 is of the utmost importance since these tubes may be called upon to handle signal modulated multiplexer channel pulses occurring at a 100 kilocycle rate.

Another special feature of the multiplexer 11 is that of providing the parallel network comprising the inductance element 1477 and resistor 1478 in the coupling circuit between the master inverter tube 1470 and the cathode follower tube 1480. This network performs the function of neutralizing stray capacitances in the circuit as well as the high input capacitance of the cathode follower tube 1480. Such capacitance neutralization has the effect of preventing excessive attenuation of the signal pulses. In other words, this network acts to raise the response characteristic of the inverter tube 1470 at the high frequency end of the signal transmission band which the tube is required to handle.

*Finder 12a*

Figure 2:
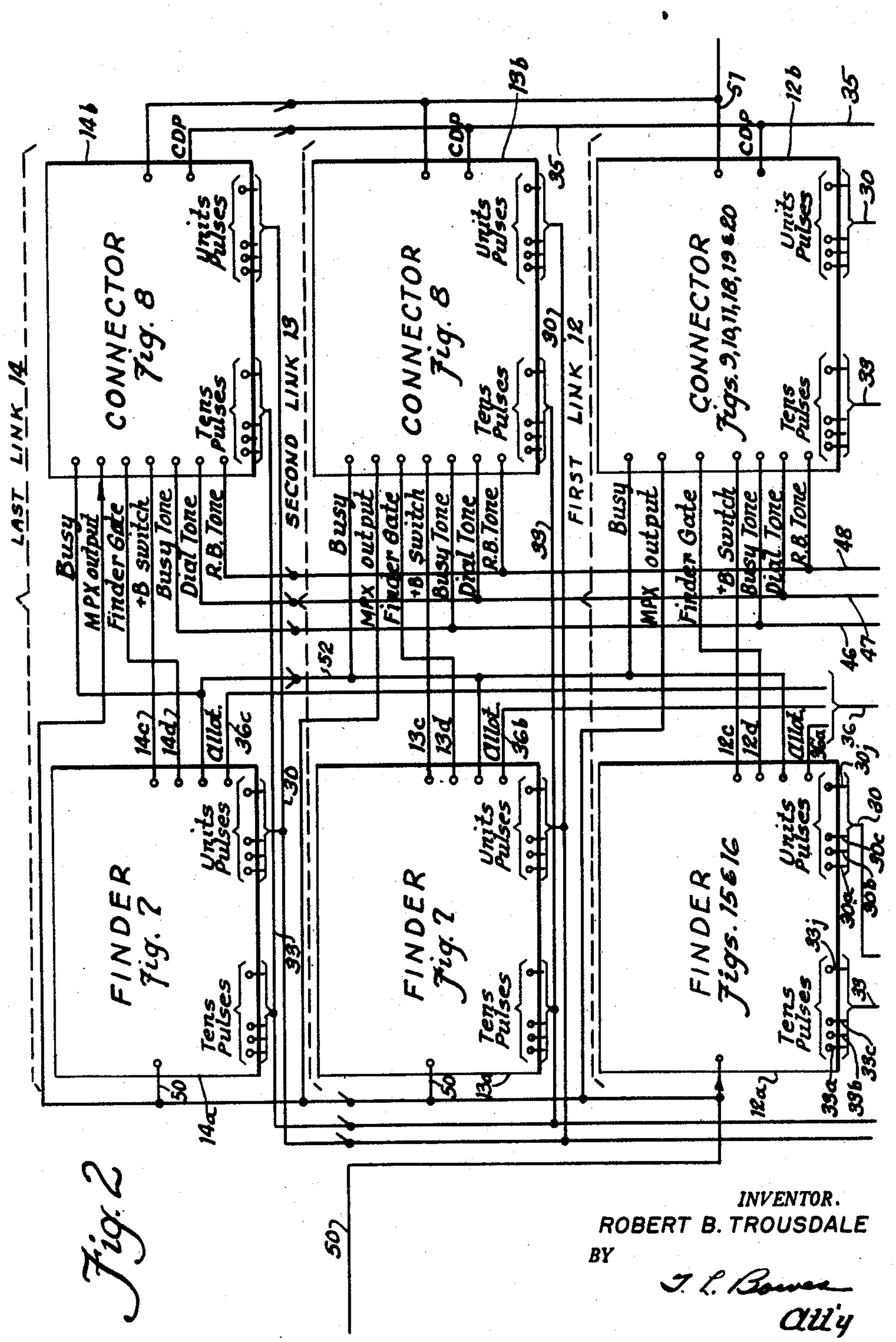
Figure 2A:
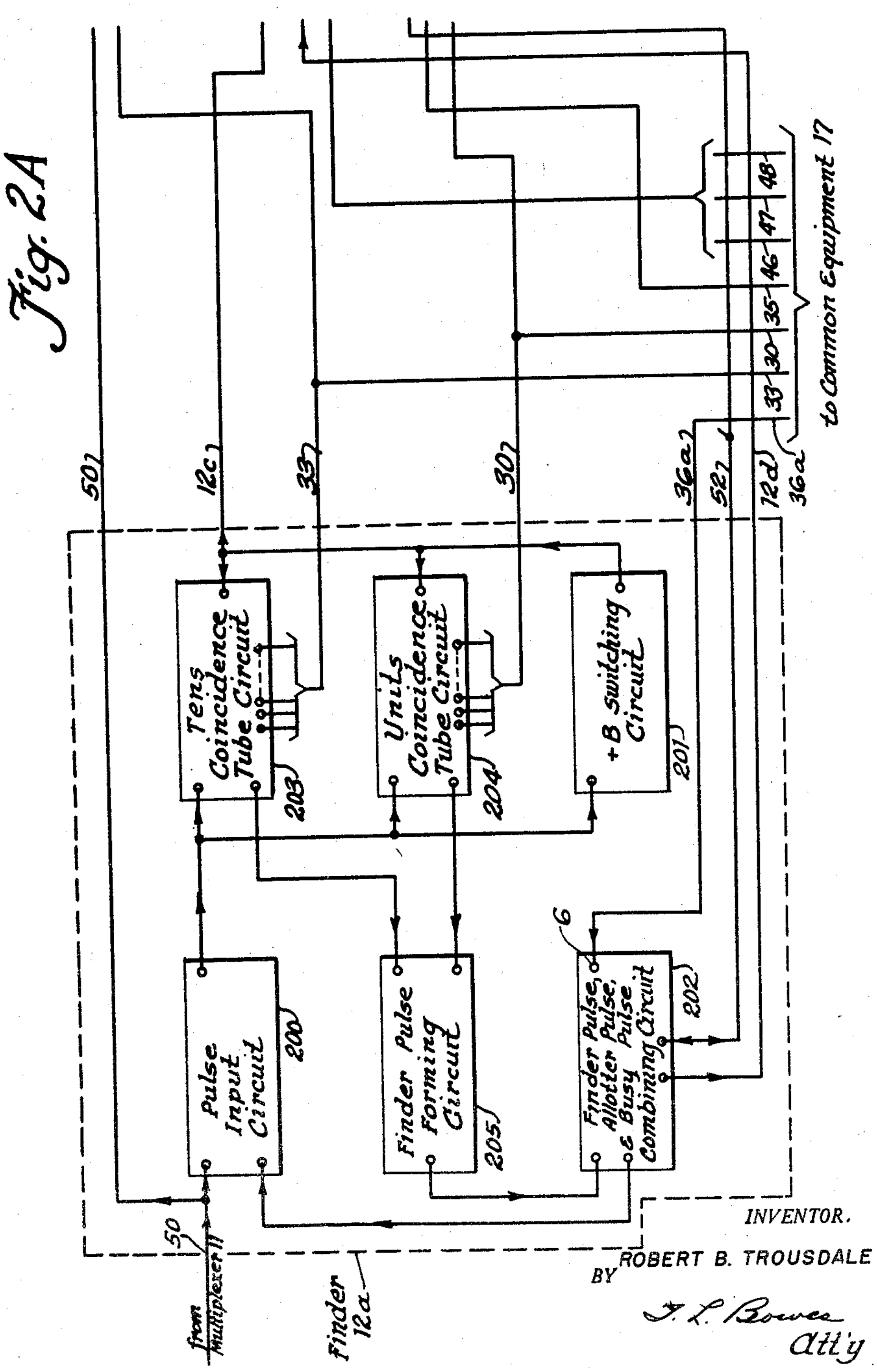
Figure 15:
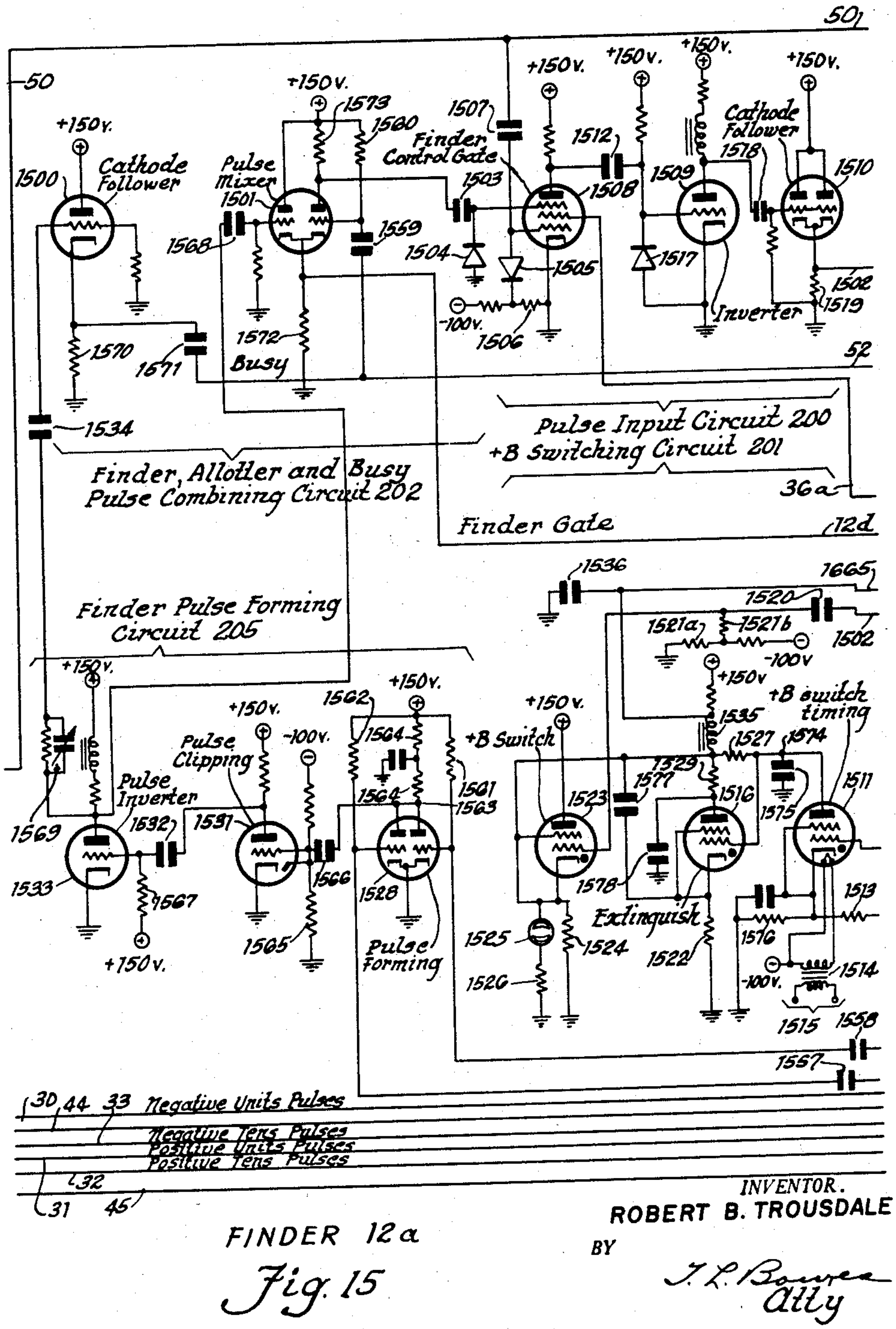
Figure 16:
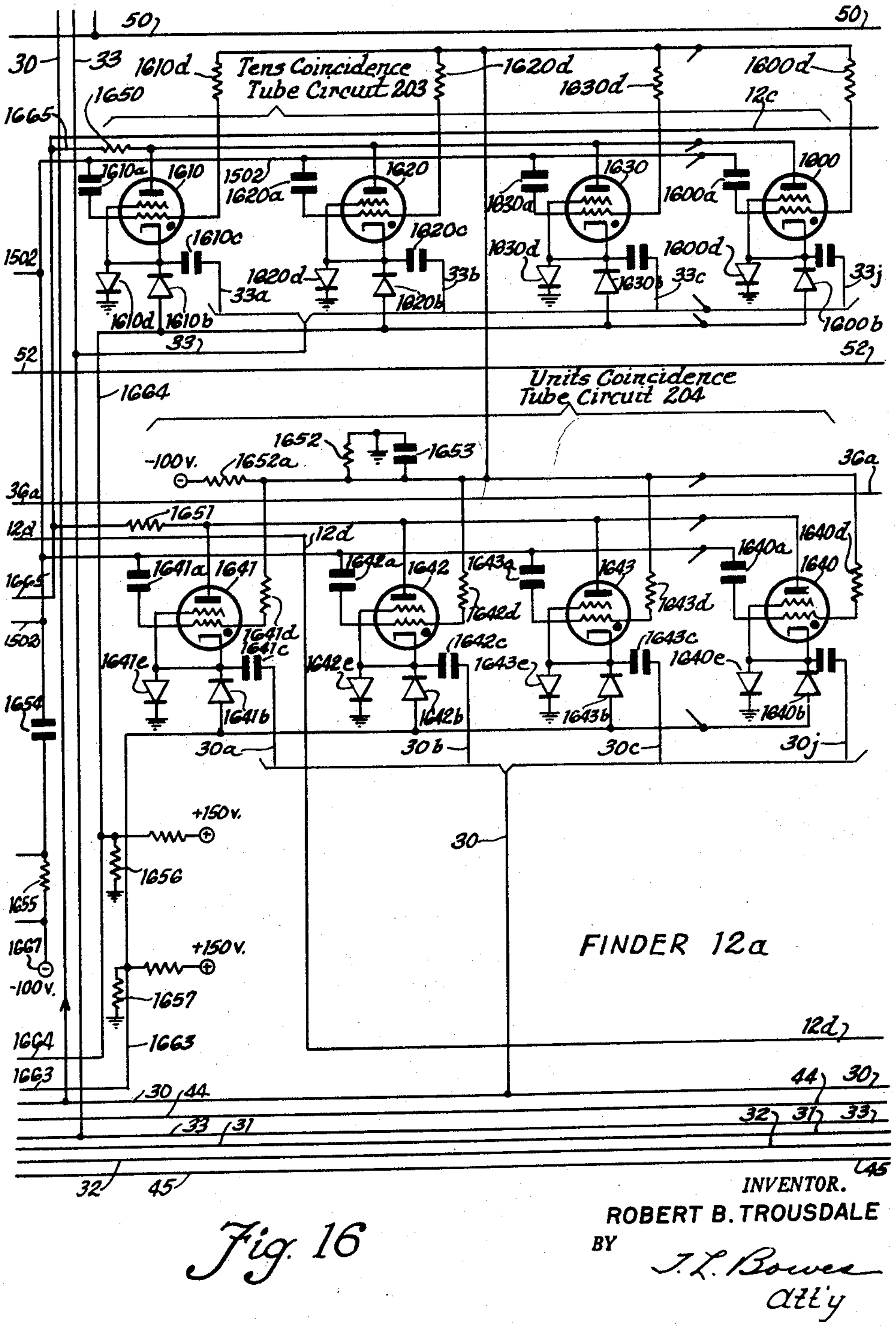
Figure 17:
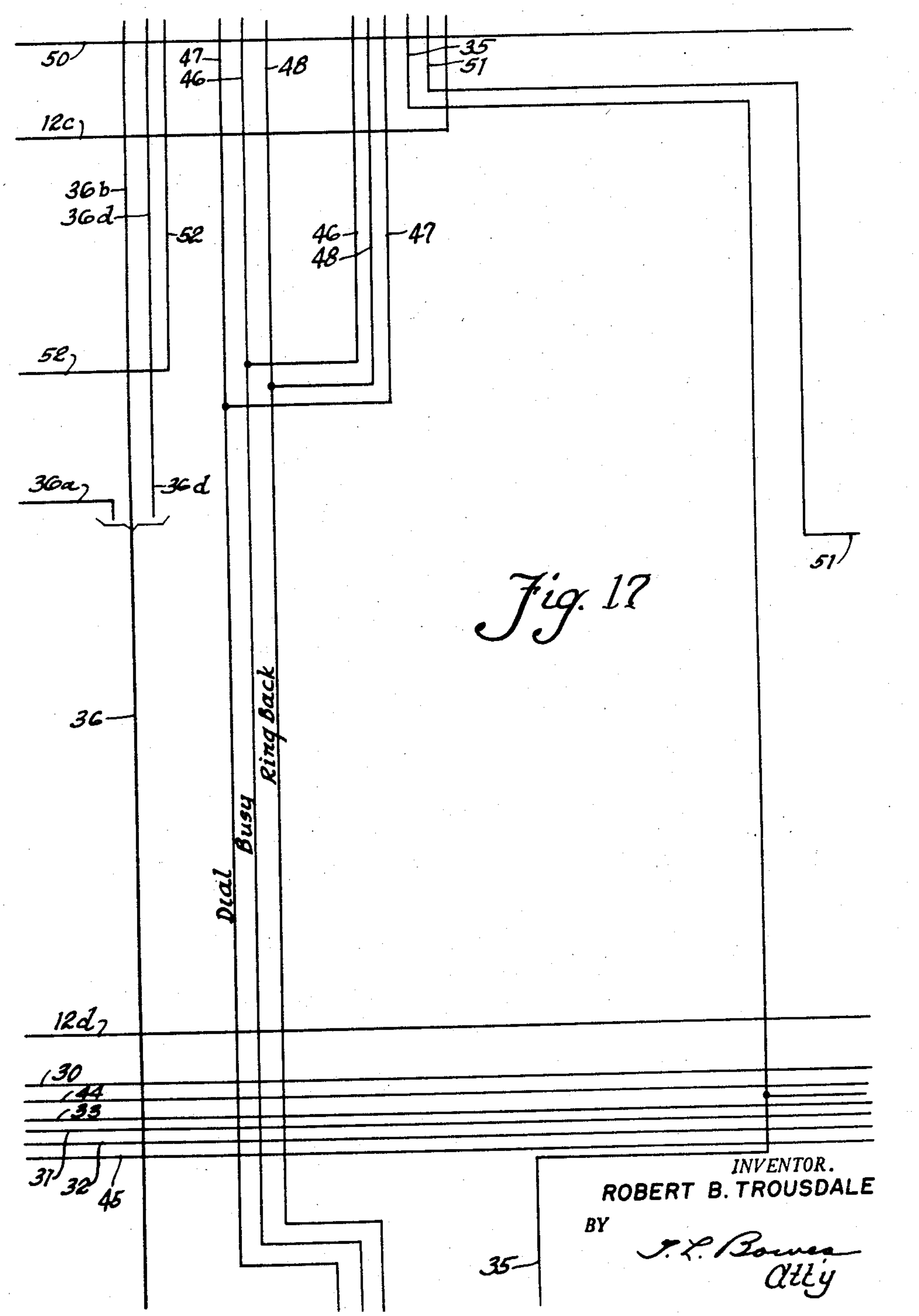

As previously explained in connection with Fig. 2A of the drawings, this finder generally comprises a pulse input circuit 200, a +B switching circuit 201, a pulse combining circuit 202, a tens coincidence tube circuit 203, a units coincidence tube circuit 204 and a finder pulse forming circuit 205. The functions performed by this circuit and the identified components thereof are also generally explained above with reference to the same figure of the drawings. Referring now more particularly to Figs. 15 and 16 of the drawings, wherein the detailed circuitry of the finder **12*a* is illustrated, it will be seen that the pulse input circuit 200 comprises a finder control gate tube 1508, an inverter tube 1509 and a cathode follower tube 1510 connected in tandem in the order named and arranged to impress pulses gated therethrough upon a common conductor 1502. These pulses are distributed over the conductor 1502 to the input terminals of the tens coincidence tube circuit 203, the units coincidence tube circuit 204 and the +B switching circuit 201 in parallel. The +B switching circuit 201 comprises a +B switch tube 1523, a +B switch timing tube 1511 and a +B switch extinguishing tube 1516 interconnected in the manner illustrated. This circuit is controlled solely by pulses gated thereto from the pulse input circuit 200. The tens coincidence tube circuit 203 comprises ten gate control tubes, the first, second, third and tenth of which are indicated at 1610, 1620, 1630 and 1600 in horizontal alignment in Fig. 16 of the drawings. These gate control tubes have individually associated therewith tens pulse gating crystal rectifiers 1610*b*, 1620*b*, 1630*b*—1600*b* and are arranged to be jointly controlled by pulses delivered thereto from the pulse input circuit 200 over the conductor 1502 and negative tens pulses successively transmitted thereto over the negative tens pulse conductors 33*a*, 33*b*, 33*c*—33*j* from the tens pulse ring circuit 21. Pulses gated by the tens coincidence tube circuit 203 are impressed upon the finder pulse forming circuit over a path which includes the conductor 1664 and a coupling condenser 1558. Similarly, the units coincidence tube circuit comprises ten gate control tubes of which the first, second, third and tenth tubes 1641, 1642, 1643 and 1640 are illustrated in horizontal alignment in the lower half of Fig. 16. These tubes have pulse gating crystal rectifiers 1641*b*, 1642*b*, 1643*b* and 1640*b* individually interconnected therewith. They are arranged to be jointly controlled by pulses delivered thereto over the conductor 1502 from the pulse input circuit 200, and negative units pulses successively transmitted thereto over the units pulse conductors 30*a*, 30*b*, 30*c*–30*j* from the units pulse ring circuit 20. Pulses gated by the units coincidence tube circuit 204 are transmitted to the finder pulse forming circuit 205 over a path which includes the conductor 1663 and a coupling condenser 1557. The finder pulse forming circuit 205 comprises a pulse forming tube 1528, a pulse clipping tube 1531 and a pulse inverter tube 1533 connected in tandem in the order named. As shown, the pulse forming circuit 205 is controlled solely by pulses gated thereto from the two coincidence tube circuits 203 and 204. Pulses developed at the output side of this circuit are impressed upon the pulse combining circuit 202 over two paths which respectively comprise the coupling condensers 1534 and 1568. The pulse combining circuit 202 comprises a cathode follower tube 1500 and a pulse mixer tube 1501, both of which are arranged to be controlled by the finder pulse forming circuit 205. The tube 1501 is also arranged to respond to busy pulses transmitted thereto over the busy pulse conductor 52 from the other finders and connectors of the system. This circuit functions to gate busy and finder gate pulses to the conductors 52 and 12***d* respectively when the finder 12*a* is operatively associated with a calling line. Circuit elements not specifically mentioned in the above description of the finder 12*a* are referred to below in describing the functions which they respectively perform in the finder circuit. All gas filled tubes embodied in the finder 12*a*, namely the ten tubes of the tens coincidence tube circuit 203, the ten tubes of the units coincidence tube circuit 204 and the three tubes of the +B switching circuit 201 are highly sensitive thyratrons, preferably of the RCA commercial type 5696. The three twin triode tubes 1501, 1510 and 1528 embodied in the finder are preferably of the commercial 6J6 type. The triodes 1500, 1509 and 1533 are preferably of the commercial 6C4 type, while the pentode 1508 employed as the finder control gate tube is preferably of the 6AS6 type. Finally, the tube 1531 employed as the pulse clipping tube in the pulse forming circuit 205 is preferably of the commercial 6AQ6 type.

In considering the operational details of the finder 12*a*, it is first pointed out that when the finder is idle, all tubes embodied in the circuits 203, 204 and 201 are deionized. With these circuits thus rendered inactive, the pulse forming circuit 205 and pulse combining circuit 202 are likewise maintained in an inactive condition. Moreover, with the +B switching circuit 201 inactive, the connector 12*b* is likewise inactive. So long as a positive allotter pulse is not impressed upon the screen grid of the control gate tube 1508 over the allotter conductor 36*a* from the link allotter 24, space current cannot flow through the tube 1508 even when multiplexer pulses are present. In addition, the presence of a busy pulse on the busy pulse conductor 50 in the time position corresponding to that of the calling line multiplexer pulse will be so applied to the suppressor grid of the gate tube 1508 that current flow through this tube is cut off even though a positive allotter pulse may be present on the screen grid of the tube and a positive multiplexer pulse may be coincidentally applied to the control grid of the tube through the condenser 1507 from the multiplexer output conductor 50. It will thus be apparent that the tube 1508 is rendered operative to gate positive multiplexer pulses appearing on the conductor 50 only when an allotter pulse is present on the allotter conductor 36*a* and only when busy pulses are not present on the busy pulse conductor 50 in the time positions respectively corresponding to the multiplexer pulses.

Operational details of the finder 12*a* may best be explained with reference to the functions performed by this finder in handling the above described call originating at the substation A and routed to the substation B. In this regard, it will be recalled from the above description of the multiplexer 11 that when the call is initiated on the line 23 serving the substation A, multiplexer pulses appearing in the time position 64*b* assigned to the calling line 23 and modulated with signals derived from this line are transmitted from the multiplexer 11 over the multiplexer output conductor 50 to each of the finders and connectors of the system. It will also be understood that if such multiplexer pulse transmission over the conductor 50 starts during an interval when an allotter pulse is not impressed upon the conductor 36*a* in the allotter 24, the link 12 cannot handle the call and hence will not be operatively associated with the calling line. Assume, however, that the transmission of multiplexer pulses over the conductor 50 in the time position 64*b* starts during an interval when a positive allotter pulse is present on the conductor 36*a*. This allotter pulse is employed to raise the potential of the screen electrode in the control gate tube 1508 to its normal operating level to permit space current flow through the tube providing the potentials on the other electrodes of the tube have the proper values.

With operating screen potential thus supplied to the tube 1508, the pulses occurring on the conductor 50 in the time position 64*b* assigned to the calling line 23 are gated by the tube 1508 through the coupling condenser 1512 to the control grid of the inverter tube 1509. More specifically, the positive multiplexer pulses are impressed upon the control grid of the tube 1508 through the coupling condenser 1507 and each thereof opposes the negative bias normally applied to this control grid through the resistor 1506 and the crystal rectifier 1505. These pulses are prevented from driving the control grid of the tube 1508 substantially above ground potential through proper choice of the negative bias potential across the resistor 1506. The pulses impressed upon the control grid of the tube 1508 are amplified and inverted through this tube to appear as negative pulses at the anode thereof. As indicated, they are impressed upon the control grid of the inverter tube 1509 through the coupling condenser 1512. The base line or reference voltage level of the negative pulses thus delivered to the tube 1509 is clamped to the ground potential level through the action of the clamping crystal rectifier 1517. After being amplified and inverted by the tube 1509 the pulses are impressed upon the parallel connected control grids of the tube 1510 through the coupling condenser 1518. They are greatly amplified through the tube 1510 and are reproduced in amplified form across the cathode load resistor 1519 of this tube. From the cathode terminal of the load resistor 1519, the pulses are delivered to the circuits 201, 203 and 204 over the conductor 1502 in the manner previously explained.

The first positive pulse thus produced on the conductor 1502 is impressed upon the control grid of the thyratron tube 1523 through the coupling condenser 1520 and has the effect of overcoming the negative bias normally impressed upon this grid through the resistors 1521*a* and 1521*b*, whereby the grid of the tube 1523 is driven positive relative to the cathode thereof. As a consequence, the tube 1523 fires to produce space current flow therethrough in a circuit which includes the cathode load resistor 1524. After the tube 1523 fires, the grid thereof loses control so that thereafter the presence or absence of pulses on the conductor 1502 cannot directly affect the ionized condition of the tube. With the tube 1523 conducting, the voltage of the 150 volt anode current source, less the voltage drop through the tube 1523, appears across the cathode load resistor 1524 of the tube 1523. This voltage has a magnitude of the order of 140 volts and is impressed upon the neon indicator tube 1525 through the resistor 1526 to fire the indicator tube and thus provide a visual indication that the finder 12*a* is in use. The voltage of positive polarity thus developed at the cathode of the +B switching tube 1523 is also applied to the anodes of the tubes 1511 and 1516 through the resistors 1527 and 1529 respectively. It is also impressed upon the +B switching conductor 12*c* over a path which includes the conductor 1665 and a filter network consisting of a series choke impedance 1535 and a shunt condenser 1536. From the conductor 1665 the voltage is applied to the anodes of the twenty tubes included in the coincidence tube circuits 203 and 204 through the resistors 1650 and 1651.

Normally the tubes of the tens coincidence tube circuit 203 are biased to prevent space current flow therethrough by the negative potentials impressed upon the control grids thereof from the bleeder resistors 1652 and 1652*a* through the isolating resistors 1610*d*, 1620*d*, 1630*d*—

1600*d* individual thereto. Similarly, the tubes of the units coincidence tube circuit 204 are normally biased against space current flow therethrough by the negative potentials impressed upon the respective control grids thereof through the isolating resistors 1641*d*, 1642*d*, 1643*d*—1640*d*, respectively. When operating anode potentials are supplied to the anodes of the gate control tubes of the circuits 203 and 204 in the manner just explained, these tubes are conditioned to fire under the joint control of the negative tens and units pulses respectively delivered to these circuits and the pulses gated to the circuits over the conductor 1502 from the pulse input circuit 201. In this regard, it should be noted that the described response of the pulse input circuit 200 and the +B switching circuit 201 to the pulses delivered to the finder 12*a* over the conductor 50 in the time position 64*b* occurs during the first pulse frame or during the first few pulse frames which follow application of the first pulse in the time position 64*b* to the control grid of the tube 1508. During the next few pulse frames, the pulses delivered in the time position 64*b* over the conductor 1502 to the control grids of the tubes in the circuits 203 and 204 coact with the tens and units gate pulses which are negatively applied to the cathodes of these tubes to fire that tens coincidence tube which corresponds to the tens time position of the calling line in each pulse frame and that units coincidence tube which corresponds to the units time position of the calling line 23 in each pulse frame. In this regard, it will be noted that the positive pulses gated by the circuit 200 in the time position 64*b* assigned to the calling line 23 are impressed upon the control grids of the tubes 1610, 1620, 1630—1600 of the circuit 203 through the coupling condensers 1610*a*, 1620*a*, 1630*a*—1600*a*, respectively. The same pulses are impressed upon the control grids of the tubes 1641, 1642, 1643—1640 of the units coincidence tube circuit 204 through the coupling condensers 1641*a*, 1642*a*, 1643*a*—1640*a*, respectively. However, these pulses are capable of firing the tubes of the two circuits 203 and 204 only when they occur coincidentally with the application of negative tens or units pulses to the cathodes of the tens and units coincidence tubes. In this regard, it will be understood from the preceding explanation that the pulses developed on the conductor 1502 in the time position 64*b* occur in coincidence only with the second tens pulse of each pulse frame and the third units pulse of each pulse frame. Accordingly, only the tens coincidence tube 1620 is fired in the circuit 203 and only the third units coincidence tube 1643 is fired in the circuit 204. The other tubes of the tens coincidence tube circuit 203 cannot fire due to lack of coincidence between the tens pulses negatively impressed upon the control grids thereof and the pulses gated to the conductor 1502 by the circuit 200 in the time position 64*b* assigned to the calling line. Similarly, the other nine tubes of the units coincidence tube circuit 204 cannot fire due to lack of coincidence between the units pulses respectively impressed upon the cathodes thereof and the pulses produced on the conductor 1502 in the time position 64*b*. Once the tubes 1620 and 1643 are fired, the control grids thereof lose control, such that space current flow therethrough continues without interruption so long as the +B switching circuit 201 maintains operating potentials upon the anodes thereof. Moreover, once the tube 1620 has fired, the other tens coincidence tubes of the circuit 203 are positively prevented from firing even though pulses may inadvertently be coincidentally impressed upon the cathode and control grids of one or more thereof. Thus when space current flow through the tube 1620 is established, the 140 volts present on the conductor 1665 is largely dissipated as a voltage drop across the common anode resistor 1650 with the result that the anode potentials of the other nine tens coincidence tubes are all lowered to values at which firing of these tubes cannot occur. Similarly, the voltage drop developed across the resistor 1651 when the tube 1643 fires positively prevents any of the other nine units coincidence tubes in the circuit 204 from firing. Provision of the voltage dropping resistors 1650 and 1651 to perform the functions just described positively prevents the finder 12*a* from being operatively associated with two or more lines at the same time. In this regard, it may occur that calls are simultaneously initiated on two lines during the existence of an allotter pulse on the conductor 36*a* at a time when link 12 is not in use, with the result that multiplexer pulses occurring in the time positions respectively assigned to the two calling lines may be gated by the pulse input circuit 200 to the tens and units coincidence tube circuits 203 and 204. In such case, the resistors 1650 and 1651 positively prevent more than one tube from firing in each of the two circuits and thus prevent the finder 12*a* from being associated with more than one calling line.

When the tens coincidence tube 1620 and the units coincidence tube 1643 are rendered conductive in the manner explained above, the pulse gating rectifiers 1620*b* and 1643*b* respectively controlled thereby are unbiased to permit pulse transmission therethrough over the conductors 1664 and 1663, respectively, to the pulse forming circuit 205. To explain more fully the manner in which the crystal rectifier 1620*b* is rendered operative to gate the negative tens pulses appearing on the conductor 33*b*, it is noted that when the tube 1620 is non-conductive, the cathode terminal of the rectifier 1620*b* is biased positive relative to ground by an amount equal to the voltage drop across the resistor 1656. This voltage is of the order of ten volts and is impressed directly across the two crystals 1620*b* and 1620*d* to bias the crystals against current conduction therethrough. Each of the negative pulses impressed upon the cathode of the tube 1620 through the condenser 1620*c* from the tens pulse conductor 33*b* serves to overcome this bias and drive the cathode of the tube 1620 towards ground potential. In this regard, it is noted that the crystal rectifier 1620*d* tightly clamps the tops of the negative pulses at the ground potential level, i.e., prevents the cathode of the tube 1620 from being driven negative with respect to ground. Specifically, if the positive voltage impressed across the rectifier 1620*d* from the resistor 1656 through the back resistance of the rectifier 1620*b* is exceeded by the negative pulse impressed upon the cathode through the condenser 1620*c* from the conductor 33*b*, the polarity of the voltage across the rectifier 1620*d* is reversed to render this rectifier conductive with the result that the condenser 1620*c* is charged. During succeeding pulses appearing on the conductor 33*b* the voltage across the condenser 1620*c* resulting from this charge is subtracted from the pulse voltage in producing a change in the potential level of the cathode of the tube 1620. Charging of the condenser 1620*c* continues so long as the amplitude of the pulse appearing on the conductor 33*b* is excessive and the extent of charge and hence the magnitude of the voltage across the condenser 1620*c* varies directly with the extent to which the pulse amplitude exceeds the normal bias voltage across the clamping rectifier 1620*d*. Thus the rectifier 1620*d* positively clamps the cathode of the tube 1620 at the ground potential level as negative tens pulses are applied to this cathode. The crystal rectifiers 1610*d*, 1630*d*—1600*d* perform the same potential clamping functions at the cathodes of the tubes 1610, 1630—1600, respectively. Thus variations in the cathode potential levels of the tens coincidence tubes in the circuit 203 due to amplitude variations in the tens pulses impressed upon the respective pulse conductors 33*a*, 33*b*, 33*c*–33*j* are positively prevented. In identical manner, the clamping crystal rectifiers 1641*e*, 1642*e*, 1643*e*—1640*e* prevent amplitude variations in the units pulses respectively delivered to the cathodes of the tubes 1641, 1642, 1643—1640 from driving the potentials of the tube cathodes negative relative to the ground potential level. In this regard, it will be noted that the gating and clamping rectifiers, such, for example, as the rectifiers **1641*b* and 1641*e* associated with the coincidence tube 1641, included in the units coincidence tube circuit 204, are normally biased against current conduction therethrough by the voltage drop across the resistor 1657**.

After the tube 1620 is fired in the manner explained above, the upper anode terminal of the rectifier **1620*b* is driven positive relative to the lower cathode terminal thereof to render this rectifier effective to gate the negative pulses appearing on the conductor 33*b*. These pulses are transmitted over the conductor 1664 and through the condenser 1558 to the right control grid of the tube 1528. When the cathode potential of the tube 1620 is elevated to a higher positive level as a result of the tube firing, the bias voltage across the clamping rectifier 1620*d* is obviously increased to the same level, thereby to decrease the likelihood of the negative tens pulses impressed on the conductor 33*b* overcoming this bias potential. In an entirely similar manner, the polarity of the voltage across the gating crystal rectifier 1643*b* is reversed and the crystal rectifier 1643*e* is rendered inactive as a clamping rectifier when the units coincidence tube 1643 is fired in the circuit 204 in the manner explained above. Negative units pulses developed on the pulse conductor 30*c* in the ring circuit 20 are gated by the rectifier 1643*b* and transmitted to the left grid of the pulse forming tube 1528 over a path which includes the conductor 1663 and the coupling condenser 1557**.

Figure 44:
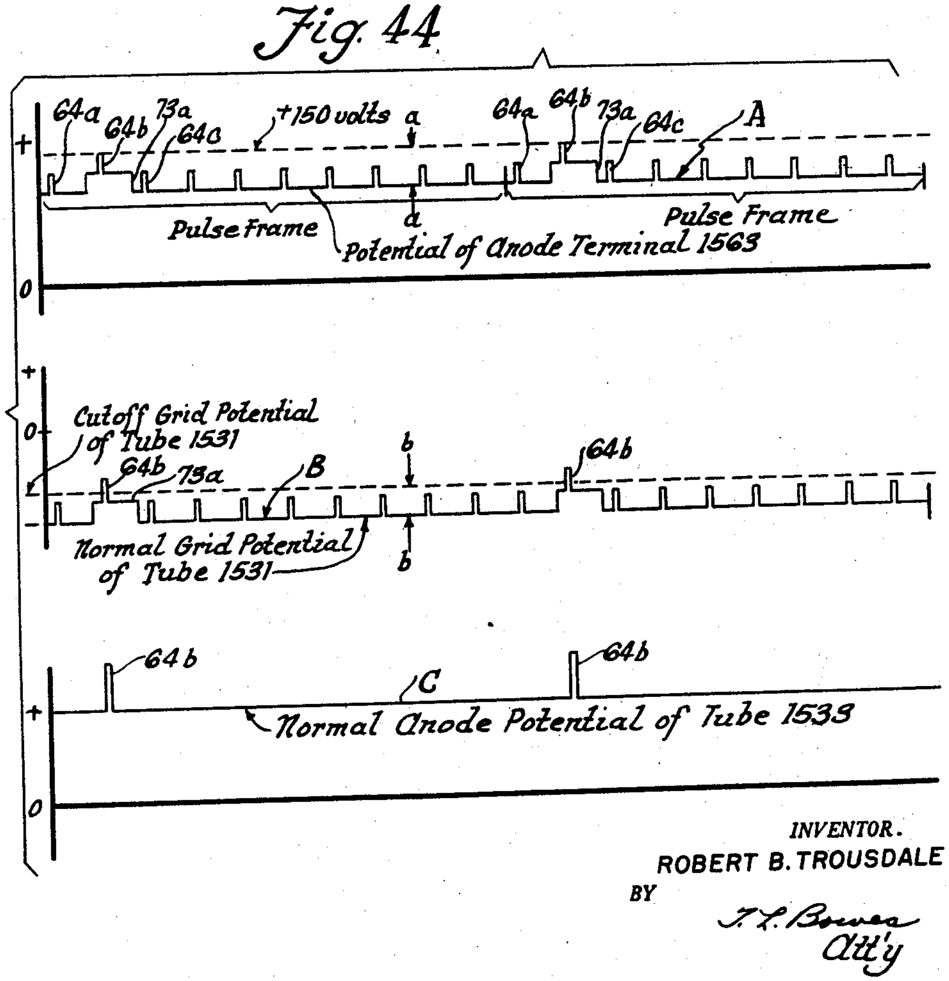

Referring now more particularly to the manner in which the finder pulse forming circuit 205 responds to the tens and units pulses gated thereto from the circuits 203 and 204, it is pointed out that normally both sections of the tube 1528 are heavily conductive by virtue of the positive potentials impressed upon the control grids thereof through the grid current limiting resistors 1561 and 1562 from the positive terminal of the anode current source. The tens pulses gated by the crystal rectifier **1620*b* are of negative polarity and each pulse is of sufficient amplitude to cut off space current flow through the right section of the tube 1528. Similarly, the units pulse gated by the crystal rectifier 1643*b* are of negative polarity and each pulse is of sufficient amplitude to cut off space current flow through the left section of the tube 1528. The resulting variations in the potential of the tube anode terminal 1563** are illustrated in Fig. 44 of the drawings by the curve A. As there shown, the normal positive potential of this anode terminal is less than the 150 volt value of the anode current source by an amount *a*—*a* equal to the voltage drop across the anode resistors 1564. The tens and units pulses gated to the control grids of the tube 1528 causes the potential level of the terminal 1563 to be correspondingly pulsed. Thus as each of the first and third to tenth negative units pulses of each pulse frame is negatively gated to the left control grid of the tube 1525 to cut off space current flow through the left section of this tube, the voltage drop across the resistor 1564 is correspondingly reduced to produce a corresponding increase in the potential of the terminal 1563. These nine units pulses of each pulse frame do not occur coincidentally with the tens pulse gated by the circuit 203 to the right control grid of the tube 1528 during the pulse frame and accordingly normal space current flow through the right section of the tube 1528 occurs for the duration of each identified units pulse. However, the second units pulse gated by the units coincidence tube circuit 204 in the time position **64*b* occurs coincidentally with the tens pulse 73*a* gated by the circuit 203. As a consequence, space current flow through both halves of the tube 1524 is cut off during the short time interval of the units pulse. Thus, once during each pulse frame a composite pulse consisting of the units pulse occuring in the time position 64*b* and the tens pulse occurring in the tens time position 73*a* is developed at the anode terminal 1563. Since anode current flow through both sections of the tube 1528 is completely stopped during each time position 64*b***, it will be understood that each composite pulse has a clean top, i.e., noise components are clipped off.

All of the pulses thus developed at the anode terminal 1563 of the tube 1528 are of positively polarity and are impressed upon the control grid of the pulse clamping tube 1531 through the condenser 1566. Normally the voltage drop across the resistor 1565 is negatively applied to the control grid of the tube 1531 to bias this grid beyond cutoff by an amount *b*—*b*. As shown by the curve B in Fig. 44, this bias voltage is appreciably greater than the amplitude of either the unwanted units pulses or the single tens pulse impressed upon this control grid during each pulse frame. Thus the tens pulses **73*a* and the first and third to tenth units pulses of each pulse produce no anode current flow through this tube and hence are not reproduced at the anode of the tube. However, the second units pulse of each pulse frame, i.e., that occurring in the time position 64*b* and superimposed upon the tens pulse occurring in the tens pulse time position 73*a*, serves to drive the grid of the tube 1531** into the conductive region of the tube. In other words, that portion of each composite pulse which exceeds in amplitude the bias voltage value *b*—*b* is reproduced in amplified form as a negative pulse at the anode of the tube 1531. Since the bias on the control grid of the tube 1531 is held at a fixed value such that exactly the same portion of each composite pulse is clipped off in the tube, it will be understood that the pulses gated by this tube are of constant amplitude and have clean bottoms as well as clean tops, i.e., noise components are completely removed therefrom.

The pulses thus gated by the tube 1531 in the time position **64*b* are of negative polarity and are impressed upon the control grid of the pulse inverter tube 1533 through the coupling condenser 1532. These pulses cause pulsed variations in the anode potential of the tube 1533 in the manner illustrated by the curve C in Fig. 44 of the drawings. From an examination of this curve, it will be noted that one positive pulse is developed at the anode of the tube 1533 during each pulse frame and that each pulse occurs in the time position 64*b* assigned to the calling line 23**. These pulses are hereinafter referred to as finder pulses.

The finder pulses developed at the anode of the tube 1533 in the manner just explained are impressed upon the control grid of the cathode follower tube 1500 through a pulse attenuating network 1569 and the coupling condenser 1534. As reproduced across the cathode load resistor 1570 of the tube 1500, these pulses are impressed upon the busy conductor 52 through the coupling condenser 1571. Application of positive busy pulses to the conductor 52 in the time position **64*b* of each pulse frame serves to mark the calling line 23 as busy in the other finders and connectors of the system. The pulses applied to the busy conductor 52 in the time position 64*b* are also impressed upon the right control grid of the pulse mixer tube 1501 through the coupling condenser 1559 along with any other busy pulses applied to this conductor as a result of the other lines of the system being busy. In the absence of the facilities described below, the busy pulses thus impressed upon the right control grid of the tube 1501 in the time position 64*b* would have the effect of biasing the suppressor grid of the finder control gate tube 1508 to cutoff and thus preventing the desired multiplexer pulses from being gated by this tube. To prevent this action from occurring, the left section of the tube 1501 is controlled to modify the operation of the right section of the tube during the time position 64*b* of each pulse frame. More specifically, positive finder pulses are impressed upon the left control grid of the tube 1501 directly from the anode of the tube 1533 through the coupling condenser 1568. These finder pulses have approximately twice the amplitude of the busy pulses coincidentally impressed upon the right control grid of this tube through the condensers 1559 and 1571 from the cathode load resistor 1570 of the cathode follower tube 1500. As a consequence, heavy space current flow through the left section of the tube 1501 and the cathode resistor 1572 occurs during each finder pulse interval. The positive pulses thus developed across the cathode load resistor 1572 occurring in the time position 64*b* assigned to the calling line are impressed on the finder gate conductor 12*d*. They are transmitted over this conductor to the connector 12*b* as finder gate pulses and serve to condition the connector to respond only to multiplexer pulses appearing on the multiplexer output conductor 50 in the time position assigned to the calling line 23**.

The increase in anode current flow through the left section of the tube 1501 and the cathode resistor 1572 which occurs during each finder pulse interval has the effect of increasing the bias on the right section of the tube to an extent such that current flow through the anode resistor 1573 and the right section of the tube 1501 drops to a very low value. As a consequence, the voltage drop across the resistor 1573 is reduced to a very low value permitting charging current to flow from the positive terminal of the anode current source through this resistor, the condenser 1503 and the crystal rectifier 1504 to the grounded terminal of the anode current source. Thus the condenser 1503 is charged to a relatively high voltage level during the finder pulse interval. At the end of each such interval, the voltage across the condenser 1503 is negatively applied to the suppressor grid of the gate tube 1508 in opposition to the voltage drop across the right section of the tube 1501 and the cathode load resistor 1572. The voltage across the condenser 1503 predominates sufficiently to bias the suppressor grid of the tube 1508 beyond cutoff. Moreover, the described charging action of the condenser 1503 occurs during the time position **64*b* of each pulse frame. Further the discharge path for this condenser, which includes the high back resistance of the rectifier 1504, has such a long time constant that the condenser 1503 is not appreciably discharged between successive charging intervals. As a consequence, the tube 1508 is biased beyond cutoff by the voltage across the condenser 1503 throughout each pulse frame except the particular interval spanned by the time position 64*b* of each pulse frame. During this interval of each pulse frame the right anode of the tube 1501 becomes highly positive to overcome the voltage across the condenser 1503 and thus lower the bias on the suppressor grid of the tube 1508** so that this tube can conduct.

From the preceding explanation, it will be understood that pulses from the multiplexer 11 are permitted to enter the finder **12*a* only during those intervals when finder pulses are developed by the circuit 205 coincidentally with the application of a positive allotter pulse to the screen grid of the tube 1508. Thus, regardless of the potential applied to the suppressor grid of the tube 1508, this tube cannot conduct in the absence of a positive allotter pulse on the screen grid thereof. In this regard, it is pointed out that the repetition rate of the allotter pulses on the conductor 36*a* is sufficiently high to prevent the +B switching circuit 201 from relaxing, i.e., removing +B potential from the conductors 1665 and 12*c*, during the intervals separating successive allotter pulses. This fact will become apparent from the immediately following description of the mode of operation of the switching circuit 201**.

Referring now more particularly to the operation of the +B switching circuit 201, it is pointed out above that the +B switching tube 1523 is fired under the influence of the pulses gated by the tube 1508 in the time position **64*b* immediately the finder 12*a* is taken into use to handle the call initiated at the substation A and that when space current flow through this tube is established an operating anode potential of 140 volts appears at the cathode end of the resistor 1524. After this tube is fired, deionization thereof is under the control of the two associated tubes 1511 and 1516. More specifically, the extinguishing tube 1516 is provided to deionize the tube 1523 when the call is abandoned or terminated, while the +B switch timing tube 1511 is provided to prevent undesired deionization of the tube 1523 during the intervals separating allotter pulses on the conductor 36*a*, the open circuit periods of dial impulses dialed through operation of the impulsing contacts 1105 at the calling substation, hook switch flashing intervals, and other periods of short duration when the loop circuit extending from the substation A to the line circuit 10 may be interrupted. The manner in which these functions are carried out in the circuit 201 during operation of the finder 12*a* to handle the call under consideration may best be explained by reference to Figs. 45, 46A, and 46B of the drawings, the significance of which is pointed out more fully below. Normally, i.e., with the circuit 201 inactive, the condenser 1575 is completely discharged through the resistors 1527 and 1524 so that the terminal 1574 thereof is at substantially zero potential. Also, with the circuit 201 inactive, the negative 100 volts impressed between the bias terminal 1667 and ground by the bias potential source is divided between the two resistors 1513 and 1576 in the ratio of five volts across the resistor 1513 and 95 volts across the resistor 1576. Thus the cathode of the tube 1511 is normally maintained at a potential which is 95 volts negative with respect to ground. Due to the presence of this high negative potential upon the cathode of the tube 1511 it is necessary to provide a separate heater supply source for the filamentary heater of the tube in order to prevent arcing between the tube heater and cathode which would result in destruction of the tube. This is accomplished by providing a separate current supply transformer 1514 having its primary winding 1515 connected to an appropriate source of alternating current and its secondary winding bridged by the heater of the tube 1511. This winding is connected to the negative terminal of the 100 volt bias potential source so that the heater is effectively maintained at a potential approximately five volts negative with respect to the tube cathode. This arrangement positively precludes any arcing between the cathode and cathode heater of the tube 1511**.

When the +B switch tube 1523 fires in the manner explained above, the condenser 1578 is charged to the full value of the voltage across the resistor 1524 through the resistor 1529, and operating anode potential is supplied to the tube 1516. Also, the condenser 1577 is charged through the cathode resistor 1522 to the full value of the voltage across the resistor 1524. Charging of the condenser 1577 over this path drives the cathode terminal of the resistor 1522 highly positive during the initial portion of the charging interval. Concurrently with charging of the condenser 1577, a charging path for the condenser 1575 is established from the cathode terminal of the resistor 1524 through the timing resistor 1527. Initially, the major portion of the charging voltage appears across the resistor 1527 and a very small portion thereof appears across the condenser 1575. Similarly, the major portion of the charging voltage for the condenser 1577 initially appears across the cathode resistor 1522 immediately after the tube 1523 fires. Thus during the initial portion of the condenser charging interval, the control grid of the tube 1516 is held at ground potential whereas the cathode of the tube is driven highly positive. The grid of the tube 1516 is thus effectively biased negative relative to the tube cathode by an amount equal to the voltage drop across the resistor 1522. This bias prevents the tube 1516 from firing.

Figures 45, 46A, 46B:
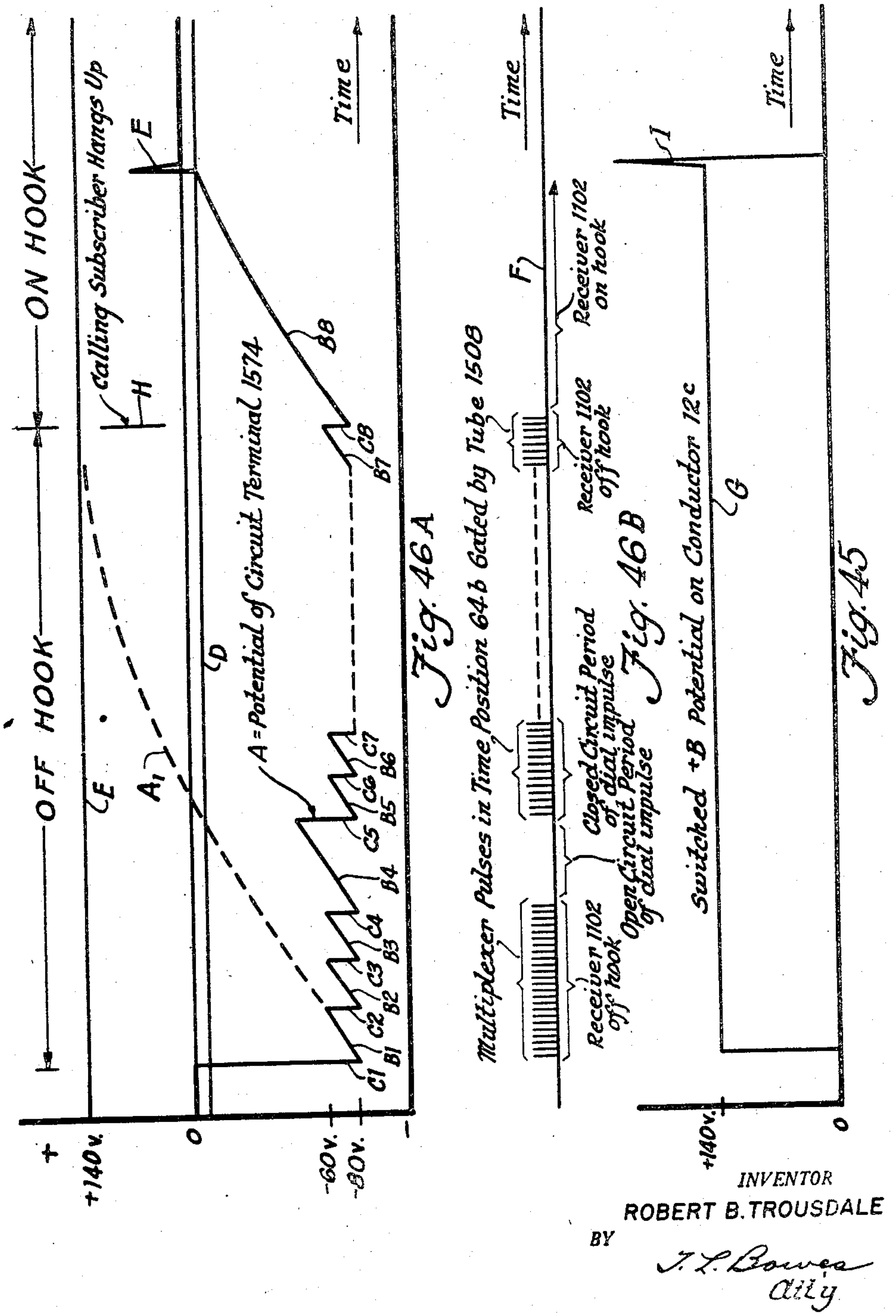

As explained above, the grid of the tube 1511 is normally biased approximately five volts negative relative to the tube cathode by the voltage across the resistor 1513. This bias voltage prevents the tube 1511 from firing in the absence of positive pulses on the output conductor 1502 of the pulse input circuit 200. However, immediately positive pulses are gated to this conductor by the pulse input circuit 200 they are impressed upon the control grid of the tube 1511 through the condenser 1654 and serve to drive this control grid positive relative to the tube cathode and fire the tube. It will thus be apparent that the tubes 1511 and 1523 are fired substantially simultaneously. When the tube 1511 is fired, current flows through this tube and the condenser 1575 in a circuit which extends from the grounded terminal of the resistor 1576 through the condenser 1575 and the space current path through the tube 1511 to the cathode terminal of the resistor 1576. Thus the voltage across the resistor 1576 less the voltage drop through the tube 1511 is impressed across the condenser 1575 immediately the tube 1511 fires. As a consequence, the circuit terminal 1574 is driven approximately 80 volts negative with respect to ground. In Fig. 46A of the drawings, this negative voltage rise of the terminal 1574 is indicated along the portion C1 of the potential curve A. The negative potential thus developed at the terminal 1574 is directly impressed upon the control grid of the tube 1516 to bias this grid highly negative with respect to the cathode of the tube and thus prevent the tube from firing regardless of the voltage across the cathode resistor 1522. When the voltage across the condenser 1575 rises to approximately 80 volts, current flow through the tube 1511 drops to the extinction point and is interrupted. The condenser 1575 now starts to charge through the resistor 1527 to the positive potential of 140 volts across the resistor 1524 as indicated by the line E in Fig. 46 of the drawings. The charging rate of the condenser 1575 is obviously determined by the time constant of the series circuit comprising this condenser and the resistor 1527. In this regard, it is pointed out that the condenser 1575 has a very large capacitance value, of the order of .1 microfarad, and the resistor 1527 has a very large resistance value of the order of 4.7 megohms, such that the time constant of the circuit is very long and the charging rate of the condenser 1575 is correspondingly low. Specifically, the condenser 1575 starts to charge at the rate indicated by the curve A1 in Fig. 46A. As it charges, the negative potential of the terminal 1574 is correspondingly reduced as indicated by the curve segment B1 in Fig. 46A. When the potential of this terminal is reduced to a value of approximately 60 volts negative, the voltage across the tube 1511 is increased to a value at which this tube refires. When the tube 1511 refires, the voltage across the condenser 1575 instantly rises to a value of 80 volts as indicated by the curve segment C2 in Fig. 46A to again produce deionization of the tube 1511. The described relaxation type of operation of the tube 1511 and condenser 1575 continues in the manner indicated by the curve segments B2, C3, B3, C4 so long as an off hook condition persists at the called substation A, i.e., so long as the loop extending from this substation to the line circuit 10 is not interrupted.

During the open circuit or break period of each dial impulse, the transmission of multiplexer pulses to the finder **12*a* in the time position 64*b* assigned to the calling line 23 is arrested in the manner indicated in Fig. 46B of the drawings, so that the tube 1511 cannot refire after it is first extinguished during the initial portion of the dial impulse break period. Accordingly and again referring to Fig. 46A, the condenser 1575 charges through the resistor 1527 for the duration of the impulse in the manner indicated by the curve segment B4. Due to the long time constant of the condenser charging circuit, the dial impulse break period is not long enough to charge the condenser to the value D at which the negative bias on the control grid of the tube 1516 becomes insufficient to prevent this tube from firing. When the dial impulse break period ends to cause resumption of the pulse gating operation of the circuit 200 in the manner shown in Fig. 46B, the tube 1511 immediately fires to recharge the condenser 1575 and raise the negative potential of the terminal 1574 to the negative 80 volts value. During the closed circuit period of each impulse, the described relaxation operation of the tube 1511 and condenser 1575** is resumed in the manner in the manner explained above as indicated by the curve segments B5, C6, B6 and C7 of the curve A. This action also continues after the dialing operation is completed and so long as the receiver at the calling substation is held off hook. In Fig. 46A, the curve segments B7 and C8 of the curve A illustrate the last relaxation cycle which occurs before the call is abandoned or terminated.

When the call is abandoned or terminated at the point H along the time axis, gating of multiplexer pulses to the conductor 1502 by the pulse input circuit 200 is interrupted in the manner described above. Accordingly, the condenser 1575 is permitted to charge through the resistor 1527 from the cathode resistor 1524 so that the negative potential of the terminal 1574 is decreased along the curve segment B8. When this potential is reduced to the value D with a corresponding reduction of the bias on the control grid of the tube 1516 this tube fires. In firing, the tube 1516 instantly discharges the condenser 1578 through the space current path thereof and the resistor 1522. Thus a voltage of approximately 130 volts is developed across the resistor 1522. This voltage spike is additively combined with the 140 volts across the charged condenser 1577 to produce a voltage across the cathode resistor 1524 of approximately 270 volts. Thus the cathode of the tube 1523 is driven positive relative to the anode of this tube and space current flow through the tube is interrupted. Referring to Figs. 45 and 46A the transient spike developed across the resistor 1524 is indicated at I at the end of the switched +B potential line G in Fig. 45, and the change in potential at the terminal point 1574 produced by the same transient voltage is indicated at E along the potential curve A of Fig. 46A. When space current flow in the tube 1523 is thus interrupted, the condenser 1577 discharges through the two resistors 1524 and 1522, following which the voltage across the resistor 1524 drops to zero. Thus operating anode potentials are removed from the conductors 1665 and **12*c*. As a consequence, the tubes 1620 and 1643 in the circuits 203 and 204 are deionized, the tube 1516 is deionized and all gas filled tubes of the connector 12*b* are deionized. Following deionization of the identified tubes, the finder 12*a* and the connector 12*b*** are fully restored to normal.

From the preceding explanation, it will be understood that the switching circuit 201 functions positively to prevent false release of the link 12 during hook switch flashing, or the dialing of impulses at any calling substation with which the link 12 is operatively associated. In this connection, it is pointed out above that the multiplexer pulses accepted by the finder **12*a* over the multiplexer output conductor 50 for the duration of a call are all gated by the allotter pulses impressed upon the conductor 36*a* by the link allotter 24. In other words, multiplexer pulses occurring in the time position assigned the calling line with which the link is operatively associated are only gated by the tube 1508 during those intervals when allotter pulses are impressed upon the screen grid of this tube, and hence are not gated to the control grid of the timing tube 1511 during the periods separating the allotter pulses. However, the allotter pulse periodicity is high enough so that the condenser 1575 is prevented from discharging to the link release value D during the interval separating successive allotter pulses. Specifically, the allotter pulse periodicity is such that the interval separating each successive pair of allotter pulses is only a very small fraction of the period represented by the potential curve segment B8 in Fig. 46A. Thus space current flow through the switch tube 1523** is maintained throughout the call.

An additional important feature of the finder **12*a* is that of using the high mu inner control grid of the tube 1508 to handle the pulses delivered to the finder over the conductor 50 from the multiplexer and of using the low mu suppressor grid of the tube to handle the busy pulses generated by the pulse mixer tube 1501. This is an exception to the general rule followed in the other line switching components of the system of employing the suppressor grids of gating tubes to handle signal modulated pulses. In the finder 12a, this exception is permissible since the circuit does not function to transmit intelligence signals to a following circuit. The purpose of utilizing the suppressor and control grids of the gating tube 1508 in the described manner is that of preventing the high amplitude gating pulses developed at the right anode of the tube 1573 from being gated by the tube 1508 in the absence of coincident multiplexer pulses on the multiplexer output conductor 50. Specifically, if the high amplitude gating pulses developed at the right anode of the tube 1501 were impressed upon the high mu inner control grid of the tube 1508, they would be gated by this tube regardless of the presence or absence of the relatively low amplitude multiplexer pulses on the low mu suppressor grid of the tube. Such undesired gating of the pulses developed at the right anode of the tube 1501 would effectively lock up the finder 12a and render the same inoperative. However, by utilizing the low mu suppressor of the tube 1508 to handle the high amplitude gating pulses developed at the right anode of the tube 1501, these pulses cannot be repeated by the tube 1508 in the absence of coincident multiplexer pulses on the inner control grid of the tube. Moreover, the multiplexer pulses impressed on the inner control grid of the tube 1508 rarely if ever exceed an amplitude of nine volts, which pulse amplitude is insufficient to cause gating thereof by the tube 1508 in the absence of coincident high amplitude gating pulses on the suppressor grid of the tube. Another advantage of the described arrangement resides in obtaining maximum response of the tube 1508 and the tandem related tubes 1509 and 1510 of the pulse input circuit 200 to the multiplexer pulses gated by the tube 1508**.

As explained above, multiplexer pulse gating by the circuit 200 only occurs when allotter pulses are present on the conductor 36a. For this reason each allotter pulse should be of relatively long duration, i.e., span a time interval equal to that of ten to twenty pulse frames. This interval is several times greater than that required for the finder to establish switched +B potential on the conductors 12c and 1665, fire its own coincidence tube and start emitting busy pulses over the busy conductor 52. By thus allotting the finders on a long allotter pulse basis, partial seizure of a plurality of finders by the same calling line is minimized.

In the event that multiplexer pulses assigned to a calling line are first released to the finder 12a at an instant near the end of an allotter pulse on the conductor 36a, one of three possibilities may result. First, the finder may respond rapidly enough to associate itself with the calling line and emit busy pulses over the conductor 52 before the allotter pulses end. Secondly, the allotter pulse may end after the +B switching circuit 201 has operated but before the appropriate tubes have fired in the coincidence tube circuits 203 and 204. In this case, no busy pulses are emitted over the conductor in the time position assigned to the calling line and the next finder in allotter time sequence is thus free to associate itself with the calling line. The finder 12a then returns to normal after a short period determined by the release time of the +B switching circuit 201. The third possibility is that the allotter pulse may end before the +B switching circuit 201 operates. In this case the next allotter finder associates itself with the calling line and the finder 12a retains its normal condition.

*Connector 12b*

Figure 2B:
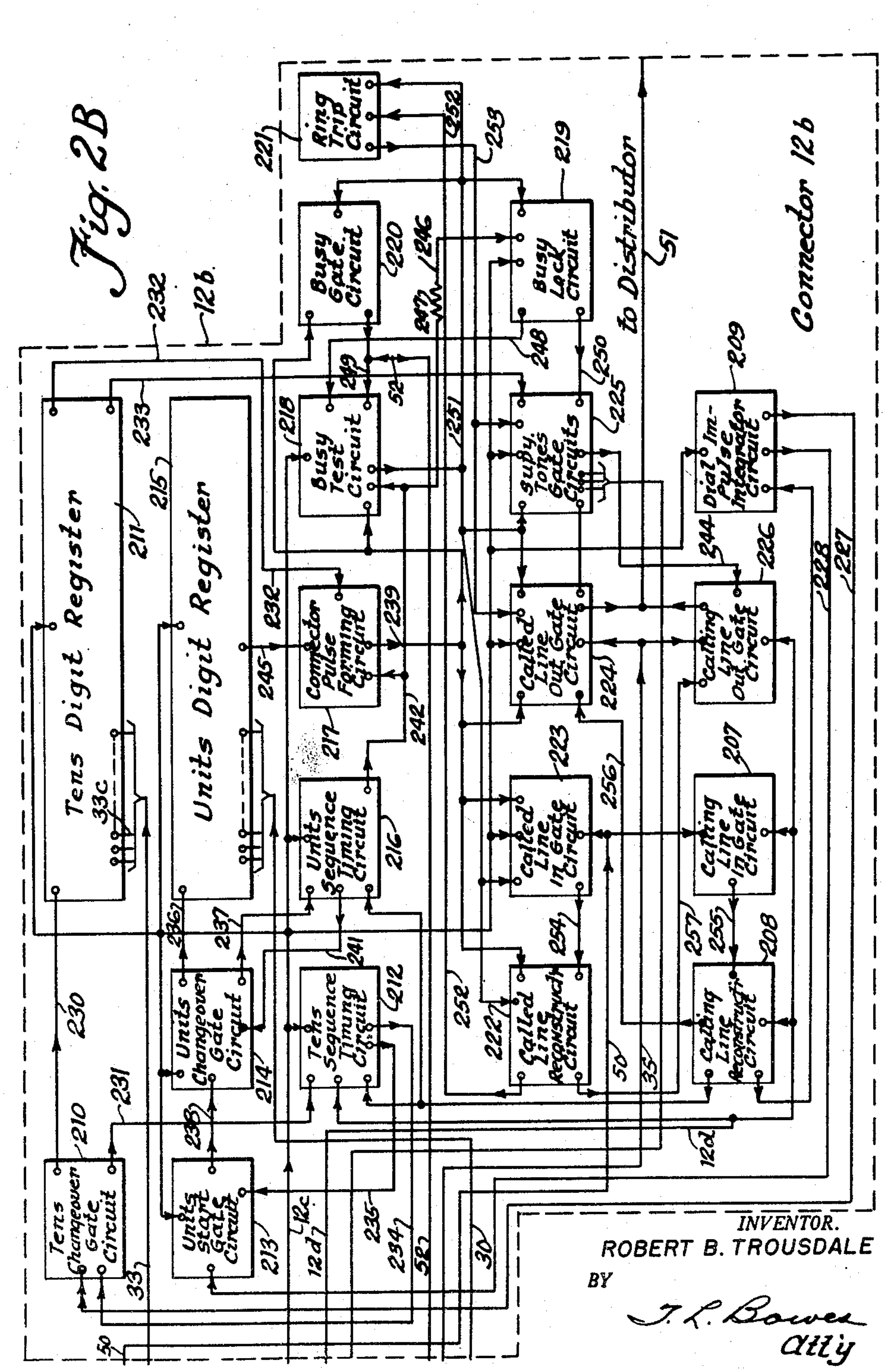
Figure 3:
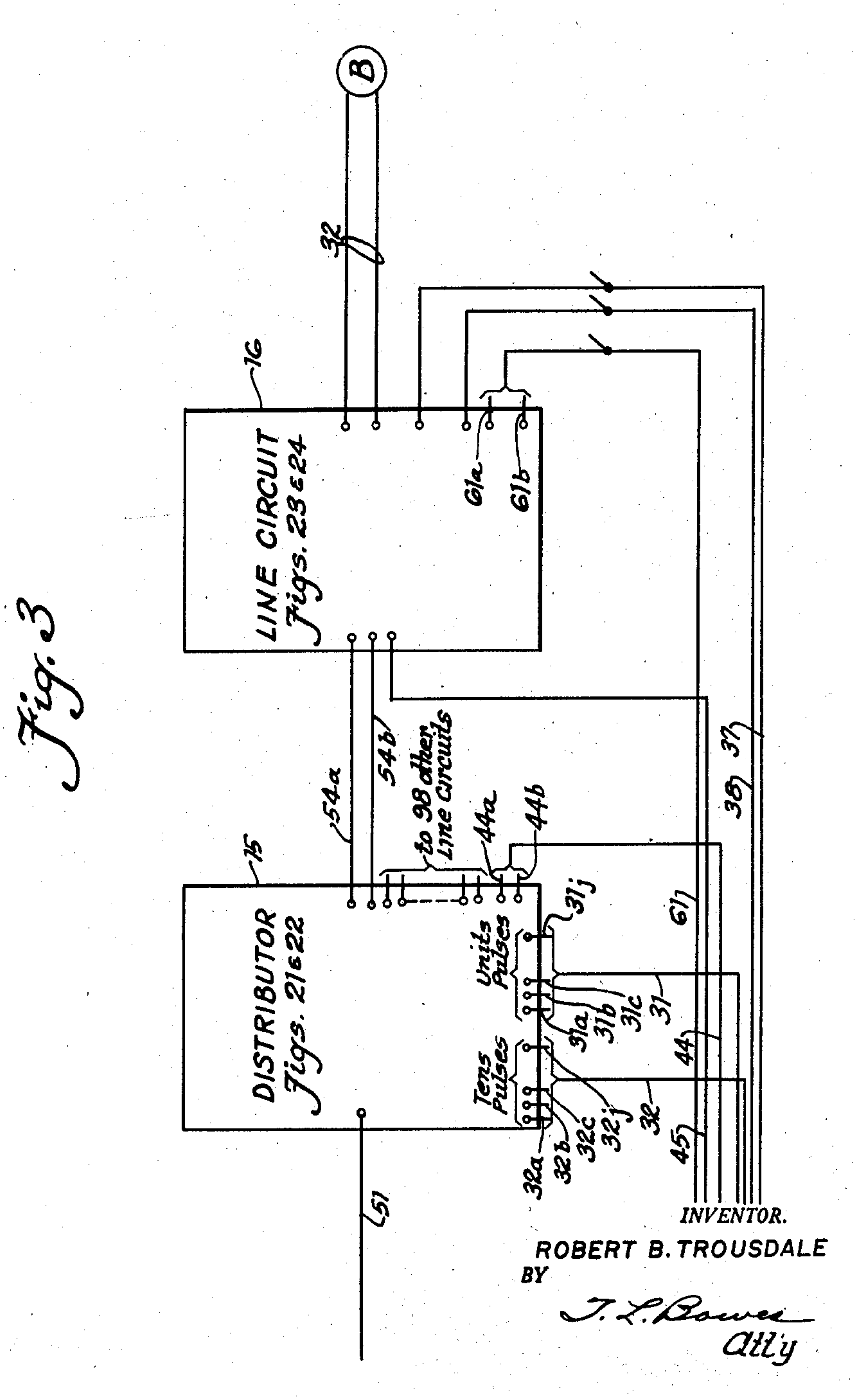
Figure 4:
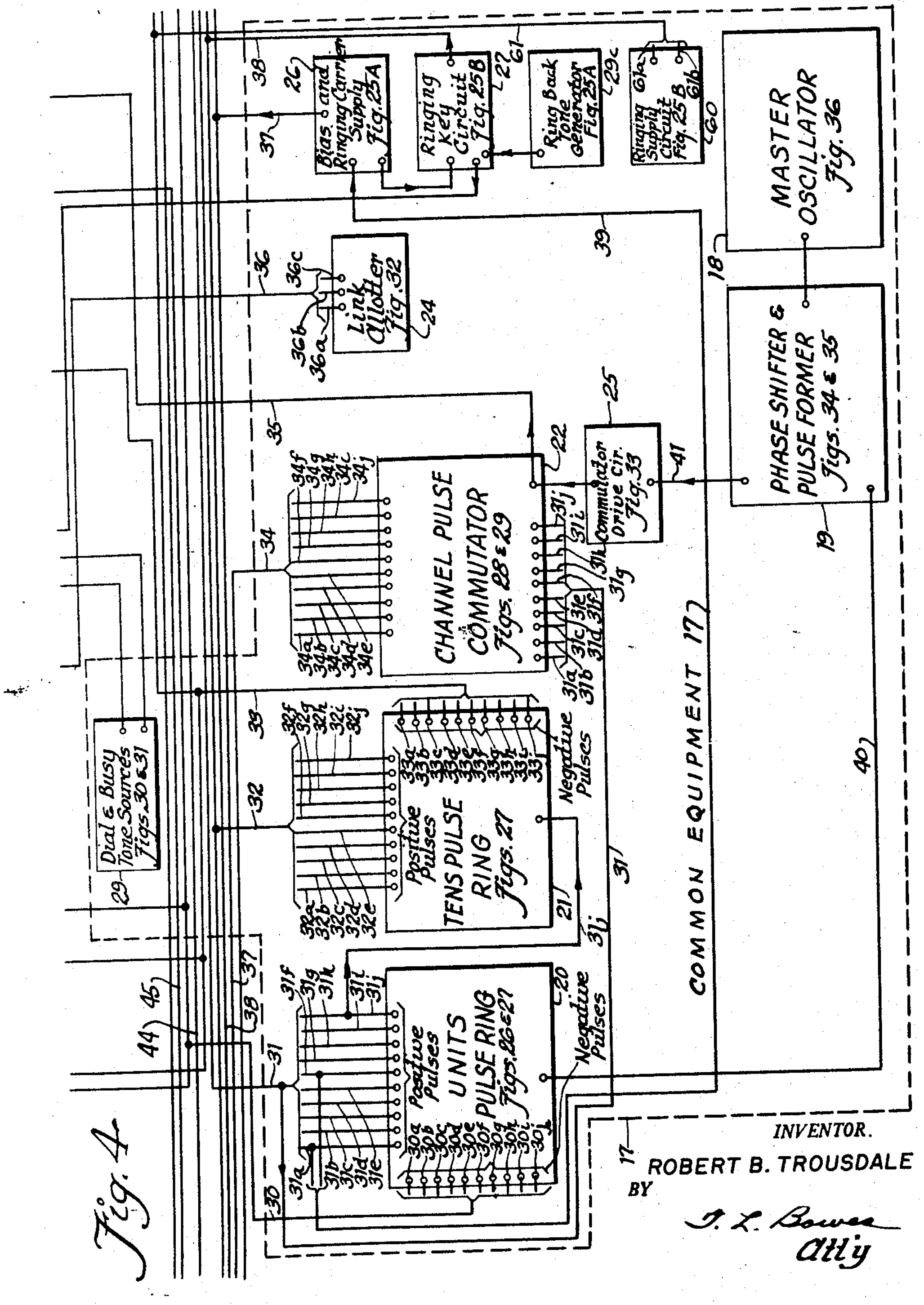
Figure 5:
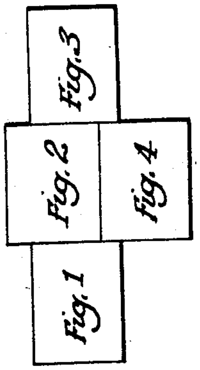
Figure 6:
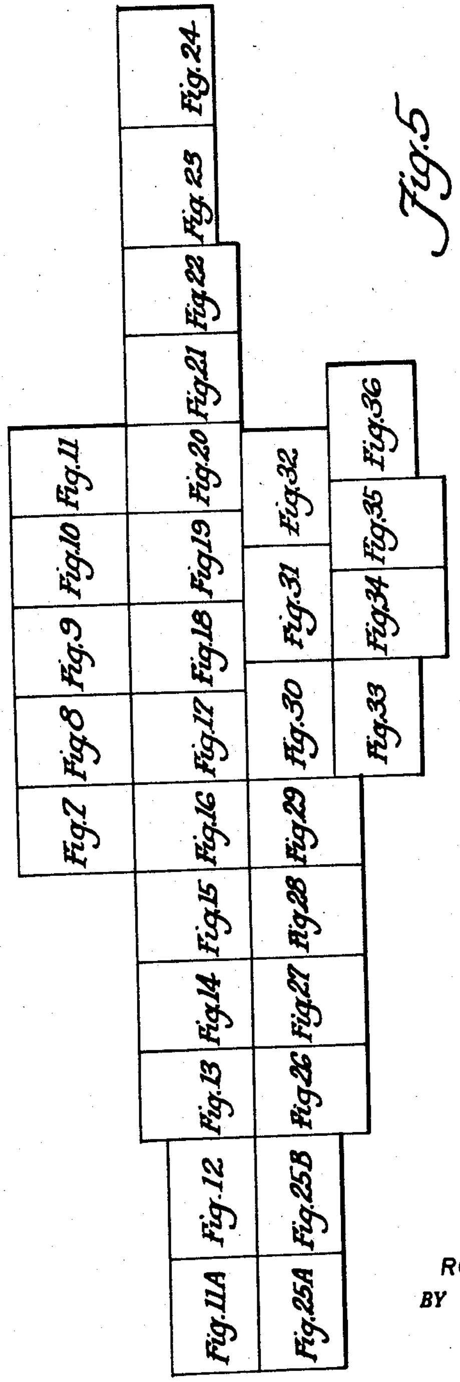
Figure 7:
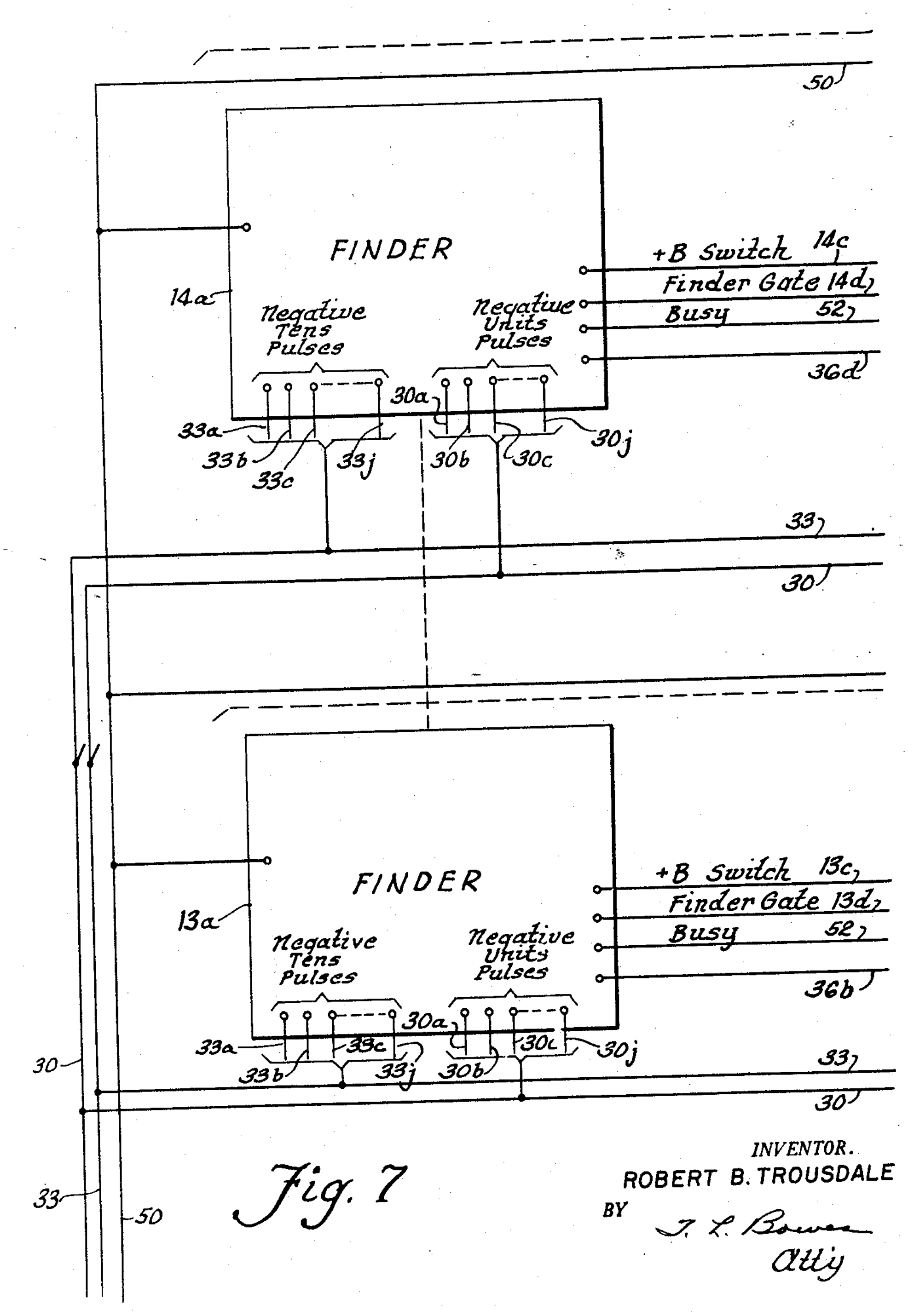
Figure 8:
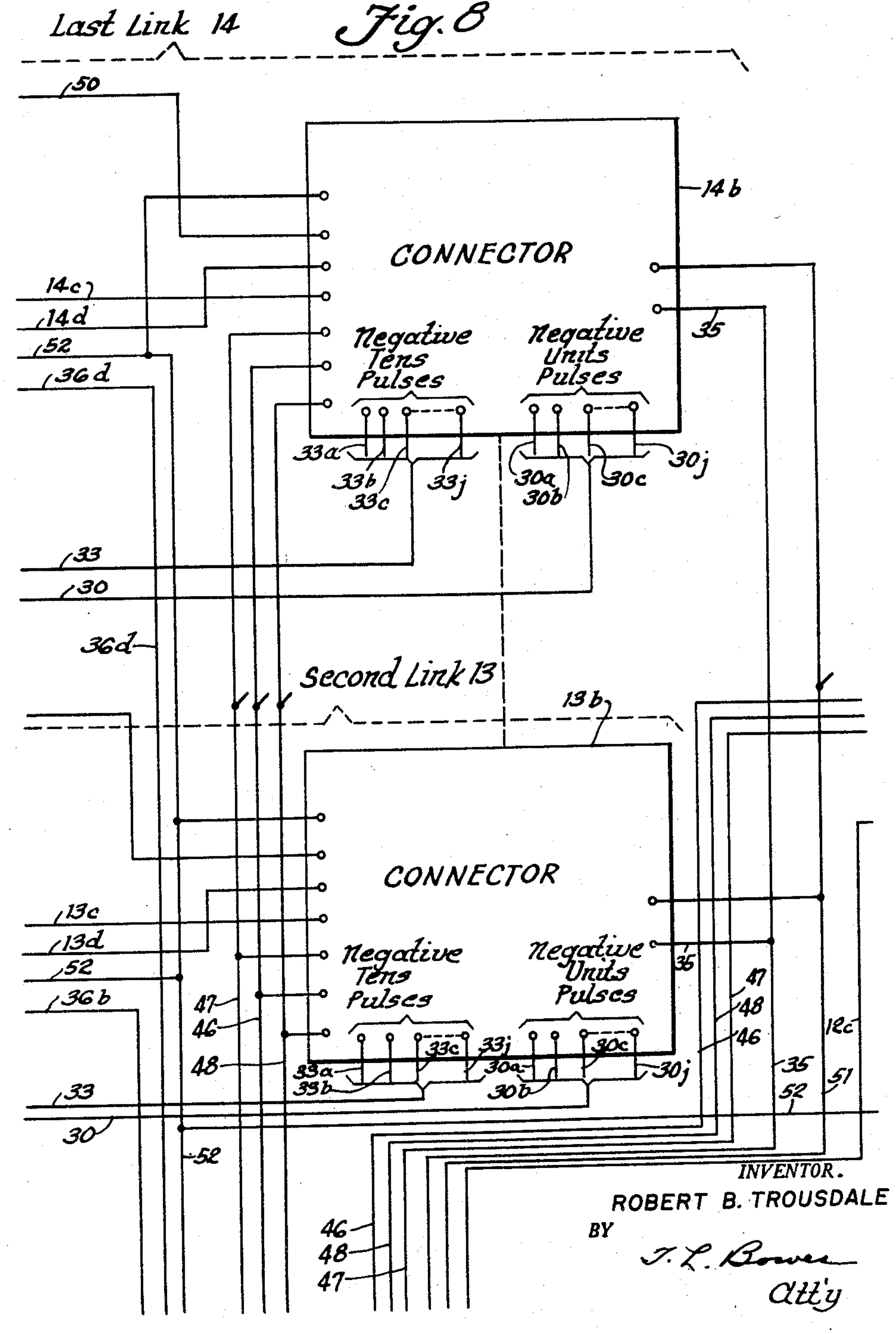

As previously explained in connection with Fig. 2B of the drawings, this connector generally comprises calling and called line in gate circuits 207 and 223, calling and called line out gate circuits 226 and 224, calling and called line reconstructor circuits 208 and 222, a dial impulse integrater circuit 209, tens and units changeover gate circuits 210 and 214, tens and units sequence timing circuits 212 and 216, a units start register circuit 213 and tens and units digit registers 211 and 215. The connector 12b is also diagrammatically illustrated in Fig. 2B of the drawings as comprising a connector pulse forming circuit 217, a busy test circuit 218, a busy lock circuit 219, a busy gate circuit 220, a ring trip circuit 221 and tones gate circuits 225. The functions performed by the connector and the above-identified components thereof are also generally described above with reference to Fig. 2B of the drawings.

Figure 9:
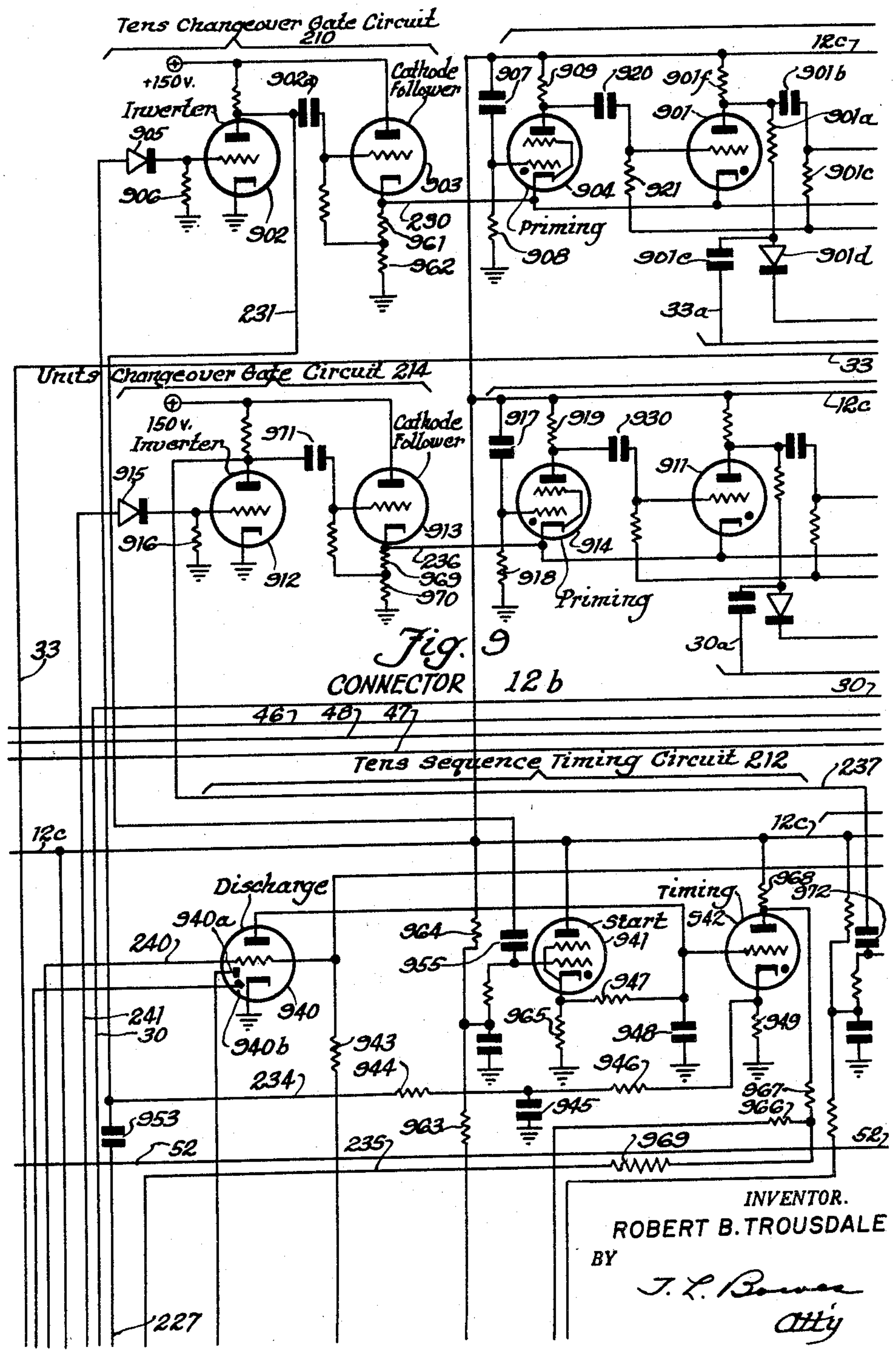
Figure 10:
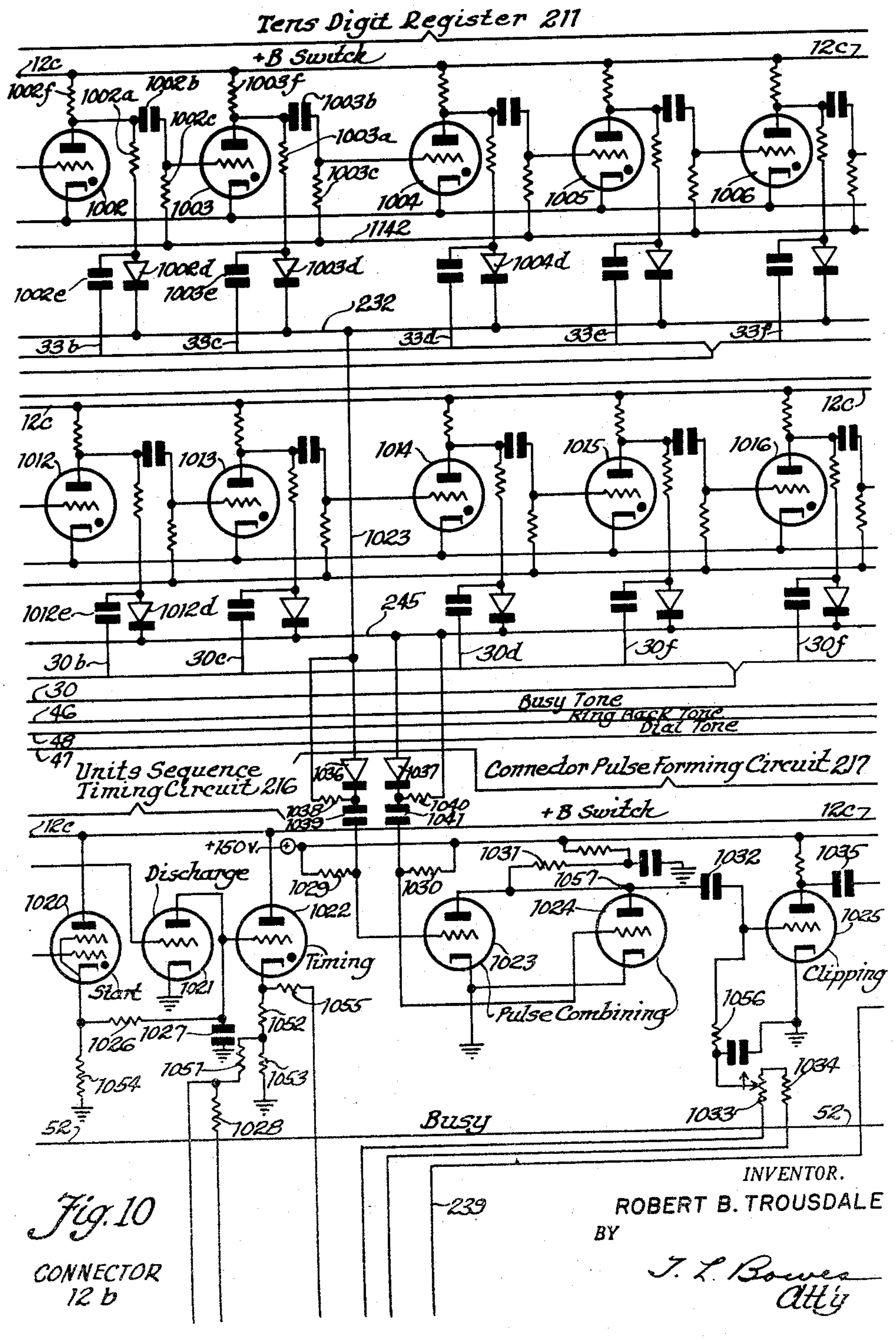
Figure 11:
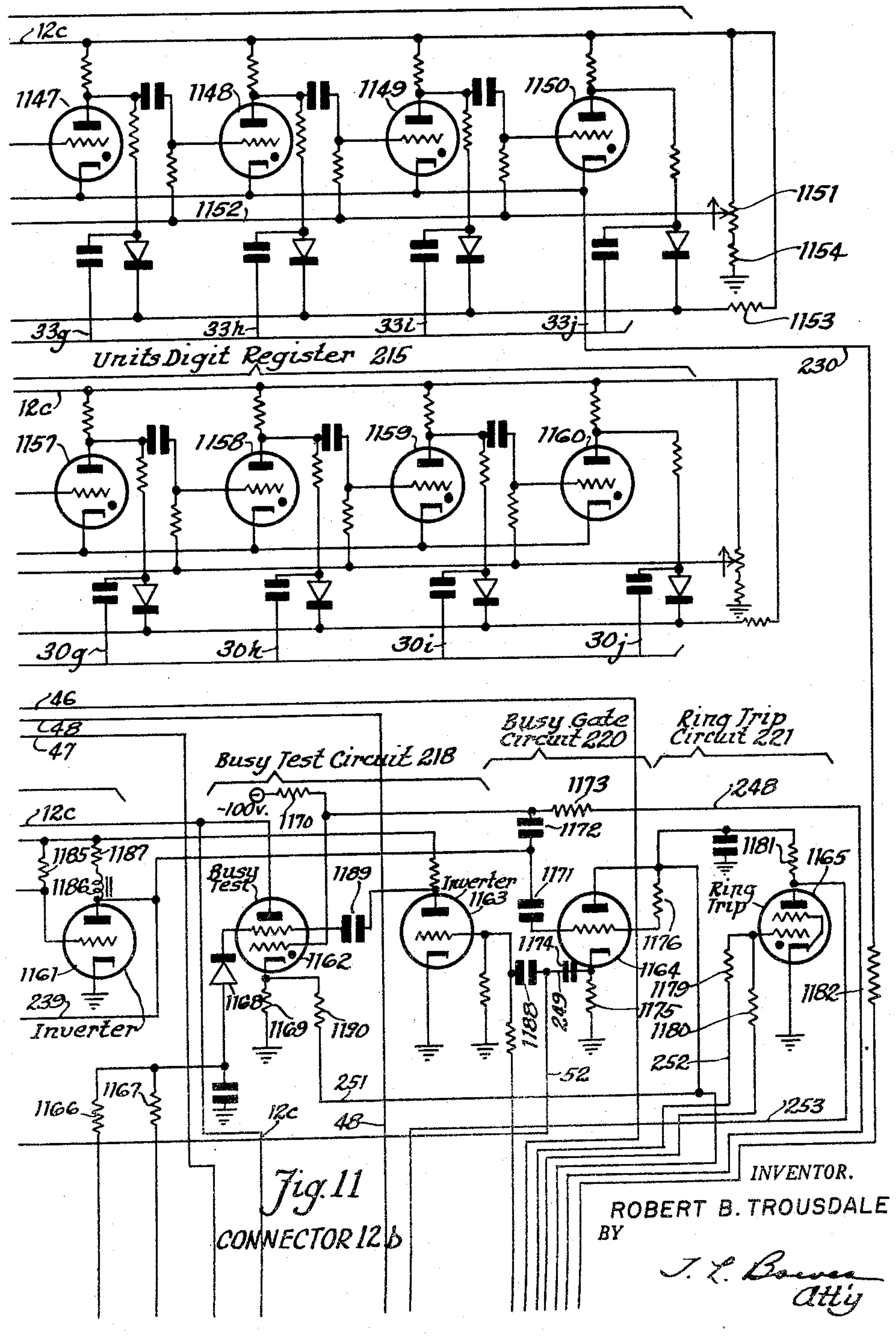
Figure 12:
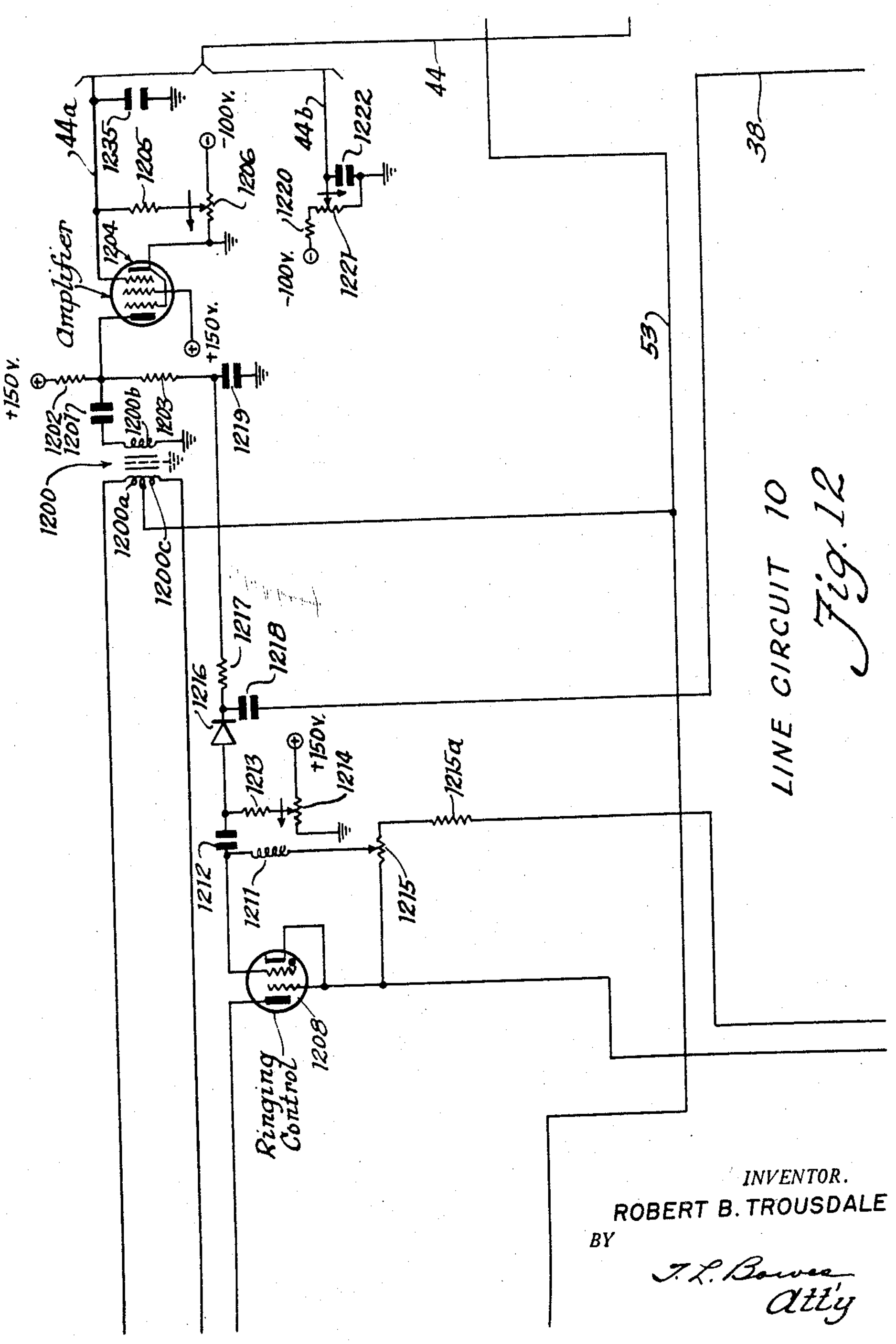
Figure 18:
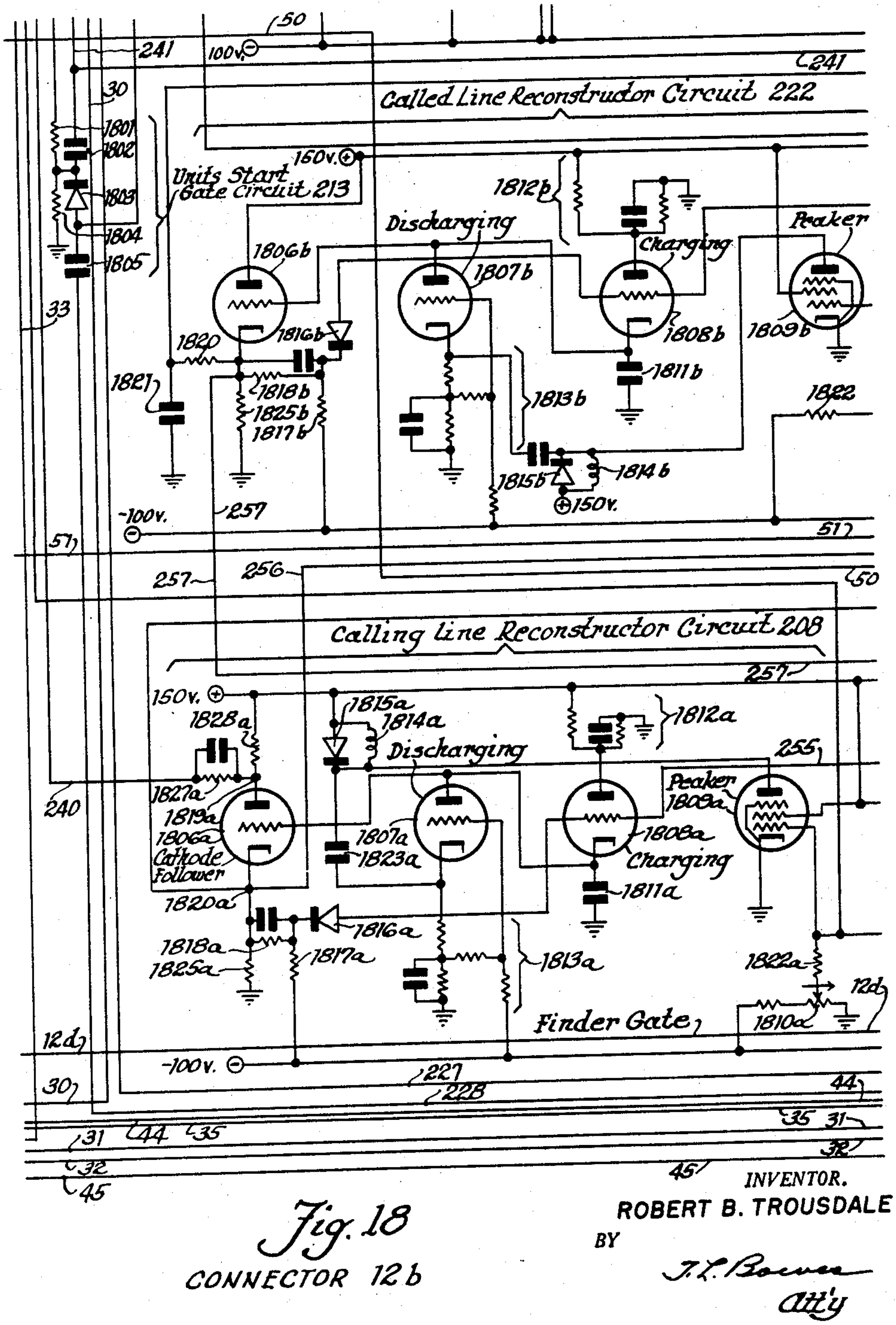
Figure 19:
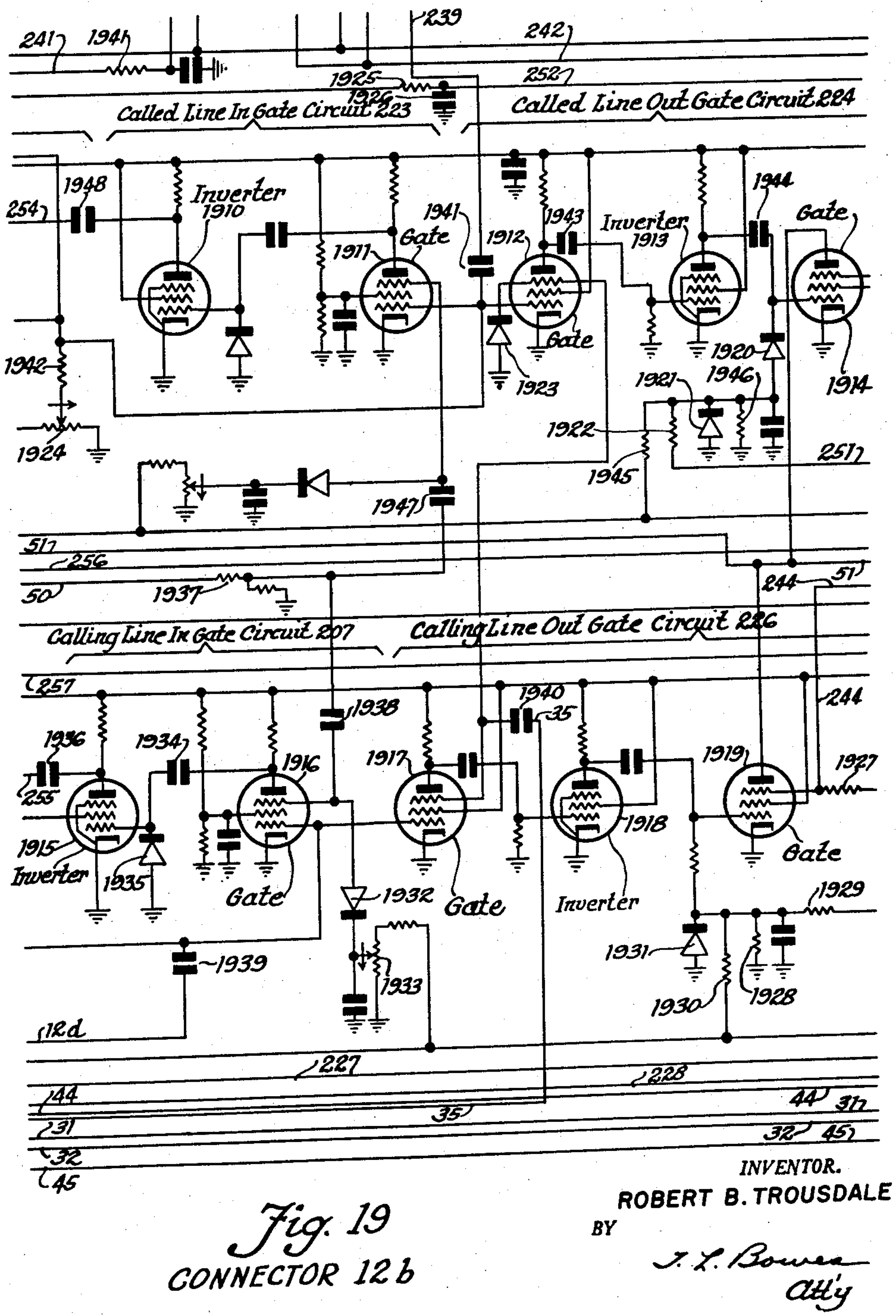
Figure 20:
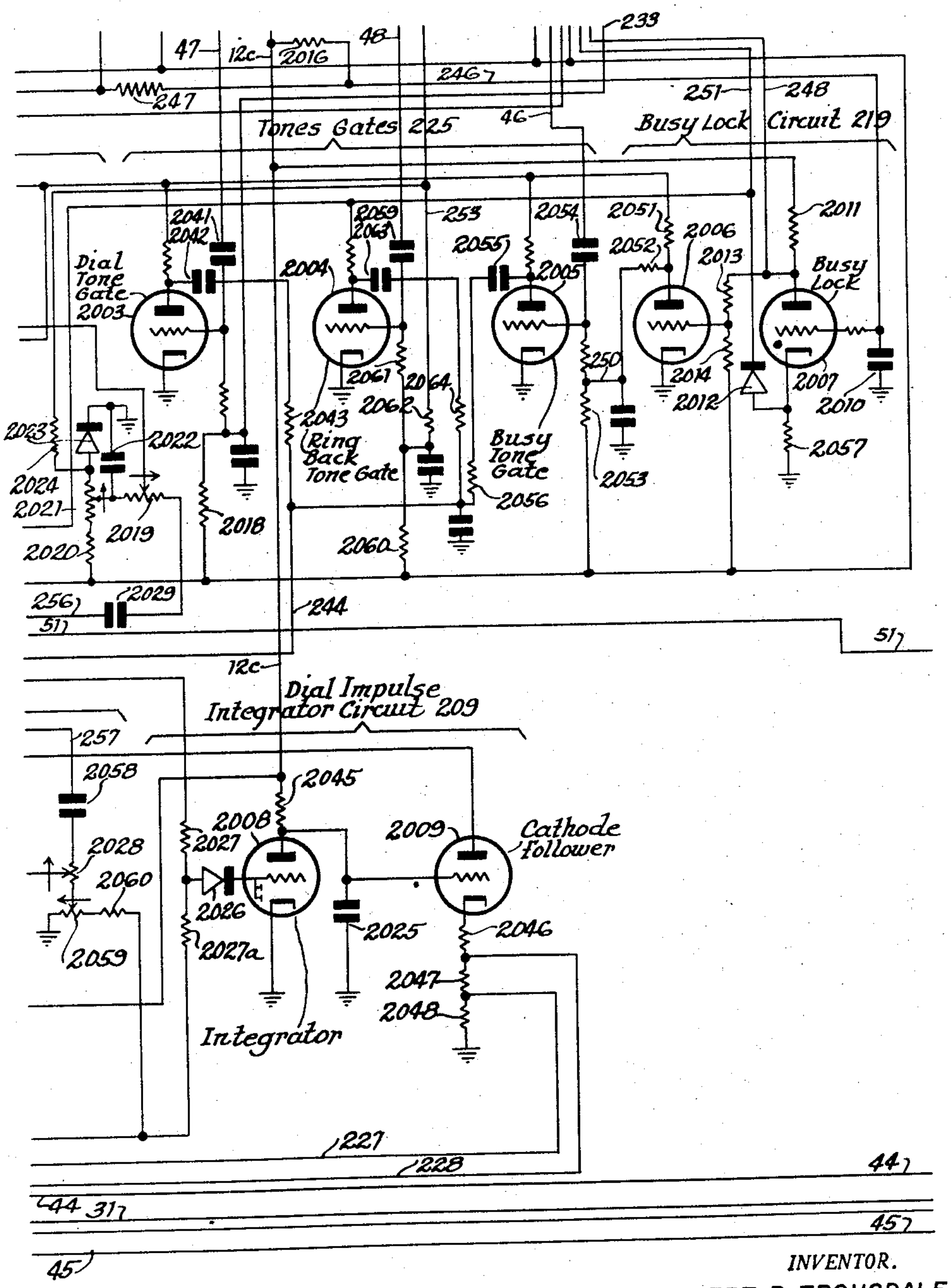

Referring now more particularly to Figs. 9, 10, 11, 18, 19 and 20 wherein the circuitry of the connector 12b is illustrated, it will be readily understood that the details of this connector may best be described in terms of the functional significance of the various circuit components thereof. In order to correlate these six figures with the schematic showing of Fig. 2B, it may be pointed out that the calling line in gate circuit is shown in Fig. 19 as comprising a gate tube 1916 and an inverter tube 1915, the calling line reconstructor circuit 208 is shown in Fig. 18 as comprising a peaker tube 1809a, a condenser charging tube 1808a, a condenser discharge tube 1807a and a cathode follower tube 1806a, and the called line out gate circuit 224 is illustrated in Fig. 19 as including an inverter tube 1913 and two gate tubes 1912 and 1914. Similarly, the called line in gate circuit 223 as shown in Fig. 19 comprises a gate tube 1911 and an inverter tube 1910, the called line reconstructor circuit 222 is shown in Fig. 18 as comprising a peaker tube 1809b, a condenser discharging tube 1807b, a condenser charging tube 1808b and a cathode follower tube 1806b, and the calling line out gate circuit 226 is shown in Fig. 19 as including an inverter tube 1918 and two gate tubes 1917 and 1919. The dial pulse integrator circuit 209 is illustrated in Fig. 20 and comprises an integrator tube 2008 and a cathode follower tube 2009. The tens changeover gate circuit 210 is shown in Fig. 9 as comprising an inverter tube 902 and a cathode follower tube 903. This circuit controls the tens digit register 211 which is shown in Figs. 9, 10, 11 as comprising a priming tube 904 and ten impulse counting tubes 901, 1002 to 1006, inclusive, and 1147 to 1150 inclusive. The units changeover gate circuit 214 is also illustrated in Fig. 9 and includes an inverter tube 912 and a cathode follower tube 913. This circuit controls the units digit register 215 which as shown in Figs. 9, 10 and 11 comprises a priming tube 914 and ten impulse counting tubes 911, 1012 to 1016 inclusive, 1157 to 1160 inclusive. The tens and units sequence timing circuits 212 and 216 are respectively illustrated in Figs. 9 and 10 and are substantially identical. Specifically, the tens sequence timing circuit 212 comprises a start tube 941, a timing tube 942 and a condenser discharge tube 940. Similarly, the units sequence timing circuit 216 comprises a start tube 1020, a timing tube 1022 and a condenser discharge tube 1021. The connector pulse forming circuit 217 is shown in Figs. 10 and 11 as comprising two pulse combining tubes 1023 and 1024, a clipping tube 1025 and an inverter tube 1161. The busy test circuit 218 is illustrated in Fig. 11 as comprising a busy test tube 1162 and an inverter tube 1163. The busy gate circuit 222 is also shown in Fig. 11 and comprises a single gate tube 1164. The ring trip circuit 221 is also shown in Fig. 11 and includes the ring trip tube 1165. The supervisory tone gate circuits generally indicated at 225 are illustrated in Fig. 20 and comprise a dial tone gate tube 2003, a ring back tone gate tube 2004 and a busy tone gate tube 2005. Finally, the busy lock circuit 219 is illustrated in Fig. 20 as comprising an inverter tube 2006 and a busy lock tube 2007. The manner in which the identified tubes of the connector are interconnected is pointed out more fully below with the reference to operation of the individual circuits. Although the identified tubes may be of any desired commercial types having the required operating characteristics, it is pointed out that preferably the tubes 1911, 1912, 1914, 1916, 1917 and 1919 are commercial type 6AS6 pentodes, the tube 903, 913, 1025, 1161, 1163, 1164, **1806*a*, 1806*b*, 2003, 2004, 2005, 2006 and 2009 are commercial type 6C4 triodes, the tubes 902, 912, 940, 1021, 1807*a*, 1807*b*, 1808*a*, 1808*b* and 2008 are commercial type 6AQ6 duo-diode triodes, the tubes 1809*a* and 1809*b* are commercial type 6AK5 pentodes and the tubes 1910, 1913, 1915 and 1918 are commercial type 6AK6 pentodes. Preferably, the gas filled thyratrons of the hot cathode type included in the connector 12*b*, namely the tube 904, 914, 941, 1020, 1162, 1165, are of the R.C.A. commercial 5696 type. The cold cathode gas filled triodes included in the connector 12*b* are preferably of the 1621 type. This group includes the tube 901, 911, 942, 1002 and 1006 inclusive, 1147 to 1150 inclusive, 1012 to 1016 inclusive, 1157 to 1160, inclusive, 1022 and 2007. The pulse combining tubes 1023 and 1024, inclusive, in the connector pulse forming circuit 217** are illustrated as separate tubes, although the two tube sections may be incorporated in a single envelope. For example, a twin triode of the 6J6 type may well be used as the pulse combining tube instead of the two triodes shown.

In considering the operation of the connector **12*b*, reference is again made to the above-described call originating at the substation A and routed by way of the link 12 to the called substation B. From the description pertaining to this call, it will be recalled that when the finder-connector link 12 is idle, the finder 12*a* withholds operating anode potential from the conductor 12*c* and also withholds finder gating pulses from the conductor 12*d*. However, immediately the finder 12*a* is operatively associated with the calling line 23, the +B switching circuit 201 embodied therein operates to impress a positive potential of 140 volts on the conductor 12*c* and almost immediately thereafter functions to impress finder gating pulses upon the conductor 12*d* in the time position 64*b* assigned to the calling line 23. When operating anode potential is thus suddenly applied to the conductor 12*c*, it is impressed across the series connected condenser 907 and resistor 908 of the tens digit register 211 with the result that the condenser 907 starts to charge through the resistor 908. Initially, however, the major portion of the available voltage is dissipated as a voltage drop across the resistor 908, such that the control grid of the thyratron tube 904 is driven positive relative to the cathode of this tube. As a consequence, the tube 904 is fired to produce current flow therethrough over a path which includes the resistor 909, the cathode bus conductor 230 and the cathode load resistors 961 and 962 of the cathode follower tube 903. Current flow in this circuit raises the positive potential of the parallel connected cathodes of the tubes in the tens digit register 211 to a high value. Concurrently, a relatively large voltage drop is produced across the resistor 909 to decrease the positive potential impressed upon the grid of the tube 901 through the coupling condenser 920. After the tube 904 is fired in the manner just explained, the control grid thereof loses control such that space current flow through the tube is rendered independent of the potential on the control grid thereof. In this regard, it is noted that after the tube 904 fires the condenser 907 charges to the full value of the anode voltage on the conductor 12*c*, with the result that the control grid of the tube 904 is reduced substantially to cathode potential. Firing of the tube 904 in the manner just explained prevents the ten impulse counting tubes of the tens digit register 211 from prematurely firing in the manner more fully described below. In an entirely similar manner, the condenser 917 and resistor 918 cooperate to effect ionization of the priming tube 914 embodied in the units digit register 215 when anode potential is impressed upon the conductor 12*c* in the +B switching circuit 201 of the finder 12*a***.

When a relatively high positive potential is developed on the cathode bus conductor 230 interconnecting the cathodes of the tubes in the tens digit register 211 in the manner just explained, this potential is impressed upon the control grid of the dial tone gate tube 2003 over a path which includes the resistor 1182 and the conductor 233. Normally, the tube 2003 is biased beyond cutoff by the negative potential impressed upon the control grid thereof through the resistor 2018 from the negative terminal of the bias potential source. However, the positive potential developed on the conductor 230 when the tube 904 fires, overcomes the negative bias normally impressed upon the grid of the tube 2003 and serves to bias the tube 2003 to the mid-point of its class A operating range. Thus the dial tone gate tube 2003 is rendered operative to amplify the dial tone signal voltage impressed upon the control grid thereof through the condenser 2041 from the dial tone signal conductor 47. The amplifier dial tone signal appearing at the anode of the tube 2003 is impressed upon the suppressor grid of the gate tube 1919 in the calling line out gate circuit 226 over a path which includes the condenser 2042, the resistor 2043 and the conductor 244. As explained more fully below, this signal voltage modulates the pulses being gated by the tube 1919 in the time position **64*b* assigned to the calling line 23** with the dial tone signal, whereby this signal is delivered to the calling line to signal the calling subscriber that the dialing operation may be started.

Figure 47:
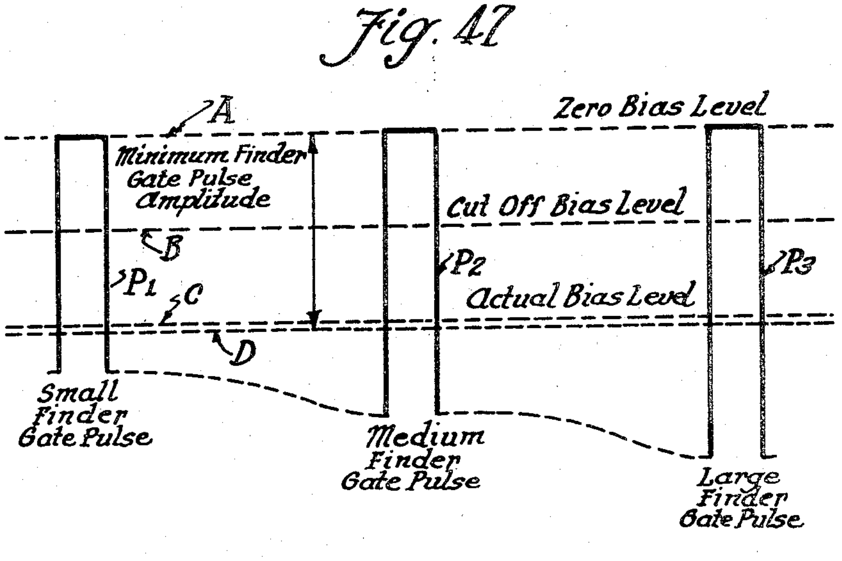

Referring now more particularly to the calling line in gate circuit 207, it is pointed out that finder gate pulses produced on the conductor **12*d* in the finder 12*a* control this circuit to gate multiplexer pulses occurring on the multiplexer output conductor in the time position 64*b* assigned to the calling line reconstructor circuit 208. Normally, the control grid of the gating tube 1916 is biased beyond cutoff by the negative potential impressed thereon from the potentiometer 1810*a* through the resistor 1822*a*. The suppressor grid of the gating tube 1916 is normally biased to a predetermined value through the back resistance of the clamping crystal rectifier 1932 from the potentiometer 1933. Positive signal modulated multiplexer pulses of positive polarity applied to the conductor 50 in the multiplexer 11 are impressed upon the suppressor grid of the gating tube 1916 through the resistor 1937 and the condenser 1938. Finder gating pulses developed on the conductor 12*d* in the finder 12*a* are of positive polarity and are impressed upon the control grid of the gating tube 1916 over a path which includes the conductor 12*d* and the condenser 1939. The tube 1916 is rendered conductive only when multiplexer pulses are impressed on the suppressor grid of the tube coincidentally with excitation of the tube control grid by finder gating pulses. It will be understood, therefore, that the tube 1916 is rendered operative to repeat only those multiplexer pulses which occur in the time position 64*b* assigned to the calling line 23. These pulses appear as negative pulse at the anode of the tube 1916 and are impressed upon the control grid of the inverter tube 1915 through the coupling condenser 1934. In order to prevent variations in the amplitude of the finder gating pulses from producing corresponding variations in the signal bearing multiplexer pulses gated by this tube, facilities are provided for clamping the tops of the finder gating pulses to the zero potential level in the manner illustrated in Fig. 47 of the drawings. These facilities comprise the coupling condenser 1939 and a diode anode 940*b* of the tube 940 included in the tens sequence timing circuit 212. Normally the diode section of the tube 940 comprising the anode 940*b* and the tube cathode is biased against current conduction by the negative potential impressed upon the identified anode through the resistor 1822*a* from the potentiometer 1810*a*. However, if the amplitude of the finder gate pulses appearing on the conductor 12***d* exceeds the magnitude of this bias voltage, the anode 940*b* is driven positive relative to the cathode of the tube 940 so that current conduction through this diode section of the tube 940 occurs. As a consequence, charging current flows through the condenser 1939 to build up a voltage across this condenser which is subtracted from the amplitude of the finder gate pulses as seen by the control grid of the tube 1916. The action which occurs is well illustrated in Fig. 47 wherein the lines A, B, C and D respectively indicate zero bias, cutoff bias, normal bias and minimum finder gate amplitude levels for the control grid of the tube 1916. As the finder gate pulse amplitude tends to rise, as indicated by the pulse $P_1$, $P_2$ and $P_3$, thereby to increase the voltage drop across the condenser 1939, the finder gate pulse base line is moved farther away from the zero grid bias level, so that the pulses are prevented from driving the control grid beyond the zero bias potential level. By virtue of this arrangement, each finder gate pulse functions to swing the control grid of the tube 1916 from beyond the cutoff potential level B and the zero bias level A during each pulse period. In order to prevent variations in the base line potential level of the signal bearing multiplexer pulses gated by the tube 1916 from manifesting themselves at the output side of this tube, the pulse base line potential level is clamped to the bias level of the suppressor grid of the tube by means of the clamping crystal rectifier 1932 and the condenser 1938. Thus if the pulse base line potential level tends to exceed in a negative sense the negative bias potential derived from the potentiometer 1933, the crystal rectifier 1932 is rendered conductive to permit charging current to flow through this rectifier and the condenser 1938. As a consequence, a voltage is developed across the condenser 1938 which is effectively subtracted from the pulse base line voltage present on the multiplexer output conductor 50 in so far as the suppressor grid of the tube 1916 is concerned. As a consequence, variations in the base line potential level of the signal modulated multiplexer pulses impressed upon the suppressor grid of the tube 1916 serves to eliminate forward crosstalk between adjacent pulses as reproduced at the output side of this tube. Also, the clamping rectifier 1932 is so poled as to be non-conducting as far as the multiplexer pulses are concerned.

It will be recalled that the signal modulated multiplexer pulses impressed upon the conductor 50 in the multiplexer 11 are of positive polarity. Accordingly, these pulses as amplified through the tube 1916 appear as negative pulses at the anode of this tube. They are repeated to the control grid of the amplifier and inverter tube 1915 through the coupling condenser 1934, a crystal rectifier 1935 being provided to coact with the coupling condenser 1934 in clamping the base line of the pulses developed at the anode of the tube 1916 to the ground potential level. The tube 1915 amplifies and inverts the pulses and repeats the same as positive pulses to the control grid of the charging tube 1808*a* provided in the calling line reconstructor circuit 208 over a path which includes the coupling condenser 1936 and the conductor 255.

In considering the operational details of the calling line reconstructor circuit 208, it is again pointed out that this circuit functions to store the amplitude of the signal modulated multiplexer pulses as amplified through the tubes 1916 and 1915 for an interval equal to the duration of one pulse frame. In general, this is accomplished by charging the condenser 1811*a* through the charging tube 1808*a* in accordance with the amplitude of each pulse repeated to the reconstructor circuit 208 by the calling line in gate circuit 207 and discharging this condenser through the tube 1807*a* just prior to each such condenser charging operation. In the case under consideration, it will be understood that only signal modulated multiplexer pulses occurring in the time position 64*b* assigned to the calling line 23 are gated to the circuit 208 by the calling line in gate circuit 207.

In considering the details of the reconstructor circuit 208, it is pointed out that normally the charging tube 1808*a* is biased beyond cutoff by the potential impressed upon the control grid thereof through the crystal rectifier 1816*a* from the bleeder resistors 1817*a* and 1818*a*. Since the condenser 1811*a* must be fully discharged between successive pulses gated to the circuit 208 from the in gate circuit 207, this condenser is chosen to have a small capacitance value. In order positively to prevent charging of this condenser during the off pulse periods, it is essential that the tube 1808*a* be maintained completely non-conducting during such periods. To this end, a high gain triode is used as the condenser charging tube 1808*a*. This tube is operated at a very low anode voltage through the expedient of utilizing the bleeder network 1812*a* to supply anode voltage to the tube 1808*a*. Normal bias for the condenser discharging tube 1807*a* is supplied from the bleeder circuit 1813*a*, this bias being sufficient normally to cut off space current flow through the tube 1807*a*. Similarly, the peaker tube 1809*a* is normally biased well below cutoff by the potential impressed upon the control grid thereof from a bleeder circuit comprising the potentiometer 1810*a* and the resistor 1822*a*.

Finder gate pulses impressed upon the conductor 12*d* in the finder 12*a* and utilized to control the gate tube 1916 in the manner explained above are also impressed upon the control grid of the peaker tube 1809*a* through the condenser 1939. Each such pulse has the effect of causing current conduction through the peaker tube 1809*a* for the duration of the pulse. The anode circuit of this tube consists of an inductance element 1814*a* shunted by a crystal rectifier 1815*a*. The inductance element 1814*a* is tuned to resonance at a very high frequency, several times greater than the finder gate pulse frequency, by the stray capacitances associated therewith. Thus the inductance element 1814*a* effectively comprises a resonant circuit which is shock excited into oscillation as the leading edge of each finder gate pulse is impressed upon the control grid of the peaker tube 1809*a* to start current conduction through this tube. However, the rectifier 1815*a* in shunt with the inductance element 1814*a* only allows the first half cycle of the first oscillatory transient to develop, following which it absorbs all energy stored in the inductance element 1814*a*. It will thus be understood that as each finder gate pulse builds up to full amplitude, a very sharp pulse of negative polarity is developed at the anode of the peaker tube 1809*a*. This pulse is coincident with the leading edge of the corresponding finder gate pulse. At the end of each finder gate pulse, current conduction through the tube 1809*a* is cut off, thereby tending to produce a rise in the anode potential of the tube. However, the tube anode is already at the potential level of the anode current supply source due to the action of the rectifier 1815*a* and as a consequence no pulse whatever is produced on this anode as each finder gate pulse ends.

The sharp negative pulse thus developed coincident with the leading edge of each finder gate pulse is utilized to effect discharging of the condenser 1811*a* just before this condenser is recharged to the amplitude of a new signal modulated multiplexer pulse gated to the circuit 208 by the calling line in gate circuit 207. In this regard it will be recalled that each multiplexer pulse delivered to the connector 12*b* over the conductor 50 occurs approximately at the center of a coincident finder gate pulse. Each negative pulse developed at the anode of the tube 1809*a* during the initial portion of a finder gate pulse is impressed upon the cathode of the discharging tube 1807*a* through the coupling condenser 1823*a*. Each such pulse has the effect of driving the cathode of the tube 1807*a* negative and thus effecting current conduction through this tube for the duration of the pulse. As a consequence, the condenser 1811*a* is permitted to discharge through the space current path of the tube 1807a for the duration of each pulse impressed upon the cathode of this tube. Immediately after the condenser 1811a is thus discharged during each finder gate pulse, a positive signal modulated multiplexer pulse is impressed upon the control grid of the charging tube 1808a through the condenser 1936 to recharge the condenser 1811a to the potential level which corresponds to the amplitude of the multiplexer pulse. So long as multiplexer pulses are thus impressed upon the control grid of the charging tube 1808a, the condenser 1811a is not fully discharged during any one condenser discharging interval, but is only discharged down to a predetermined level which insures that the amplitude of the immediately succeeding multiplexer pulse will be accurately reflected in the charge produced thereby on the condenser 1811a. It will thus be apparent that as the amplitude of the signal bearing multiplexer pulses impressed upon the control grid of the charging tube 1808a varies in accordance with intelligence, i.e., voice or other signals derived from the calling line 23, the voltage across the condenser 1811a is correspondingly varied to detect or reproduce the intelligence component of the multiplexer pulses.

During dialing at the calling substation A and more particularly during the open circuit or break period of each dial impulse, the flow of multiplexer pulses through the calling line in gate circuit 207 to the control grid of the charging tube 1808a is interrupted. However, the flow of finder gate pulses to the control grid of the peaker tube 1809a is not interrupted due the holding action of the +B switching circuit 201 embodied in the finder 12a. As a consequence, the discharging tube 1807a is periodically rendered conductive during the open circuit period of each dial impulse with the result that the condenser 1811a is fully discharged or is discharged down to a very low level. Thus, the circuit 208 is arranged to discriminate between directive dial impulses and supervisory signals on the one hand and voice signals on the other hand.

The bias voltage between the control grid and cathode of the charging tube 1808a is in part controlled by the voltage across the condenser 1811a, as will be evident from an inspection of the circuit. As a consequence, large variations in the signal input level to the circuit 208 tend to cause the operating bias voltage between the control grid and cathode of the tube 1808a to vary over a relatively wide range. To minimize such variations, a feed back circuit is provided between the cathode terminal 1820a of the tube 1806a and the control grid of the tube 1808a which comprises the bleeder resistors 1817a and 1818a and the crystal rectifier 1816a. With this arrangement, any increase in the amplitude of the pulses impressed upon the control grid of the tube 1808a produces a voltage rise across the condenser 1811a to increase the positive potential level of the cathode terminal 1820a of the tube 1806a. Due to the increase in the positive potential level of the terminal 1820a the return voltage for the rectifier 1816a is correspondingly increased to produce a corresponding decrease in the bias on the grid of the tube 1808a. Thus the change in grid to cathode voltage resulting from a large increase in the amplitude of the signal pulses delivered to the circuit 208 is held to a minimum. Similarly, when the signal pulse amplitude drops to a low value, the voltage across the condenser 1811a is correspondingly reduced and as a further result of the action of the feed back network, the bias potential level of the control grid in the tube 1808a is correspondingly increased. The described "boot strap" arrangement for maintaining the grid-cathode bias of the charging tube 1808a relatively constant over a wide signal input pulse amplitude range is not required in conjunction with the discharging tube 1807a since the grid to cathode voltage of the latter tube is not altered as a result of changes in the amplitude of the signal input pulses.

The signal voltages thus reconstructed across the condenser 1811a are positively impressed upon the control grid of the cathode follower tube 1806a to effect reproduction of the reconstructed signal voltage at both the anode terminal 1819a and the cathode terminal 1820a of this tube. More specifically, the voltage developed at the cathode terminal 1820a is an exact replica of the voltage across the condenser 1811a, whereas the voltage produced at the anode terminal 1819a of the tube 1806a is an inverted replica of the voltage across the condenser 1811a. Typical variations in the voltages developed at these two terminals of the tube 1806a during operation of the connector 12b to handle the described call routed from the substation A to the substation B are illustrated by the curves 48a and 48b illustrated in Fig. 48 of the drawings. As shown by the curve 48b the voltage developed at the cathode terminal 1820a is reduced to its normal on-hook value during the open circuit period of each dial impulse dialed at the calling substation A. By reference to the curve 48a it will be noted that the voltage at the anode terminal 1819a rises to its normal on-hook value during the open circuit periods of the same dial impulses. During voice signal transmission from the substation A over the line 23, the voice signals are reconstructed on an incremental or step-by-step basis so that the portion of the curves 48a and 48b representative of such signals are characterized by minute step-by-step variations. The signal voltages thus developed at the anode terminal 1819a of the tube 1806a are impressed upon the control grids of the tubes 940 and 1021 included in the tens and units sequence timing circuits 212 and 216, respectively, over the conductor 240. The signal voltage as reproduced at the cathode terminal 1820a of the tube 1806a is impressed upon the suppressor grid of the gating tube 1914 in the called line out gate circuit 224 over a path which includes the conductor 256 and the coupling condenser 2029. This same voltage is impressed upon the control grid of the dial pulse integrator circuit 209 over a path which includes the resistor 2027. It will thus be apparent that the signals developed at the calling substation A, including voice, switch directing and supervisory signals, are repeated negatively to the circuits 212 and 216 and are repeated positively to the circuits 224 and 209.

In considering the operation of the dial pulse integrator circuit 209, it is repeated that this circuit performs the function of increasing the discrimination between dial impulses and all other signals developed at the output side of the calling line reconstructor circuit 208. Normally, i.e., when the connector 12b is not occupied with a call, operating anode potential for the integrator tube 2008 is withheld from the tube in the +B switching circuit 201 of the finder 12a. Also under normal conditions, the control grid of the tube 2008 has a negative potential thereon which serves to bias the tube beyond cutoff. More specifically, this grid is connected to the junction point between the two bleeder resistors 2027 and 2027a which are bridges across the negative 100 volt bias potential source in series with the cathode resistor 1825a of the cathode follower tube 1806a. Thus the net voltage across the series connected resistors 1825a and 2027 is negatively applied to the control grid of the tube 2008 through the rectifier 2026. This voltage is sufficient to bias the tube 2008 beyond cutoff and thus prevent the tube from conducting when operating anode potential is applied to the tube anode from the conductor 12c through the resistor 2045.

Figure 48:
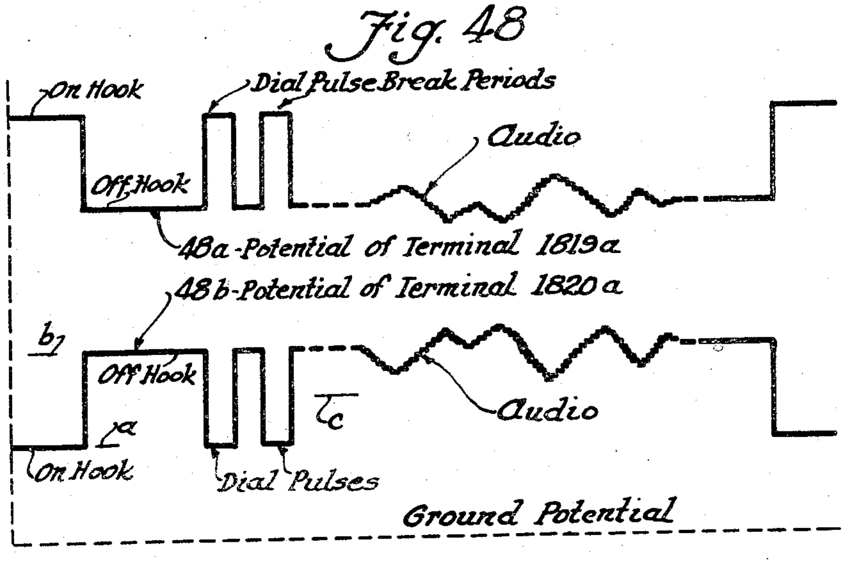

When the connector 12b is seized in the manner explained above, anode potential is impressed upon the integrator tube 2008 and the voltage across the cathode resistor 1825a rises substantially to the value *b* shown by the curve 48b in Fig. 48 of the drawings. This rise in voltage at the cathode terminal 1820a serves to reduce the bias on the control grid of the tube 2008 substantially to zero. As a consequence, the integrator tube 2008 starts to conduct heavily, thereby to produce a voltage drop across the resistor 2045 which prevents the condenser 2025 from charging to any appreciable extent.

During the open circuit or break period of each impulse dialed at the calling substation A, the voltage at the cathode terminal 1820*a* of the tube 1806*a* is reduced to its on-hook value *a* in the manner shown by curve 48b in Fig. 48, with the result that current conduction through the resistor 2045 and the space current path of the tube 2008 is interrupted. As a consequence, the condenser 2025 is charged through the resistor 2045 at a rate determined by the time constant of this resistance-capacitance circuit. When the open circuit period of the dial impulse ends, the potential of the cathode terminal 1820*a* rapidly rises to the value *b* as shown by the curve *48b*, thereby to reduce the bias on the control grid of the tube 2008 to zero and thus reinitiate current conduction through this tube. As a consquence, a low resistance discharge path through the tube 2008 is provided for the condenser 2025. Accordingly, the condenser discharges to a very low voltage. The described cycle is repeated during each impulse dialed at the calling substation, with the result that a series of saw-tooth voltage pulses are developed across the condenser 2025. The magnitude of each saw-tooth pulse is determined solely by the duration of the open circuit period of the corresponding dial impulse. Noise signals and hash developed at the output side of the reconstructor circuit 208 and more particularly at the cathode terminal 1820*a* of the tube 1806*a* during the open circuit periods of the dial impulses have no effect on the saw-tooth pulses produced across the condenser 2025 for the reason that during the dial break interval of each impulse the tube 2008 is biased beyond cutoff. Noise or voice signals and hash developed at the cathode terminal 1820*a* of the tube 1806*a* during the closed circuit or make periods of the dial impulses and before the dialing operation is completed are reduced in two ways. Thus, the rectifier 2026 prevents such signals of positive polarity which tend to drive the control grid of the tube 2008 positive relative to ground from reaching the control grid of the tube 2008. Signals and hash of negative polarity produced at the cathode terminal 1820*a* before the dialing operation is completed and during dial impulse make periods cannot produce a voltage build up across the condenser 2025 simulating that which occurs during the break period of a dial impulse because of the relatively high frequency of such signal energy and the very rapid discharging of the condenser 2025 through the tube 2008 during these intervals.

The saw-tooth voltage pulses developed across the condenser 2025 during the dialing operation at the calling substation are positively applied to the control grid of the cathode follower tube 2009 and hence are reproduced across the series connected cathode load resistors 2046, 2047 and 2048 of this tube. That portion of the voltage which is developed across the resistor 2048 is impressed upon the tens changeover gate circuit 210 over a path which includes the conductor 227 and the condenser 953. That portion of the saw-tooth voltage developed across the two series connected resistors 2047 and 2048 during impulsing is impressed upon the units start gate circuit 213 over a path which includes the conductor 228 and the condenser 1805. These voltages are obviously of different orders of magnitude and control the respective circuits 210 and 213 in the manner more fully described below.

In considering the manner in which the dial impulses reproduced by the dail impulse integrator circuit 209 during dialing of the first digit at the calling substation are repeated by the tens changeover gate circuit 210 to the tens digit register circuit 211, it is pointed out that normally the timing tube 942 of the tens sequence timing circuit 212 is non-conductive, such that no current traverses the cathode resistor 949 and hence the cathode terminal of this resistor is at ground potential. As a consequence, the crystal gating rectifier 905 is unbaised and hence is operative to repeat negative pulses to the grid of the inverter tube 902. Each saw-tooth pulse positively developed on the conductor 227 by the dial impulse integrator circuit 209 during an impulse dialed at the calling substation is differentiated in a circuit comprising the condenser 953 and the resistor 944 to produce a sharp negative pulse coincident with the start of each dial impulse make period. Each sharp negative pulse thus produced is impressed upon the grid resistor 906 through the gating crystal 905 and is thus applied to the control grid of the inverter tube 902 to decrease space current flow through this tube. As a consequence, the pulse is repeated as a positive pulse to the grid of the cathode follower tube 903 through the coupling condenser 902*a*. Each such positive pulse thus developed at the anode of the inverter tube 902 is also repeated to the control grid of the start tube 941 in the tens sequence timing circuit 212 over a path which includes the conductor 231 and the condenser 955. Each pulse thus applied to the control grid of the cathode follower tube 903 is reproduced as a positive pulse across the cathode load resistors 961 and 962 in series and is applied to the common cathode conductor 230 of the tens digit register 911. It will thus be understood that during the dialing of any tens digit, the tens changeover gate circuit 210 functions to repeat one short positive pulse to each of the tens sequence timing circuit 212 and the tens digit register circuit 211 coincidentally with the start of the make period of each dial impulse in the digit. In the particular call under consideration wherein the tens digit designation of the called line 32 is 3, three short positive pulses are repeated by the tens changeover gate circuit 210 to each of the circuits 211 and 212.

In considering the operation of the tens digit register 211 to register the numerical value of any tens digit dialed at a calling substation, it will be understood from the foregoing explanation that this register is driven by the large positive pulses delivered thereto by the cathode follower tube 903 of the tens changeover gate circuit 210. Specifically, the tubes of this register, other than the priming tube 904, are connected to operate as a pulse counting chain, wherein the cathodes of all of the tubes 901, 1002, 1003, etc., are all connected to the common driving conductor 230, the anodes are all returned through suitable anode resistors 901*f*, 1002*f*, 1003*f*, etc., to the switched +B conductor 12*c*, the anode of each tube is capacitively coupled to the control grid of the next succeeding tube through a suitable coupling condenser 901*b*, 1002*b*, 1003*b*, etc., and the control grid of each tube is normally biased to a predetermined level from a common bias potential source. More specifically, the control grids of the tubes 901, 1002, 1003, 1004, etc., are normally biased, following seizure of the connector 12*b*, to a predetermined positive potential from the common potentiometer 1151 which is connected between the switched +B conductor 12*c* and ground in series with a fixed resistor 1154. The potential extracted from this bias circuit and impressed upon the conductor 1152 common to the counting tubes is impressed upon the grids of these tubes through isolating resistors 921, 901*c*, 1002*c*, 1003*c*, etc., individual to the tubes. As explained above, immediately the connector 12*b* is seized the priming tube 904 is fired to develop a substantial voltage drop across the series connected cathode load resistors 961 and 962 of the tube 903 so that the cathodes of the ten counting tubes 901, 1002, etc., are raised to a relatively high positive potential which is substantially greater than the difference between the positive potentials impressed upon the control grids of these tubes over the conductor 1152 from the potentiometer 1151 and the positive grid bias required to cause tube ionization. Thus the control grid of each counting tube is effectively biased below ignition potential with respect to the tube cathode immediately the connector 12*b* is seized and the priming tube 904 fires.

As previously explained, when the connector 12*b* is seized through the application of operating anode potential to the switched +B conductor 12c, the priming tube 904 is immediately fired to produce a voltage drop across the cathode load resistors 961 and 962 of the tube 903 which prevents ionization of the counting tubes in the tens digit register circuit 211. It is also explained above that during the dialing of the tens digit, a large positive pulse is developed across the two cathode load resistors 961 and 962 at the start of the closed circuit or make period of each impulse. The first such pulse to appear across the two resistors 961 and 962 raises the positive potential of the common cathode conductor 230 and hence the cathode potential of the priming tube 904 to a value approximately equal to or greater than the anode potential of this tube, with the result that space current flow through the tube is interrupted. The large increase in the positive potential of the common cathode conductor 230 which occurs during the pulse also prevents any of the ten counting tubes of the register circuit 211 from firing. Immediately space current flow through the priming tube 904 is interrupted, the voltage drop across the anode resistor 909 disappears. As a result, the control grid potential of the tube 901 rises immediately and starts to decay at a rate determined by the time constant of the coupling circuit provided between the anode of the priming tube 904 and the control grid of the tube 901 and consisting of the coupling condenser 920 and the grid resistor 921. The time constant of this circuit is long enough to hold the grid of the tube 901 considerably above its normal positive potential level after the described cathode driving pulse has terminated. Upon termination of the cathode driving pulse, the positive potential of the conductor 230 drops sharply and this potential drop coupled with the sustained increase in the positive potential of the control grid of the tube 901 causes the tube to fire. The resulting space current flow through this tube produces an increased current flow through the resistors 961 and 962 which again raises the positive potential level on the common cathode conductor 230. Simultaneously, a voltage drop is produced across the anode resistor 901f of the tube 901 which lowers the positive potential on the control grid of second counting tube 1002. The described potential level changes on the control grid and cathode of the tube 1002 coact to prevent this tube from firing. To summarize, it will be apparent that when the first pulse appears across the cathode load resistors 961 and 962 at the end of the open circuit period of the first impulse dialed at the calling substation, the priming tube 904 is deionized and the first counting tube 901 is fired to register the dial impulse.

The second impulse of the first or tens digit dialed at the calling substation results in the appearance of a second large positive pulse on the common cathode conductor 230. The resulting rise in the positive potential of the common cathode conductor 230 serves to extinguish space current flow through the first counting tube 901 and to bias all of the counting tubes against ionization. Immediately space current flow through the tube 901 is arrested, current flow through the anode resistor 901f ends to increase the positive control grid potential of the second counting tube 1002 through the coupling network comprising the condenser 901b and the grid resistor 901c. Here again, the time constant of the described coupling circuit is long enough to maintain the control grid potential of the tube 1002 at a relatively high positive level after the positive pulse on the common cathode conductor 230 subsides. Accordingly, when the second pulse on the conductor 230 ends, the second counting tube 1002 is fired to produce space current flow therethrough which in traversing the anode resistor 1002f and the resistors 961 and 962 prevents ionization of the other counting tubes in the register circuit 211. It will thus be apparent that the second impulse of the first digit dialed at the calling substation has the effect of extinguishing space current flow through the first counting tube 901 and firing the second counting tube 1002 to register the two impulses of the digit.

The manner in which one or all of the remaining eight counting tubes of the tens digit register 211 are successively fired as additional impulses of a given tens digit are dialed at the calling substation will be fully apparent from the explanation just given. Since this register circuit comprises ten counting tubes, it will be understood that the circuit is capable of registering the numerical value of any digit comprising from one to ten impulses. In the particular call under consideration wherein the called line 32 has a tens digit designation of 3, the third counting tube 1002 will of course be ionized in response to the third impulses of the digit and will remain conductive for the duration of the call. All other counting tubes of the tens digit register 211 remain non-conductive for the duration of the call.

Referring now more particularly to the manner in which the counting tubes of the tens digit register 211 selectively control the gating crystal rectifiers 901d, 1002d, 1003d, 1004d, etc., to gate to the connector pulse forming circuit 217 only those tens pulses which occur in the tens time pulse position assigned to a particular called line, it is first pointed out that when the link 12 is not in use, the described rectifiers have no biasing potentials impressed upon the electrodes thereon. Specifically, the cathode terminals of these rectifiers are all connected to the +B switching conductor 12c over paths individual thereto. Thus the cathode terminal of the pulse gating rectifier 1003d associated with the third counting tube 1003 is connected to the conductor 12c through the resistors 1003a and 1003f. The anode terminals of the rectifiers are commonly connected to the +B switching conductor 12c through the resistor 1153. Thus the anode and cathode terminals of each of the identified pulse gating rectifiers are both connected to the same conductor and are at the same potential. With negative tens gating pulses being sequentially applied to the conductors 33a, 33b, 33c, etc., from the tens pulse ring circuit 21, these pulses are sequentially impressed on the cathode terminals of the tens pulse gating rectifiers through the coupling condensers 901e, 1002e, 1003e, etc. As a consequence, each crystal conducts each pulse impressed thereon until the associated coupling condenser is charged to the peak potential of the pulses impressed on the cathode terminal thereof. Thus with the connector 12b inactive, the gating rectifier 1003d passes tens pulses impressed upon the cathode terminal thereof through the condenser 1003e until this condenser is charged to the peak pulse value. When the condenser 1003e is thus charged, it holds its charge during the off pulse periods and the resulting voltage thereacross serves to bias the rectifier 1003d against current conduction. It will thus be apparent that when the connector 12b is in active, all ten of the pulse gating rectifiers 901d, 1002d, 1003d, etc., are biased against pulse transmission therethrough. As a consequence, the tens pulses sequentially developed on the conductors 33a, 33b, 33c, etc., are prevented from appearing on the pulse output conductor 232 of the register circuit 211. The same condition exists after the finder 12a functions in the manner explained above to impress operating anode potential upon the +B switching conductor 12c incident to seizure of the link 12, except that the described coupling condensers 901e, 1002e, 1003e, etc., become charged to the positive level of the potential impressed upon the conductor 12c plus the peak potential value of the pulses appearing on the conductors 33a, 33b, 33c, etc. In other words, the gating rectifiers 901d, 1002d, 1003d, etc., remain biased against tens pulse transmission therethrough after the link 12 is seized but before the dialing operation is started at the calling substation.

At the end of the first digit dialed at the calling substation A, the counting tube 1003 is ionized in the manner pointed out above. As a consequence, the anode potential of this tube is decreased to a value lower than the positive potential of the +B switching conductor 12*c*. The resulting polarity reversal of the potentials on the anode and cathode terminals of the gating rectifier 1003*d* biases this rectifier conductive, thereby to cause current flow therethrough over a path which extends from the conductor 12*c* by way of the resistor 1153, the rectifier 1003*d*, the resistor 1003*a*, the space current path of the tube 1003 and the resistors 961 and 962. Thus the rectifier 1003*d* is biased to permit tens pulse transmission therethrough. As a consequence, negative tens pulses appearing on the conductor 33*c* in the third tens pulse position of each pulse frame are gated by the rectifier 1003*d*, appear on the pulse output conductor 232 of the circuit 211, and are impressed upon the connector pulse forming circuit 217. Current flow through the resistor the resistor 1153 and the rectifier 1003*d* also has the effect of lowering the potential on the common anode terminal conductor of the ten rectifiers 901*d*, 1002*d*, 1003*d*, etc., to a value such that the other nine rectifiers are almost completely nonconductive. As a result, only the third tens pulse of each pulse frame is permitted to appear on the pulse output conductor 232 along with slight base line disturbances caused by the other nine tens pulses of each pulse frame. Thus, it will be understood that in the particular case under consideration the tens digit register 211 is controlled in accordance with the numerical value of the tens digit 3 dialed at the calling substation to select the third tens pulse of each pulse frame for transmission to the connector pulse forming circuit 217.

Referring now to the manner in which dial tone signal transmission to the calling substation is terminated when the dialing operation is started at this substation, it is pointed out above that the priming tube 904 of the tens digit regiser 211 is deionized in response to dialing of the first impulse of the first digit at the calling substation. When current flow through this tube and the resistors 961 and 962 is thus arrested, the voltage drop across these two resistors is substantially decreased to decrease the positive potential level on the common cathode conductor 230. This potential decrease is thereafter maintained since the magnitude of current flow through any one of the ten cold cathode counting tubes 901, 1002, 1003, etc., is appreciably lower than the current flow through the hot cathode priming tube 904. When the positive potential level on the conductor 230 is thus reduced, the negative bias on the control grid of the dial tone gate tube 2003 rises to a value well beyond cutoff value of this tube, thereby to render the tube nonconductive. As a consequence, the tube is blocked against repeating the dial tone signal continuously developed on the conductor 47 by the dial tone generator 29*c* to the calling line out gate circuit 226. Thus, dial tone signal transmission to the calling substation is arrested.

Referring now more particularly to the tens sequence timing circuit 212, it is again pointed out that this circuit controls the tens changeover gate circuit 210 and the units start gate circuit 213 in such manner that the pulses developed during dialing of the first digit are directed to the tens digit register 211 in the manner just explained, the tens digit register 211 is rendered inactive at the end of the first digit, and the pulses developed during dialing of the second digit are directed to the units digit register 215. To these ends, the control grid potential of the discharge tube 940 embodied in the tens sequence timing circuit 212 is controlled in accordance with the potential at the anode terminal 1819*a* of the calling line reconstructor circuit 208 and the control grid potential of the start tube 941 is coupled to receive positive pulses delivered thereto from the anode of the inverter tube 902 in the manner explained above. Before describing the operation of the timing circuit 212 to perform the indicated functions, it is pointed out that normally the control grid of the tube 940 is biased to the ground potential level from a biasing circuit which includes the resistor 943, the conductor 240, the resistor 1827*a* and the resistor 1828*a*. However, when the potential level of the tube anode terminal 1819*a* is reduced to the off hook value shown in Fig. 48 in response to seizure of the link 12, the accompanying increase in the voltage across the anode resistor 1828*a* has the effect of increasing the bias on the control grid 940 in a negative sense until this tube is biased beyond cutoff. Normally the start tube 941 is deionized, the control grid of this tube being biased to a high negative value by the potential supplied thereto from a bleeder circuit consisting of the two resistors 963 and 964. The timing tube 942 is also normally deionized.

In considering the operation of the timing circuit 212, it will be recalled from the preceding description of the tens changeover gate circuit 210 that during the first impulse of the first digit dialed at the calling substation, a large positive pulse is impressed upon the conductor 231 at the anode of the inverter tube 902. This pulse as impressed upon the control grid of the start tube 941 through the condenser 955 has the effect of firing this tube, following which the control grid of the tube loses control in the usual manner. When current conduction through the tube 941 is thus established, the voltage drop through the tube drops to a very low value, so that substantially the full voltage of the +B switching conductor 12*c* appears across the cathode resistor 965 of this tube. Specifically, approximately 130 volts of the available 140 volt potential appears across the resistor 965. This voltage is impressed upon the condenser 948 through the resistor 947 and also across the space current path of the discharge tube 940. Concurrently with firing of the start tube 941, the positive potential level of the terminal 1819*a* in the calling line reconstructor circuit 208 rises to the on hook value shown by the curve 48*a* in Fig. 48 of the drawings. As a consequence, the tube 940 is rendered conductive so that the anode-cathode space current path thereof acts as a low resistance shunt across the condenser 948. Accordingly, the voltage across the cathode resistor 965 is prevented from charging the condenser 948 to any appreciable extent. However, when the open circuit period of the dial impulse ends, the potential level of the terminal 1819*a* drops to the off hook value indicated by the curve 48*a* in Fig. 48 with the result that the tube 940 is again biased beyond cutoff and the anode-cathode resistance of the tube rises to a very high value. As a consequence, the condenser 948 starts to charge up to the voltage across the cathode resistor 965 at a rate determined by the time constant of the circuit consisting of this condenser and the charging resistor 947. By suitably proportioning the capacitance and resistance values of these two circuit elements, the time constant of the circuit is made long enough so that the potential at the upper terminal of the condenser 948 does not rise to a sufficiently high positive value to effect ionization of the timing tube 942 during the closed circuit period of a dial impulse. Immediately the open circuit period of the second impulse starts, the potential level of the terminal 1819*a* again rises to its on hook value to render the discharge tube 940 conductive, with the result that the condenser 948 is rapidly discharged through the tube 940 to a very low voltage. It will thus be understood that during the arrival of successive impulses of the first digit at the connector 12*b*, the discharge tube 940 is controlled by the calling line reconstructor circuit 208 to prevent the condenser 948 from charging to a level at which firing of the timing tube 942 can occur.

In the specific call considered in the preceding description, i.e., that initiated at the substation A and intended for the substation B, the first digit comprises three impulses with the result that the tube 940 functions to discharge the condenser 948 twice. However, at the end of the third impulse and during the interdigit pause between the first and second digits which is of substantially greater duration than the closed circuit period of each dial impulse, the condenser 948 is permitted to charge through the resistor 947 to substantially the full voltage across the resistor 965. As a result, the control grid potential of the tube 942 is driven positive to a value at which ionization of this tube occurs. Once, the tube 942 is thus fired, the control grid thereof loses control. It will be understood, therefore, that at the end of the first digit dialed at the calling subtsation the two tubes 941 and 942 are both ionized and remain conductive for the duration of the call.

When current conduction through the tube 942 is initiated in the manner just explained, the resulting current flow through the resistors 968 and 949 has the effect of decreasing the positive potential level of the tube anode and increasing the positive potential level of the tube cathode. The positive potential developed at the cathode terminal of the resistor 949 is impressed upon the cathode terminal of the crystal rectifier 905 over a path which includes the decoupling resistors 946 and 944 and the conductor 234. This potential serves to bias the rectifier 905 against current conduction therethrough. As a result, further pulses developed across the cathode load resistors of the tube 2009 in the dial impulse integrator circuit 209 during dialing of the second and any additional digits at the calling substation are blocked against transmittal through the tens changeover gate circuit 210 to the tens digit register 211. The potential developed at the anode of the tube 942 is impressed upon the cathode terminal of the pulse gating rectifier 1803 in the units start gate circuit 213 over a path which includes the resistors 967 and 969 and the conductor 235. When the timing tube 942 fires to decrease the potential at the anode of the tube 942, the polarity of the voltage across the rectifier 1803 is reversed to render this rectifier conductive and thus condition the same to transmit pulses through the gating rectifier 915 to the control grid of the inverter tube 912 in the units changover gate circuit 214 during the dial of the second digit at the calling substation. Thus the tens sequence timing circuit 212 operates during the interdigit pause separating the first and second digits to block the tens changeover gate circuit 210 against repeating pulses to the tens digit register 211 during dialing of the second digit and to condition the units start gate circuit 213 to repeat pulses to the units changeover gate circuit 214 during the second digit.

As indicated above, the purpose of the units start gate circuit 213 is that of preventing the positive pulses developed across the load resistors 2047 and 2048 of the dial impulse integrator circuit 209 during dialing of the first digit at the calling substation from reaching the control grid of the inverter tube 912 in the units changeover gate circuit 214. To this end, the anode terminal of the gating rectifier 1803 is, following seizure of the connector 12*b*, biased to a positive potential of approximately 31 volts from a bleeder circuit consisting of the resistors 1801 and 1804 connected in series between the +B switching conductor 12*c* and ground. The cathode potential of the crystal rectifier 1803, on the other hand, is maintained at a potential of approximately 75 volts positive with respect to ground, this potential being impressed thereon over a path including the conductor 235 and the resistor 969 from a bleeder circuit consisting of the resistors 966, 967 and 968 connected in series between the negative terminal of the bias potential source and the +B switching conductor 12*c*. Thus the crystal rectifier 1803 is biased against pulse transmission therethrough following seizure of the connector 12*b* and throughout dialing of the first digit at the calling sub-station. When the timing tube 942 is rendered conductive at the end of the first digit in the manner explained above, the potential on the cathode terminal of the rectifier 1803 is reduced to a value of approximately five volts positive with respect to ground, thereby to reverse the polarity of the voltage across this rectifier and thus render the rectifier operative to transmit pulses therethrough.

During dialing of the second digit, the positive sawtooth pulses developed across the load resistors 2047 and 2048 of the dial impulse integrator circuit 209 at the rate of one such pulse for each dial impulse are each differentiated in a differentiating circuit comprising the condenser 1805, the conductor 235 and the resistor 969, and then gated by the rectifier 1803. The resulting sharply defined negative pulses are impressed upon the control grid of the inverter tube coincident with the trailing edges of the saw-tooth pulses produced by the dial impulse integrator circuit 209 over a path which includes the conductor 241 and the crystal rectifier 915.

In general, the operation of the units changeover gate circuit 214 to repeat pulses representative of the impulses of the second digit to the units digit register 215 is the same as the operation of the tens changeover gate circuit 210 to repeat the pulses representative of the impulses of the first digit to the tens digit register 211. More specifically considered, the right anode terminal of the crystal rectifier 915 is normally at ground potential by virtue of the conductive path to ground afforded by the grid resistor 916. The cathode terminal of the rectifier 915, on the other hand, is biased slightly negative with respect to ground by virtue of the negative potential impressed thereon over the conductor 241 and through the resistor 1941 from a bleeder circuit consisting of the series connected resistors 1028, 1051 and 1053. This slight negative bias on the cathode terminal of the rectifier 915 renders the rectifier more heavily conductive and hence prevents this element from unduly attenuating the pulses transmitted therethrough to the control grid of the inverter tube 912. Higher pulse voltage input to the circuit 213 and less attenuation through the rectifier 915 are required in the case of the pulses representative of the impulses of the second digit, since these pulses are required to traverse an additional gating rectifier 1803 and an added coupling condenser 1802 during transmission from the circuit 209 to the circuit 214. Each negative pulse impressed upon the amplifier and inverter tube 912 through the pulse gating rectifier 915 during dialing of the second digit at the calling substation is amplified and inverted by this tube and impressed upon the control grid of the cathode follower tube 913 through the coupling condenser 971. The resulting positive pulses developed across the cathode load resistors 969*a* and 970 of the tube 913 are impressed upon the common cathode conductor 236 of the units digit register 215 to drive this register in the manner described below. The positive pulses developed at the anode of the amplifier and inverter tube 912 are impressed upon the control grid of the start tube 1020 in the units sequence timing circuit 216 over a path which includes the conductor 237 and the coupling condenser 972. Thus the pulses transmitted to the units changeover gate circuit 214 during the dialing of the second digit at the calling substation are repeated by this gate circuit both to the units digit register 215 and the units sequence timing circuit 216.

The manner in which the units digit register 215 responds to the pulses repeated thereto by the units changeover gate circuit 214 is exactly the same as the above-described response of the tens digit register 211 to the pulses repeated thereto by the tens changeover gate circuit 210. From this explanation, it will be understood that the first positive pulse, i.e., that representative of the first dial impulse of the second digit, developed across the load resistors 969*a* and 970 has the effect of extinguishing current flow through the priming tube 914, and that at the end of the pulse the first counting tube 911 is fired. It will also be understood that if successive pulses each representative of another dial impulse are developed across the load resistors 969*a* and 970, the counting tubes of the units digit register 215 are ionized in sequence at the rate of one counting tube for each dial impulse. Thus the second pulse produced across the load resistors 969*a* and 970 has the effect of extinguishing the counting tube 911 and causing the second counting tube 1012 to fire, the third pulse to appear across the resistors 969*a* and 970 has the effect of deionizing the second counting tube 1012 and causing the third counting tube 1013 to fire, and so on. In the particular call under consideration, i.e., that involving the substation B as the called substation, wherein the numerical value of the second digit is 2, the second counting tube 1012 remains conductive at the end of the digit. With this tube conducting, the polarities of the potentials respectively impressed upon the anode and cathode terminals of the pulse gating rectifier 1012*d* are such that this rectifier is rendered operative to transmit negative units pulses appearing on the units pulse conductor 30*b* over the conductor 245 to the connector pulse forming circuit 217. Since the second counting tube 1012 of the units digit register 215 remains conductive for the duration of the call, negative units pulses developed on the conductor 30*b* by the units pulse ring circuit 20 are likewise gated to the connector pulse forming circuit 217 through the crystal 1012*d* for the duration of the call.

Referring now more particularly to the units sequence timing circuit 216, it will be recalled that this circuit is provided to block the units changeover gate crcuit 214 against pulse transmission therethrough after the second digit is terminated. It also performs certain other functions described more fully below including that of initiating the line busy test operation, i.e., the operation of testing the time position of the selected called line to determine whether the line is idle or busy. In general, the circuit 216 operates in exactly the same manner as the tens sequence timing circuit 212. Thus the discharge tube 1021 is controlled in parallel with the discharge tube 940 from the anode terminal 1819*a* of the calling line reconstructor circuit 208 over the conductor 240 so that it is only rendered conductive during the open circuit period of each impulse dialed at the calling substation. Due to the action of the units start gate circuit 213 to prevent pulses from reaching the control grid of the amplifier and inverter tube 912 while the first digit is being dialed at the calling substation, no pulses are impressed upon the control grid of the start tube 1020 during this digit. However, the first pulse repeated by the tube 912 during the second digit is applied to the control grid of the start tube 1020 over the coupling path comprising the conductor 237 and the condenser 972 and has the effect of firing the tube 1020. After this tube fires to produce a large voltage drop across its cathode load resistor 1054, the discharge tube 1021 responds to the pulses repeated thereto from the anode terminal 1819*a* of the cathode follower tube 1806*a* in the calling line reconstructor circuit 208 to prevent the condenser 1027 from charging to a potential which will effect firing of the timing tube 1022 until after the digit is ended. However, when the second digit ends to end the transmission of pulses to the control grid of the discharge tube 1021 from the calling line reconstructor circuit 208, the condenser 1027 charges through the resistor 1026 to the voltage across the resistor 1054 and in so doing drives the grid of the timing tube 1022 sufficiently positive to cause this tube to fire. When the tube 1022 is thus rendered conductive, the resulting heavy current flow through the cathode load resistors 1052 and 1053 thereof has the effect of raising the positive potential of the tube cathode to a value of approximately 130 volts to materially increase the positive potential level of the junction point between the two resistors 1052 and 1053. As a consequence of the increased voltage drop across the resistor 1053, the cathode terminal of the rectifier 915 is driven positive relative to the rectifier anode terminal over the described biasing path comprising the resistors 1051 and 1941 and the conductor 241, thereby to bias this rectifier against further pulse transmission therethrough. It other words, the rectifier 915 is biased to prevent any further signals of whatever charcter developed at cathode resistors 2047 and 2048 of the tube 2009 from reaching the control grid of the amplifier and inverter tube 912. The positive potential developed at the cathode terminal of the timing tube 1022 incident to firing of this tube is impressed upon the circuits 217, 218 and 219 over a path which includes the resistor 1055 and the conductor 242. Since the two tubes 1020 and 1022 remain conductive for the duration of the call, it will be understood that the positive control potential impressed upon the conductor 242 remains on this conductor until the connector 12*b* is released, and further that the crystal rectifier 915 remains blocked against signal transmission therethrough for the duration of the call.

Referring now more particularly to the connector pulse forming circuit 217, it will be recalled that this circuit is provided to combine the selected tens pulse gated by the tens digit register 211 with one of the units pulses gated by the units digit register 215 to form a single connector pulse which occurs in the time position of each pulse frame assigned to the called line. The connector pulses thus formed are utilized to control the busy test circuit 218, the busy gate circuit 220, the called line in gate circuit 223 the called line reconstructor circuit 222, and the called line out gate circuit 224 in the performance of the functions respectively assigned to these circuits. Operation of the connector pulse forming circuit 217 may best be explained by reference to the particular call considered throughout this specification, namely the call originating at the substation A and intended for the substation B. In this case and as explained above, the tens digit register 211 is controlled by the first digit dialed at the calling substation to select the third tens pulse 74*a* of each pulse frame and to gate this pulse over the the conductor 232 to the connector pulse forming circuit 217. The units digit register 215 is controlled by the second digit dialed at the calling substation to select the 2nd, 12th, 22nd, etc., units pulses 63*a*, 63*b*, 63*c*, etc., of each pulse frame and to gate these pulses over the conductor 245 to the connector pulse forming circuit 217.

Normally both of the pulse combining tubes 1023 and 1024 are heavily conductive by virtue of the positive potentials impressed upon the control grids thereof through the current limiting resistors 1029 and 1030 respectively. The inverter tube 1161 is also normally heavily conductive by virtue of the positive potential impressed upon the control grid thereof through the current limiting resistor 1185. The clipping tube 1025, on the other hand, is normally biased beyond cutoff by the bias potential impressed upon the control grid thereof from the potentiometer 1033 through the resistor 1056. This potentiometer is included in a bleeder circuit which also comprises the resistors 1034 and 1055 and the cathode load resistors 1052 and 1053, those five series connected resistors being connected in series between the grounded terminal of the bias potential source and the negative terminal of this source. Thus the clipping tube 1025 is normally biased against repeating connector pulses to the inverter tube 1161. When, however, the timing tube 1022 is rendered conductive to produce a large voltage drop across the cathode load resistors 1052 and 1053 of this tube the bias level on the control grid of the clipping tube 1025 is reduced to render this tube pulse conductive in the manner more fully explained below.

In considering the operation of the circuit 217, it is first pointed out that the clipping circuits respectively comprising the crystal rectifiers 1036 and 1037, the resistors 1038 and 1040, the condensers 1039 and 1041, the resistors 1029 and 1030 and the grid-cathode paths of the tubes 1023 and 1024 function to clip the positive parts of the waves, including base line "hash," from the signals received from the two registers 211 and 215, so that the two tubes 1023 and 1024 will amplify and reproduce only the chosen tens and units pulses at the output sides thereof. Base line "hash" is made up of two principal components, namely noise components from the gas tubes included in the two registers 211 and 215 and noise components resulting from partial leakage of unwanted tens and units pulses through the gating crystal rectifiers respectively controlled by the tens and units digit register tubes due to lack of sufficient back resistance through these rectifiers. This "hash," if allowed to pass through the connector pulse forming circuit 217, would continue through the system and be reproduced as noise by the telephone receiver at the called substation. The manner in which the described clipping circuits function to prevent the base line "hash" of the signals produced on the conductors 233 and 245 from being reproduced at the output sides of the pulse combining tubes 1023 and 1024 is explained more fully below with reference to Figs. 49 to 53, inclusive, of the drawings.

The pulse combining tubes 1023 and 1024 function to combine the selected tens pulse with one of the ten selected units pulses of each pulse frame through the use of a common anode circuit including a common load resistor 1031. Specifically, each negative tens pulse appearing on the conductor 232 has the effect of biasing the tube 1023 beyond cutoff and thus arresting space current flow through the tube 1023 for the duration of the pulse. Similarly, each negative units pulse gated to the conductor 245 by the register 215 has the effect of cutting off space current flow through the tube 1024. By utilizing pulses of sufficient amplitude to drive the tubes 1023 and 1024 beyond cutoff, any noise components on the tops of the pulses are clipped off and are not reproduced at the output sides of these tubes. It will thus be understood that space current flow through the tube 1023 is cut off during the third tens time position of each pulse frame whereas space current flow through the tube 1024 is cut off during the 2nd, 12th, 22nd, 32nd, etc., units pulses of each pulse frame. As a consequence, the potential at the common anode terminal 1057 of the two pulse combining tubes is varied in the exact manner shown by the curve A in Fig. 44 of the drawings except for the relative time positions of the pulses.

All of the pulses developed at the common anode terminal 1057 are impressed upon the control grid of the clipping tube 1025 through the coupling condenser 1032. After the timing tube 1022 has fired to decrease the negative bias on the control grid of the clipping tube, this tube is biased beyond cutoff by a value just exceeding the amplitude of the tens and units pulses alone in the manner generally illustrated by the curve B in Fig. 44 of the drawings. Thus only the units pulse portion of each composite pulse has the effect of driving the grid of the tube 1025 into the conductive region of the tube. In other words, the clipping tube 1025 is controlled to draw current only during the units pulse period of each composite pulse developed at the common anode terminal 1057. This pulse period obviously occurs in the time position assigned to the called line, i.e., the time position *63c* in the particular call under consideration. Thus connector pulses occurring in the time position assigned to the called line are developed as negative pulses at the anode of the clipping tube 1025 at a rate of one pulse for each pulse frame. At this point, the importance of biasing the clipping tube 1025 substantially beyond cutoff to prevent pulses from being developed at the anode thereof until after the second digit ends becomes apparent. Thus the tens pulses gated by the tens digit register 211 are reproduced at the anode of the tube 1023 immediately the first digit ends and before the second digit is dialed. Moreover, during the dialing of the second digit, units pulses are successively gated to the connector pulse forming circuit 217 by the gating circuits respectively controlled by the tubes 911, 1012, 1013, etc., as the first, second, third, etc., impulses of the second digit are dialed into the connector 12b. These units pulses are, of course, combined with the tens pulses gated to the circuit 217 from the tens digit register 211 and, but for the heavy bias potential on the control grid of the tube 1025, would be reproduced at the anode of this tube to cause trouble in the circuits controlled by the connector pulse forming circuit 217. However, by blocking the tube 1025 against pulse reproduction until after the second digit is ended, the connector pulse forming circuit 217 is prevented from developing connector pulses until both the tens and units time positions designating the called line are fully selected.

The connector pulses produced at the anode of the tube 1025 in the manner just explained are of negative polarity. They are impressed upon the control grid of the amplifier and inverter tube 1161 through the coupling condenser 1035 and appear in amplified form as positive pulses at the anode of this tube. Thus each pulse serves to decrease current flow through the anode resistor 1187 and the peaking coil 1186, thereby to increase the positive potential level at the anode of the tube 1161. The coil 1186 is tuned to resonance at a frequency of approximately 5 megacycles and is provided to prevent distortion of the connector pulses as reproduced at the anode of the tube 1161. These connector pulses are distributed over the conductor 239 to the called line in gate circuit 223, the called line out gate circuit 224, the busy test circuit 218, the busy gate circuit 220, and the called line reconstructor circuit 222.

In order to explain the manner in which the clipping circuits respectively comprising the rectifiers 1036 and 1037 function to clip base line "hash" from the tens and units pulses reproduced at the anodes of the pulse combining tubes 1023 and 1024, reference is made to Figs. 49 to 53, inclusive, of the drawings. Aside from the constants of the circuit components embodied in the two clipping circuits, these circuits are identical. Accordingly, the operation thereof will be explained with reference to the clipping circuit comprising the rectifier 1036. The voltage input $E_{in}$ to this circuit is graphically illustrated in Fig. 50 as being a positive voltage which is decreased from the value $E_1$ to the value $E_2$ for the interval $t_1$ of each tens pulse 74a gated by the rectifier 1003d. Successive pulses are separated by the interval $t_2$. The voltage $E_{in}$ is impressed upon the clipping circuit comprising the rectifier 1036, which is shown in equivalent form in Fig. 49. In the equivalent circuit there shown, the control grid and cathode of the tube 1023 are disclosed as a diode rectifier $D_2$ and the crystal rectifier 1036 as a diode rectifier $D_1$. The other components shown in Fig. 49 will be readily identified as components of the pulse combining circuit 217 by reference to Fig. 10 of the drawings.

Figure 49:
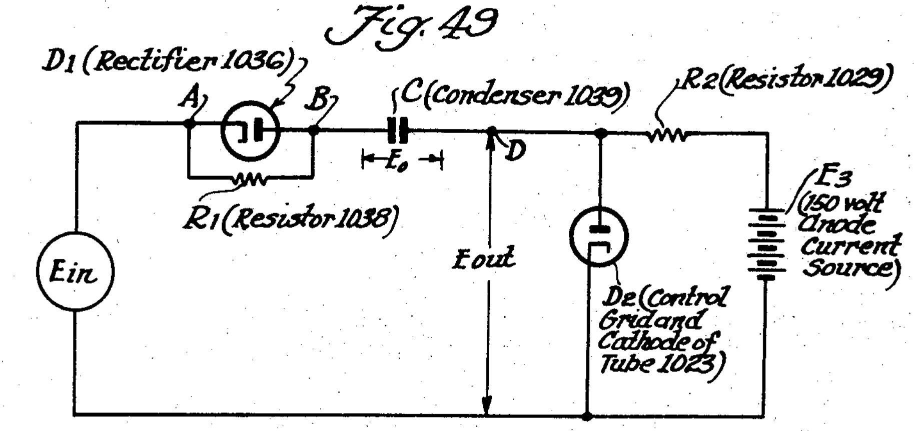
Figure 50:
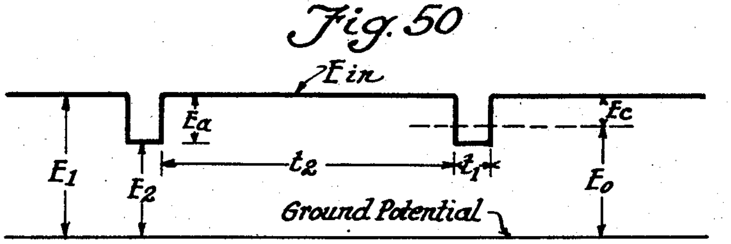

Referring now more particularly to Figs. 49 and 50, it may first be assumed that when $E_{in}$ has the value $E_1$, $E_{out}$ is zero if the diode $D_2$ is also assumed to be a perfect diode such that it passes current from the source $E_3$ through the resistor $R_2$ to ground and has no appreciable voltage drop thereacross. With this condition prevailing, current flows from the circuit point A through the resistor $R_1$ to the circuit point B and thence through the condenser C to charge the condenser. Moreover, if sufficient time elapses with this condition undisturbed, the condenser C will charge to the voltage level $E_1$, at which time current flow through the condenser C is arrested.

Assume now that after the condenser C has charged to a voltage $E_0$ equal to $E_1$, the voltage $E_{in}$ is suddenly changed to the value $E_2$ at the start of a tens pulse 74a in the manner shown in Fig. 50. When this occurs, the voltage $E_0$ exceeds the voltage $E_{in}$ so that the diode $D_1$, which has no appreciable resistance in the forward direction, is rendered conductive to bring the circuit point B down to the voltage level $E_2$. At this instant the circuit point D is at a potential lower than the voltage level $E_2$ by an amount $E_0$ or $E_1$ equal to the voltage drop across the condenser C. This brings the circuit point D to a potential level of $E_2-E_1=-A$ volts. Thus the polarity of the voltage across the diode $D_2$ is reversed to stop current conduction through this diode. In other words, the control grid of the tube 1023 is driven negative relative to the tube cathode to stop grid current flow through the tube at the beginning of the pulse.

So long as the tens pulse persists the input voltage $E_{in}$ remains at the value $E_2$. During this interval, the condenser C discharges to ground through the diode $D_1$ and the impedance of the source $E_{in}$. If the pulse interval $t_1$ were sufficiently long, the condenser C would discharge to a voltage $E_0$ equal to the voltage $E_2$, at which time the diode $D_2$ would again start to conduct current from the source $E_3$ and the input voltage $E_{in}$ would just balance the condenser voltage $E_0$. Should this occur, the voltage $E_{out}$ would again be reduced to zero. If the voltage $E_{in}$ should now change from the value $E_2$ back to the value $E_1$, the condenser C would recharge through the resistor $R_1$ and the diode $D_2$ back to the voltage level $E_1$.

Figure 51:
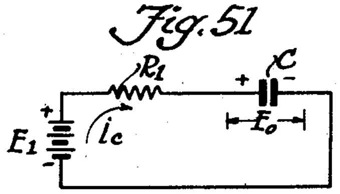
Figure 52:
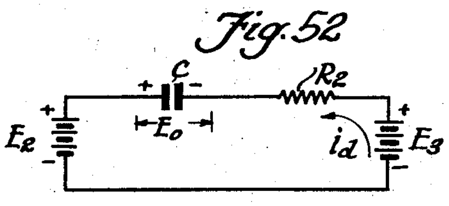

Assume now that the input voltage $E_{in}$ changes on a repetitive basis and in the manner shown in Fig. 50 from the value $E_1$ to the value $E_2$ and back to the value $E_1$ so rapidly that the change on the condenser C and hence the voltage $E_0$ thereacross does not have time to change appreciably. Under this assumption the problem resolves itself to one of finding out whether the voltage $E_0$, which exists when the repetitively pulsed input voltage $E_{in}$ is applied to the circuit, can be made to assume an equilibrium value somewhere between the values $E_1$ and $E_2$. To solve this problem reference is made to the equivalent circuits shown in Figs. 51 and 52, which show the conditions existing in the circuit of Fig. 49 when the input voltage $E_{in}$ has the values $E_1$ and $E_2$, respectively. Referring to Figs. 51 and 52, if $E_1$, $E_2$, $E_3$, and the condenser voltage $E_0$ does not change appreciably during the intervals $t_2$ and $t_1$, then (1) $$i_c=\frac{E_1-E_0}{R_1}$$

and (2) $$i_d=\frac{E_3+E_0-E_2}{R_2}$$

and the charges entering and leaving the condenser C during these intervals are as follows:

(3) $$Q_c=\left(\frac{E_1-E_0}{R_1}\right)t_2$$

=charge entering condenser C during each interval $t_2$ and (4) $$Q_d=\left(\frac{E_3+E_0-E_2}{R_2}\right)t_1$$

=charge leaving condenser C during each interval $t_1$

Obviously, the voltage $E_0$ across the condenser C can remain constant over a period of time only if the charge going into the condenser equals the charge coming out of the condenser. Thus to have a constant equilibrium value of $E_0$, the charge $Q_c$ must equal $Q_d$. From Equations 3 and 4, therefore, (5) $$\left(\frac{E_1-E_0}{R_1}\right)t_2=\left(\frac{E_3+E_0-E_2}{R_2}\right)t_1$$

as shown in Fig. 50, let (6) $$E_a=E_1-E_2$$

and (7) $$E_c=E_1-E_0$$

(8) $$E_1=E_a+E_2$$

(9) $$E_1=E_c+E_0$$

(10) $$E_a+E_2=E_c+E_0$$

and

(11) $$E_0-E_2=E_a-E_c$$

Substituting these values to eliminate $E_0$, $E_1$ and $E_2$ from Equation 5:

(12) $$\left(\frac{E_c}{R_1}\right)t_2=\left(\frac{E_3+E_a-E_c}{R_2}\right)t_1$$

or

(13) $$E_cR_2t_2=(E_3+E_a-E_c)R_1t_1$$

or

(14) $$E_cR_2t_2=E_3R_1t_1+E_aR_1t_1-E_cR_1t_1$$

or

(15) $$E_cR_2t_2+E_cR_1t_1=E_3R_1t_1+E_aR_1t_1$$

or

(16) $$E_c(R_2t_2+R_1t_1)=(E_3+E_a)R_1t_1$$

and

(17) $$E_c=\frac{(E_3+E_a)R_1t_1}{R_2t_2+R_1t_1}$$

If the value of $E_3$ is zero, then Equation 17 reduces to

(18) $$E_c=\frac{E_aR_1t_1}{R_2t_2+R_1t_1}=E_aK$$

From Equation 18 it is clear that the voltage $E_c$ is directly proportional to the pulse amplitude $E_a$.

Figure 53:
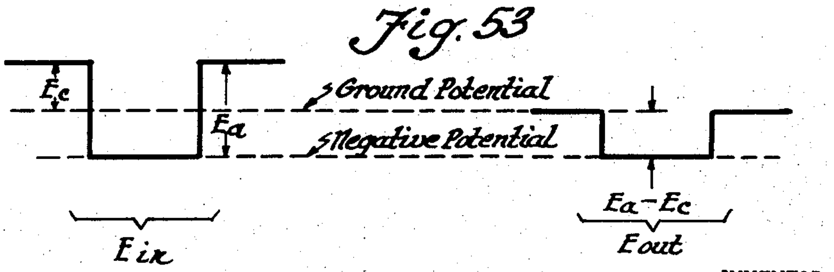

It is also apparent from the above analysis that the condenser voltage $E_0$ can reach an equilibrium value between the values $E_1$ and $E_2$ by properly relating the resistance values $R_1$ and $R_2$ to the established time intervals $t_1$ and $t_2$. With these conditions established, it can readily be shown how the circuit of Figs. 10 and 50 functions to clip the upper positive portion of the signal input wave form, including any noise components or base line hash which may form a part thereof. Thus by again referring to Fig. 49, when $E_{in}$ is positive, i.e., has the value $E_1$, the diode $D_2$ conducts but since $E_1$ is greater than the equilibrium value of $E_0$ as shown in this figure, the diode $D_1$ does not conduct, so that the difference between the voltages $E_1$ and $E_0$ appears across the resistor $R_1$. At this value of $E_{in}$, the voltage $E_{out}$, i.e., that determining the magnitude of space current flow through the tube 1023, is zero. However, when $E_{in}$ is negative, i.e., has the value $E_2$, the diode $D_1$ conducts due to the voltage $E_1$ being greater than the equilibrium value of the condenser voltage $E_0$, thus driving the anode of the diode $D_2$, i.e., the control grid of the tube 1023, negative by an amount equal to the difference between the values $E_0$ and $E_2$. As a consequence, the diode $D_2$ is rendered nonconductive so that the output voltage $E_{out}$ assumes a finite value equal to $E_0$ minus $E_2$ in the manner shown in Fig. 50. As shown in Fig. 53, this output voltage $E_0$ is equal to the voltage value $E_a$ minus the voltage value $E_c$. Thus it will be apparent that when the condenser C is made to have an equilibrium voltage thereacross having a value intermediate the values $E_1$ and $E_2$, all portions of the signal input voltage $E_{in}$ having potential values in excess of the equilibrium condenser voltage value $E_0$ are clipped and hence are not reproduced at the anode of the tube 2023.

From Equation 18 it will be apparent that the magnitude of the clipping voltage $E_c$ is determined solely by the resistance values $R_1$ and $R_2$, the time values $t_1$ and $t_2$, and the tens pulse amplitude $E_a$ when the voltage $E_3$ is zero. On the other hand and as will be apparent from Equation 17, when the voltage $E_3$ is large in comparison with $E_{in}$, the clipping level $E_c$ becomes substantially independent of the tens pulse amplitude and depends only on the value of $E_3$, the resistance values $R_1$ and $R_2$ and the time values $t_1$ and $t_2$. This is true of the clipping circuits shown in Fig. 10 of the drawings. More specifically, the parameters $R_1$ and $R_2$ (the resistance values of the resistors 1038 and 1029, for example) are so proportioned in each of the clipping circuits of Fig. 10 that the equilibrium condenser voltage $E_0$ is made as high as possible while preventing reproduction of noise signals or tens pulse base line hash at the anodes of the pulse combining tubes 1023 and 1024.

Referring now more particularly to the busy test circuit 218, it will be recalled that this circuit performs the function of comparing the time position of the connector pulses developed by the connector pulse forming circuit 217 with the time positions of busy pulses which may be present on the busy conductor 52 to determine whether or not the called line is idle or busy. In the event the called line, i.e., the line 32 is idle, coincidence is lacking between the time position 63c of the connector pulses produced by the circuit 217 and the time position occupied by any of the busy pulses present on the busy conductor 52. In such case the circuit 218 functions to prevent the busy lock circuit 219 from operating and also to initiate operation of the ringing facilities provided in the line circuit terminating the called line. On the other hand, if the connector pulses developed by the connector pulse forming circuit 217 coincide in time position with busy pulses present on the busy conductor 52, an indication is provided that the called line is busy. In such event the busy test circuit 218 does not operate, but permits the busy lock circuit 219 to operate and lock the connector 12b in its line busy setting.

In considering the operation of the busy test circuit 218, it will be noted that busy pulses developed on the busy conductor 52 in each of the busy finders and connectors of the system are impressed upon the control grid of the inverter tube 1163 in a positive sense through the coupling condenser 1188. These pulses are amplified and inverted through the tube 1163 and impressed upon the upper shield grid of the busy test thyratron tube 1162 through the coupling condenser 1189. Normal operating bias for the upper shield grid of the tube 1162 is impressed upon this grid through the crystal rectifier 1168 from a bleeder circuit consisting of the two resistors 1166 and 1167. More specifically, these resistors are connected in series between the negative terminal of the bias potential source and the conductor 242 which extends to the cathode terminal of the timing tube 1022 in the units sequence timing circuit 216. Prior to firing of the tube 1022 at the end of the second digit, the potential impressed upon the upper shield grid of the tube 1162 from the bleeder circuit 1166, 1167 through the rectifier 1168 is highly negative. However, when the tube 1022 is fired to produce current flow through the resistor 1052 and 1053, this bias potential is reduced to zero. It will be understood, therefore, that after the timing tube 1022 is fired, the busy pulses impressed upon the upper shield grid of the tube 1162 serve to drive this grid negative with respect to ground.

Connector pulses impressed on the output conductor 239 by the connector pulse forming circuit 217 are applied to the inner control grid of the tube 1162 in a positive sense over a path which includes the coupling condenser 1172. Normally, this grid is biased to a predetermined negative potential from a bleeder circuit comprising the series connected resistor 1170 and 1173, the conductor 248 and the resistor 2011 which is bridged between the negative terminal of the bias potential source and the positive terminal of the anode current source. This negative potential serves to prevent the busy test tube 1162 from firing when the potential on the upper shield grid of the tube is reduced to zero through ionization of the timing tube 1022.

Each positive connector pulse impressed upon the control grid of the tube 1162 has the effect of driving this grid positive relative to the tube cathode so that in the event no busy pulse is coincidentally present on the upper shield grid of the tube to drive the latter grid negative, the tube fires. Thus the idle condition of the called line is indicated. However, if busy pulses are delivered to the upper shield grid of the tube 1162 to drive this grid negative coincidentally with excitation of the tube control grid with the positive connector pulses, the tube 1162 is not fired. Thus the busy condition of the selected called line is indicated. In the event the busy test tube 1162 fires, current conduction through the tube is thereafter independent of the potentials impressed upon the two grids thereof. Thus the tube will continue to conduct for the duration of the call and until the connector 12b is released. Space current flow through the tube causes a large voltage drop to appear across the cathode load resistor 1169. This voltage is impressed upon the cut-through conductor 251 through the resistor 1190. It will thus be understood that if the called line 32 is idle, the busy test tube 1162 responds to the connector pulses impressed upon the control grid thereof from the connector pulse forming circuit 217 by firing to develop a positive control potential on the cut-through conductor 251. On the other hand, if this called line is busy, the application of inverted busy pulses to the upper shield grid of the tube 1162 in time coincidence with the connector pulses applied to the control grid of this tube prevent the tube from firing.

Referring now more particularly to the busy lock circuit 219 in its operation to lock the connector in its called line busy setting in the event the busy test tube 1162 is not fired in the manner explained above, it is pointed out that the control grid of the busy lock tube 2007 is normally biased to a potential slightly positive with respect to ground over the conductor 246 from a bleeder circuit consisting of the resistors 2016, 247, 1055, 1052 and 1053, and the conductors 242 and 246. With the tube 2007 normally deionized, the cathode thereof is at ground potential and the small positive bias voltage impressed upon the control grid of the tube is insufficient to cause the tube to fire. However, when the timing tube 1022 is fired in the manner explained above to produce a large positive potential on the conductor 242, the positive potential present on the conductor 246 starts to increase and charge the condenser 2010 in the proper direction to increase the positive potential on the control grid of the tube 2007. The charging rate of this condenser is of course determined by the time constant of the circuit in which the condenser is included. Preferably, the time constant of this circuit is made relatively short, such that if the busy lock tube 2007 is not otherwise biased against firing in the manner explained below, the control grid potential of the tube is rapidly increased in a positive sense to the tube ignition value within a few pulse frames after the timing tube 1022 is rendered conductive.

Assuming that the called line is busy such that the busy test tube 1162 is prevented from firing in the manner explained above, the rise in potential across the condenser 2010 results in ionization of the busy lock tube 2007 to produce current flow through the anode resistor 2011 and the cathode resistor 2057. Thus the positive potential at the anode of the tube 2007 is substantially decreased whereas the positive cathode potential of this tube is greatly increased. Since the resistor 2011 is included in the above-described bleeder circuit from which the negative bias potential for the control grid of the busy test tube 1162 is derived, it will be understood that when the busy lock tube 2007 is rendered conductive to produce a large voltage drop across the resistor 2011, the negative bias potential impressed upon the control grid of the busy test tube 1162 is increased to a very high value with the result that this tube is positively biased against inadvertent firing as a result of the continued application of pulses to the two grids thereof.

Normally the control grid of the inverter tube 2006 is biased positively to the anode current saturation value of the tube from a bleeder circuit which comprises the anode resistor 2011 of the busy lock tube 2007 and the two resistors 2013 and 2014, the three identified resistors being connected in series between the +B switching conductor 12c and the negative terminal of the bias potential source. Thus the inverter tube 2006 is normally heavily conductive. The control grid of the busy tone gate tube 2005 is normally biased negatively well beyond cutoff by the potential supplied thereto from a bleeder circuit consisting of the anode resistor 2051 of the tube 2006, the resistor 2052, the conductor 250 and the resistor 2053, which circuit is bridged between the positive terminal of the anode current source and the negative terminal of the bias potential source. With the busy tone gate tube 2005 biased beyond cutoff, the busy tone signal voltage produced on the conductor 46 by the busy tone signal generator *29b* and impressed upon the control grid of the tube 2005 through the coupling condenser 2054 is prevented from reaching the calling line out gate circuit 226.

When the busy lock tube 2007 is fired in the manner explained above, the resulting voltage drop produced across the resistor 2011 drives the control grid of the inverter tube 2006 negative well beyond cutoff. As a consequence, the voltage drop across the resistor 2051 disappears to drive the control grid of the busy tone gate tube 2005 positive into the Class A operating region of the tube and thus render the tube conductive. The busy tone signal impressed upon the control grid of the tube 2005 through the coupling condenser 2054 is now reproduced at the anode of this tube and impressed upon the calling line out gate circuit 226 over a path which includes the coupling condenser 2055, the isolating resistor 2056 and the conductor 244. From the calling line out gate circuit the busy tone signal is forwarded through the distributor 15 and the line circuit 10 to the calling line for reproduction by the receiver at the calling substation in the manner explained below. Reproduction of this signal serves to inform the calling subscriber that the called line is busy and that the connection should be released.

As explained above, if the called line tests idle, the busy test tube 1162 is rendered conductive to produce a relatively large voltage drop across the cathode resistor 1169. This voltage causes current flow over a path comprising the resistor 1190, the conductor 251, the crystal rectifier 2012 and the cathode resistor 2057 of the busy lock tube 2007 in the proper direction to drive the cathode of the latter tube highly positive. As a consequence, the subsequent rise in positive potential of the control grid of the tube 2007 resulting from charging of the condenser 2010 to the potential level of the conductor 242 is prevented from firing the tube 2007. It will be understood, therefore, that the busy lock tube 2007 is only rendered conductive to perform the functions just described in the event the called line or more particularly the time position assigned thereto in each pulse frame is tested by the busy test tube 1162 and found busy. It will also be understood that the rectifier 2012 is so poled as to prevent the voltage developed across the cathode resistor 2057 when the tube 2007 fires from being applied to the conductor cut through conductor 251 to cause false cut through operation of the connector.

In considering the details of the busy gate circuit 220, it will be recalled that this circuit is provided to gate the connector pulses developed by the connector pulse forming circuit 217 to the busy conductor 52 upon completion of the busy test in the event the time position assigned to the called line indicates that the called line is idle. Gating of the connector pulses through the tube 1164 to the busy conductor 52 provides an indication to all of the other finders and connectors of the system that the called line is busy. As a result, when and if the call is answered at the called substation the called line is marked as busy in all of the finders to prevent an idle finder from associating itself with the called line. Further, any other connector of the system, as for example, the connector *13b*, which may later be directed to route a call to the called line selected by the connector *12b* responds to the connector pulses gated by the tube 1164 to the busy conductor 52 by indicating that the called line is busy.

Normally the anode, cathode and control grid of the gating tube 1164 have no potentials thereon, the control grid and anode of this tube being connected by way of the cut through conductor 251 and the resistor 1190 to the cathode terminal of the load resistor 1169 associated with the busy test tube 1162. When connector pulses are first released to the conductor 239 by the connector pulse forming circuit 217 in the time position assigned to the called line, these positive pulses cause grid to cathode current conduction through the gating tube 1164, the coupling condenser 1171 and the cathode load resistor 1175. The first few pulses traversing this circuit serve to charge the condenser 1171 substantially to the connector pulse amplitude and this charge is maintained on the condenser 1171 during each off pulse period. The voltage thus built up across the condenser 1171 is negatively applied to the control grid of the tube 1164 to arrest grid to cathode current conduction through the tube during the connector pulse periods. Thus the charge accumulated across the condenser 1171 during the first few connector pulses released by the circuit 217 prevents any pulses from being applied to the busy conductor 52 by way of the busy gate circuit 220. Moreover, the pulses initially released to the conductor 52 and resulting from grid current conduction through the cathode resistor 1175 are of such a low order of magnitude as to have no effect on the busy test facilities of the other links of the system. It will thus be understood that unless and until anode potential is supplied to the tube 1164 from the cathode load resistor 1169 of the busy test tube 1162, connector pulses occurring in the time position assigned to the called line are not gated by the busy gate circuit 220 to the busy conductor 52. This means that if the called line is tested and found busy, connector pulses are not released to the busy conductor 52 from the connector *12b*.

In the event the called line tests idle, such that the busy test tube 1162 is fired in the manner explained above, anode potential is supplied to the anode of the busy gate tube 1164 from the cathode terminal of the cathode load resistor 1169, thereby to produce space current flow through this tube. Immediately the tube 1164 is thus rendered conductive to produce a voltage drop across the cathode load resistor 1175 of the tube, the bias between the input electrodes of the tube is increased in a negative sense so that the connector pulses appearing on the conductor 239 and impressed upon the control grid of the tube 1164 through the condenser 1171 have the effect of driving this control grid positive relative to the tube cathode during each connector pulse period. As a consequence, the connector pulses are amplified through the tube 1164 and appear as positive pulses at the cathode terminal of the load resistor 1175. These pulses are impressed upon the busy conductor 52 over a path which includes the coupling condenser 1174 and the conductor 249. They serve to mark the called line as busy in the manner explained above.

The connector pulses developed across the cathode load resistor 1175 of the tube 1164 are also impressed upon the control grid of the inverter tube 1163 through the coupling condenser 1188. They are amplified and inverted through the tube 1163 and impressed upon the upper shield grid of the busy test tube 1162 through the coupling condenser 1189. However, by the time these pulses are negatively applied to the upper shield grid of the tube 1162, this tube has already been rendered conductive so that the potentials applied to the two grids thereof are ineffective to control space current flow through the tube. Thus the busy test circuit 218 is prevented from recognizing the busy pulses released thereto locally in the connector *12b* by the busy gate circuit 220.

Referring now more particularly to the called line out gate circuit 224, it will be recalled that this circuit is provided to resample the signal voltage stored in the calling line reconstructor circuit 203 in the time position assigned to the selected called line and to release signal pulses, modulated in accordance with the sampled signal voltage, to the distributor in this time position for distribution to the line circuit terminating the called line. This circuit is also controlled by the busy test circuit 218 and the ring trip circuit 221 to transmit a start ring signal to the line circuit terminating the called line after this line is tested and found idle and to terminate this signal when the call is answered at the called substation. To perform these functions, narrow commutator drive pulses positively applied to the commutator drive conductor 35 by the commutative drive circuit 25 in the manner illustrated in Figs. 37 to 40, inclusive, are impressed upon the suppressior grid of the gate tube 1912 through the coupling condenser 1940, and positive connector pulses developed on the conductor 239 at the output side of the connector pulse forming circuit 217 in the time position assigned to the selected called line are impressed upon the control grid of the gate tube 1912 through the coupling condenser 1941. The commutator drive pulses impressed upon the suppressor grid of the tube 1912 are positively clamped to ground in an obvious manner through the action of the crystal rectifier 1923. Normally, the control grid of this tube is biased beyond cutoff by the negative potential impressed thereon from the potentiometer 1924 through the resistor 1942. However, the positive connector pulses impressed upon the control grid of the gate tube 1912 through the coupling condenser 1941 serve to drive the control grid of this tube into the conductive region of the tube, thereby to gate to the output side of the tube the particular commutator drive pulses which are straddled by the connector pulses. More specifically, each connector pulse serves to drive the control grid of the tube 1912 positive from a value below cutoff until the potential on this grid reaches the ground potential level. This permits the commutator drive pulse impressed upon the suppressor grid of the tube and straddled by the connector pulse to produce a very narrow pulse of low amplitude at the anode of the tube 1912. These gated pulses appear at the anode of the tube 1912 as pulses of negative polarity. In order to prevent variations in the amplitude of the connector pulses from influencing the amplitude of the narrow pulses gated by the tube 1912, the connector pulses are positively clamped at the ground potential level through the action of the diode comprised of the anode **940*a* and cathode of the tube 940 combined with the diodes effectively formed by the control grid and cathode elements of the tubes 1911, 1912 and 1809*b*. Specifically, these parallel connected diode paths positively prevent the control grids of any one of the three tubes 1809*b*, 1911 and 1912 from being driven positive relative to the respective tube cathodes. The clamping action is obtained in the manner explained above with reference to operation of the diode comprising the anode 940*b* and cathode of the tube 940 to clamp the tops of the finder gate pulses appearing on the conductor 12*d*** at the ground potential level.

The narrow pulses gated by the tube 1912 are impressed upon the control grid of the amplifier and inverter tube 1913 through the coupling condenser 1943 and are amplified and inverted through this tube to appear as positive pulses at the tube anode. These positive pulses are impressed upon the control grid of the gate tube 1914 through the coupling condenser 1944. Normally, the control grid of the tube 1914 is biased well beyond cutoff to prevent the sampling pulses delivered thereto from the tube 1913 from driving this grid into the conductive region of the tube. The negative potential for thus biasing the control grid of the tube 1914 beyond cutoff is impressed upon this control grid through the back resistance of the crystal rectifier 1920 from a bleeder circuit consisting of the two resistors 1945 and 1946 which are connected in series across the negative bias potential source.

When the busy test tube 1162 is fired in the manner explained above to indicate that the called line is idle, the positive potential developed at the cathode terminal of the load resistor 1169 is impressed across the resistor 1946 and the shunting crystal rectifier 1921 in parallel over a path which includes the resistor 1190, the cut through conductor 251 and the resistor 1922. This potential serves to reverse the polarity of the voltage across the rectifier 1921 causing this rectifier to conduct heavily and thus provide a path in shunt with the resistor 1946 which has no appreciable resistance. Thus the bias potential on the control grid of the gate tube 1914 is effectively reduced to zero, i.e., to the ground potential level. After the bias on this control grid is thus reduced, each sampling pulse delivered to the control grid thereof through the coupling condenser 1944 is rendered effective to vary anode current flow through the tube 1914 in accordance with the amplitude of the pulse. This pulse amplitude is positively clamped to the ground potential level through the action of the crystal rectifier 1920. Thus if the amplitude of the pulses impressed on the control grid of the tube 1914 tends to exceed the ground potential level, the condenser 1944 is charged to develop a voltage thereacross which subtracts from the amplitude of succeeding sampling pulses. The described arrangement comprising the bleeder circuit 1945, 1946 and the crystal rectifier 1921 for controlling the bias on the control grid of the gate tube 1914 and for decreasing the bias level to a pulse gating value when the busy test tube 1162 fires insures that the required bias potential change on the control grid of the tube 1914 will always occur incident to the connector cut through operation and that the control grid potential will be maintained at the ground level so long as the voltage on the conductor 251 exceeds the normal voltage across the resistor 1946. The arrangement has the additional advantage of allowing for greater resistor tolerances in the biasing network for the control grid of the tube 1914.

The positive sampling pulses impressed upon the control grid of the tube 1914 following the described reduction in the bias potential of this grid to zero have the effect of causing cathode current to flow in the tube, but are ineffective to produce anode current flow through the tube until such time as the suppressor grid of the tube is biased to a suitable potential level. From an examination of the circuit, it will be seen that the biasing circuit for the suppressor grid of the tube 1914 comprises the resistor 2020, the potentiometer 2021, the resistor 2024, the conductor 253, the resistor 1181, the conductor 251 and the resistor 1190 and 1169. This circuit is bridged across the negative bias potential source. That portion of this circuit which comprises the resistor 2024, the conductor 253, the resistor 1181, the conductor 251, the resistor 1190 and the cathode load resistor 1169 of the busy test tube 1162 is paralleled by a crystal rectifier 2023 which is so poled as to be conductive so long as a voltage is not introduced into the circuit through ionization of the busy test tube 1162. The potentiometer 2021 included in the described biasing circuit has a wiper adjustable therealong to determine the normal suppressor grid bias of the tube 1914. This wiper is connected to the suppressor grid of the tube 1914 through a portion of the volume control potentiometer 2019 and the wiper adjustable along the potentiometer. With the rectifier 2023 conducting, the bias voltage derived from the potentiometer 2021 has a magnitude sufficient to bias the suppressor grid of the tube 1914 slightly negative relative to the tube cathode, thereby to provide for reproduction of the sampling pulses impressed upon the control grid of this tube at the tube anode at the normal pulse amplitude. When, however, the busy test tube 1162 is fired to indicate that the called line is idle, a voltage of approximately 130 volts is developed across the resistor 1169 which overcomes the voltage supplied by the negative bias potential source and drives the suppressor grid of the tube 1914 somewhat positive relative to the tube cathode. This change in the suppressor grid bias potential of the tube 1914 occurs coincident with the above-described change in the control grid potential of the tube from a negative value beyond cutoff to the ground potential level. The voltage introduced into the described suppressor grid biasing circuit as a result of current flow through the tube 1162 drives the cathode terminal of the rectifier 2023 positive relative to the rectifier anode terminal, thereby to render this rectifier non-conductive. With the control grid potential of the tube 1914 at its normal pulse gating value and the suppressor grid of the tube at a slightly positive value relative to the tube cathode, this tube conducts heavily during each sampling pulse interval so that large amplitude sampling pulses of negative polarity are delivered over the distributor input conductor 51 to the distributor 15. In this regard, it is noted that operating anode potentials for the gate tube 1914 and the gate tube 1919 in the calling line out gate circuit 226 are supplied to these tubes over paths which commonly include the resistor 2142 and the distributor input conductor 51. The large amplitude sampling pulses thus delivered to the distributor 15 in the time position assigned to the called line effect operation of the ringing facilities included in the line circuit 16 terminating the called line in the exact manner previously explained with reference to operation of the line circuit 10. Thus the operation of ringing the called substation is initiated.

As explained more fully below, when the call is answered at the called substation, the ring trip circuit 221 operates to provide a low resistance shunt between the conductor 253 and ground, thereby to reduce to approximately ten volts the positive voltage which is introduced into the biasing network for the suppressor grid of the tube 1914 in opposition to the voltage of the negative bias potential source. This decrease in the positive potential on the conductor 253 has the effect of reversing the polarity of the voltage across the crystal rectifier 2023 with the result that this rectifier is rendered heavily conductive. Since the internal resistance of this rectifier in the forward direction is substantially zero, the bias on the suppressor grid of the tube 1914 is changed from a positive value to a slightly negative value which provides for operation of the tube 1914 within the class A operating range of the tube. More specifically, the negative voltage impressed upon the suppressor grid of the tube 1914 is that voltage which appears across the conducting rectifier 2023 of substantially zero internal resistance and that portion of the potentiometer 2021 which is connected between the lower terminal of the rectifier 2023 and the wiper adjustable along the potentiometer 2021. It will be understood that this wiper may be so adjusted along the potentiometer 2021 that when the ring trip circuit 221 operates to cause current conduction through the rectifier 2023 the negative potential impressed upon the suppressor grid of the tube 1914 through the potentiometer 2019 serves to bias this tube to the exact center of its class A operating range.

Signal voltages derived from the calling line 10 and reconstructed across the cathode load resistor **1825*a* of the calling line reconstructor circuit 208 in the manner previously explained are impressed upon the suppressor grid of the tube 1914 over a path which includes the conductor 256, the coupling condenser 2029 and the volume control potentiometer 2019. More specifically, the volume control potentiometer 2019 is bridged across the cathode load resistor 1825*a* of the reconstructor circuit 208 in series with the coupling condenser 2029 and the by-pass condenser 2022. That portion of this voltage which appears across the left portion of the potentiometer 2019 is impressed upon the suppressor grid of the tube 1914 and serves to amplitude modulate the sampling pulses developed at the anode of this tube. Thus, sampling pulses occurring in the time position assigned to the called line and modulated in accordance with the signal voltage reconstructed and stored (for one pulse frame) by the calling line reconstructor circuit 208 are transmitted over the distributor input conductor 51 for distribution to the line circuit terminating the called line. After the rectifier 2023 is rendered conductive in response to operation of the ring trip circuit 221, variations in the current traversing this rectifier have negligible effect on the magnitude of the bias voltage impressed upon the suppressor grid of the tube 1914, due to the very low forward resistance of this rectifier. As a consequence, the circuit stability is very high and greater tolerances are permitted for the resistors included in the biasing network for the suppressor grid of the tube 1914**.

Referring now more particularly to the operation of the ring back tone gate tube 2004 to gate the ring back tone signal voltage to the calling line outgate circuit 226, it is pointed out that the control grid of this tube is continuously excited by the ring back tone signal voltage developed by the generator **29*c* over a path which includes the conductor 48 and the coupling condenser 2059. Normally, however, the tube 2004 is biased beyond cutoff by the bias potential impressed upon the control grid thereof through the isolating resistor 2061 from a biasing circuit consisting of the resistors 2060 and 2062, the conductor 253, the resistor 1181, the conductor 251 and the resistors 1190 and 1169. This circuit is bridged across the terminals of the negative potential source. When the busy test tube 1162 is fired to initiate the called substation ringing operation in the manner just explained, the voltage developed across the resistor 1169 and injected into the above-described biasing circuit drives the grid of the gate tube 2004 into the class A operating region of the tube. Thus, the tube 2004 is rendered operative to reproduce the ring back tone signal voltage at the anode thereof. This voltage is impressed upon the suppressor grid of the gate tube 1919 in the calling line outgate circuit 226 over a path which includes the condenser 2063, the mixing resistor 2064 and the conductor 244. From the circuit 226 the ring back tone signal voltage is transmitted through the distributor 15 and the line circuit 10 to the line 23 for reproduction by the receiver 1102** provided at the calling substation. Audible reproduction of this signal serves to advise the calling subscriber that the called substation is being rung.

When the call is answered at the called substation to effect operation of the ring trip circuit in the manner explained below, the tube 1165 is fired to reduce to approximately 10 volts the positive voltage on the conductor 253. As a result, the control grid of this tube is driven negative to cut off space current flow through the tube and thus terminate transmission of the ring back tone signal to the calling substation.

In considering the operation of the called line in gate circuit 223, it will be recalled that this circuit is provided for the purpose of gating sampling pulses carrying signals derived from the called line to the called line reconstructor circuit 222. To this end the inner control grid of the gate tube 1911 provided in the circuit 223 is excited by connector pulses impressed thereon through the coupling condenser 1941 from the connector pulse forming circuit 217, and the suppressor grid of this tube is excited by signal bearing multiplexer pulses impressed thereon from the multiplexer output conductor 50 through the coupling condenser 1947. The circuit configuration and operation of the called line in gate circuit 223 are identical with those of the calling line in gate circuit 207 described above. From this description it will be understood that signal bearing multiplexer pulses occurring only in the time position assigned to the called line are gated by the tube 1911, inverted and amplified by the inverter tube 1910, and impressed upon the called line reconstructor circuit 222 over a path which includes the coupling condenser 1948 and the conductor 254. All other signal modulated multiplexer pulses present on the multiplexer output conductor 50 are excluded from the called line reconstructor circuit 222 due to lack of coincidence between these pulses and the connector pulses impressed upon the control grid of the gate tube 1911.

Referring now more particularly to the called line reconstructor circuit 222, it is again pointed out that the purpose of this circuit is to reconstruct the signals derived from the called line and transmitted thereto on the multiplexer pulses gated by the called line in gate circuit 223, and of storing the signal voltage amplitude of each such gated pulse for the time interval of one pulse frame. In configuration and operation, this reconstructor circuit is identical with the calling line reconstructor circuit 208 and its operation will be readily understood from the above description of the latter circuit. It is pointed out, however, that connector pulses derived from the connector pulse forming circuit 217 in the time position assigned to the called line and impressed upon the control grid of the peaker tube **1809*b* through the coupling condenser 1941 are utilized to control the operation of the condenser discharging tube 1807*b*. More specifically, the peaker tube 1809*b* differentiates the leading edge of each connector pulse impressed upon the control grid thereof to produce a sharp pulse which drives the discharging tube 1807*b* into its conductive region to discharge the condenser 1811*b* just prior to the application of a succeeding signal bearing multiplexer pulse on the control grid of the charging tube 1808*b* from the called line in gate circuit 223. As explained above with reference to the reconstructor circuit 208, the charge on the condenser 1811*b* is varied up and down in accordance with the amplitude of the signal modulated on the multiplexer pulses gated by the circuit 223, and this voltage is utilized to control the cathode follower tube 1806*b* so that the signal is reconstructed across the cathode resistor 1825*b* of the tube. The voltage thus developed across the resistor 1825*b* is impressed upon the ring trip circuit 221 over a path which includes the resistor 1820, the resistor 1925, and the conductor 252. This voltage is also impressed upon the calling line out gate circuit over a path which includes the conductor 257 and the coupling condenser 2058**.

Before the call is answered at the called substation, no multiplexer pulses occurring in the time position assigned to the called line are present on the multiplexer output conductor 50. Accordingly, no pulses are gated by the called line in gate circuit 223 to the called line reconstructor circuit 222. Under these circumstances the charging tube **1808*b* is not excited during successive connector pulses. However, the discharging tube is rendered conductive coincident with the leading edge of each connector pulse. As a consequence, the condenser 1811*b* is discharged down to a very low level with the result that current flow through the cathode follower tube 1806*b* is held at a low level. Thus, the voltage drop across the cathode load resistor 1825*b* is relatively low. When the call is answered at the called substation, however, multiplexer pulses are gated to the circuit 222 through the called line in gate 223 to effect charging of the condenser 1811*b* during each such pulse. This has the effect of increasing the current flow through the cathode follower tube 1806*b* and hence of increasing the magnitude of the voltage drop across the resistor 1825*b*. When a signal voltage is modulated on the gated pulses, this voltage, i.e. that across the resistor 1825*b***, is obviously varied in amplitude in accordance with the signal voltage.

Referring now more particularly to the ring trip circuit 221, it is again pointed out that this circuit is provided for the purpose of lowering the amplitude of the pulses released by the called line out gate circuit 224 over the distributor input conductor 51 to the distributor 15 when the call is answered at the called substation. Operation of the ring trip circuit 221 also has the effect of terminating the transmission of the ring back tone signal to the calling substation. In order that the ring trip operation may be permanently effected for the duration of the call, a tube 1165 of the thyratron type is employed as the ring trip tube. As will be apparent from the following explanation, this tube is fired immediately multiplexer pulses are released by the multiplexer 11 in the time position assigned to the called line, indicating that the line has been answered, and starts in an ionized condition to prevent inadvertent resumption of the ringing operation even if the release of multiplexer pulses in this time position is terminated. This arrangement has the desired effect of preventing ultimate reringing of the called substation in the event the connection involving the connector **12*b*** is released at the called substation before it is released at the calling substation.

Operating anode potential for the ring trip tube 1165 is supplied to this tube from the cathode end of the load resistor 1169 included in the cathode circuit of the busy test tube 1162 over a path which includes the resistor 1190 and the conductor 251. This means that the ring trip tube 1165 cannot operate unless and until the test tube 1162 is fired in the manner explained above. Normally, the control grid of the ring trip tube 1165 is maintained at a potential appreciably negative relative to the grounded cathode of the tube from a biasing circuit which includes the cathode load resistor **1825*b* of the tube 1806*b* included in the called line reconstructor circuit 222, the resistor 1820, the resistor 1925, the conductor 252, the resistor 1179 and the resistor 1180, which circuit is bridged between the negative terminal of the bias potential source and ground. In conjunction with the resistors 1820 and 1925 included in this biasing circuit, the condensers 1821 and 1926 form a low pass filter network which has the effect of preventing spurious pulses released by the multiplexer 11 in the time position assigned to the called line from prematurely tripping the ringing operation. This filter also functions to keep hash developed in the ring trip tube 1165 from backing up to modulate the connector signal pulses released by the calling line out gate circuit 226 to the distributor 15** in the manner explained below.

As pointed out above, until such time as the call is answered at the called substation, multiplexer pulses are not released by the multiplexer 11 over the conductor 51 to the called line in gate circuit 223 in the time position assigned to the called line. When this condition prevails, the discharge tube **1807*b* in the reconstructor circuit 222 keeps the condenser 1811*b* discharged to a very low level with the result that no appreciable voltage is developed across the cathode load resistor 1825*b*. As a consequence, the control grid of the ring trip tube 1165 is biased below cutoff to prevent this tube from firing. However, when the call is answered at the called substation the multiplexer 11 releases pulses to the connector 12*b* in the time position assigned to the called line with the result that an appreciable voltage is developed across the resistor 1825*b* which opposes the negative voltage impressed upon the control grid 1165 from the above traced biasing circuit. Thus the control grid of the ring trip tube 1165 is driven positive relative to the tube cathode, thereby to fire the tube and reduce the potential at the anode thereof to a very low positive value of approximately ten volts. As a consequence, the polarity of the voltage across the rectifier 2023 is reversed in the manner previously explained to produce heavy current flow through this rectifier and thus bias the gate tube 1914 to the middle of its class A operating range. Incident to the increase in bias on the suppressor grid of the gate tube 1914, the amplitude of the connector pulses released by this tube over the distributor input conductor 51 to the distributor 15** is greatly reduced, thereby to effect termination of the ringing operation in the line circuit associated with the called line in the manner previously explained. The decrease in the positive potential on the conductor 253 which results from ionization of the ring trip tube 1165 also has the previously described effect of increasing the bias on the control grid of the ring back tone gate tube 2004 to bias this tube beyond cutoff. Accordingly, the tube 2004 is rendered inoperative to repeat the ring back tone signal to the calling line out gate circuit 226 over the conductor 224. Thus, firing of the ring trip tube 1165 has the effect of terminating the ringing operation and of stopping the transmission of the ring back tone signal to the calling substation. In this regard, it will be understood that since the tube 1165 is of the thyratron type, the control grid thereof loses control once the tube has fired so that current flow through the tube cannot be varied or stopped by varying the potential on the control grid thereof. In other words, the ring trip tube passes current of a substantially constant magnitude for the duration of the call.

Referring now more particularly to the calling line out gate circuit 226, it is again pointed out that this circuit is provided for the purpose of resampling the signal voltage stored in the reconstructor circuit 222 in the time position assigned to the calling line and of releasing pulses modulated with the reconstructed signal voltage to the distributor in this time position. The circuit also performs the additional function of gating pulses to the distributor 15 which are modulated in accordance with the various supervisory tones, i.e., dial tone, busy tone and ring back tone, in the manner pointed out above.

To perform these functions, finder gate pulses appearing on the conductor 12*d* in the time position assigned to the calling line are impressed upon the control grid of the gate tube 1917 through the condenser 1939, and commutator drive pulses appearing on the conductor 35 are impressed upon the suppressor grid of this gate tube through the condenser 1940. The gate tube 1917 functions in the exact manner explained above with reference to operation of the gate tube 1911 to gate only that commutator drive pulse of each pulse frame which occurs in the time position assigned to the calling line. Specifically, the tube 1917 will only gate a commutator drive pulse when this pulse occurs in time coincidence with one of the finder gate pulses impressed upon the control grid of the tube. Each pulse gated by the tube 1917, i.e., reproduced at the anode thereof, is of negative polarity. The finder gate and commutator drive pulses respectively impressed upon the control and suppressor grids of the gate tube 1917 are both clamped to ground in the manner previously explained so that the drive pulses gated by this tube are of uniform amplitude. Each pulse gated by the tube 1917 is amplified and inverted through the inverter tube 1918 and impressed as a positive pulse upon the control grid of the gate tube 1919. Bias for the control grid of the gate tube 1919 is obtained from a network including the crystal rectifier 1931 and the resistors 1928, 1929 and 1930. The resistor 1929 is returned to the +B switching conductor 12*c*, while the resistor 1930 is returned to the negative terminal of the bias potential source. Hence, with the link 12 inactive such that no positive potential is present on the conductor 12*c*, a relatively large voltage is developed across the resistor 1928 which is negatively applied to the control grid of the gate tube 1919 to bias this tube beyond cutoff, the rectifier 1931 being so poled as to be non-conductive when the upper terminal of the resistor 1928 is negative with respect to ground. The gate tube 1919 is thus biased beyond cutoff when the link 12 is not in use. However, when the link is taken into use and the finder 12*a* thereof functions to impress a positive voltage of 140 volts on the +B switching conductor in the manner previously explained, current flow through the resistor 1928 is reversed causing the crystal rectifier 1931 to conduct in the forward direction. Due to the low internal resistance of this rectifier the voltage drop thereacross is substantially zero so that the control grid potential of the tube 1919 is effectively reduced to the ground potential level. Thus, the gate tube 1919 is rendered effective to amplify the positive pulses impressed upon the control grid thereof from the inverter tube 1918 in the time position assigned to the calling line. Grid leak bias on the control grid of this tube adjusts the grid potential so that the pulses are positively clamped to the ground potential level.

Normally, the suppressor grid of the gate tube 1919 is biased to a value which will insure operation of the gate tube 1919 in the middle of its class A operating range when the control grid of the tube is biased to the ground potential level. Specifically, the suppressor grid of the tube 1919 derives its bias from a biasing network which comprises the resistor 2060 and the potentiometers 2028 and 2059, it being noted that the potentiometer 2059 is adjustable to establish the desired operating bias on the suppressor grid of this tube. As will be evident from the preceding explanation, the three tubes 1917, 1918 and 1919 are activated immediately the link 12 is seized and the finder 12*a* thereof starts to deliver finder gate pulses to the connector 12*b* over the conductor 12*d*. Thus the circuit 226 is rendered operative to gate connector signal pulses modulated in accordance with the supervisory tones, i.e., the dial, busy and ring back tones, immediately the connector is conditioned for operation. These tones are selectively impressed upon the suppressor grid of the gate tube 1919 over paths which commonly include the conductor 244. Each such signal serves to modulate the connector signal pulses released by the gate tube 1919 to the distributor 15 over the conductor 51 in the time position assigned to the calling line in accordance with the frequency of the particular signal involved.

Signal voltages derived from the called line and reconstructed across the output resistor 1825*b* of the calling line reconstructor circuit 222 in the manner explained above are also utilized to modulate the connector signal pulses developed by the gating tube 1919 in the time position assigned to the calling line. To this end, the cathode terminal of the resistor 1825*b* is coupled to the upper terminal of the potentiometer 2028 over a path which includes the conductor 257 and the coupling condenser 2058. Thus the signal voltage developed across the resistor 1825*b* is impressed across the potentiometers 2028 and 2059 in series and an adjustable portion thereof determined by the setting of the potentiometer 2028 is impressed upon the suppressor grid of the gate tube 1919 through the resistor 1927. This signal voltage serves to modulate the connector signal pulses developed at the anode of the tube 1919 in accordance with the varying amplitudes thereof so that the connector signal pulses released by this tube to the distributor 15 carry the intelligence derived from the called line. These pulses are of course diverted by the distributor 15 to the line circuit terminating the calling line where they are detected and impressed upon the calling line for reproduction by the receiver provided at the calling substation.

As will be apparent from the foregoing explanation, the connector 12*b*, operating in conjunction with the multiplexer 11 and the distributor 15 affords separate signal tranmission channel for transmitting intelligence between the calling and called substations of a connection in which the connector is involved. Thus the calling line in gate circuit 207, the calling line reconstructor circuit 208 and the called line out gate circuit 224 are utilized in transmitting signals originating at the calling substation to the called substation. Conversely, the called line in gate circuit 223, the called line reconstructor circuit 222 and the calling line out gate circuit 226 are used to tranmit signals originating at the called substation to the calling substation. Release of the connector 12*b* is solely under the control of the calling subscriber. Thus if the called subscriber disconnects, the only response is the operation of the multiplexer 11 to discontinue the release of multiplexer pulses to the connector 12*b* in the time position assigned to the called line. The only response of the connector to the absence of multiplexer pulses in this time position is a reduction in the voltage across the output resistor 1825*b* of the called line reconstructor circuit 222. This voltage decrease has no effect upon the other components of the connector. When the calling party disconnects, however, the finder 12*a* is released in the manner previously explained and incident to the release of this finder, operating anode potential is removed from the +B switching conductor 12*c*. As a consequence, all ionized gas tubes in the connector are deionized. Deionizing of these tubes has the effect of restoring the connector to its normal setting in readiness to handle another call. As previously explained, release of the connector involves deionization of one or more gas tubes in each of the connector components 211, 215, 212, 216, 218, 219 and 221. In connection with the release of the connector it is pointed out that if a second calling line is waiting for the link 12 at the time the connector 12*b* is released, such that the link is immediately reassigned for use, a condition may arise which will result in the connector assuming an abnormal setting. Thus, as the connector starts to release, the timing tube 942 is deionized to drop the bias on the crystal rectifier 905. Concurrently, the integrator tube 2008 in the integrator circuit 209 starts to conduct due to the drop in voltage across the load resistor 1825b in the calling line reconstructor circuit 208. As a consequence, a negative dip is produced in the voltage on the conductor 227. This voltage dip is differentiated and impressed on the tube 902 through the rectifier 905, and repeated through the tube 903 to the common cathode conductor 230 of the tens digit register tubes. It has been found that this dip may remain on the conductor 230 after the +B switching conductor 12*c* is reenergized in response to reseizure of the link to handle the call on the waiting line. This dip may have the effect of causing the priming tube 904 to extinguish occasionally and can frequently cause premature ignition of the start tube 941 in the tens sequence timing circuit 212. Thus, the connector may be caused to assume an abnormal setting. To eliminate this trouble, the condenser 945 should be made quite large so that the bias on the crystal rectifier 905 is maintained during link transfer from one line to a waiting second line, thereby to prevent the indicated voltage dip developed in the integrator circuit 209 from being impressed upon the tube 902 in the tens changeover gate circuit 210.

*Distributor 15*

Figure 21:
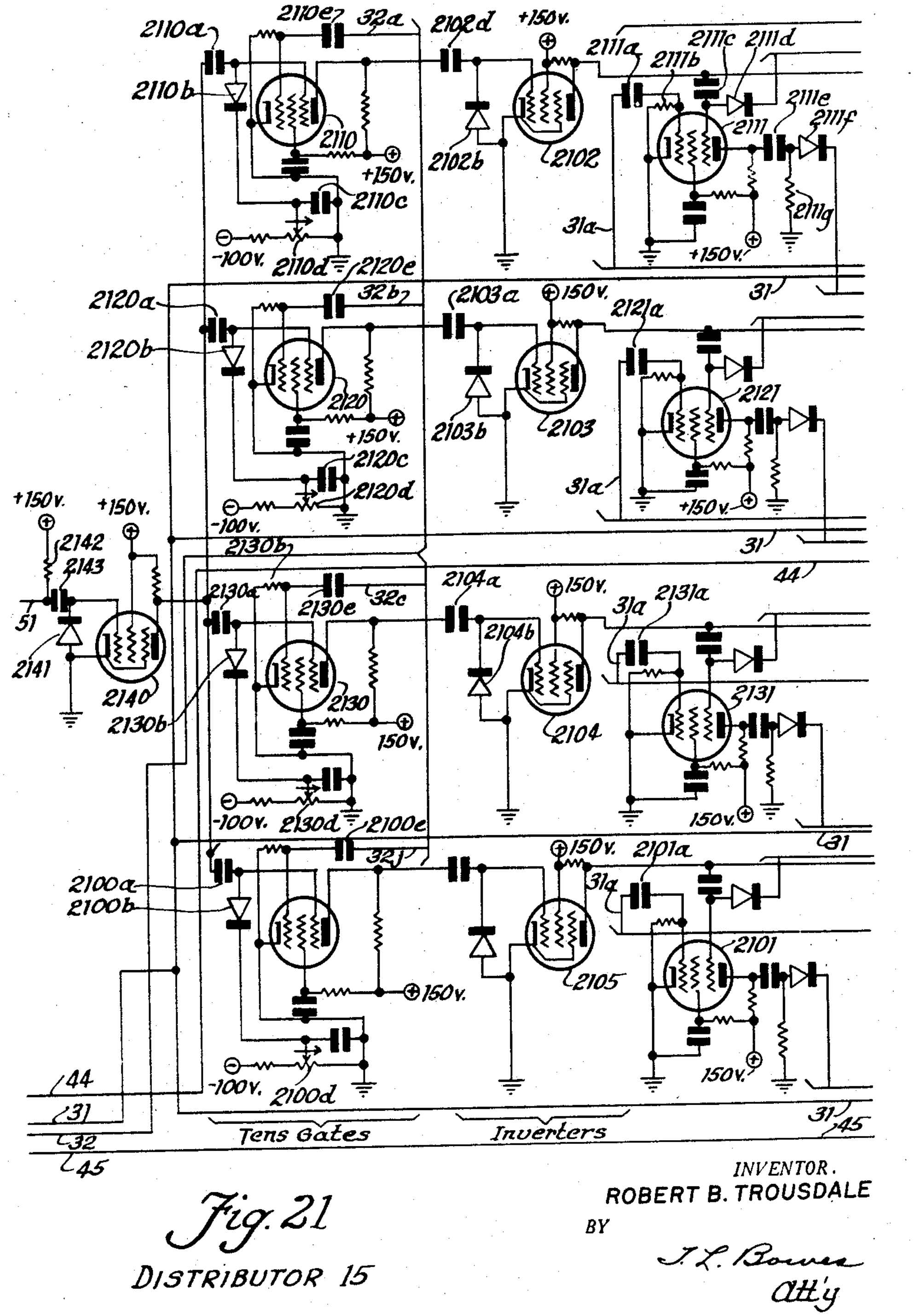
Figure 22:
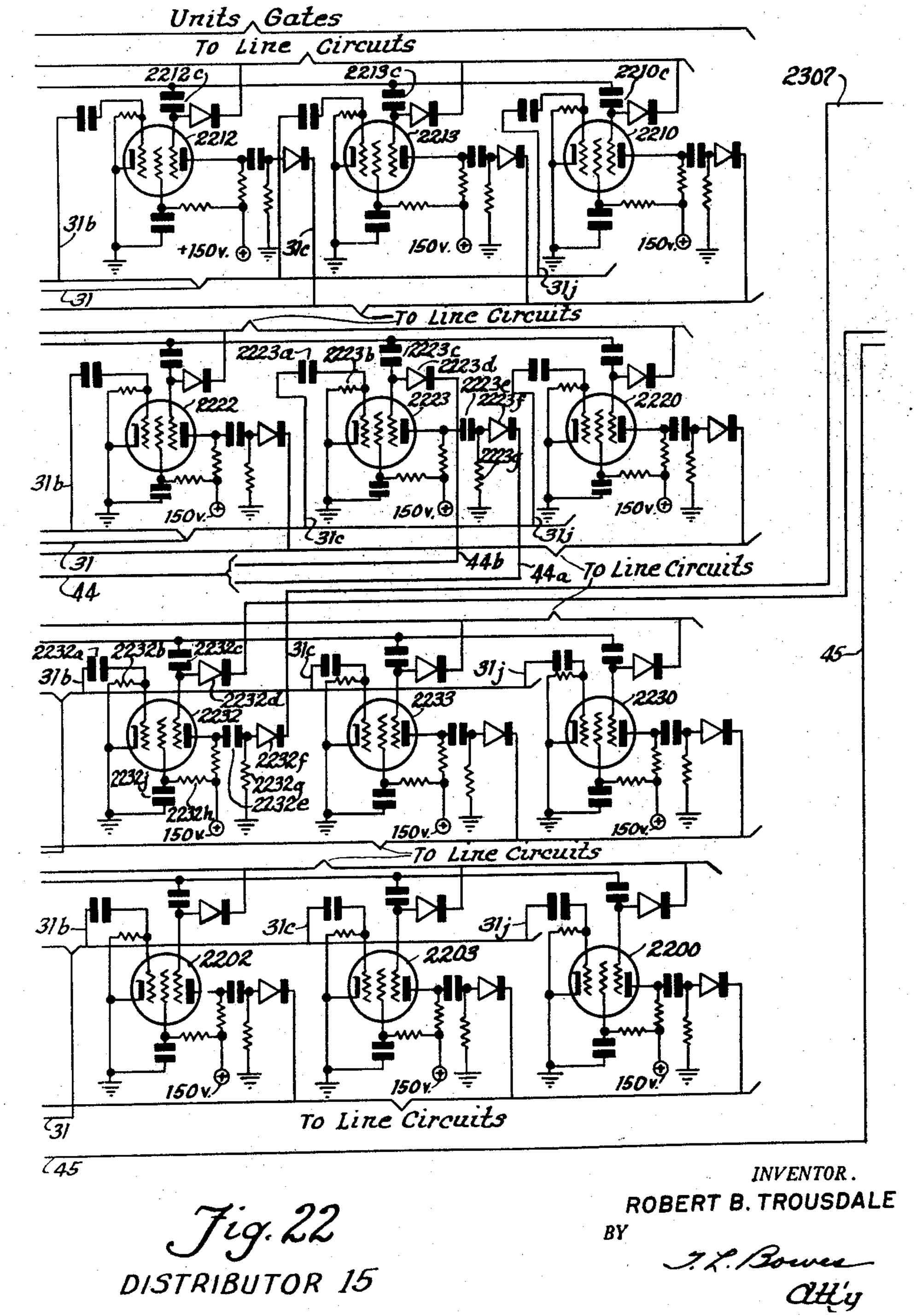

As pointed out in the general description of the system, this circuit, the details of which are illustrated in Figs. 21 and 22 of the drawings, is provided for the general purpose of distributing signal sample modulated connector pulses developed in the connectors of the system to the line circuits terminating the calling and called lines of the system in the time positions of each pulse frame respectively assigned to these lines. More specifically, the circuit is capable of distributing signal modulated connector pulses appearing in different time positions on the common distributor input channel conductor 51 to the respective line circuits under the directive control of the connectors 12*b*, 13*b*, 14*b*, etc. embodied in the system. Generally considered, the distributor 15 comprises one hundred units gate circuits, i.e., one for each line of the system, which individually include ten strings of units gate tubes. Thus the gate circuits individually associated with the lines of the system assigned the directory number designations 11, 12, 13—10 respectively comprise ten units gate tubes 2111, 2212, 2213—2210 forming the upper or first horizontal string of units gate tubes. Similarly, the units gate circuits respectively associated with the ten lines of the system having the directory number designations 21, 22, 23—30 individually include the units gate tubes 2121, 2222, 2223—2220 forming the second horizontal string of units gate tubes. In a similar manner, the units gate circuits of the distributor which are individually associated with those lines of the system having the directory number designations 31, 32, 33—30 respectively assigned thereto individually comprise the units gate tubes 2131, 2232, 2233—2230. Finally, the units gate circuits individually associated with the lines having the directory number designations 01, 02, 03—00 assigned thereto individually include the units gate tubes 2101, 2202, 2203—2200. Each of the ten strings of units gate tubes is preceded by a tens gate tube and a pulse inverter tube. The four tens gate tubes 2110, 2120, 2130 and 2100 having inverter tubes 2102, 2103, 2104 and 2105 individually connected in tandem therewith are interconnected on an individual basis with the four illustrated strings of units gate tubes. Signal sample modulated pulses impressed on the distributor input channel conductor 51 in the various connectors of the system are delivered to the ten tens gate tubes in parallel through a master inverter tube 2140. Each of the tens and units gate tubes embodied in the distributor 15 is preferably a pentode of the 6AS6 type. Pentodes of the 6AK6 type are preferably used as the inverter tubes 2140, 2102, 2103, 2104 and 2105. The various circuit elements employed in interconnecting the identified tubes of the distributor 15 are described below with reference to the functions which they respectively perform in the circuit.

Operation of the distributor 15 is under the joint control of the units pulse ring circuit 20 and the tens pulse ring circuit 21. More specifically, positive units pulses 62*a*, 62*b*, etc., as shown in the pulse chart of Figs. 37 to 40, inclusive, are delivered to the control grids of the No. 1 units gate tubes of each of the ten horizontal strings in parallel over a path which includes the positive units pulse conductor 31*a*. From this conductor, the identified positive units pulses are impressed upon the control grids of the illustrated No. 1 units gate tubes through the coupling condensers 2111*a*, 2121*a*, 2131*a*, and 2101*a*, respectively. Similarly, the positive units pulses 63*a*, 63*b*, 63*c*, etc., of each pulse frame are impressed upon the inner control grids of the No 2 tubes of each units gate tube string over a path which includes the second positive units pulse conductor 31*b* and positive units pulses 64*a* 64*b*, 64*c*, etc., of each pulse frame are impressed upon the inner control grids of the No. 3 tubes of the ten units gate tube strings in parallel over a path which includes the third negative units pulse conductor 31*c*. The fourth to tenth units gate tubes of the ten units gate tube strings are similarly excited in parallel on a numerical basis over the seven other positive units pulse conductors 31*d*—31*j*, respectively.

The suppressor grids of the units gate tubes in each of the ten strings are adapted to be excited in parallel by signal sample bearing connector pulses repeated thereto by the respective associated inverter and tens gate tubes. Thus, the suppressor grids of the tubes 2111, 2212, 2213—2210 in the upper units gate tube string are commonly coupled to the anode of the inverter tube 2102 through coupling condensers 2111*c*, 2112*c*, 2213*c*—2210*c*, respectively. In a similar manner signal sample modulated connector pulses developed at the anode of the inverter tube 2103 are impressed upon the suppressor grids of the tubes 2121, 2222, 2223—2220 in the second units gate tube string, and the suppressor grids of the tubes 2131, 2232, 2233—2230 are commonly coupled to the anode of the third inverter tube 2104. Finally, the suppressor grids of the tubes 2101, 2202, 2203—2200 forming the tenth units gate tube string are arranged for parallel excitation by signal bearing connector pulses appearing at the anode of the inverter tube 2105. Signal sample modulated pulses developed in amplified form at the anodes of the respective units gate tubes are gated to the respective line circuits individually associated with these tubes. Thus, the signal bearing pulses gated by the tube 2232 are impressed upon the input circuit of the amplifier tube 2304 in the line circuit 16 over a path which includes the coupling condenser 2232*e*, the crystal rectifier 2232*f* and the conductor 2307. Similarly, the signal bearing pulses gated by the units gate tube 2223 are impressed upon the input circuit of the amplifier tube 1204 included in the line circuit 10 terminating the line 23 over a path which includes the coupling condenser 2223*e*, crystal rectifier 2223*f*, and the conductor 44*a*. The other 98 units gate tubes of the distributor 15 are similarly coupled to the 98 other line circuits with which they are individually associated. From an inspection of the circuits embodied in the distributor 15, it will be noted that normally the inner control grids of the units gate tubes are at ground potential, i.e., the same potential as the tube cathodes. Thus the control grid of the tube 2223 is connected to ground and the cathode of this tube through a grid resistor 2223*b*. Similarly, the control grid of the units gate tube 2232 is connected to ground and the cathode of this tube through the grid resistor 2232*b*. The suppressor grids of the units gate tubes are normally biased to a predetermined negative potential on an individual basis from biasing potentiometers respectively included in the line circuits with which these tubes are individually associated. Thus the suppressor grid of the tube 2223 is normally biased to a predetermined negative value over a path which includes the conductor 44*b* and the back resistance of the crystal rectifier 2223*d* from the potentiometer resistor 1221 included in the line circuit 11. Similarly, the suppressor grid of the tube 2232 is normally biased to a predetermined negative potential from the potentiometer resistor 2321 included in the line circuit 16 over a path which includes the conductor 2323 and the back resistance of the crystal rectifier 2232*d*.

Signal modulated connector pulses developed on the distributor input connector 51 in the time positions assigned to the calling and called lines of the system are of negative polarity and are impressed upon the inner control grid of the master inverter tube 2140 through the coupling condenser 2143. These pulses as amplified and inverted in polarity through the tube 2140 and impressed upon the suppressor grids of the tens gate tubes 2110, 2120, 2130—2100 in parallel through the coupling condensers 2110*a*, 2120*a*, 2130*a*—2100*a*, respectively. Positive tens pulses 72*a*, 73*a*, 74*a*, etc., are successively impressed upon the inner control grids of the tens gate tubes 2110, 2120, 2130—2100 over the positive tens pulse conductors 32*a*, 32*b*, 32*c* and 32*j* and through the coupling condensers 2110*e*, 2120*e*, 3130*e*—2100*e*, respectively, during each pulse frame. Normally the control grids of the tens gate tubes 2110, 2120, 2130—2100 are at ground potential, being connected to the grounded cathodes of these tubes through the illustrated grid resistors. The suppressor grids of the tens gate tubes are normally biased to predetermined negative potentials through the biasing potentiometers individually associated with these tubes. Thus, the suppressor grid of the tube 2110 is normally biased to a predetermined negative potential from the potentiometer 2110*d*, through the back resistance of the crystal rectifier 2110*b*. Rectifiers 2120*b*, 2130*b*, and 2100*b* are similarly provided to interconnect the suppressor grids of the tubes 2120, 2130 and 2100 with the potentiometers 2120*d*, 2130*d* and 2100*d*. With reference to the described biasing circuits for the suppressor grids of the tens and units gating tubes embodied in the distributor 15, it is noted that individual biasing potentiometers are required since variations in the operating characteristics of the individual tubes require that different suppressor grid bias potentials be supplied to each of these tubes. It is also pointed out that the voltages built up across the coupling condensers 2110*e*, 2120*e*, 2130*e*—2100*e* as a result of the positive pulses impressed upon the tens pulse conductors 32*a*, 32*b*, 32*c*–32*j* serve to bias the respective tens gating tubes beyond cutoff during off pulse periods. Thus considering the tens gating tube 2130 by way of example, each positive pulse appearing on the tens pulse conductor 32*c* charges the coupling condenser 2130*e* through the grid resistor 2130*b* to a relatively high voltage level. After the pulse ends the voltage across this condenser is negatively applied to the control grid of the tube 2130 to bias this tube against cutoff. Moreover, the pulse periodicity and the time constant of the condenser discharge circuit are such that the condenser 2130*e* cannot discharge sufficiently to render the tube 2130 conductive during an off pulse period. It will be understood, therefore, that the tube 2130 is only rendered conductive during each interval when a positive tens pulse is impressed on the conductor 32*c* to overcome the bias voltage built up across the condenser 2130*e*. In a similar manner, the voltages built up across the coupling condensers through which positive units pulses are respectively impressed upon the inner control grids of the units gate tubes serve to bias these tubes beyond cutoff during off pulse periods. Thus, the coupling condenser 2232*a* is charged through the grid resistor 2232*b* during each units pulse period in the correct sense to bias the control grid of the tube 2232 negative relative to the tube cathode to a point beyond the cutoff value of the tube during each off pulse interval. As a result, the tube 2232 is only rendered conductive during those intervals when positive units pulses are impressed on the units pulse conductor 31*b*.

From the above explanation it will be understood that each units gate tube is only operative to gate a signal bearing connector pulse during a predetermined units pulse of each pulse frame. Thus considering the tube 2223 by way of example, it will be understood that since the tens gate tube 2120 is only rendered operative to repeat signal bearing connector pulses during the positive tens pulse interval 73*a* of each pulse frame, all signal bearing pulses occurring within the frame except those which coincide with the tens pulse period 73*a* are blocked from the suppressor grid of the tube 2223. As many as ten signal bearing connector pulses may be gated through the tube 2120 to the suppressor grid of the units gate tube 2223 during each tens pulse interval 73*a*. However, this units gate tube is biased beyond cutoff by the voltage impressed upon the control grid from the condenser 2223*a* except when a positive units pulse is present on the conductor 31*c*. From an examination of Figs. 37 to 40 inclusive, it will be noted that only one positive units pulse, i.e., the pulse occurring in the time position 64*b*, is impressed upon the control grid of the tube 2223 during the tens pulse interval 73*a* when signal bearing connector pulses are gated to the suppressor grid of this tube by the tens gate tube 2120. It will thus be apparent that coincidence between the positive tens pulses respectively impressed upon the control grids of the ten tens gate tubes and the units pulses respectively impressed upon the control grids of the units gate tubes is required to effect gating of signal bearing connector pulses through the units gate tubes to the line circuits individually associated therewith.

Referring now more particularly to the mode of operation of the distributor 15 to repeat signal bearing connector pulses from the connector 12*b* to the line circuit 16 in the above-described call originating at the substation A and routed to the substation B, it will be understood that those connector pulses developed in the connector 12*b* which carry signal samples derived from the line 23 and are intended for the line 32 occur on the distributor input conductor 51 in the time position 63*c* assigned to the line 32. These pulses are negatively applied to the control grid of the master inverter tube 2140 and are amplified and inverted through this tube to appear as positive pulses at the tube anode. In order to prevent cross or spurious modulation of these pulses, the pulse base line or reference voltage is clamped to the ground potential level through the action of the crystal rectifier 2141. Thus if the reference voltage level on the conductor 51 tends to rise above ground potential, the rectifier 2141 conducts to charge the condenser 2143. The voltage thus developed across the condenser 2143 is subtracted from the actual pulse base line value so that the effective pulse base line potential is held at the ground potential level.

As explained above, the positive signal modulated connector pulses appearing at the anode of the master inverter tube 2140 are impressed upon the suppressor grids of the ten tens gate tubes in parallel. Those connector pulses appearing in the time position 63*c* assigned to the called line 32 are gated by the tens gate tube 2130 to the suppressor grids of the ten units gate tubes in the third horizontal string during the third tens pulse period 74*a* of each pulse frame. At this stage, the crystal rectifier 2130*b* coacts with the condenser 2130*a* to clamp the pulse base line potential level to the level of the negative bias derived from the potentiometer resistor 2130*d*. The connector pulses gated by the tube 2130 appear as negative pulses at the anode of this tube and are impressed upon the control grid of the inverter tube 2104 through the coupling condenser 2104*a*. At this state also, the crystal rectifier 2104*b* coacts with the condenser 2104*a* to clamp the pulse base line potential to the ground potential level and thus prevent spurious modulation of the gated pulses. The connector pulses thus impressed upon the control grid of the tube 2104 are amplified and inverted through this tube to appear as positive pulses at the anode thereof. These pulses are impressed upon the suppressor grids of the ten associated units gate tubes in the manner previously explained.

As explained above, the units gate tube 2232 is only rendered operative to gate amplified signal bearing connector pulses impressed upon the suppressor grid thereof through the condenser 2232*c* during that interval of each pulse frame when a positive units pulse is impressed upon the control grid of the tube in coincidence with the positive tens pulse impressed upon the control grid of the tens gate tube 2130. This means that only connector pulses modulated with signal samples derived from the connector 12*b* or more particularly from the calling line 23 and occurring in the time position 63*c* are gated by the tube 2232 to appear at the anode thereof. At the units gate tube 2232, the crystal rectifier 2232*d* coacts with the coupling condenser 2232*c* to clamp the connector pulse base line potential to the negative bias voltage level determined by the setting of the potentiometer 2321, thereby to prevent spurious modulation of the pulses gated by this tube. The signal modulated connector pulses thus developed at the anode of the tube 2232 are of negative polarity and are impressed upon the input circuit of the amplifier tube 2304 included in the line circuit 16 over a path which includes the coupling condenser 2232*e* and the crystal rectifier 2232*f*.

For reasons which will be apparent from the preceding explanation, the signal bearing connector pulses occurring in the time position 63*c* are gated to the circuit 16 at the rate of one pulse for each pulse frame, i.e., at a pulse repetition rate of ten kilocycles. In considering the manner in which the original signals are reconstructed from the samples modulated on the connector pulses gated by the tube 2232, it is pointed out that each pulse charges the condenser 2325 in the line circuit 16 to the amplitude level of the pulse through the low forward resistance of the crystal rectifier 2232*f*. During the succeeding off pulse period, the condenser 2325 discharges through the high back resistance of the rectifier 2232*f* and the resistor 2232*g*. The condenser 2325 also discharges through the resistor 2305 and the potentiometer 2306, and the combined effective resistance of the two parallel condenser discharge paths is preferably of the order of five hundred thousand ohms. In this regard it is noted that the size of the condenser 2235 is of considerable importance in that the condenser should not be so small as to discharge completely during each off pulse period or so large as not to discharge at all during each off pulse period. Thus the condenser 2325 is made so small as to fully discharge during each period separating the arrival of successive connector pulses, the rise or fall of voltage across this condenser has the effect of swinging the grid of the amplifier tube 2304 at the basic carrier frequency of ten kilocycles, such that an excess of carrier energy is delivered to the succeeding components of the line circuit 16. Conversely, if the condenser 2325 has too large a capacitance value, such that it does not discharge to any appreciable extent during an off pulse period, the voltage there-across is built up to a relatively high steady state value with the result that the modulation components of the connector pulses become ineffective to vary the voltage across this condenser in accordance with the amplitude of the signal samples modulated thereon. However, by making the condenser 2325 of the correct size, the voltage across this condenser is varied in accordance with variations in the amplitudes of the connector pulses, thereby to reconstruct the original signals from the signal samples modulated thereon.

The manner in which connector pulses modulated with signals intended for the calling line 23 and impressed upon the distributor input conductor 51 by the connector 12*b* in the time position 64*b* are amplified and inverted through the tube 2140, gated by the tens gate tube 2120, amplified and inverted by the tube 2103 and gated to the line circuit 11 through the units gate tube 2223 will be readily apparent from the preceding explanation with reference to operation of the distributor 15 to deliver samples to the line circuit 16. In an entirely similar manner, the distributor 15 is operative to gate to the other ninety-eight line circuits of the system signal samples occurring in the time positions individually assigned to the lines associated with or terminated by these line circuits. From the above description, it will be apparent that the distributor 15 is arranged to deliver signal modulated connector pulses or signal samples to the one hundred line circuits of the system on a decimal basis. Effectively, this is accomplished by the described method of double multiplexing, employing slow speed distribution of the connector pulses to the units gate circuits followed by high speed distribution of the signal samples to the line circuits through the units gate circuits. As in the multiplexer 11, this arrangement has the important advantage of eliminating the necessity for providing ring circuits in the common equipment having one hundred stages, i.e., stages equal in number to the number of lines in the system. The described method of double multiplexing at the high and low speeds becomes even more important when the system is expanded to accommodate the requirements of exchanges having more than one hundred lines. It also has the important advantage of eliminating the necessity for carrying one hundred or more pulse bus conductors throughout the exchange. Thus, in the illustrated arrangement, the distributor 15 has only a single input channel, namely, that comprising the conductor 51 and the ground return bus conductor of the system.

As in the multiplexer 11, two difficult problems solved in the development of the distributor 15 were those of preventing distortion of the signal modulated connector pulses and of preventing cross talk between the pulses occurring in different time positions which would result in cross talk between the different signal transmission paths through the distributor. Spurious modulation of the connector pulses entering the distributor 15 over the distributor input conductor 51 is in part prevented by the described clamping circuits provided in association with the input electrodes of the master inverter tube 2140, the tens gate tubes 2110, 2120, 2130—2100, the tens inverter tubes 2102, 2103, 2104, etc. and the units gate tubes. Variations in the amplitude of the tens pulses delivered to the tens gate tubes over the conductors 32*a*, 32*b*, 32*c*—32*j* and variations in the amplitude of the units pulses delivered to the control grids of the units gate tubes over the conductors 31*a*, 31*b*, 31*c*—31*j* may also have the effect of distorting the signal samples handled by the distributor 15. Such variations in the tens units gate pulse amplitudes are minimized by the described resistance-capacitance coupling circuits employed to impress these pulses upon the control grids of the respective tens and units gate tubes.

Another very important feature of the distributor 15 which also contributes to reduction of cross talk between the signal bearing connector pulses is that of employing the inner control grids of the tens and units gating tubes as the pulse gating grids and of using the suppressor grids of these tubes as the signal excited control grids of the tubes. The importance of this feature of the distributor is exactly the same as explained previously with reference to the multiplexer 11. Cross talk between the signal bearing connector pulses handled by the distributor 15 is also reduced by operating the screen electrodes of the tens and units gating tubes at conservative voltages so that they will not heat up and act as electron emitters to the tube anodes. This is accomplished by providing a voltage dropping resistor, such, for example, as the resistor 2232*h*, between the 150 volt anode current source and the screen electrode of each of the gating tubes. Further to minimize signal frequency variations in the potentials on the screen electrodes of the gating tubes, each such electrode is by-passed to ground at signal frequencies by a suitable by-pass condenser, such, for example, as the condenser 2232*j*. When the described features are incorporated in the distributor 15, cross talk between the signal bearing connector pulses handled by the distributor and spurious modulation of these pulses within the distributor itself are reduced to tolerable minimums.

SUMMARY

It will be understood that each of the finder-connector links 13, 14, etc., provided in the system is directively controllable in the same manner as the described link 12 to set up a two-way communication connection between any two lines of the system. Thus the several links of the system are capable of providing mutually non-interfering and secret two-way communication connections between a like number of different pairs of lines at the same time. Although the invention has been disclosed herein with particular reference to operation of the present improved apparatus to set up communication connections between subscribers' lines, it will be readily understood by those skilled in the art that the apparatus may also be employed to interconnect interoffice or inter-switch stage trunks or trunk lines with each other or in various combinations of trunks and subscribers' lines. Accordingly, the term "line" or "lines" as used herein and particularly in the claims hereof is hereby defined to include trunks or trunk lines of any and all types as well as subscriber lines. Also by way of definition, it is pointed out that the term "link" as used in the claims hereof is intended to include any switching stage of numerical (directively controllable by dial impulses) or non-numerical (non-directively controlled) type or a combination of one numerical and one non-numerical switching stage. Further, the term "supervisory signal" as used herein and particularly in the claims hereof denotes any signal which performs a control or informative function incident to the setting up of a connection through the improved apparatus disclosed herein and specifically includes on-hook and off-hook signals, dial and busy tone signals, and ringing, ring start, ring cut-off and ring back tone signals. It is also pointed out that where crystal rectifiers are specified in the circuits disclosed herein, rectifiers of the germanium crystal type may well be employed, although any low capacitance type rectifier, including hot cathode electron discharge tubes, may be used.

From the above explanation it will be understood that in the present improved system, all line selecting and signal transmission functions are performed exclusively by electronic facilities without using any electromechanical switching components whatever. As a consequence, line selecting times are many times faster than in conventional automatic telephone systems. Moreover, the dial impulsing speeds to which the present system is capable of responding are much greater than in conventional systems. Also, the present system is characterized by novel facilities for providing each and every one of the supervisory signaling functions normally provided in conventional automatic telephone systems. In this regard particular emphasis is directed to the very simple and yet novel arrangement disclosed herein for guarding busy lines against intrusion and for determining the idle or busy condition of called lines. All of the above and other advantages are realized with the present improved system without any detectable sacrifice in the quality of signal transmission between calling and called substations. Moreover, since no electromechanical switching components, such for example, as relays, stepping switches and the like, are employed in the system, the problems of minimizing, discovering and eliminating relay or switch contact failures are entirely eliminated. From the standpoints of initial equipment cost, equipment size, operating cost, and maintenance cost, the present improved system compares favorably on a per line basis with conventional automatic telephone systems. As far as the possibilities of increasing the trunking capacity of a given exchange are concerned, the present improved system is far superior to known types of automatic telephone systems.

While one embodiment of the present invention has been disclosed, it will be understood that various modifications may be made therein without departing from the true spirit and scope of the invention as defined in the appended claims.

I claim:

1. In an automatic telephone system, a plurality of lines having individually assigned thereto different time positions in repetitive time position frames, a selector provided with two pulse input channels and a pulse output channel and including pulse gating means controlled by pulses transmitted over one of said pulse input channels in the time position assigned to a calling one of said lines for gating pulses transmitted to said selector over the other of said pulse input channels in the same time position, the pulses gated to said selector through said pulse gating means from said other pulse input channel being modulated in accordance with signals derived from the calling line, means included in said selector for reconstructing the signals modulated on the pulses gated by said pulse gating means, means included in said selector and controlled by the pulses gated by said pulse gating means for gating pulses to said pulse output channel in a different time position, and means included in said selector for modulating the pulses gated to said pulse output channel with said reconstructed signals.

2. In an automatic telephone system, a plurality of lines having individually assigned thereto different time positions in repetitive time position frames, a selector provided with two pulse input channels and a pulse output channel and including pulse gating means controlled by pulses transmitted over one of said pulse input channels in the time position assigned to a calling one of said lines for gating pulses transmitted to said selector over the other of said pulse input channels in the same time position, means included in said selector and controlled by the pulses gated by said pulse gating means for gating pulses to said selector from said other pulse input channel in the time position assigned to a called one of said lines, the pulses gated to said selector by said last-named means being modulated in accordance with signals derived from the called line, means including in said selector for reconstructing said signals, means included in said selector and controlled by the pulses transmitted over said one input channel for gating pulses to said output channel in the time position assigned to the calling line, and means included in said selector for modulating the pulses gated to said pulse output channel with said reconstructed signals.

3. In an automatic telephone system, a plurality of lines having individually assigned thereto different time positions in repetitive time position frames, a selector provided with two pulse input channels and a pulse output channel and including pulse gating means controlled by pulses transmitted over one of said pulse input channels in the time position assigned to a calling one of said lines for gating pulses transmitted to said selector over the other of said pulse input channels in the same time position, the pulses gated to said selector through said pulse gating means from said other pulse input channel being modulated in accordance with signals derived from the calling line, means included in said selector for reconstructing the signals modulated on the pulses gated by said pulse gating means, means included in said selector and controlled by the pulses gated by said pulse gating means for gating pulses to said pulse output channel in a different time position, means included in said selector for modulating the pulses gated to said pulse output channel with said signals, means included in said selector and controlled by the pulses gated by said pulse gating means for gating pulses to said selector from said pulse input channel in the time position assigned to a called one of said lines, the pulses gated to said selector by said last-named means being modulated in accordance with signals derived from the called line, means included in said selector for reconstructing said last-named signals, means included in said selector and controlled by the pulses transmitted over said one input channel for gating pulses to said output channel in the time position assigned to the calling line, and means included in said selector for gating the pulses gated to said pulse output channel by said last-named means with said last-named signals.

4. In an automatic telephone system, a plurality of lines having individually assigned thereto different time positions in repetitive time position frames, a selector provided with two pulse input channels and a pulse output channel and including pulse gating means controlled by pulses transmitted over one of said pulse input channels in the time position assigned to a calling one of said lines for gating pulses transmitted to said selector over the other of said pulse input channels in the same time position, the pulses gated to said selector through said pulse gating means from said other pulse input channel being modulated in accordance with signals derived from the calling line, means included in said selector for reconstructing the signals modulated on the pulses gated by said pulse gating means, means included in said selector and controlled by the pulses transmitted over said one pulse input channel for gating pulses to said pulse output channel in the time position assigned to the calling line, means included in said selector for selectively modulating the pulses gated to said output channel by said last named means with at least one supervisory signal, means included in said selector and at least partially controlled by the pulses gated by said pulse gating means for gating pulses to said output channel in a different time position, and means included in said selector for modulating the pulses gated by said last named means with said reconstructed signals.

5. In an automatic telephone system, a plurality of lines having individually assigned thereto different time positions in repetitive time position frames, a selector provided with a pulse input channel and a pulse output channel and including pulse gating means controlled in accordance with the identity of a calling one of said lines for gating pulses to said selector from said pulse input channel in the time position assigned to the calling line, the pulse flow from said pulse input channel through said pulse gating means to said selector being modulated in accordance with the transmission of switch directing impulses over the calling line, a group of pulse paths, means for sequentially transmitting pulses to said selector in each of said time positions over said groups of pulse paths, means included in said selector and responsive to said modulation of the pulse flow through said pulse gating means for selecting one of the pulses transmitted to said selector over said groups of pulse paths which occurs in a different time position, and means included in said selector and controlled by the pulses selected by said last-named means for gating pulses to said output channel in said different time position.

6. In an automatic telephone system, a plurality of lines having individually assigned thereto different time positions in repetitive time position frames, a selector provided with a pulse input channel and a pulse output channel and including pulse gating means controlled in accordance with the identity of a calling one of said lines for gating pulses to said selector from said pulse input channel in the time position assigned to the calling line, the pulse flow from said pulse input channel through said pulse gating means to said selector being interrupted during a portion of each switch directing impulse transmitted over the calling line, a group of pulse paths, means for sequentially transmitting pulses to said selector in each of said time positions over said group of pulse paths, means included in said selector and responsive to said interruptions in pulse flow through said pulse gating means for selecting one of the pulses transmitted to said selector over said groups of pulse paths which occurs in a different time position, and means included in said selector and controlled by the pulses selected by said last-named means for gating pulses to said output channel in said different time position.

7. In an automatic telephone system, a plurality of lines having individually assigned thereto different time positions in repetitive time position frames, a selector provided with a pulse input channel and a pulse output channel and including pulse gating means controlled in accordance with the identity of a calling one of said lines for gating pulses to said selector from said pulse input channel in the time position assigned to the calling line, the pulse flow from said pulse input channel through said pulse gating means to said selector being interrupted during a portion of each switch directing impulse transmitted over the calling line, a group of pulse paths, means for sequentially transmitting pulses to said selector in each of said time positions over said group of pulse paths, an impulse integrator circuit included in said selector and operative to develop a control pulse in response to each interruption in pulse flow from said pulse input channel through said pulse gating means to said selector, impulse register means included in said selector and responsive to said control pulses to select one of the pulses transmitted to said selector over said groups of pulse paths which occur in a different time position, and means included in said selector and controlled by the pulses selected by said impulse register means for gating pulses to said output channel in said different time position.

8. An impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means to said selector being interrupted during a portion of each impulse, a group of pulse paths, means for sequentially transmitting pulses to said selector in each of said time positions over said group of pulse paths, an impulse integrator circuit operative to develop a control pulse in response to each interruption in pulse flow through said pulse gating means to said selector, impulse register means responsive to said control pulses to select one of the pulses transmitted to said selector over said group of pulse paths which occurs in a different time position, and means controlled by the pulses selected by said impulse register means for gating pulses to said output channel in said different time position.

9. An impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means to said selector being interrupted during a portion of each impulse, an impulse integrator circuit operative to develop a control pulse in response to each interruption in pulse flow through said pulse gating means to said selector, impulse register means comprising a string of electric discharge tubes of the gaseous discharge type, means responsive to said control pulses for firing said tubes in sequence at the rate of one tube each control pulse, and means controlled by the last-fired tube of said string for gating pulses to said output channel in a different time position.

10. An impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means to said selector being interrupted during a portion of each impulse, an impulse integrator circuit operative to develop a control pulse in response to each interruption in pulse flow through said pulse gating means to said selector, impulse register means comprising a string of electric discharge tubes of the gaseous discharge type, means responsive to said control pulses for firing said tubes in sequence at the rate of one tube for each control pulse, pulse gating circuits individually controlled by said tubes and each operative to gate pulses which the tube controlling the circuit is fired, and means controlled by the pulses gated by the circuit controlled by the last-fired one of said tubes for gating pulses to said output channel in a different time position.

11. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a group of units pulse paths, means for sequentially transmitting units pulses to said selector in each of said time positions over said group of units pulse paths, a group of group pulse paths, means for transmitting group pulses to said selector over said group of group pulse paths, a pair of digit registers successively responsive to the control pulses produced by said integrator circuit during two successive digits and jointly operative to combine one of said group pulses and one of said units pulses to form selector pulses occuring in one of said time positions, and means controlled by said selector pulses for gating pulses to said output channel in said one time position.

12. A two-digit impulse responsive signal repeating selector of the pulse multiplexer type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a pair of digit registers each including a string of electric discharge tubes of the gaseous discharge type, means responsive to the control pulses developed by said integrator circuit during a first digit for firing the tubes of one of said strings at the rate of one tube for each control pulse, means responsive to cessation of the control pulses developed during said one digit for rendering said last-named means non-responsive to further control pulses, means responsive to the control pulses developed by said integrator circuit during a second digit for firing the tubes of the other of said strings at the rate of one tube for each control pulse, and means jointly controlled by the last fired tubes of said impulse registers for gating pulses to said output channel in one of said time positions.

13. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a pair of digit registers each including a string of electric discharge tubes of the gaseous discharge type, means responsive to the control pulses developed by said integrator circuit during a first digit for firing the tubes of one of said strings at the rate of one tube for each control pulse, means responsive to cessation of the control pulses developed during said one digit for rendering said last-named means non-responsive to further control pulses, means responsive to the control pulses developed by said integrator circuit during a second digit for firing the tubes of the other of said strings at the rate of one tube for each control pulse, pulse gating circuits individually controlled by said tubes and each operative to gate pulses when the tube controlling the circuit is fired, and means jointly controlled by the pulses gated by the pulse gating circuits controlled by the last fired tubes of said registers for gating pulses to said output channel in one of said time positions.

14. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a pair of digit registers each including a string of electric discharge tubes of the gaseous discharge type, means responsive to the control pulses developed by said integrator circuit during a first digit for firing the tubes of one of said strings at the rate of one tube for each control pulse, means responsive to cessation of the control pulses developed during said one digit for rendering said last-named means nonresponsive to further control pulses, means responsive to the control pulses developed by said integrator circuit during a second digit for firing the tubes of the other of said strings at the rate of one tube for each control pulse, pulse gating circuits individually controlled by said tubes and each operative to gate pulses when the tube controlling the circuit is fired, means for combining the pulses gated by the pulse gating circuits controlled by the last fired tubes of said registers to form pulses which recur in one of said time positions, and means responsive to said last-named pulses for gating pulses to said output channel in said one time position.

15. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a pair of digit registers each including a string of electric discharges tubes of the gaseous discharge type, a pair of gate circuits for respectively repeating said control pulses to said registers, means normally blocking one of said gate circuits against repeating control pulses to its associated register, means responsive to cessation of the control pulses developed during a first impulse digit for opening said one gate circuit and for blocking the other gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, and means jointly controlled by the last fired tubes of said registers for gating pulses to said output channel in one of said time positions.

16. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, the pulse flow from said pulse input channel through said pulse gating means being interrupted during a portion of each impulse, an impulse integrator circuit operative to develop a control pulse in response to each interruption in pulse flow through said pulse gating means to said selector, a pair of digit registers each including a string of electric discharge tubes of the gaseous discharge type, a pair of gate circuits for respectively repeating said control pulses to said registers, means normally blocking one of said gate circuits against repeating control pulses to its associated register, means responsive to cessation of the control pulses developed during a first impulse digit for opening said one gate circuit and for blocking the other gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, and means jointly controlled by the pulses gated by the pulse gating circuits controlled by the last fired tubes of said registers for gating pulses to said output channel in one of said time positions.

17. A two-digit impulse responsive signal repeating selector of the pulse multiplex type adapted for selective response to pulses transmitted thereto over a pulse input channel in predetermined time positions of repetitive time position frames and provided with a pulse output channel, comprising pulse gating means for selectively gating pulses to said selector from said pulse input channel in any one of said time positions, means for interrupting the pulse flow from said pulse input channel through said pulse gating means during a portion of each impulse, an impulse integrator circuit operative to develop a control pulse in response to each interruption in pulse flow through said pulse gating means to said selector, a pair of digit registers each including a string of electric discharge tubes of the gaseous discharge type, a pair of gate circuits for respectively repeating said control pulses to said registers, means normally blocking one of said gate circuits against repeating control pulses to is associated register, means responsive to cessation of the control pulses developed during a first impulse digit for opening said one gate circuit and for blocking the other gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last fired tubes of said registers to form pulses which recur in one of said time positions, and means responsive to said last-named pulses for gating pulses to said output channel in said one time position.

18. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit contnrolled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, and means for modulating the pulses gated to said output channel with the signals reconstructed by said reconstructor circuit.

19. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for preventing said last-named means from operating in the event said selector pulses are coincident with busy pulses fed to said selector over said busy pulse channel, and means for modulating the pulses gated to said output channel with the signals reconstructed by said reconstructor circuit.

20. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for modulating the pulses gated to said output channel with the signals reconstructed by said reconstructor circuit, and a busy pulse gate circuit jointly controlled by said selector pulses and said busy test circuit for releasing busy pulses to said busy pulse channel in the time position assigned to the called line.

21. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for preventing said last-named means from operating in the event said selector pulses are coincident with busy pulses fed to said selector over said busy pulse channel, means for modulating the pulses gated to said output channel with the signals reconstructed by said reconstructor circuit, and a busy pulse gate circuit jointly controlled by said selector pulses and said busy test circuit for releasing busy pulses to said busy pulse channel in the time position assigned to the called line.

22. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for initially modulating the pulses gated to said output channel with a ringing control signal, a gate circuit controlled by said selector pulses and conditioned to admit pulses to said selector from said signal pulse input channel in the time position assigned to the called line in response to operation of said busy test circuit, a ring trip circuit operative in response to the gating of pulses by said last-named gate circuit, means responsive to operation of said ring trip circuit for removing said ringing control signal modulation from the pulses gated to said output channel, and means for thereafter modulating the pulses gated to said output channel with the signals reconstructed by said reconstructor circuit.

23. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for preventing said last-named means from operating in the event said selector pulses occur coincidentally with busy pulses fed to said selector over said busy pulse channel, means operative in the event the called line tests idle for initially modulating the pulses gated to said output channel with a ringing control signal, a gate circuit controlled by said selector pulses and conditioned to admit pulses to said selector from said signal pulse input channel in the time position assigned to the called line in response to operation of said busy test circuit, a ring trip circuit operative in response to the gating of pulses by said last-named gate circuit, means responsive to operation of said ring trip circuit for removing said ringing control signal modulation from the pulses gated to said output channel, and means for thereafter modulating the pulses gated to said output channel with the signals reconstructed by said reconstructor circuit.

24. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idler or busy, means jointly controlled by said busy test circuit and said selector pulses for gating pulses to said output channel in the time position assigned to the called line in the event said selector pulses are not coincident with busy pulses fed to said selector over said busy pulse channel, a busy pulse gate circuit jointly controlled by said selector pulses and said busy test circuit for releasing busy pulses to said busy pulse channel in the time position assigned to the called line, means for initially modulating the pulses gated to said output channel with a ringing control signal, a gate circuit controlled by said selector pulses and conditioned to admit pulses to said selector from said signal pulse input channel in the time position assigned to the called line in response to operation of said busy test circuit, a ring trip circuit operative in response to the gating of pulses by said last-named gate circuit, means responsive to operation of said ring trip circuit for removing said ringing control signal modulation from the pulses gated to said output channel, and means for thereafter modulating the pulses gated to said output channel with the signals reconstructed by said reconstructor circuit.

25. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, pulse gating means controlled by pulses transmitted to said selector over said gate pulse channel in the time position assigned to a calling one of said lines for gating pulses to said selector from said signal pulse input channel in the same time position, means for modulating the pulses gated to said selector by said pulse gating means in accordance with signals derived from the calling line and for interrupting the flow of pulses through said pulse gating means during a portion of each impulse transmitted over the calling line, a signal reconstructing circuit controlled by said pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, a busy test circuit for comparing the time position of said selector pulses with the time positions of busy pulses fed to said selector over said busy pulse channel, thereby to determine whether the called line is idle or busy, means jointly controlled by said busy test circuit and said selector pulses for gating pulses to said output channel in the time position assigned to the called line in the event said selector pulses are not coincident with busy pulses fed to said selector over said busy pulse channel, means for preventing said last-named means from operating in the event said selector pulses occur coincidentally with busy pulses fed to said selector over said busy pulse channel, a busy pulse gate circuit jointly controlled by said selector pulses and said busy test circuit for releasing busy pulses to said busy pulse channel in the time position assigned to the called line in the event the called line tests idle, means operative in the event the called line tests idle for initially modulating the pulses gated to said ouput channel with a ringing control signal, a gate circuit controlled by said selector pulses and conditioned to admit pulses to said selector from said signal pulse input channel in the time position assigned to the called line in response to operation of said busy test circuit, a ring trip circuit operative in response to the gating of pulses by said last-named gate circuit, means responsive to operation of said ring trip circuit for removing said ringing control signal modulation from the pulses gated to said output channel, and means for thereafter modulating the pulses gated to said output channel with the signals reconstructed by said reconstructor circuit.

26. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, and means controlled by said busy test means for modulating the pulses gated to said output channel by said second pulse gating means with a busy signal in the event said selector pulses occur coincidentally with busy pulses fed to said selector over said busy pulse channel.

27. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, means controlled by said busy test means for modulating the pulses gated to said output channel by said second pulse gating means with a busy signal in the event said selector pulses occur coincidentally with busy pulses fed to said selector over said busy pulse channel, means jointly controlled by said busy test means and said selector pulses for gating pulses to said output channel in the time position assigned to the calling line in the event said selector pulses do not occur coincidentally with busy pulses fed to said selector over said busy pulse channel, and means for modulating the pulses gated to said output channel by said last-named means with the signals reconstructed by said reconstructor circuit.

28. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the registers in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, means controlled by said busy test means for modulating the pulses gated to said output channel by said second pulse gating means with a busy signal in the event said selector pulses occur coincidentally with busy pulses fed to said selector over said busy pulse channel, third pulse gating means jointly controlled by said busy test means and said selector pulses for gating pulses to said output channel in the time position assigned to the calling line in the event said selector pulses do not occur coincidentally with busy pulses fed to said selector over said busy pulse channel, means for initially modulating the pulses gated to said output channel by said third pulse gating means with a ringing control signal, means for concurrently modulating the pulses gated to said output channel by said second pulse gating means with a ring back tone signal, fourth pulse gating means controlled by said selector pulses and conditioned to admit pulses to said selector from said signal input channel in the time position assigned to the called line in response to operation of said busy test means to indicate that the called line is idle, a ring trip circuit operative in response to the gating of pulses by said fourth pulse gating means, means responsive to operation of said ring trip circuit for removing said ringing control signal modulation from the pulses gated to said output channel by said third pulse gating means and for removing said ring back tone modulation from the pulses gated to said output channel by said second pulse gating means, and means for thereafter modulating the pulses gated to said output channel by said third pulse gating means with the signals reconstructed by said reconstructor circuit.

29. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means responsive to the operative association of said selector with the calling line for modulating the pulses gated to said output channel by said second pulse gating means with a dial tone signal, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, means responsive to the first control pulse developed by said impulse integrator circuit for removing the dial tone modulation from the pulses gated to said output channel by said second pulse gating means, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, means jointly controlled by said busy test means and said selector pulses for gating pulses to said output channel in the time position assigned to the called line in the event said selector pulses are not coincident with busy pulses fed to said selector over said busy pulse channel, and means for modulating the pulses gated to said output channel with the signals reconstructed by said reconstructor circuit.

30. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means responsive to the operative association of said selector with the calling line for modulating the pulses gated to said output channel by said second pulse gating means with a dial tone signal, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, means responsive to the first control pulse developed by said impulse integrator circuit for removing the dial tone modulation from the pulses gated to said output channel by said second pulse gating means, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, third pulse gating means jointly controlled by said busy test means and said selector pulses for gating pulses to said output channel in the time position assigned to the calling line in the event said selector pulses do not occur coincidentally with busy pulses fed to said selector over said busy pulse channel, means for initially modulating the pulses gated to said output channel by said third pulse gating means with a ringing control signal means for concurrently modulating the pulses gated to said output channel by said second pulse gating means with a ring back tone signal, fourth pulse gating means controlled by said selector pulses and conditioned to admit pulses to said selector from said signal input channel in the time position assigned to the called line in respone to operation of said busy test means to indicate that the called line is idle, a ring trip circuit operative in response to the gating of pulses by said fourth pulse gating means, means responsive to operation of said ring trip circuit for removing said ringing control signal modulation from the pulses gated to said output channel by said third pulse gating means and for removing said ring back tone modulation from the pulses gated to said output channel by said second pulse gating means, and means for thereafter modulating the pulses gated to said output channel by said third pulse gating means with the signals reconstructed by said reconstructor circuit.

31. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means responsive to the operative association of said selector with the calling line for modulating the pulses gated to said output channel by said second pulse gating means with a dial tone signal, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said pulse gating means, an impulse integrator circuit controlled by said reconstructor circuit to develop a control pulse in response to each interruption in pulse flow through said pulse gating means to said selector, means responsive to the first control pulse developed by said impulse integrator circuit for removing the dial tone modulation from the pulses gated to said output channel by said second pulse gating means, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, and means controlled by said busy test means for modulating the pulses gated to said output channel by said second pulse gating means with a busy signal in the event said selector pulses occur coincidentally with busy pulses fed to said selector over said busy pulse channel.

32. In an automatic telephone system which includes a plurality of lines having individually assigned thereto different time positions in repetitive time position frames, an impulse responsive signal repeating selector provided with a gate pulse input channel, a signal pulse input channel, a busy pulse input channel and a signal pulse output channel, and including, in combination, first pulse gating means controlled by pulses transmitted to said selector over said gate pulse channel in the time position assigned to a calling one of said lines for gating pulses to said selector from said signal pulse input channel in the same time position, second pulse gating means controlled by pulses transmitted to said selector over said gate pulse channel in the time position assigned to the calling line for gating pulses to said output channel in the same time position, means responsive to the operative association of said selector with the calling line for modulating the pulses gated to said output channel by said second pulse gating means with a dial tone signal, means for modulating the pulses gated to said selector by said first pulse gating means in accordance with signals derived from the calling line and for interrupting the flow of pulses through said first pulse gating means during a portion of each impulse transmitted over the calling line, a signal reconstructing circuit controlled by said first pulse gating means to reconstruct the signals modulated on the pulses gated by said first pulse gating means, an impulse integrator circuit controlled by said reconstructor circuit to develop a control pulse in response to each interruption in pulse flow through said pulse gating means to said selector, means responsive to the first control pulse developed by said impulse integrator circuit for removing the dial tone modulation from the pulses gated to said output channel by said second pulse gating means, a pair of digit registers each including a string of gaseous discharge tubes, a pair of control pulse gate circuits for respectively repeating said control pulses to said registers, means normally blocking one of said control pulse gate circuits against repeating control pulses to its associated register, means responsive to cessation of the control pulses developed during a first impulse digit for opening said one control pulse gate circuit and for blocking the other control pulse gate circuit against repeating said control pulses to the associated register, whereby the control pulses developed during said first digit are repeated to one of said registers and the control pulses developed during a second and succeeding digit are repeated to the other of said registers, each of said registers including means for firing the tubes of the register in sequence as the control pulses are repeated thereto, pulse gating circuits individually controlled by said tubes and each operative to gate pulses when the tube controlling the circuit is fired, means for combining the pulses gated by the pulse gating circuits controlled by the last-fired tubes of said registers to form selector pulses which occur in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is idle or busy, means controlled by said busy test means for modulating the pulses gated to said output channel by said second pulse gating means with a busy signal in the event said selector pulses occur coincidentally with busy pulses fed to said selector over said busy pulse channel, means jointly controlled by said busy test means and said selector pulses for gating pulses to said output channel in the time position assigned to the called line in the event said selector pulses are not coincident with busy pulses fed to said selector over said busy pulse channel, and means for modulating the pulses gated to said output channel with the signals reconstructed by said reconstructor circuit.

33. In an automatic telephone system which includes a plurality of lines having individually assigned thereto different time positions in repetitive time position frames, an impulse responsive selector provided with a pulse input channel, a busy pulse channel and a pulse output channel, and including, in combination, first pulse gating means controlled in accordance with the identity of a calling one of said lines for gating pulses to said selector from said input channel in the time position assigned to the calling line, second pulse gating means controlled in accordance with the identity of the calling line for gating pulses from said selector to said output channel in the time position assigned to the calling line, means for modulating the pulses gated to said selector by said first pulse gating means in accordance with impulses transmitted over the calling line, means responsive to the impulse modulation of the pulses gated to said selector by said first pulse gating means for producing selector pulses in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, and means controlled by said busy test means for modulating the pulses gated to said output channel by said second pulse gating means with a busy signal in the event said selector pulses occur coincidentally with busy pulses fed to said selector over said busy pulse channel.

34. In an automatic telephone system which includes a plurality of lines having individually assigned thereto different time positions in repetitive time position frames, an impulse responsive selector provided with a pulse input channel, a busy pulse channel and a pulse output channel, and including, in combination, first pulse gating means controlled in accordance with the identity of a calling one of said lines for gating pulses to said selector from said input channel in the time position assigned to the calling line, second pulse gating means controlled in accordance with the identity of the calling line for gating pulses from said selector to said output channel in the time position assigned to the calling line, means for modulating the pulses gated to said selector by said first pulse gating means in accordance with impulses transmitted over the calling line, means responsive to the impulse modulation of the pulses gated to said selector by said first pulse gating means for producing selector pulses in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, means controlled by said busy test means for modulating the pulses gated to said output channel by said second pulse gating means with a busy signal in the event said selector pulses occur coincidentally with busy pulses fed to said selector over said busy pulse channel, and means controlled by said busy test means for gating pulses to said busy pulse channel in the time position assigned to the called line in the event said selector pulses do not occur coincidentally with busy pulses fed to said selector over said busy pulse channel.

35. In an automatic telephone system which includes a plurality of lines having individually assigned thereto different time positions in repetitive time position frames, an impulse responsive signal repeating selector provided with a signal pulse input channel and a pulse output channel, and including, in combination, first pulse gating means controlled in accordance with the identity of a calling line for gating pulses from said signal pulse input channel to said selector in the time position assigned to the calling line, means for modulating the pulses transmitted from said input channel to said selector in accordance with each impulse transmitted over the calling line, second pulse gating means also controlled in accordance with the identity of the calling line for gating pulses to said output channel in the time position assigned to the calling line, a control tube in said selector, means for rendering said tube conductive in response to transmission of pulses through said first pulse gating means, means for modulating the pulses gated to said output channel by said second pulse gating means with a dial tone signal when said tube is rendered conductive, and means responsive to impulse modulation of the pulses transmitted to said selector from said input channel for rendering said tube non-conductive, thereby to remove the dial tone signal modulation from the pulses gated to said output channel.

36. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling line for gating pulses from said input channel to said selector, means for modulating the pulses gated to said selector from said input channel in accordance with each impulse transmitted over the calling line, means responsive to the impulse modulation of the pulses gated to said selector by said first pulse gating means for producing selector pulses in the time position assigned to a called one of said lines, second pulse gating means controlled by said selector pulses for gating pulses to said output channel in the time position assigned to the called line, means for modulating the pulses gated to said output channel with a ringing control signal, third pulse gating means controlled by said selector pulses to gate pulses from said input channel to said selector in the time position assigned to the called line, a ring trip control tube of the gaseous discharge type, means responsive to the pulses gated to said selector by said third pulse gating means for firing said tube, and means for removing the ringing control signal modulation from the pulses gated to said output channel by said second pulse gating means when said ring trip tube is fired.

37. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling line for gating pulses from said input channel to said selector, means for modulating the pulses gated to said selector from said input channel in accordance with each impulse transmitted over the calling line, second pulse gating means also controlled in accordance with the identity of the calling line for gating pulses to said output channel in the time position assigned to the calling line, means responsive to the impulse modulation of the pulses gated to said selector by said first pulse gating means for producing selector pulses in the time position assigned to a called one of said lines, third pulse gating means controlled by said selector pulses for gating pulses to said output channel in the time position assigned to the called line, means for modulating the pulses gated to said output channel by said third pulse gating means with a ringing control signal, means for concurrently modulating the pulses gated to said output channel by said second pulse gating means with a ring back tone signal, fourth pulse gating means controlled by said selector pulses to gate pulses from said input channel to said selector in the time position assigned to the called line, a ring trip control tube of the gaseous discharge type, means responsive to the pulses gated to said selector by said fourth pulse gating means for firing said tube, and means for removing the ringing control signal modulation from the pulses gated to said output channel by said third pulse gating means and for removing the ring back tone signal modulation from the pulses gated to said output channel by said second pulse gating means when said ring trip tube is fired.

38. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling line for gating pulses from said input channel to said selector, means for modulating the pulses gated to said selector from said input channel in accordance with each impulse transmitted over the calling line, second pulse gating means also controlled in accordance with the identity of the calling line for gating pulses to said output channel in the time position assigned to the calling line, a control tube in said selector, means for rendering said tube conductive in response to the transmission of pulses through said first pulse gating means, means responsive to operative association of said selector with the calling line for modulating the pulses gated to said output channel by said second pulse gating means with a dial tone signal when said tube is rendered conductive, means responsive to the impulse modulation of the pulses gated to said selector by said first pulse gating means for rendering said tube non-conductive, thereby to remove the dial tone signal modulation from the pulses gated to said output channel by said second pulse gating means, and for producing selector pulses in the time position assigned to a called one of said lines, third pulse gating means controlled by said selector pulses for gating pulses to said output channel in the time position assigned to the called line, means for modulating the pulses gated to said output channel by said third pulse gating means with a ringing control signal, means for concurrently modulating the pulses gated to said output channel by said second pulse gating means with a ring back tone signal, fourth pulse gating means controlled by said selector pulses to gate pulses from said input channel to said selector in the time position assigned to the called line, and means responsive to the pulses gated to said selector by said fourth pulse gating means for removing the ringing control signal modulation from the pulses gated to said output channel by said third pulse gating means and for removing the ring back tone signal modulation from the pulses gated to said output channel by said second pulse gating means.

39. In an automatic telephone system which includes a plurality of lines having individually assigned thereto different time positions in repetitive time position frames, an impulse responsive signal repeating selector provided with a pulse input channel, a busy pulse channel and a pulse output channel, and including, in combination, first pulse gating means controlled in accordance wtih the identity of a calling one of said lines for gating pulses to said selector from said pulse input channel in the time position assigned to the calling line, means for modulating the pulses gated to said selector by said pulse gating means in accordance with impulses transmitted over the calling line, second pulse gating means also controlled in accordance with the identity of the calling line for gating pulses to said output channel in the time position assigned to the calling line, a control tube in said selector of the gaseous discharge type, means for firing said tube in response to transmission of pulses through said first pulse gating means, means for modulating the pulses gated to said output channel by said second pulse gating means with a dial tone signal when said control tube is fired, means responsive to the impulse modulation of the pulses gated to said selector by said first pulse gating means for extinguishing said control tube, thereby to remove the dial tone signal modulation from the pulses gated to said output channel by said second pulse gating means, and for producing selector pulses in the time position assigned to a called one of said lines, means for impressing busy pulses on said busy pulse channel in the time positions of other busy lines of the system, busy test means for comparing the time position of said selector pulses with the time positions of busy pulses fed to said selector over said busy pulse channel, thereby to determine whether the called line is busy or idle, means controlled by said busy test means for modulating the pulses gated to said output channel, by said second pulse gating means with a busy signal in the event said selector pulses occur coincidentally with busy pulses fed to said selector over said busy pulse channel, third pulse gating means jointly controlled by said selector pulses and said busy test means for gating pulses to said output channel in the time position assigned to the calling line in the event said selector pulses do not occur coincidentally with busy pulses fed to said selector over said busy pulse channel, means for modulating the pulses gated to said output channel by said third pulse gating means with a ringing control signal, means for concurrently modulating the pulses gated to said output channel by said second pulse gating means with a ring back tone signal, fourth pulse gating means jointly controlled by said busy test means and said selector pulses for gating pulses to said selector from said input channel in the event said selector pulses do not occur coincidentally with busy pulses fed to said selector over said busy pulse channel, a ring trip control tube of the gaseous discharge type, means responsive to the pulses gated to said selector by said fourth pulse gating means for firing said tube, and means for removing the ringing control signal modulation from the pulses gated to said output channel by said third pulse gating means and for removing the ring back tone signal modulation from the pulses gated to said output channel by said second pulse gating means in response to firing of said ring trip control tube.

40. In an automatic telephone system, a plurality of lines having individually assigned thereto different time positions in repetitive time position frames, a selector provided with a finder gate pulse input channel, a signal bearing pulse input channel and a pulse output channel, means for impressing relatively wide finder gate pulses on said finder gate pulse input channel in the time position assigned to a calling one of said lines, means controlled by said finder gate pulses for gating relatively narrow signal bearing pulses which are overlapped by said finder gate pulses and are transmitted to said selector over said signal bearing pulse input channel in the same time position, and means included in said selector and controlled by the pulses gated by said pulse gating means for gating pulses to said pulse output channel in a different time position.

41. In an automatic telephone system, a plurality of lines having individually assigned thereto different time positions in repetitive time position frames, a selector provided with a finder gate pulse input channel, a signal bearing pulse input channel and a pulse output channel, means for impressing relatively wide finder gate pulses on said finder gate pulse input channel in the time position assigned to a calling one of said lines, means for impressing relatively narrow signal bearing pulses on said signal bearing pulse input channel in the time positions assigned to all calling ones of said lines, pulse gating means controlled by said finder gate pulses for admitting signal bearing pulses to said selector in the same time position, and means included in said selector and controlled by the pulses gated by said pulse gating means for gating pulses to said pulse output channel in a different time position.

42. In an automatic telephone system, a plurality of lines having individually assigned thereto different time positions in repetitive time position frames, a selector provided with a finder gate pulse input channel, a signal bearing pulse input channel and a pulse output channel, means for impressing relatively wide finder gate pulses on said finder gate pulse input channel in the time position assigned to a calling one of said lines, means controlled by said finder gate pulses for gating relatively narrow signal bearing pulses transmitted to said selector over said signal bearing pulse input channel in the same time position, means included in said selector and controlled by the pulses gated by said pulse gating means for developing relatively wide gating pulses in a different time position, and means controlled by the gating pulses developed by said last-named means for gating relatively narrow signal bearing pulses which are completely overlapped by said developed pulses to said output channel in the same time position.

43. In an automatic telephone system, a plurality of lines having individually assigned thereto different time positions in repetitive time position frames, a selector provided with a pair of pulse input channels and a pulse output channel and including pulse gating means controlled in accordance with the identity of a calling one of said lines for gating pulses to said selector from one of said pulse input channels in the time position assigned to the calling line, means included in said selector and controlled by the pulses gated by said pulse gating means for developing selector pulses in a different time position, and means controlled by said selector pulses for gating pulses from the other of said pulse input channels to said pulse output channel in the same time position.

44. In an automatic telephone system, a plurality of lines having individually assigned thereto different time positions in repetitive time position frames, a selector provided with a pair of pulse input channels and a pulse output channel and including pulse gating means controlled in accordance with the identity of a calling one of said lines for gating pulses to said selector from one of said pulse input channels in the time position assigned to the calling line, means included in said selector and controlled by the pulses gated by said pulse gating means for developing selector pulses in a different time position, means controlled by said selector pulses for gating pulses from the other of said pulse input channels to said pulse output channel in the same time position, and means included in said selector and controlled by the pulses gated by said pulse gating means for gating pulses from the other of said pulse input channels to said pulse output channel in the time position assigned to the calling line.

45. In an automatic telephone system, a plurality of lines having individually assigned thereto different time positions in repetitive time position frames, a selector provided with a finder gate pulse channel, a pair of pulse input channels and a pulse output channel, means for impressing relatively wide finder gate pulses on said finder gate pulse channel in the time position assigned to a calling one of said lines, means controlled by said finder gate pulses for gating relatively narrow signal bearing pulses transmitted to said selector over one of said pair of pulse input channels in the same time position, means included in said selector and controlled by the pulses gated by said pulse gating means for developing relatively wide selector pulses in a different time position, and means controlled by said selector pulses for gating to said pulse output channel pulses transmitted to said selector over the other of said pulse input channels in the same time position.

46. In an automatic telephone system, a plurality of lines having individually assigned thereto different time positions in repetitive time position frames, a selector provided with a pair of pulse input channels and a pulse output channel and including pulse gating means controlled in accordance with the identity of a calling one of said lines for gating pulses to said selector from one of said pulse input channels in the time position assigned to the calling line, means included in said selector and controlled by the pulses gated by said pulse gating means for developing selector pulses in a different time position, means for impressing upon the other of said channels pulses appearing in each of said time positions, and means controlled by said selector pulses for gating pulses from the other of said pulse input channels to said pulse output channel in the same time position.

47. In an automatic telephone system, a plurality of lines having individually assigned thereto different time positions in repetitive time position frames, a selector provided with a pair of pulses input channels and a pulse output channel and including pulse gating means controlled in accordance with the identity of a calling one of said lines for gating pulses to said selector from one of said pulse input channels in the time position assigned to the calling line, means included in said selector and controlled by the pulses gated by said pulse gating means for developing relatively wide selector pulses in a different time position, means for impressing upon the other of said channels relatively narrow pulses appearing in each of said time positions, and means controlled by said selector pulses for gating pulses from the other of said pulse input channels to said pulse output channel in the same time position.

48. In an automatic telephone system which includes a plurality of lines having individually assigned thereto different time positions in repetitive time position frames, an impulse responsive selector provided with a signal pulse input channel and a signal pulse output channel and including pulse gating means controlled in accordance with the identity of a calling one of said lines for gating pulses to said selector from said pulse input channel in the time position assigned to the calling line, the pulses gated through said pulse gating means being modulated by switch directing impulses transmitted over the calling line, an impulse integrator circuit for developing control pulses in response to said switch directing impulse modulation, impulse register means including a primer stage and a plurality of counting stages, means for rendering said primer stage conductive in response to operative association of said selector with the calling line, means responsive to said control pulses for rendering said primer stage non-conductive and for successively rendering said counting stages conductive at the rate of one stage for each control pulse, and means controlled by said primer stage for transmitting dial tone modulated pulses to said signal pulse output channel in the time position assigned to the calling line during the period from operative association of said selector with the calling line until the first switch directing impulse is transmitted over the calling line.

49. In an automatic telephone system which includes a plurality of lines having individually assigned thereto different time positions in repetitive time position frames, an impulse responsive selector provided with a signal pulse input channel and a signal pulse output channel and including pulse gating means controlled in accordance with the identity of a calling one of said lines for gating pulses to said selector from said pulse input channel in the time position assigned to the calling line, the pulses gated through said pulse gating means being modulated by switch directing impulses transmitted over the calling line, an impulse integrator circuit for developing control pulses in response to said switch directing impulse modulation, impulse register means including a primer stage and a plurality of counting stages, means responsive to operative association of said selector with the calling line for rendering said primer stage conductive and for transmitting dial tone modulated pulses to said signal pulse output channel in the time position assigned to the calling line, means responsive to said control pulses for rendering said primer stage non-conductive and for successively rendering said counting stages conductive at the rate of one stage for each control pulse, and means controlled by said primer stage for removing said dial tone modulation from said pulses transmitted to said output channel.

50. In combination, a selector device having a plurality of input terminals, an output terminal and selector means for selectively connecting the input terminals to said output terminal, means to apply pulse trains of different phases to said input terminals respectively, a control circuit to actuate said selector means, a source of control voltage connected to said control circuit to cause said selector means to select one of said input terminals for connection to said output terminal, a pulse demodulator, a pulse modulator and means to connect said output terminal to said demodulator and modulator.

51. In combination, a selector device having a plurality of input terminals, an output terminal and selector means for selectively connecting the input terminals to said output terminal, means to apply pulse trains having different channel identifying signals to said input terminals respectively, a control circuit to actuate said selector means, a source of control voltage connected to said control circuit to cause said selector means to select one of said input terminals for connection to said output terminal, a pulse demodulator, a pulse modulator and means to connect said output terminal to said demodulator and modulator.

52. In combination, a selector device having a plurality of input terminals, an output terminal and selector means for selectively connecting the input terminals to said output terminal, means to apply pulse trains of different phases to said input terminals respectively, a control circuit to actuate said selector means, a source of control signals connected to said control circuit to cause said selector means to select one of said input terminals for connection to said output terminal, a pulse demodulator, a pulse modulator, and means to connect said output terminal to said demodulator and modulator.

53. Coding apparatus for automatic exchanges, comprising a main input terminal to receive dialing impulses, a plurality of selector switching devices each having a plurality of input terminals and an output terminal, control apparatus to actuate said selector switching devices in response to dialing impulses, means to apply dialing impulses from said main input terminal to said control apparatus to select different ones of the said input terminals of said selector switching devices for connection to said output terminals thereof respectively, a source of voltages of different characteristics, means to apply said voltages to the input terminals of said selector switching devices, different voltages being applied to different ones of the last said terminals, a combining circuit connecting the output terminals of said selector switching devices to provide a combined output from said selector switching devices, a source of signalling voltage, a further combining circuit, a main output terminal, means connecting said further combining circuit between the first said combining circuit and said main output terminal, and means to apply signal voltage from the last said source to said further combining circuit to produce at said main output terminal a signal having characteristics related to said dialing impulses and to a signal from the last said source.

References Cited in the file of this patent

UNITED STATES PATENTS

| | | |
|---|---|---|
| 2,490,833 | Ransom | Dec. 13, 1949 |
| 2,492,136 | Deloraine | Dec. 27, 1949 |
| 2,619,548 | Lesti | Nov. 25, 1952 |
| 2,666,809 | Flowers | Jan. 19, 1954 |
| 2,716,159 | Flowers | Aug. 23, 1955 |
| 2,770,678 | Flowers | Nov. 13, 1956 |

UNITED STATES PATENT OFFICE

CERTIFICATE OF CORRECTION

Patent No. 2,934,606 April 26, 1960

Robert B. Trousdale

It is hereby certified that error appears in the printed specification of the above numbered patent requiring correction and that the said Letters Patent should read as corrected below.

Column 96, line 63, for "2023" read -- 1023 --; column 119, line 55, for "which" read -- when --; column 122, line 71, for "contnrolled" read -- controlled --; column 128, line 41, for "idler" read -- idle --; column 132, line 9, for "registers" read -- register --; column 141, line 62, for "pulses" read -- pulse --.

Signed and sealed this 20th day of September 1960.

(SEAL)

Attest:

KARL H. AXLINE
Attesting Officer

ROBERT C. WATSON
Commissioner of Patents